US010933334B2

(12) United States Patent
Taki et al.

(10) Patent No.: US 10,933,334 B2
(45) Date of Patent: Mar. 2, 2021

(54) LIFE AND DEATH JUDGEMENT SYSTEM FOR GO GAME

(71) Applicant: PANDANET INC., Tokyo (JP)

(72) Inventors: Hiroko Taki, Tokyo (JP); Tomoya Saeki, Tokyo (JP); Hiroshi Oomoto, Funabashi (JP)

(73) Assignee: PANDANET INC., Tokyo (JP)

( * ) Notice: Subject to any disclaimer, the term of this patent is extended or adjusted under 35 U.S.C. 154(b) by 0 days.

(21) Appl. No.: 16/299,385

(22) Filed: Mar. 12, 2019

(65) Prior Publication Data

US 2019/0299106 A1 Oct. 3, 2019

Related U.S. Application Data

(63) Continuation of application No. 13/500,675, filed as application No. PCT/JP2009/067478 on Oct. 7, 2009, now Pat. No. 10,265,617.

(51) Int. Cl.
*A63F 13/80* (2014.01)
*A63F 13/00* (2014.01)
*A63F 3/00* (2006.01)

(52) U.S. Cl.
CPC .......... *A63F 13/80* (2014.09); *A63F 3/00643* (2013.01); *A63F 13/005* (2013.01); *A63F 2003/00996* (2013.01)

(58) Field of Classification Search
CPC ..................................................... A63F 3/022
See application file for complete search history.

(56) References Cited

U.S. PATENT DOCUMENTS 7,713,117 B2    5/2010 Graepel et al.

FOREIGN PATENT DOCUMENTS

JP    06-126021 A    5/1994
JP    09-075549 A    3/1997
(Continued)

OTHER PUBLICATIONS

Hyu-Soo Park et al., Implementation of State Evaluation using Group area and String Safety in Computer Baduk, Korea Information Science Society Conference, Apr. 1996, 217-220, vol. 23 No. 1A, Korea Information Science, No. 1A, Korea Information Science, http://fwww.dbpia.co.kr/Journal/ArticleDetail/NODE00624511.
(Continued)

*Primary Examiner* — David L Lewis
*Assistant Examiner* — Robert E Mosser
(74) *Attorney, Agent, or Firm* — Shlomo S. Moshen; David W. Barman

(57) ABSTRACT

A life and death judgment system for a go game played with a computer comprising an input reception unit that receives an input by a player, a life and death judgment processing unit that judges whether judgment subject stones or target stones are alive, and an output processing unit that outputs the result of the life and death judgment is provided. The life and death judgment processing unit tentatively determines the priority of a move at each point when implementing the judgment in a judgment realm, judges a point of a move with a high possibility and/or a move with a low possibility of a result of the judgment, changes the priority of the point of the move with a high possibility with respect to each priority of the tentatively determined point, and undertakes the move of each stone based on the priority after such change, thereby implement the judgment.

1 Claim, 105 Drawing Sheets

(56) References Cited

FOREIGN PATENT DOCUMENTS

| JP | 10-272259 A | 10/1998 |
|---|---|---|
| JP | 11-226262 A | 8/1999 |
| JP | 2002-292126 A | 10/2002 |

OTHER PUBLICATIONS

Hisashi Kato, et al., "Jirei o Mochiita Computer 9 Roban Igo ni Okeru Shikatsu Hantei", The 53rd (2nd Period, 1996) National Convention Proceedings, Information Processing Society of Japan, Sep. 4, 1996, pp. 2-145, 2-146.
Online Game, Passionate Amateurs and Pros, Stone's "Life and Death" is Automatically Determined. The Japan Economic Newspaper, Kabushiki Kaisha Japan Economic Newspaper, Jan. 1, 2004, the Morning Edition Part 3, p. 3.
Shinichi Sei, et al., "Introduction to Computer Go", Kyoritsu Shuppan Co., Ltd., Nov. 10, 2005, pp. 103-110, 114-115.
Yasuhiro Ike, "Algorithm for Computer Go", 1/0, Kabusiki Kaisha Kogakusha, Jun. 1, 2007, pp. 138-140, vol. 32, No. 6.

Life and Death Judgment Processing Unit 21a

White stars (☆) are the judgment object stones (target stones).

Vacant points in the judgment realm subjected to a round robin.

FIG. 19
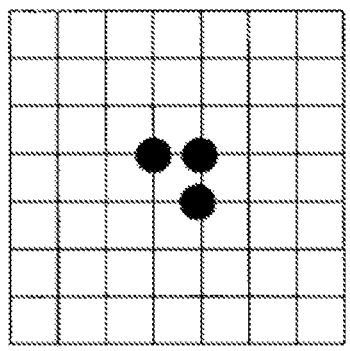
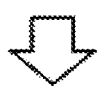 Obtain points E of each stone
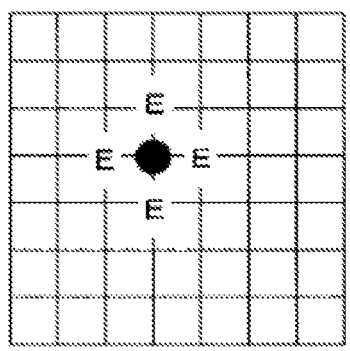 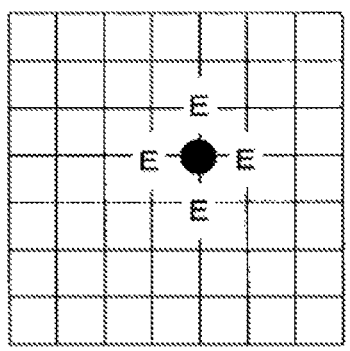 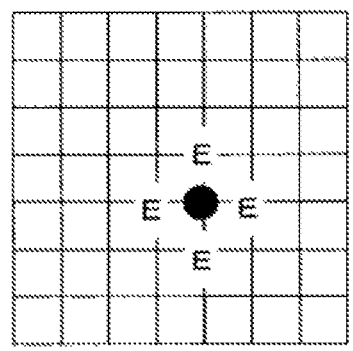
 Obtain the union of points E of each stone.
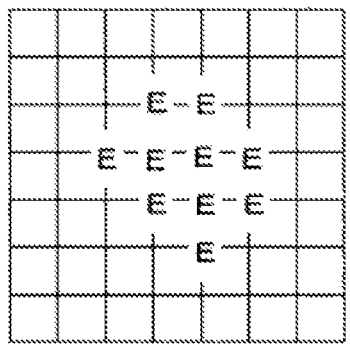  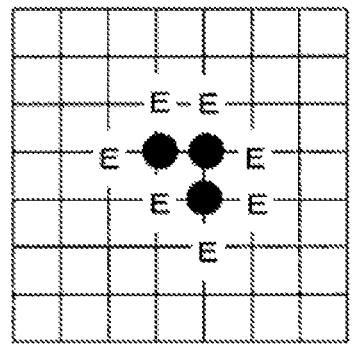
From the union of points E of each stone, remove the points E of the stones that are present. Es thus left are the points E of the three black stones.

FIG. 21
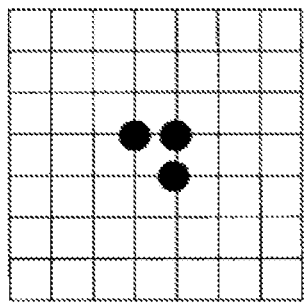
 Obtain points O of each stone.
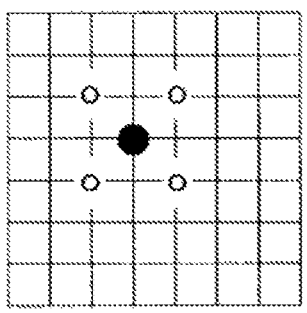 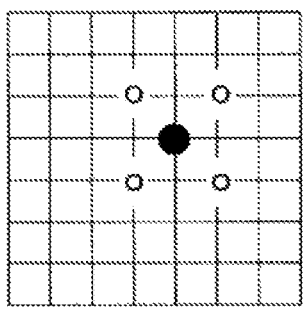 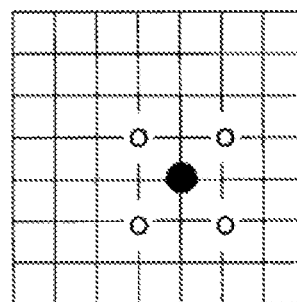
 Obtain the union of points O of each stone.
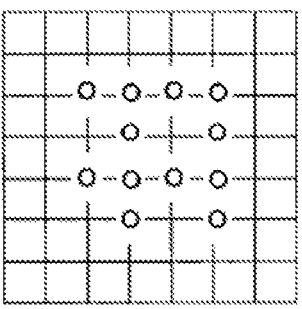 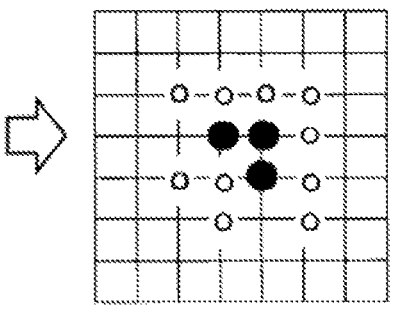 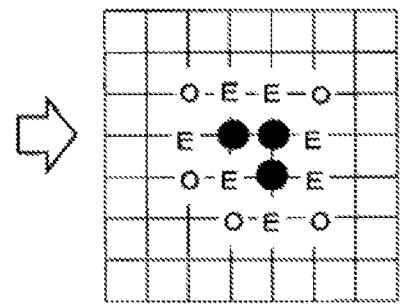
From the union of points O of each stone, remove the points O of the stones that are present.
Finally, remove all points included in points E of each stone; 5 points hence left are the points O of the three black stones.

E and O represent vacant points E and vacant points O of the three black stones respectively.

FIG. 28
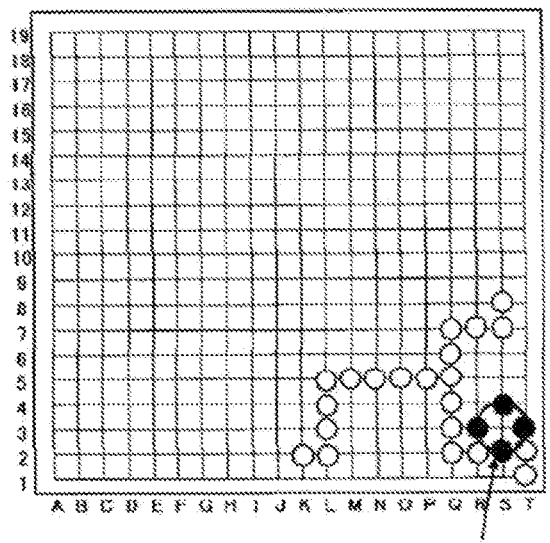 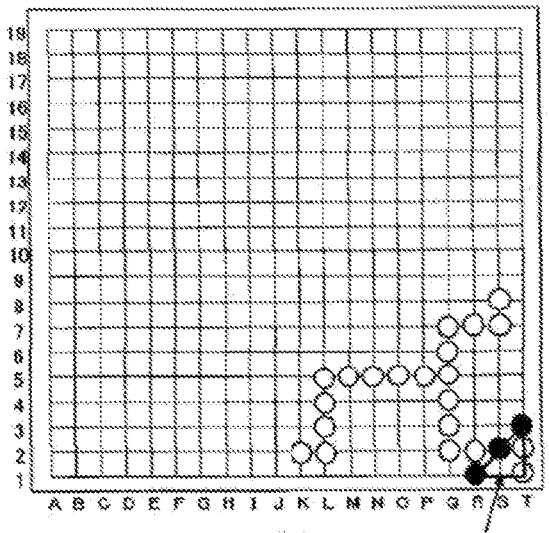
(a) Closed realm defined only by black stones
(b) Closed realm defined by black stones and the outside
FIG. 29
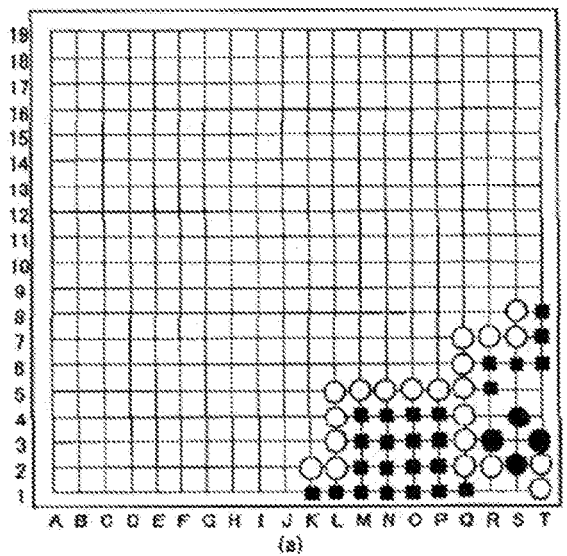 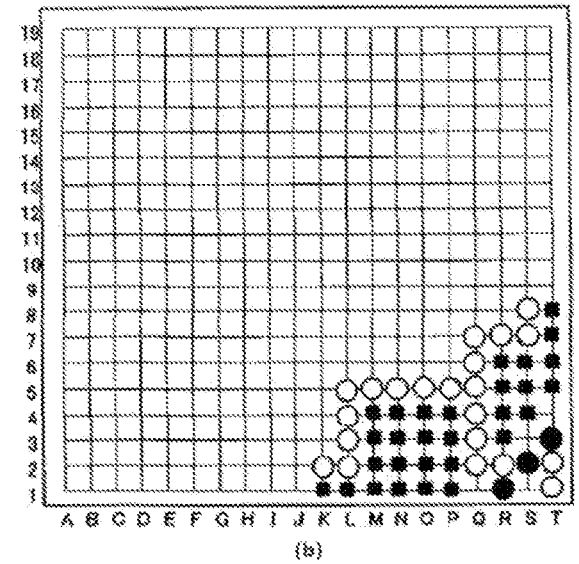
(a)
(b)

The opponent's stones to be newly placed (white stones)

Figure 31:
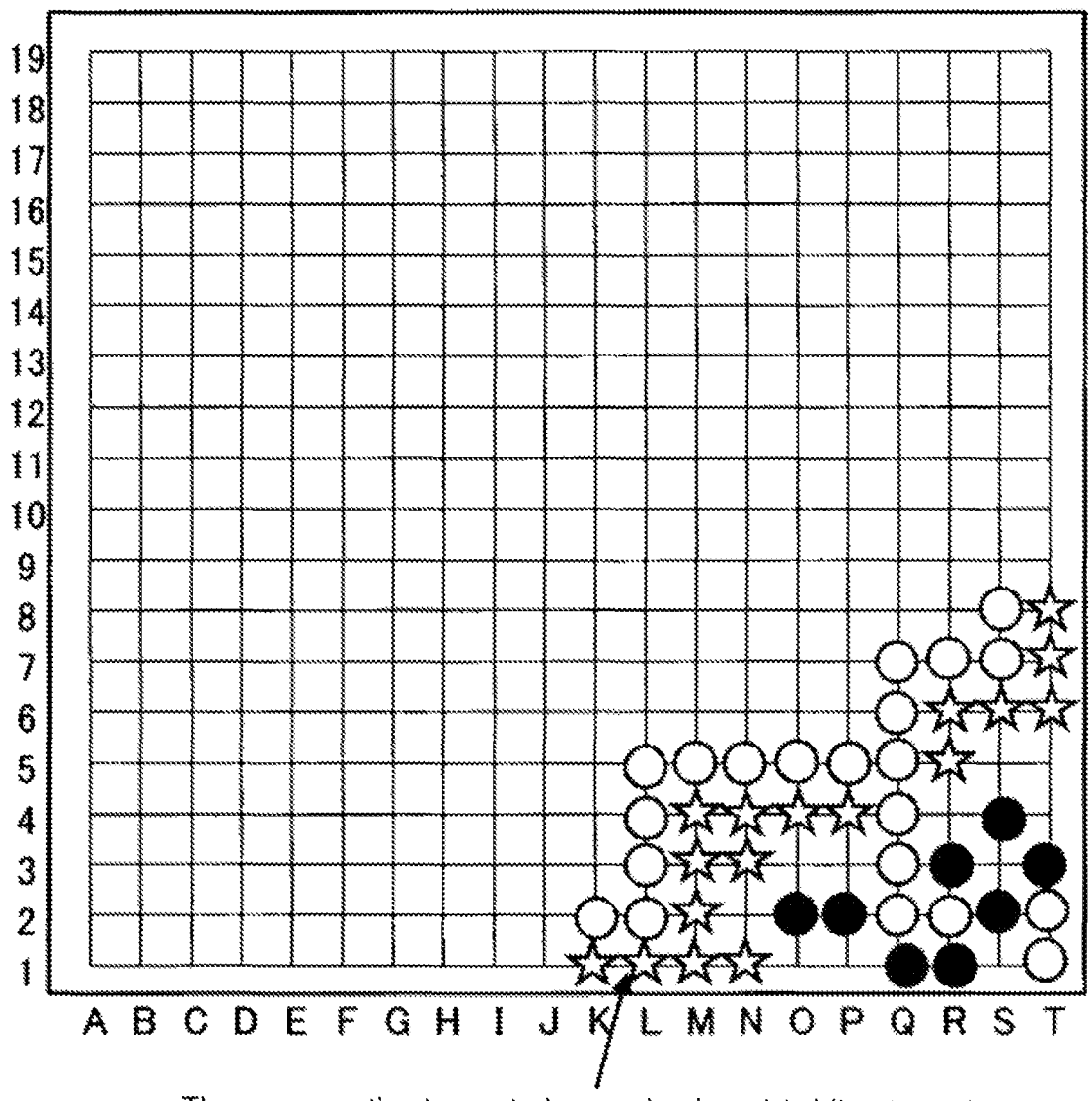

Remove the stones that are not connected to the outside from the opponent's stones (white stones) that are newly placed.
* However, there is no stone to be removed in FIG. 31.

In these points E, whether there is a point where two or more stones of the outside are contained without containing any judgment object stone is determined. If there is such a point, the opponent's stone is placed at that point, and the point is regarded as the outside.

In these points E, whether there is a point where two or more stones of the outside are contained without containing any judgment object stone is determined. If there is such a point, the opponent's stone is placed at that point and the point is regarded as the outside.

In these points E, whether there is a point where two or more stones of the outside are contained without containing any judgment object stone is determined. If there is such a point, the opponent's stone is placed at that point and the point is regarded as the outside.

In these points E, whether there is a point where two or more stones of the outside are contained without containing any judgment object stone is determined. If there is such a point, the opponent's stone is placed at the point and the point is regarded as the outside.

FIG. 56

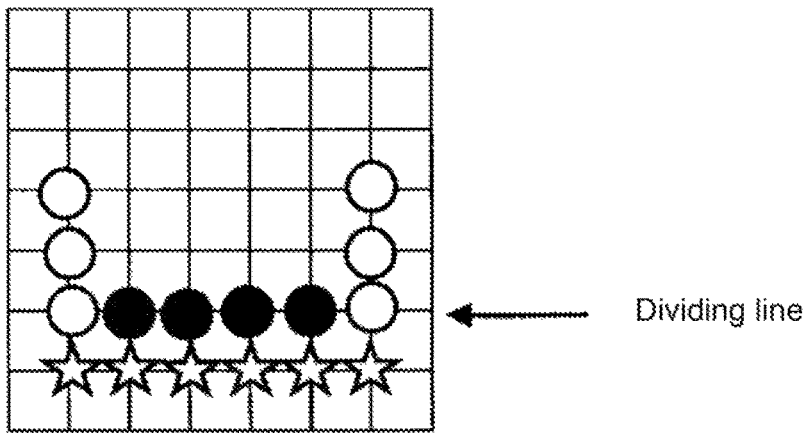

← Dividing line

FIG. 57

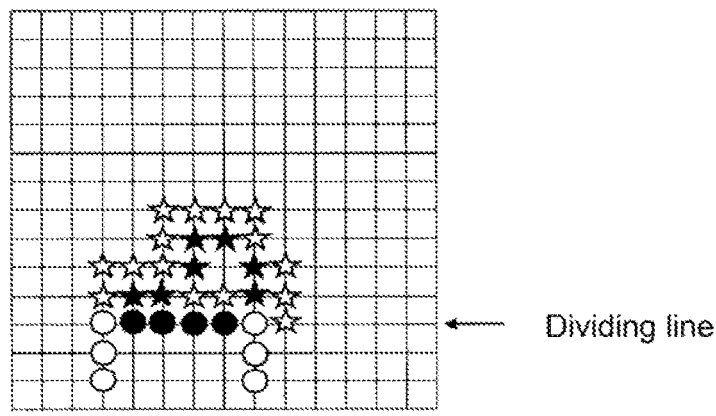

← Dividing line

*The one eye shape is formed on black's move while the 0 eye shape is formed on white's move. Additionally, no two eye shape is formed regardless of the number of moves black makes.

FIG. 58

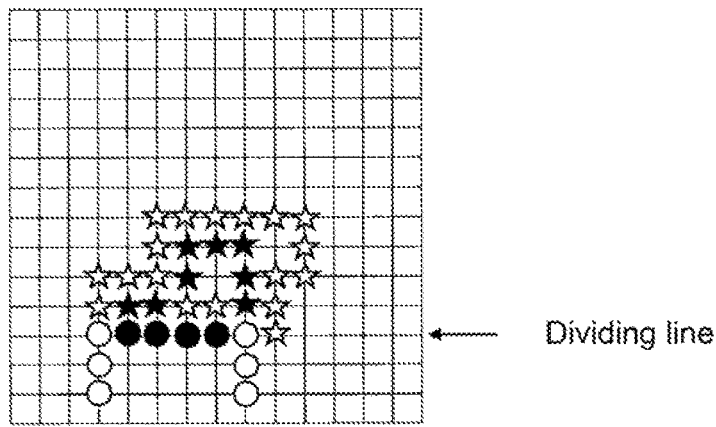

← Dividing line

*The black one eye shape is formed regardless of white's move or black's move. Additionally, no two eyes shape is formed regardless of the number of moves black repeats.

Stones to become a dividing line

Because the offense side's move enables capturing of the target stones, it is determined that the offense side wins.

Because the offense side's move enables capturing of the target stones, it is determined that the offense side wins.

LIFE AND DEATH JUDGEMENT SYSTEM FOR GO GAME

CROSS REFERENCE TO RELATED APPLICATIONS

This application is a continuation of application Ser. No. 13/500,675, which is the National Stage of International Application No. PCT/JP2009/067478, filed Oct. 7, 2009. The foregoing applications are incorporated herein by reference in their entirety.

TECHNICAL FIELD

The present invention relates to a life and death judgment (i.e., prediction) system when playing a Go game implemented on a computer.

BACKGROUND TECHNOLOGY

By using a computer, a player can play a Go game with the computer or another player via a network. Go is a game in which players compete for the size of one's territory, and it is important that the player establishes a strategy and makes a move by constantly considering what to do to keep one's living stones or to kill the opponent's stone in some situation.

For instance, if a player can determine (i.e., predict) that one's stone is dead in the early stage, the player can abandon said territory and concentrate on another place, which is very efficient as an overall strategy as well. For this reason, in Go, it is very important to determine (i.e., predict) whether one's stone or the opponent's stone is alive or dead. Note that whether a stone is alive or dead is referred to as the "life or death". Furthermore, living stones are those that cannot be captured by the opponent's moves or those that, if captured, can create new stones that cannot be captured by the opponent; dead stones are those other than living stones, which can be captured by moves of the opponent.

Moreover, in addition to the strategy during a Go game, the life and death of stones must be determined also at the endgame; from this viewpoint as well, the life or death of stones is important. For this reason, there is also what is called Tsumego where players are challenged by a problem of life or death in a limited realm.

As such, in Go, it is extremely important to determine (i.e., predict) the life or death of stones'; however, it is not easy to actually determine (i.e., predict) whether the stone is alive or dead. Particularly, it is difficult for a computer to do it automatically. Therefore, for instance, as shown in the following patent documents and non-patent documents, systems that perform the processing associated with life or death of stones are disclosed.

PRIOR ART DOCUMENTS

Patent Documents

Patent document 1: Japanese Laid-open Patent Application No. H06-126021.
Patent document 2: Japanese Laid-open Patent Application No. H10-272259.
Patent document 3: Japanese Laid-open Patent Application No. H11-226262.
Patent document 4: Japanese Laid-open Patent Application No. 2002-292126.

Non-Patent Documents

Non-patent document 1: Kabushiki Kaisha Pandanet, "Jissen Igo 'life and death navi', [online], Internet <URL: http://www.pandanet.co.jp/members/lifedeath/index.html>.
Non-patent document 2: Thomas Wolf. "GoTools", (online, Internet <URL: http://lie.math.brocku.ca/gotools/>.
Non-patent document 3: "Igo 'Don', [online], Internet <URL: http://hp.vector.co.jpauthor/VA024708/>
Non-patent document 4: Nippon Computer Igo Kyokai, "Igo Program". [online], Internet <URL: http://www.geocities.jp/otto4yoshi/jegalindexkp.html>.

SUMMARY OF TH E INVENTION

Problems the Invention Intends to Solve

The system described in Patent document 1 performs the processing associated with life and death of stones; however, it is the system in which, as a player designates dead stones, the designation of only one stone enables the player to also designate a group of stones adjacent to said stone as dead stones. Therefore, the designation of one stone by the player enables him to designate a group of stones as dead stones without designating stones around it; hence the processes to designate dead stones by the player can be reduced. Nevertheless, the life and death judgment of stones itself must be made by the player, and it is not the system which can judge the life and death automatically.

Moreover, the system described in Patent documents 2 can control the stones placed on the board as well as their characteristics. For instance, it can control the connection of the stones placed on the board and the stones constituting a group. Therefore, it can control the stones on the board as well as the alignment thereof, and determine that the stones formed in a simple pattern (i.e. the presence of two eyes represents being alive) are alive. Nevertheless, the system can make a judgment only on a very simple pattern, and cannot withstand the use in an actual game.

The system described in Patent document 3 can determine whether the stones that have already been placed on the board are strong or weak in the middle of the game. In Go, a stone's being strong or weak means that, if the outside of a certain stone is surrounded, the stone is weak; if the outside of a certain stone is not surrounded, the stone is strong. In this system, whether said stone is strong or weak is determined by the number of stones of a different color placed around (within four eyes) the certain stone. However, it can only determine whether the stone is strong or weak in terms of Go and does not make the life and death judgment (i.e., prediction) itself.

Moreover, the system described in Patent document 4 performs automatically the life and death judgment of stones at an end of game of Go. This system assumes that the game has reached an end, where a territory (closed realm) has already been established, and then, carries out no more than conducting life and death judgment in a simplified manner. Therefore, the life and death judgment cannot be made in a situation where the game has not ended, that is, during the game is being played, and furthermore, even at the end of game, the life and death judgment can be made on limited patterns.

As described above, the processing associated with life and death described in each of the above Patent documents does not necessarily provide a superior life and death judgment (i.e., prediction).

Other than the life and death judgment system described in each of the above-mentioned Patent documents, there is another system in which whether a stone is alive or dead is judged (i.e., predicted) by the use of a computer as described in the non-patent documents. For instance, it is a method in which many patterns of the problem-diagram, correct answer diagram, and expected failure-diagram are stored in advance, and the judgment (i.e., prediction) is made while matching the stones with them.

In this case, the judgment (i.e., prediction) cannot be made if an unexpected move is made, and it is not very desirable to store many patterns of the problem-diagram, correct answer-diagram, and expected failure-diagram to begin with in light of the memory capacity issue.

Theoretically, the life and death judgment (i.e., prediction) can be made by conducting a round robin. Nevertheless, processing of a life and death judgment is reported to generally require O (n!) numbers of processing (n is the size of the realm subject to the life and death judgment processing). In addition, in case of life and death judgment, it is desired to know soon its result, i.e., whether the stones will be alive or dead. However, in case of a round robin, the number of processing described above is required, and as a result, conducting simply a round robin may often result in requiring a long time before knowing the result, whereby the player feels stressed.

As used in the remainder of this specification, the term "judgment" or the like connotes "predict" or the like, and the term "determine" or the like connotes "predict" or the like.

Means to Solve the Problems

Thus, the present inventors devised the life and death judgment system which can output the result of life and death judgment at a higher speed than the known conventional life and death judgment system.

The first invention is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment unit; and said life and death judgment processing unit tentatively determines the priority of a move at each point when the processing of life and death judgment is carried out in a predetermined judgment realm, judges a point of a move with a high possibility and/or a move with a low possibility of giving a result of the life and death judgment, changes the priority of said point of move with a high possibility and/or a move with a low possibility with respect to said priority of each tentatively determined point, and undertakes the move of each stone based on the priority after said change, thereby carrying out the life and death judgment.

Applicant intends that the term "unit" as used throughout the specification can be alternatively interchangeable with the term "system," as readily understood by a person of ordinary skill in the art.

By carrying out the processing according to the present invention, a point of move with a high possibility of giving a result of the life and death judgment is processed first with a priority, and the point of a move with a low possibility is processed later. As a result, the processing can give a result of the life and death judgment at a higher speed than the simple processing of the life and death judgment.

The above-mentioned invention can also be configured in the manner described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit comprises a priority memory unit which stores the priority of a move at each point when the processing of life and death judgment is carried out in the predetermined judgment realm, a judgment processing unit which determines whether part or all of the judgment object stones or target stones of the opponent in the judgment region are alive, a priority change-processing unit which changes the priority of a move stored in said priority memory unit in accordance with the result of life and death judgment made by said judgment processing unit for said judgment object stone of the opponent, and a life and death judgment execution unit which carries out the processing of life and death judgment based on the condition set by said judgment processing unit.

The above-mentioned invention can also be configured in the manner described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment by said life and death judgment processing unit; and said life and death judgment processing unit comprises a priority memory unit that stores the priority of a move at each point when the life and death judgment is carried out in the predetermined judgment realm; a first judgment processing unit which carries out the processing of life and death judgment by using the judgment object stone or target stone of the opponent in the judgment realm as the inside, the original judgment object stone or target stone as the outside, and the opponent's stone adjacent to said original judgment object stone or target stone as a new target stone: a second judgment processing unit that carries out the processing of life and death judgment by using the judgment object stone or the opponent stone of the target stone in the judgment realm as the inside, and the original judgment object stone or target stone as the outside if said first judgment processing unit determines that no point of move satisfies the predetermined condition; a priority change processing unit which changes priority of the point of move stored in said priority memory unit in response to the result of the life and death judgment made by said first judgment processing unit and said second judgment processing unit on said judgment object stone of the opponent; and a life and death judgment execution unit which carries out the processing of life and death judgment in accordance with said condition set by said first judgment processing unit and second judgment processing unit.

The same technical effects as the first invention can be obtained with the configuration of each of the inventions described above.

The second invention is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit places a stone of a color which is different from that of the judgment object stone in the predetermined judgment realm in accordance with a given condition, and carries out the processing of life and death judgment after said placement is made on the board.

In the configuration according to the present invention, the opponent's stones can be placed appropriately at vacant points in the judgment realm. Accordingly, fewer points become judgment object points when the life and death judgment is processed. Thus, a result of the life and death judgment can be output at a higher speed than the simple processing of the life and death judgment.

The above-mentioned invention can also be configured in the manner described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit comprises an outside processing unit which places a stone of a color which is different from said judgment object stone using the outside of said judgment realm as a baseline in the predetermined judgment realm in accordance with a given condition, and a life and death judgment execution unit which carries out the processing of life and death judgment after said placement is made on the board.

The above-mentioned invention can also be configured in the manner described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit comprises a first outside processing unit which extracts the closed realm including the judgment object stone or target stone within the predetermined judgment realm, places a stone of a color which is different from that of said judgment object stone at a point which satisfies a given condition outside the closed realm using the outside as a baseline, and regards said newly placed stone as the outside; and a life and death judgment execution unit which carries out the processing of life and death judgment after the processing by said first, outside processing is provided to the board.

The above-mentioned invention may also have the configuration described below. In other words, said life and death judgment processing unit further comprises a second outside processing unit which extracts the outside-E-vacant points within the predetermined judgment realm, places a stone of a color which is different from that of said judgment object stone at a point, among all of the points, which satisfies a given condition by using the outside as a baseline, and regards said newly placed stone as the outside; and said life and death judgment execution unit carries out the processing of life and death judgment after the processing by said first outside processing unit and said second outside processing unit is provided to the board.

The above-mentioned invention can also be configured in the manner described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit comprises a second outside processing unit which extracts the outside-E-vacant points within the predetermined judgment realm, places a stone of a color which is different from that of said judgment object stone at a point, among all of the points, which satisfies a given condition by using the outside as a baseline, and regards said newly placed stone as the outside; and a life and death judgment execution unit which carries out the processing of life and death judgment after the processing by said second outside processing unit is provided to the board.

The same technical effects as the second invention can be obtained with the configuration of each of the inventions described above.

The third invention is a life and death judgment system for a Go game in which death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit divides the area in the judgment realm by a given method, changes the divided areas into a given eye shape, and carries out the processing of life and death judgment after the eye shape change is made on the board.

In the configuration according to the present invention, the judgment object realm can be divided, and the divided areas can be changed into a given eye shape. The life and death judgment can be hence accelerated utilizing the characteristic that live stones often have two eyes.

The above invention can also be configured in the manner as described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment unit comprises a realm division processing unit which divides the area in the judgment realm by a given method, an eye shape change processing unit which changes one of said divided areas into one or more eye shapes selected from 0 eye, half eye or one eye, and a life or death judgment execution unit which carries out the processing of life and death judgment on the areas with and without said shape-change.

The above invention can also be configured in the manner as described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit comprises a realm division processing unit which divides the area in the judgment realm by a given method, a 0 eye shape-change processing unit which changes one of said divided areas into the 0 eye shape, a half eye shape-change processing unit which changes one of said divided areas into the half eye shape, a one eye shape-change processing unit which changes one of said divided areas into the one eye shape, and a life and death judgment execution unit which carried out the processing of life and death judgment on the area with or without the shape-change by either said 0 eye shape-change processing unit, half eye shape-change processing unit or one eye-shape change processing unit; and said life and death judgment processing unit further changes said one of the divided areas into the 0 eye shape at said 0 eye shape-change processing unit and carries out the processing of life and death judgment on the area with or without the shape-change by said life and death judgment execution unit; if the processing of life and death judgment does not give the winning result, it further changes said one of the divided areas into the half eye shape by said half eye shape-change processing unit and carries out the processing of life and death judgment on the areas with and without the shape-change by said life and death judgment execution unit: if the processing of life and death judgment does not give the winning judgment result, it further changes said one of the divided areas into the one eye shape by said one eye change-processing unit and carries out the processing of life and death judgment on the areas with and without the shape-change; and if the processing of life and death judgment does not give the winning judgment result, it carries out the processing of life and death judgment on the board in the original state.

The above-described invention may also have the following configuration. In other words, said life and death judgment execution unit further carries out the processing of life and death judgment on the areas with and without the shape-change into the 0 eye shape at said 0 eye shape-change processing unit, and gives the winning judgment result, said life and death judgment processing unit further determines the winning as a whole.

The above-mentioned invention may also have the configuration described below. That is, if the processing of the life and death judgment by said life and death judgment execution unit is carried out on the areas with and without the shape-change into the half eye shape at said half eye shape-change processing unit and, as a result, the winning judgment result is given, said life and death judgment processing unit returns said shape-changed area to the original state while said divided area which is different from said shape-changed area is changed to the one eye shape by said one eye shape-change processing unit, and carries out the processing of life and death judgment on the areas with and without shape-change at said life and death judgment execution unit; if the processing of life and death judgment gives the winning judgment result, it gives the winning as a whole judgment; and if the winning judgment cannot be made, the processing of life and death judgment is carried out on the board in the original state.

The above-mentioned invention may also have the configuration described below. That is, if said life and death judgment execution unit carries out the processing of life and death judgment on the areas with and without shape-change into the one eye shape at said one eye shape-change processing unit and the winning judgment result is given, said life and death judgment processing unit returns said shape-changed area to the original state while said divided area which is different from said shape-changed area is changed into the half eye shape by said half eye processing unit, and said life and death judgment execution unit carries out the processing of life and death judgment on the areas with and without shape-change; if the processing of life and death judgment gives the winning judgment result, it gives the winning result as a whole judgment; and if the winning judgment cannot be made, the processing of life and death judgment is carried out on the board in the original state.

The same technical effects as the third invention can be obtained with the configuration of each of the inventions described above.

The fourth invention is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit counts the number of E-vacant points of a judgment object stone or target stone, determines the move of the offence side or defense side based on the number of said E-vacant points, and carries out the processing of life and death judgment based on the determined move.

In the configuration according to the present invention, a loose ladder move can be used to make the accelerated life and death judgment.

The above-mentioned invention may also be configured in the manner described below. In other words, it is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment unit comprises an E-vacant point count processing unit which counts the number of E-vacant point of a judgment object stone or target stone, and a life and death judgment execution unit which carries out the processing of life and death judgment by determining the priority of a move of the offence side or defense side based on the number of E-vacant points counted by said E-vacant point, and alternately repeating the moves of the offense side or defense side according to the priority.

The same technical effects as the fourth invention can be obtained with the configuration of the invention described above.

The fifth invention is a life and death judgment system for a Go game in which life and death of a Go is determined by the use of a computer, wherein said life and death judgment system comprises an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit accepts the designation of target stones as said judgment object stones, carries out the processing of life and death judgment on said received target stones, and gives the loosing judgment if one of said target stones is captured while giving the winning judgment if all target stones remain uncaptured.

Conventionally, in the life and death judgment system for a Go game, the life and death judgment processing is carried out in such a way that, the winning judgment is given if no judgment object stone is captured, and the losing judgment is given if all of them are captured. However, in the state of a game, the stones any of which should not be captured, or all of which must be protected exist. In such a case, the conventional life and death judgment processing system could not cope with the situation. In the configuration according to the present invention, target stones can be set to perform the life and death judgment processing according to the target stone baseline.

The first invention described above can also be configured in such a way that the program of the present invention is downloaded into a computer for execution. In other words, a computer is used as an input reception unit which receives an input by a player, a life and death judgment processing unit that determines whether the judgment object stone or target stone is alive, and an output processing unit which outputs the result of life and death judgment made by said life and death judgment processing unit, and said life and death judgment processing unit tentatively determines the priority of a move at each point when the processing of life and death judgment is carried out in a predetermined judgment realm, determines a point of a move with a high possibility and/or a move with a low possibility of giving a result of the life and death judgment, changes the priority of said point of a move with a high possibility and/or a move with a low possibility in said tentatively determined point, and determines life and death by undertaking a move of each stone based on the priority after said change.

The second invention described above can also be configured in such a way that the program of the present invention is downloaded into a computer for execution. In other words, a computer is used as an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit places a stone of a color which is different from that of said judgment object stone in the predetermined judgment realm in accordance with a given condition, and carries out the processing of life and death judgment after said placement is made on the board.

The third invention described above can also be configured in such a way that the program of the present invention is downloaded into a computer for execution. In other words, a computer is used as an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit divides the area in the judgment realm by a given method, changes the divided areas into a given shape in the divided area, and carries out the processing of life and death judgment on the state of the board after the shape change.

The fourth invention described above can also be configured in such a way that the program of the present invention is downloaded into a computer for execution. In other words, a computer is used as an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit counts the number of E-vacant points of a judgment object stone or target stone, determines the point of a move of the offence side or defense side based on the number of said E-vacant points, and carries out the processing of life and death judgment based on the determined move.

The fifth invention described above can also be configured in such a way that the program of the present invention is downloaded into a computer for execution. In other words, a computer is used as an input reception unit which receives an input by a player, a life and death judgment processing unit that determines whether the judgment object stone or target stone is alive, and an output processing unit which outputs the result of life and death judgment made by said life and death judgment processing unit; and said life and death judgment processing unit accepts the designation of target stones as said judgment object stones, carries out the processing of life and death judgment on said received target stones, and gives the loosing judgment if one of said target stones is captured while giving the winning judgment if all target stones remain uncaptured.

Effects of the Invention

The life and death judgment system for a Go game of the present invention can output a result of the life and death judgment faster than that of conventional technology without limiting the state to the endgame or middle of the game.

BRIEF DESCRIPTION OF TH E DRAWINGS

Figure 1:
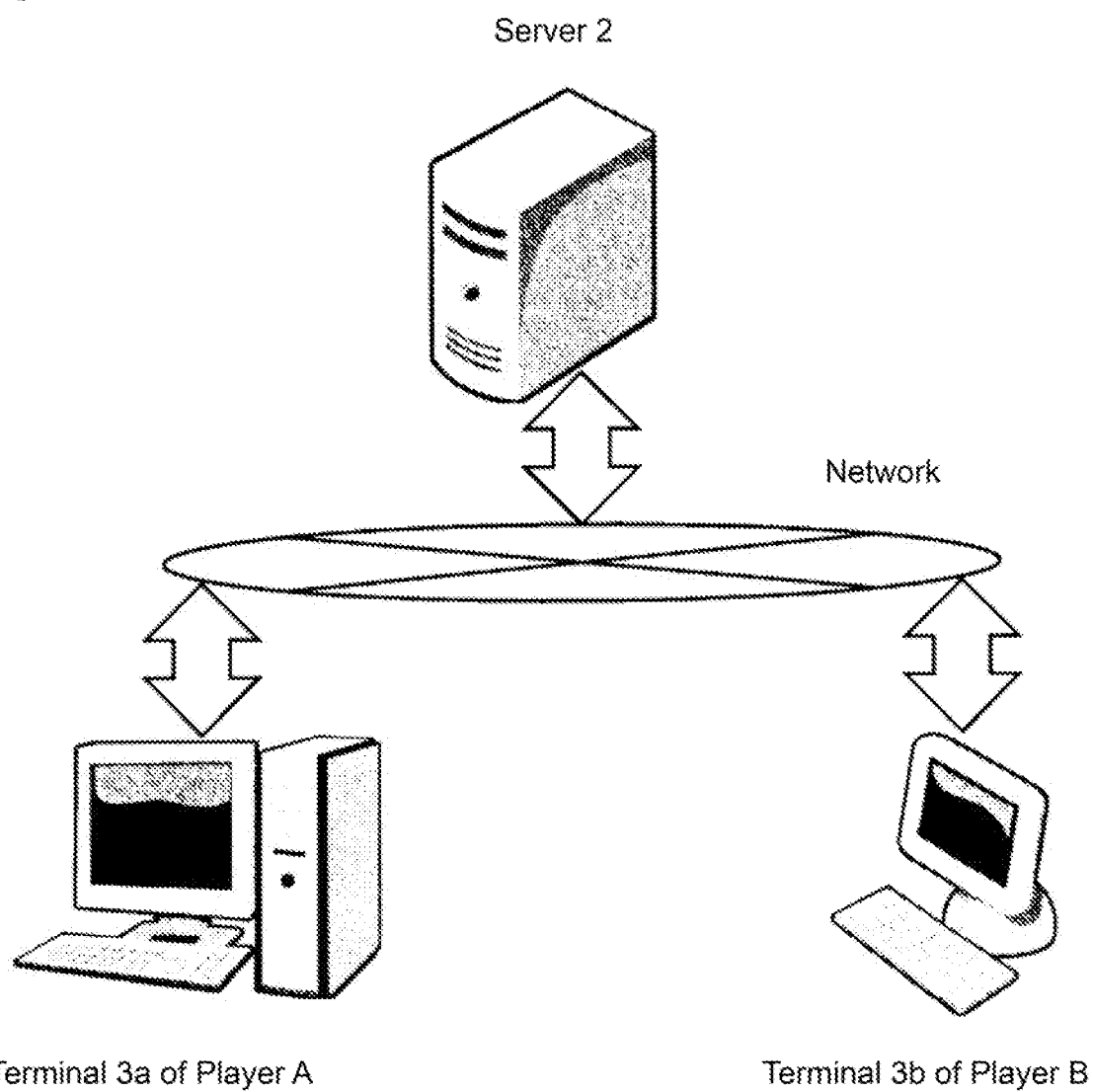

FIG. 1 This is a schematic diagram showing an example of the system configuration in which a Go game is realized via a network.

Figure 2:
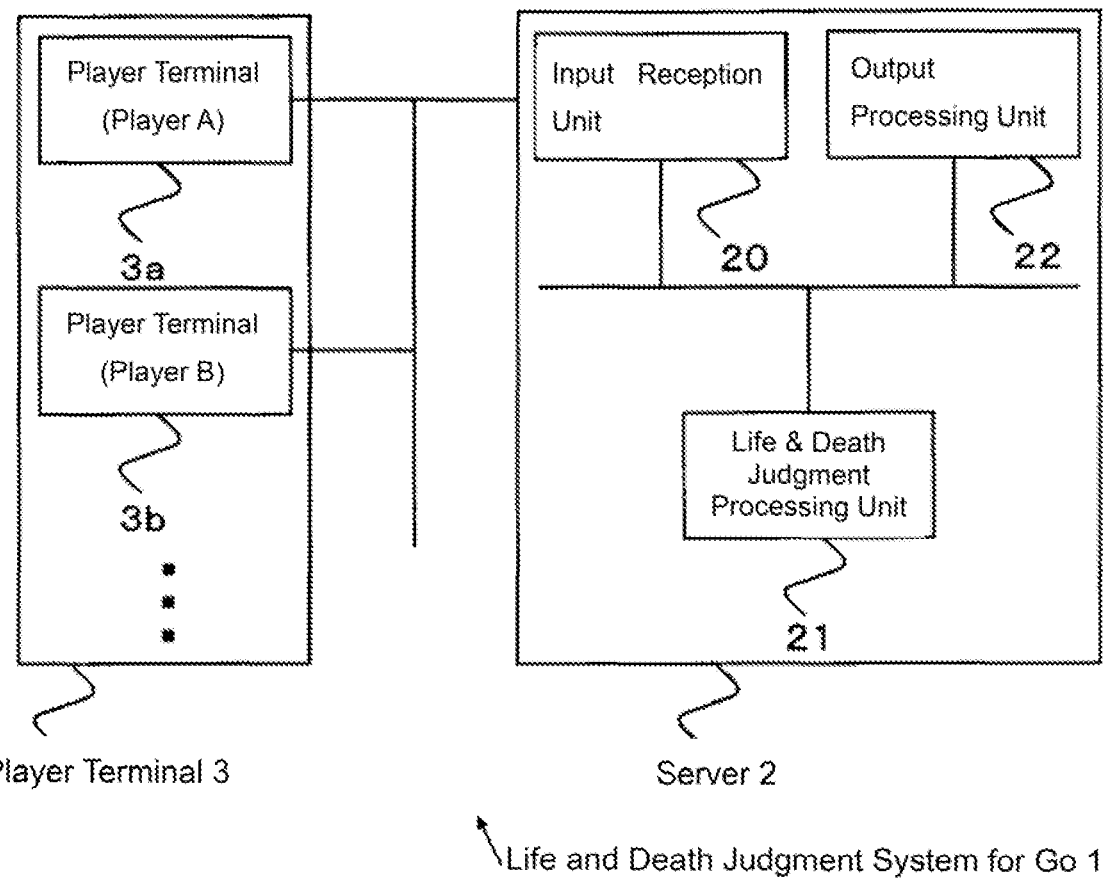

FIG. 2 This is a conceptual diagram showing an example of the entire processing functions of the present invention.

Figure 3:
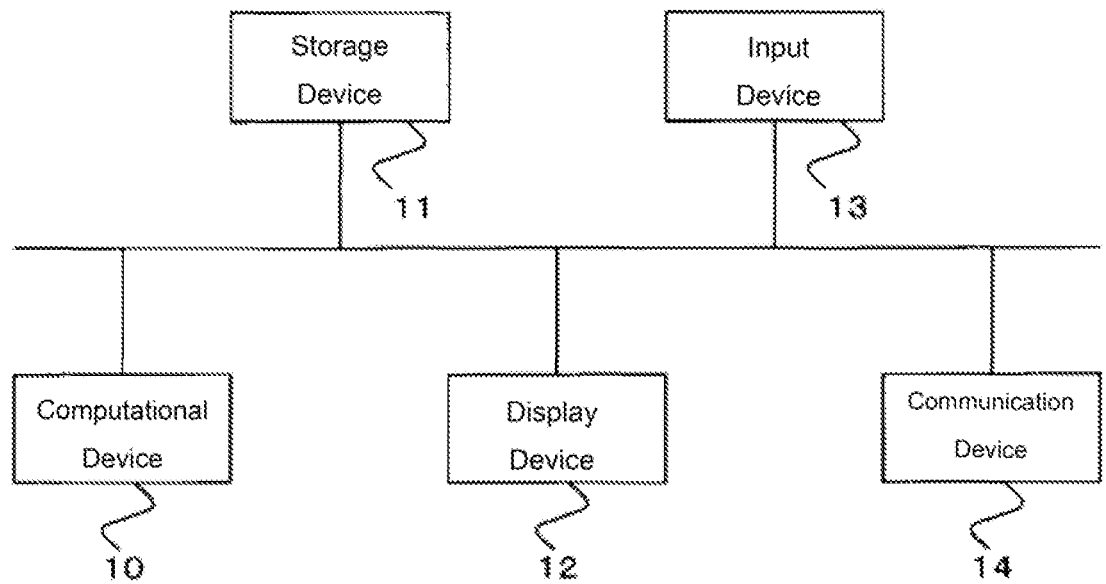

FIG. 3 This is a schematic diagram showing an example of the hardware configuration of the server and computer terminals used in the present invention.

Figure 4:
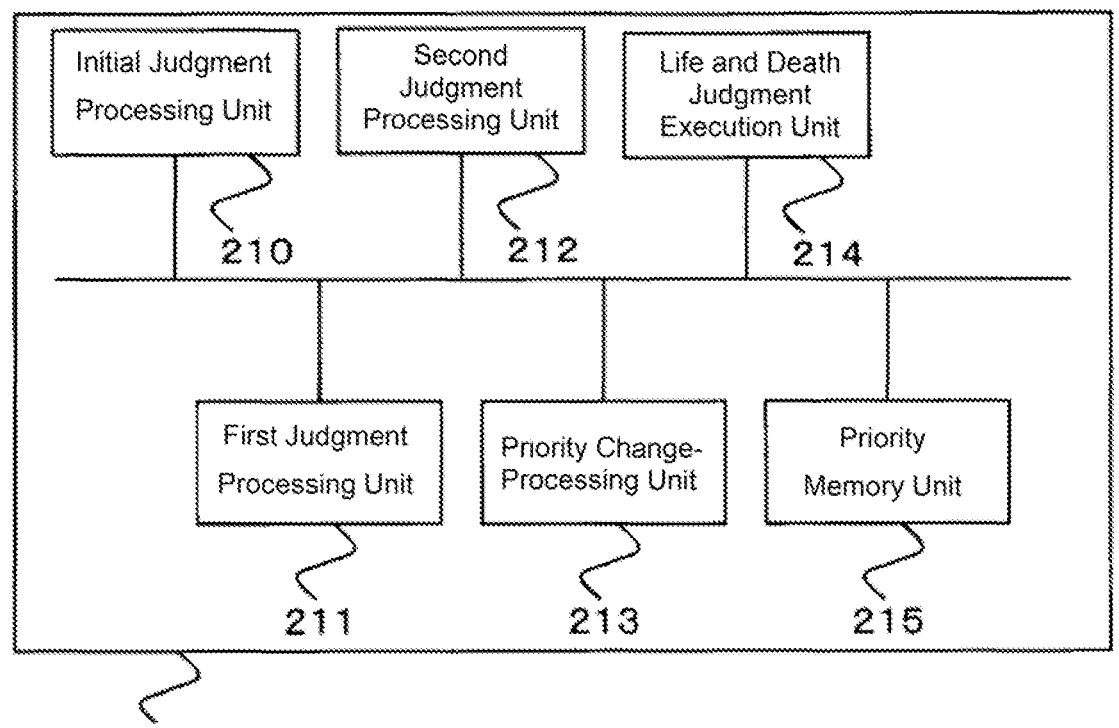

FIG. 4 This is a conceptual diagram schematically showing an example of the processing functions of the life and death judgment in Working Example 1.

Figure 5:
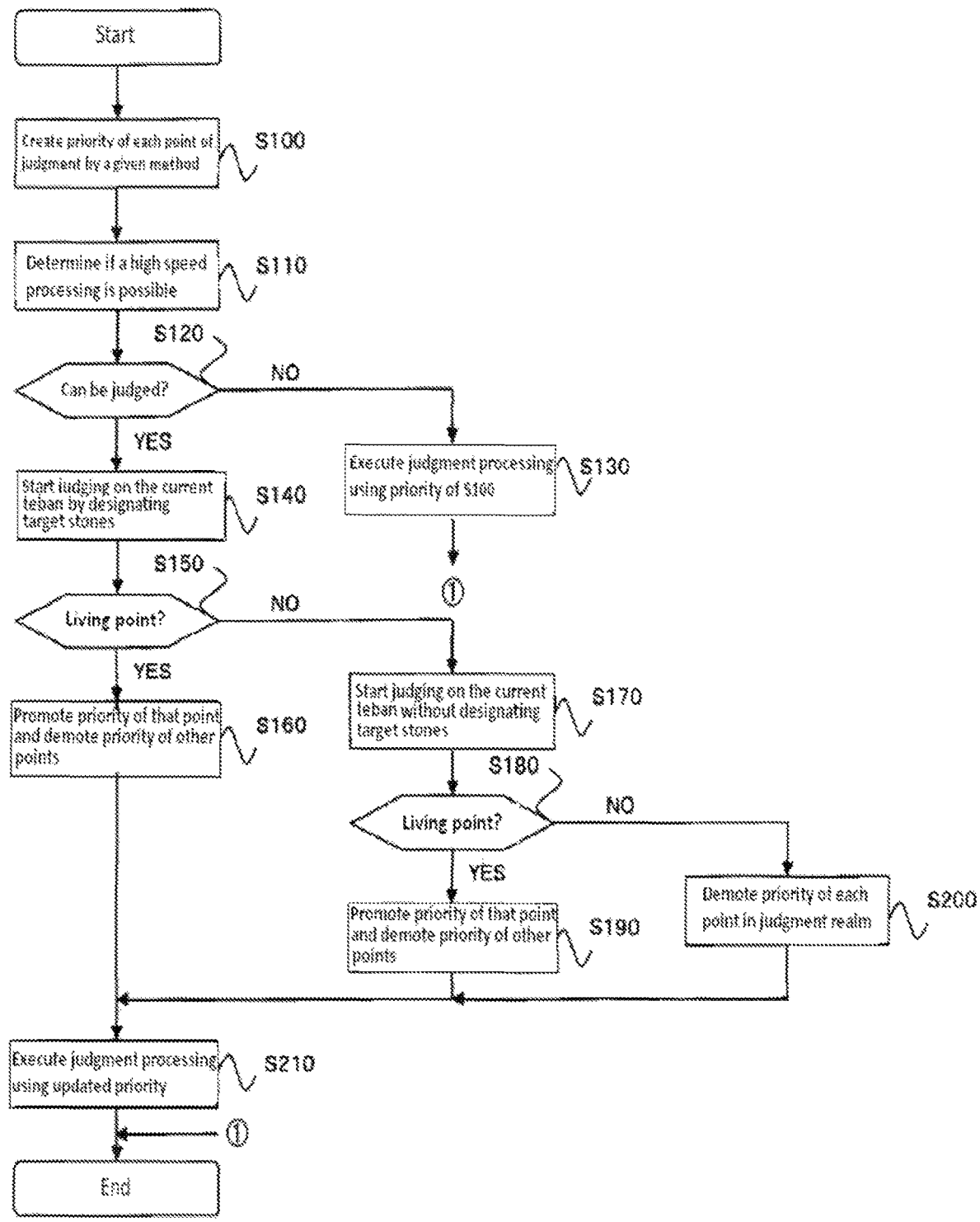

FIG. 5 This is a flowchart schematically showing an example of the processing sequence of the life and death judgment processing in Working Example 1.

Figure 6:
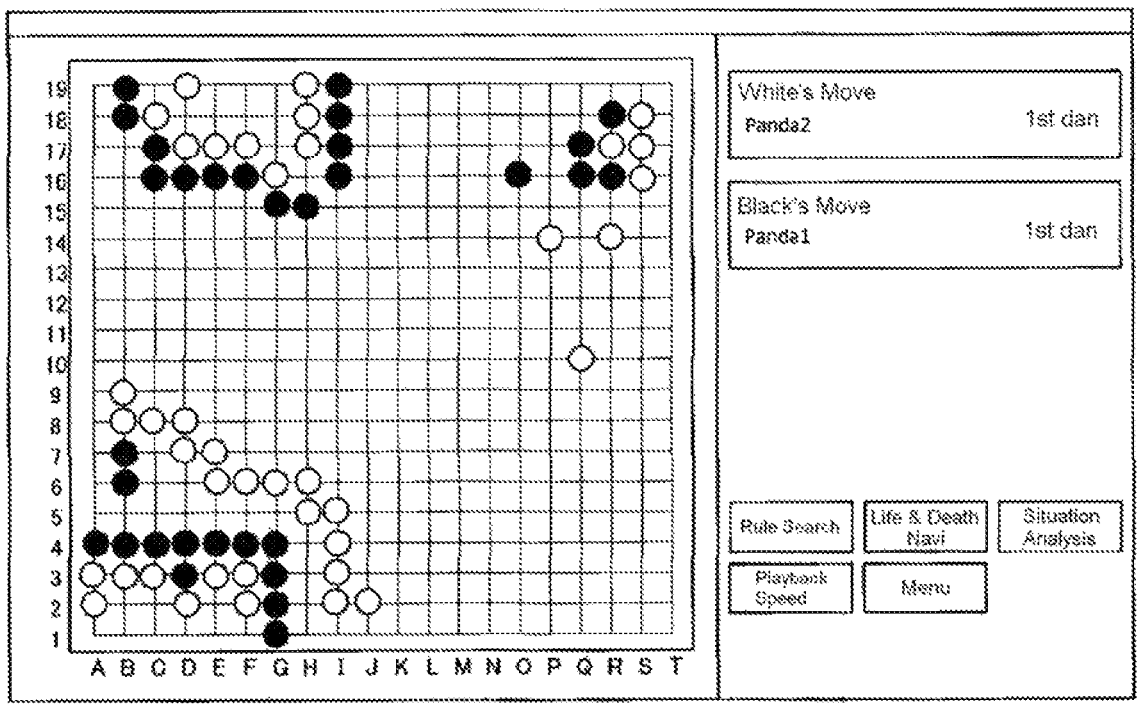

FIG. 6 This is an example of the game screen in Working Example 1.

Figure 7:
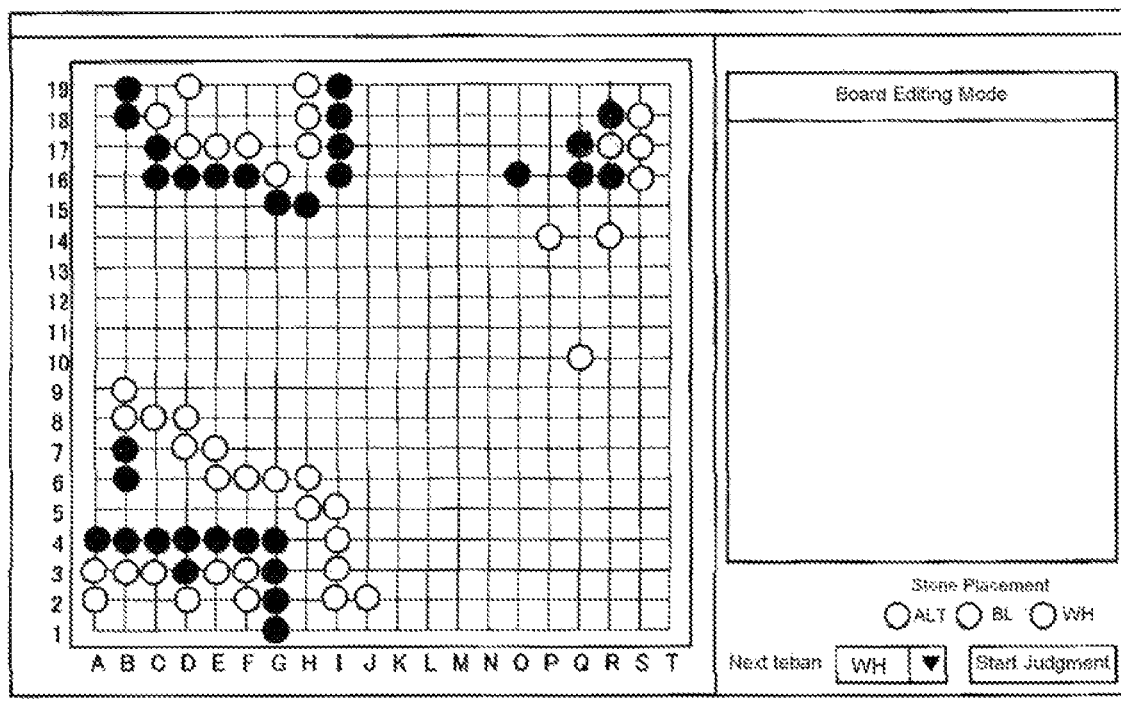

FIG. 7 This is an example of the editing screen in Working Example 1.

Figure 8:
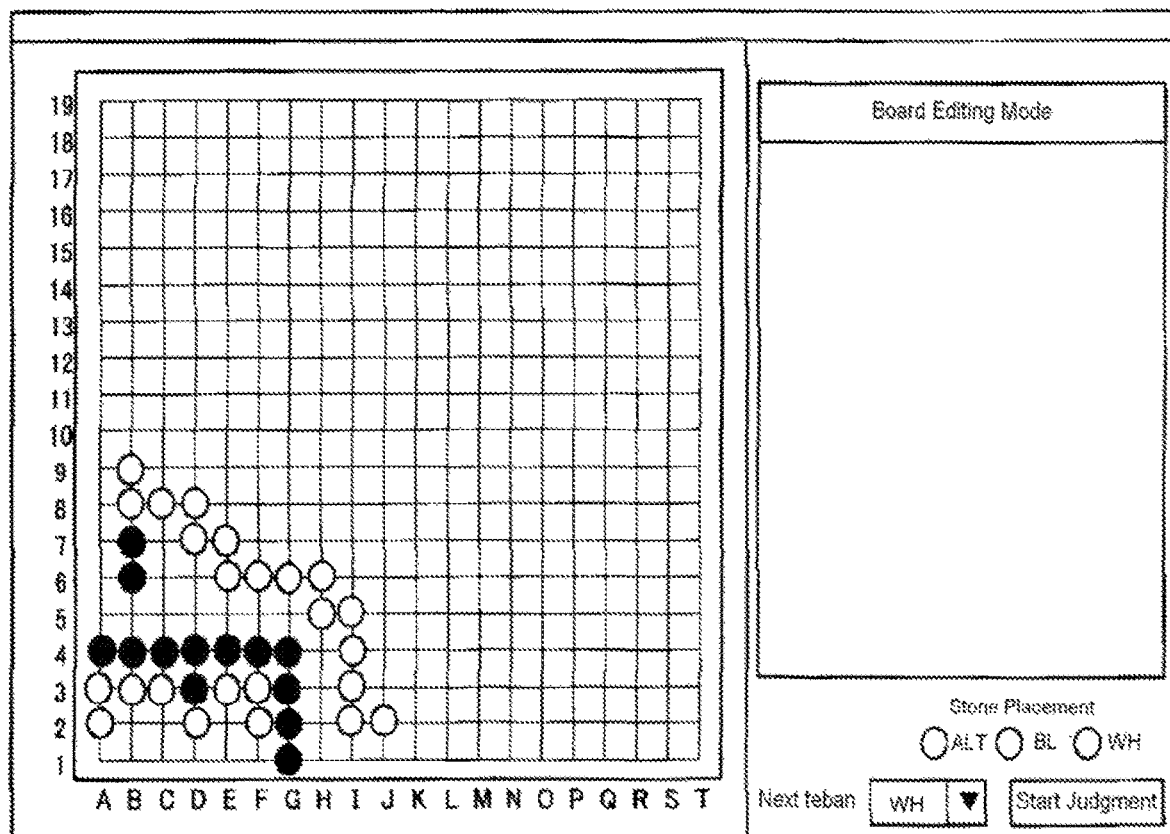

FIG. 8 This is an example of the editing screen in Working Example 1.

Figure 9:
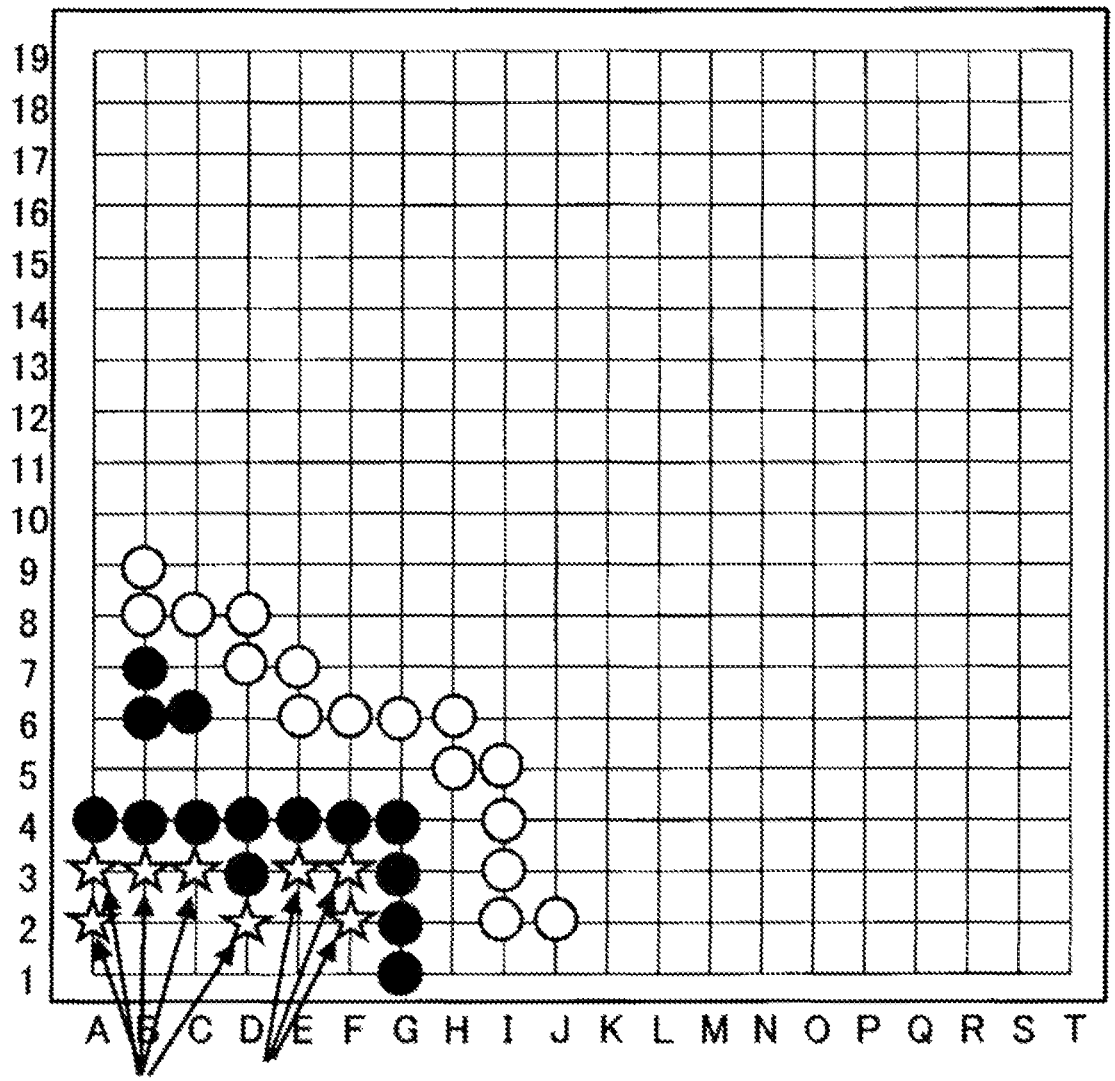

FIG. 9 This is an example of the state of the board of Working Example 1.

Figure 10:
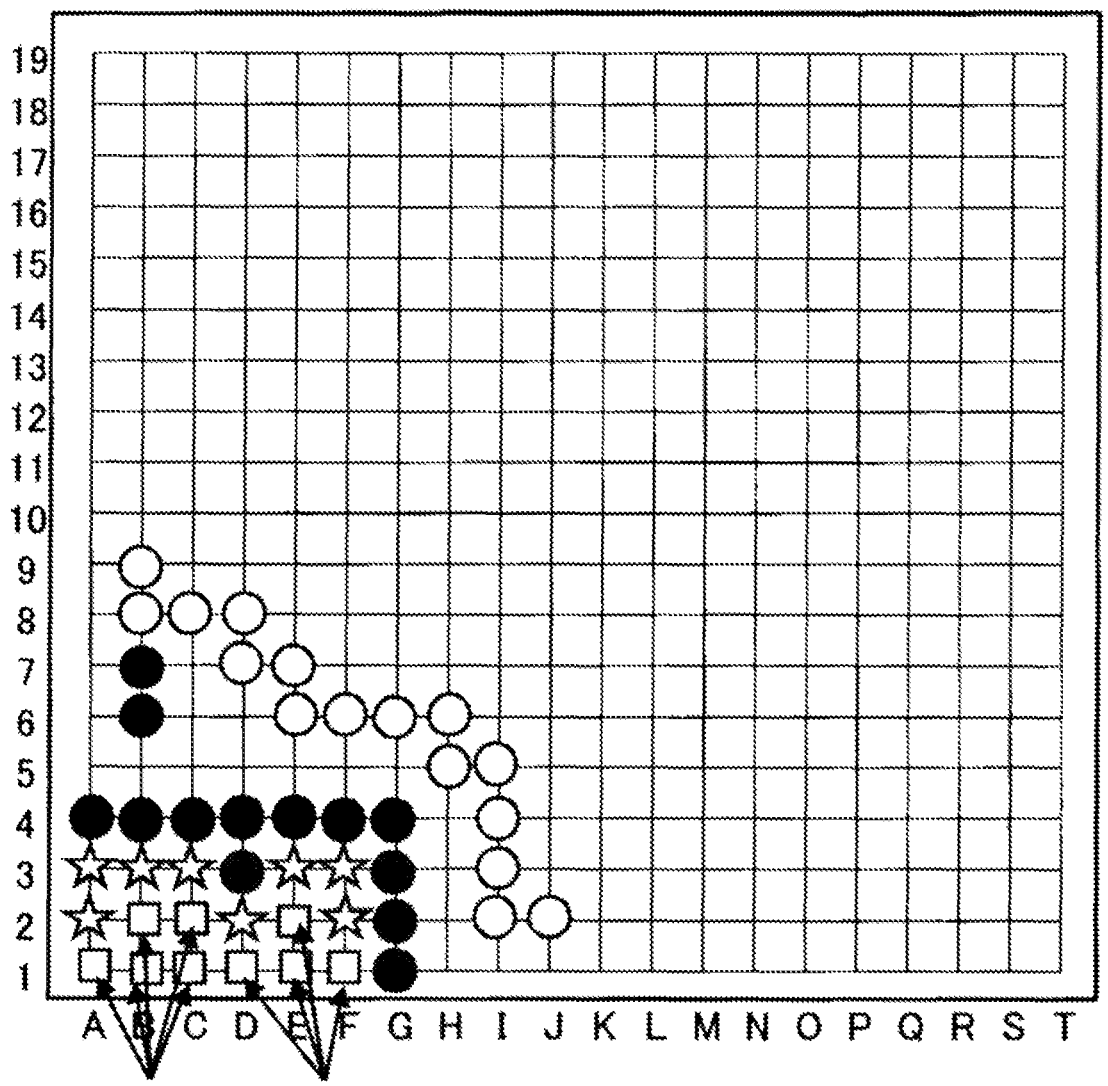

FIG. 10 This is an example of the state of the board of Working Example 1.

Figure 11:
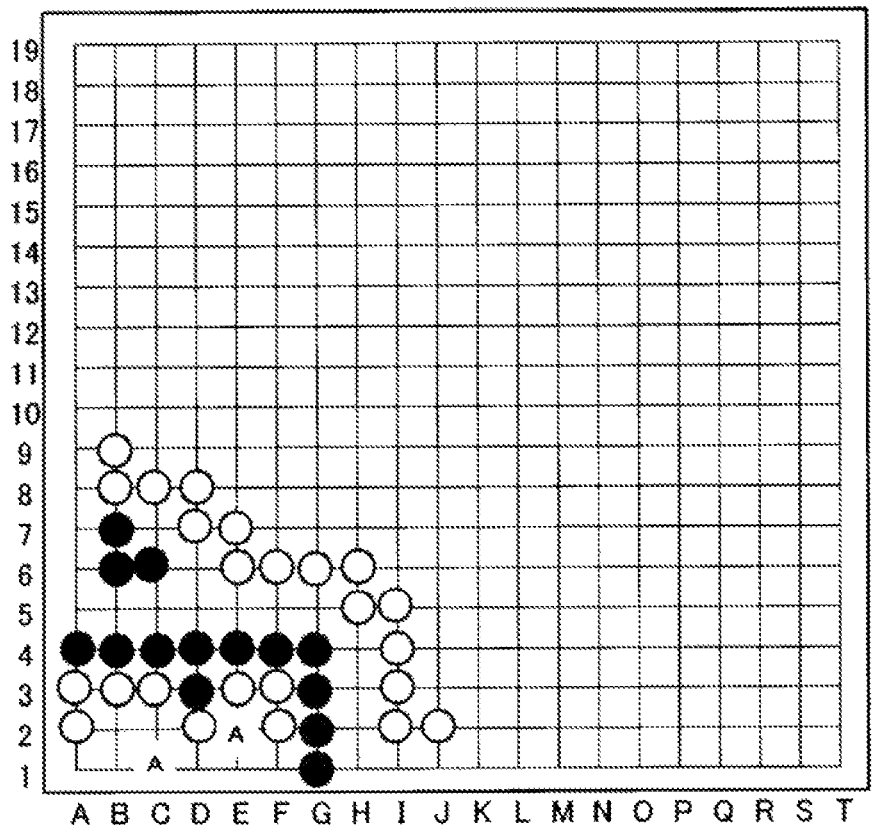

FIG. 11 This is an example of the state of the board of Working Example 1.

Figure 12:
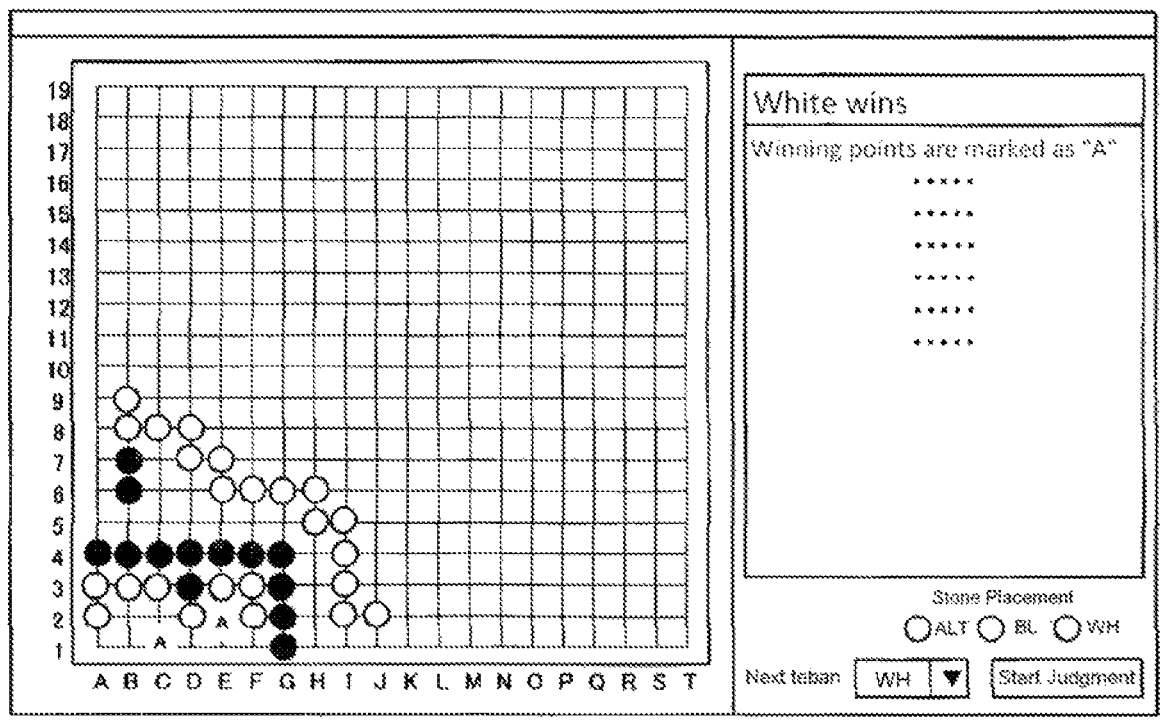

FIG. 12 This is an example of the screen showing the result obtained in Working Example 1.

Figure 13:
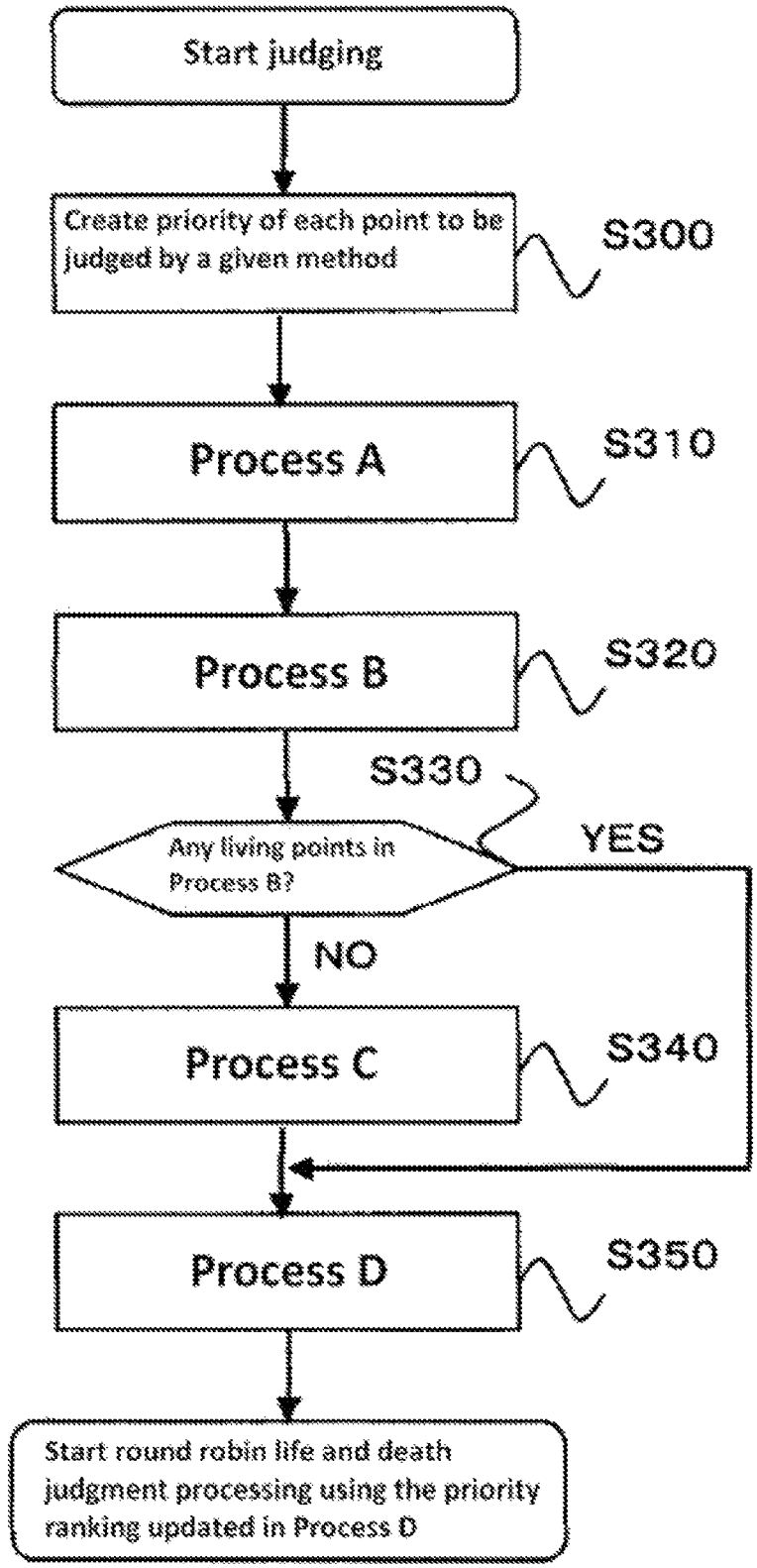

FIG. 13 This is a flowchart in which an example of the entire processing sequence in Working Example 1 is schematically described in detail.

Figure 14:
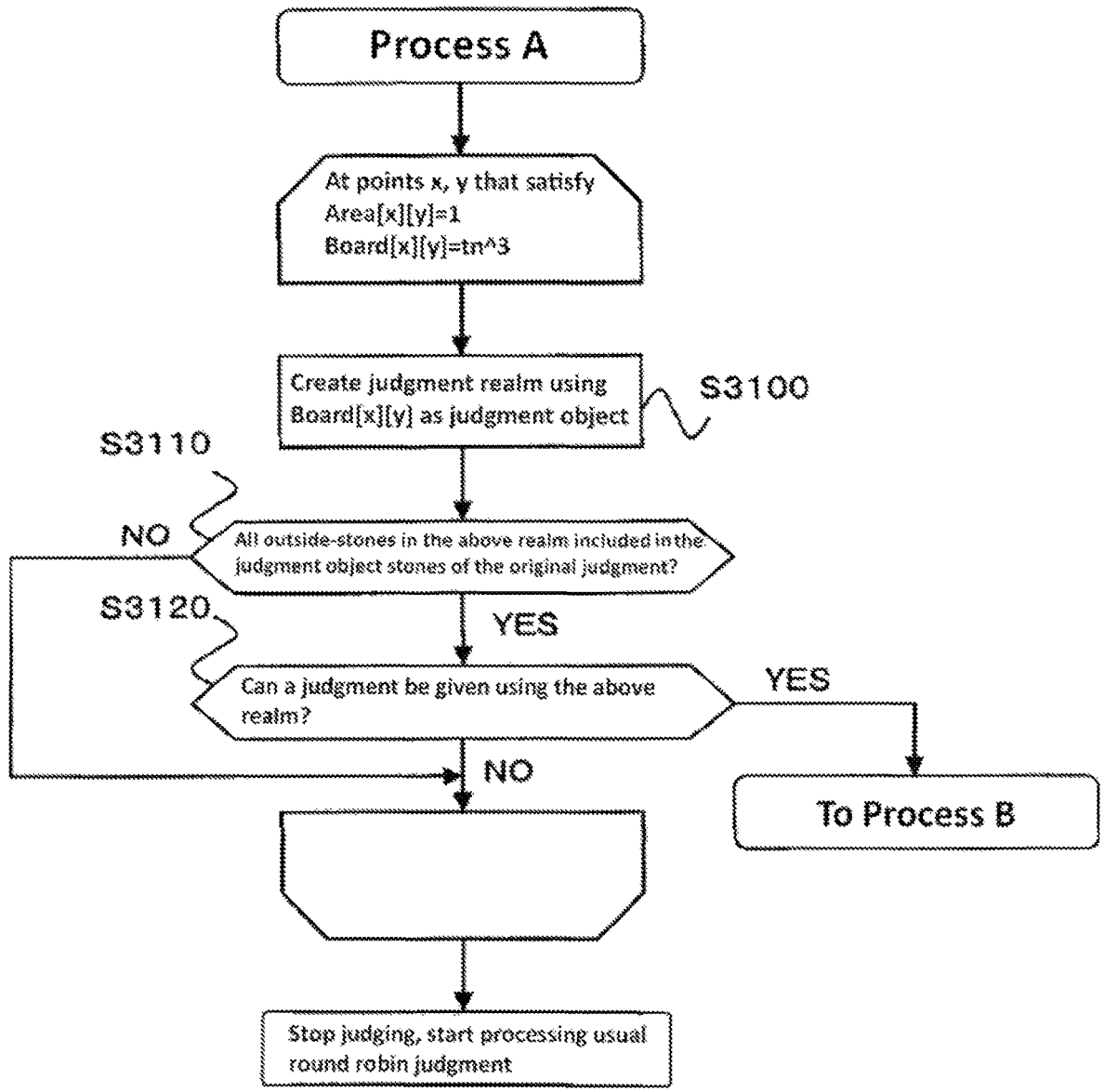

FIG. 14 This is a flowchart in which an example of the processing sequence of Process A in Working Example 1 is schematically described in detail.

Figure 15:
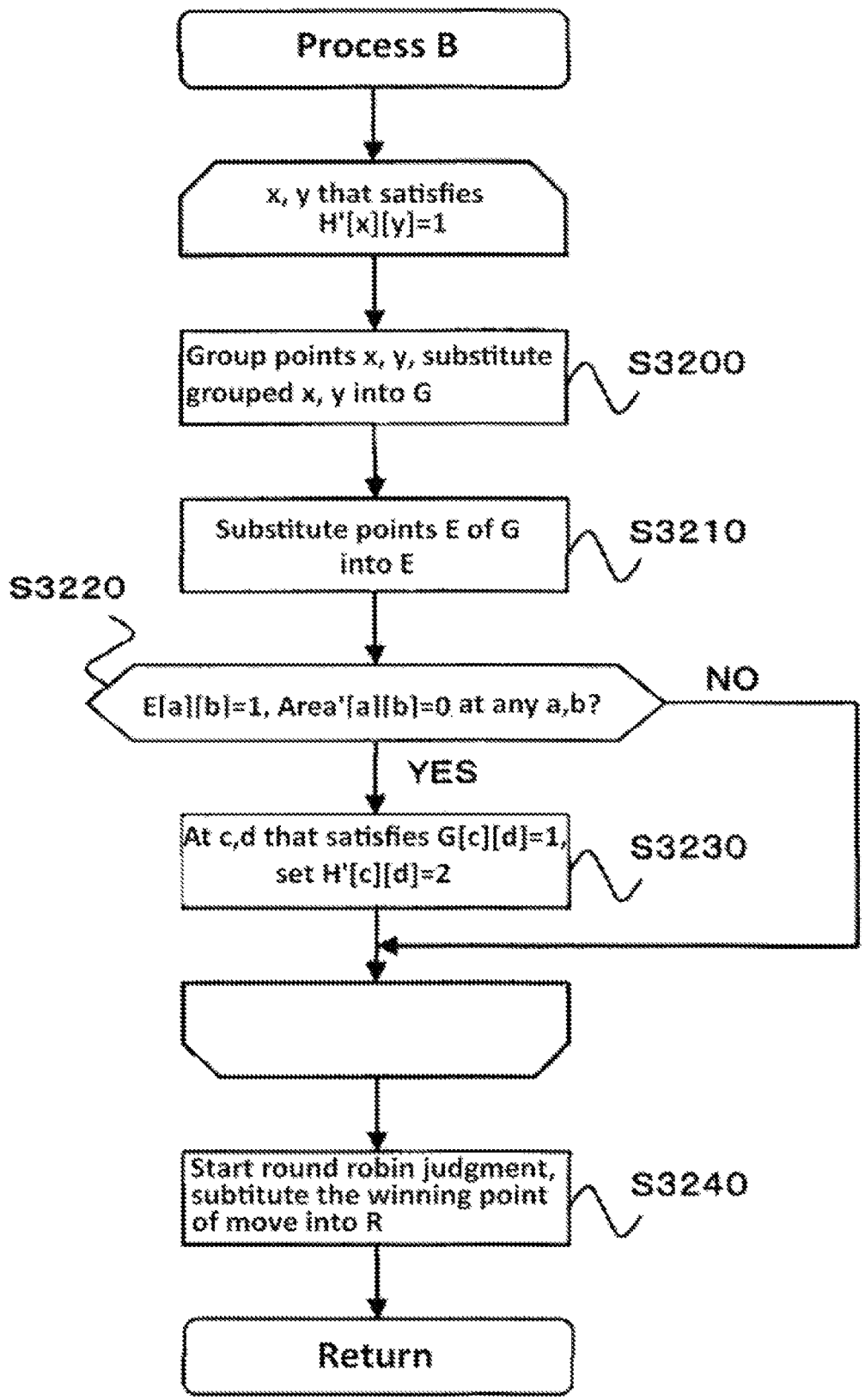

FIG. 15 This is a flowchart in which an example of the processing sequence of Process B in Working Example 1 is schematically described in detail.

Figure 16:
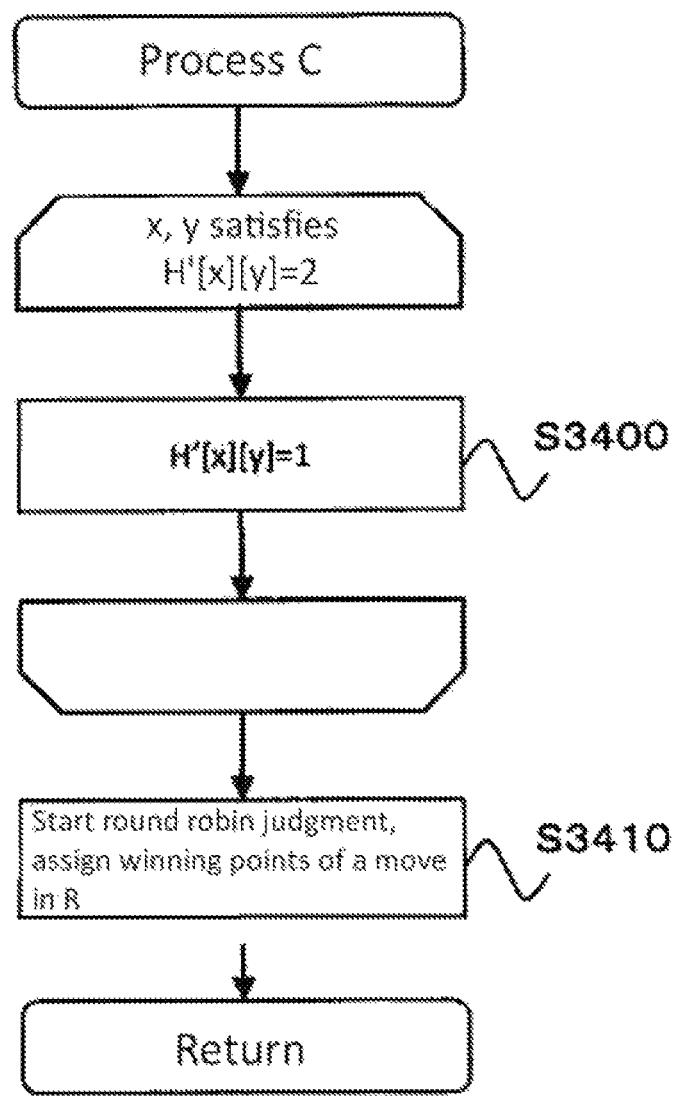

FIG. 16 This is a flowchart in which an example of the processing sequence of Process C in Working Example 1 is schematically described in detail.

Figure 17:
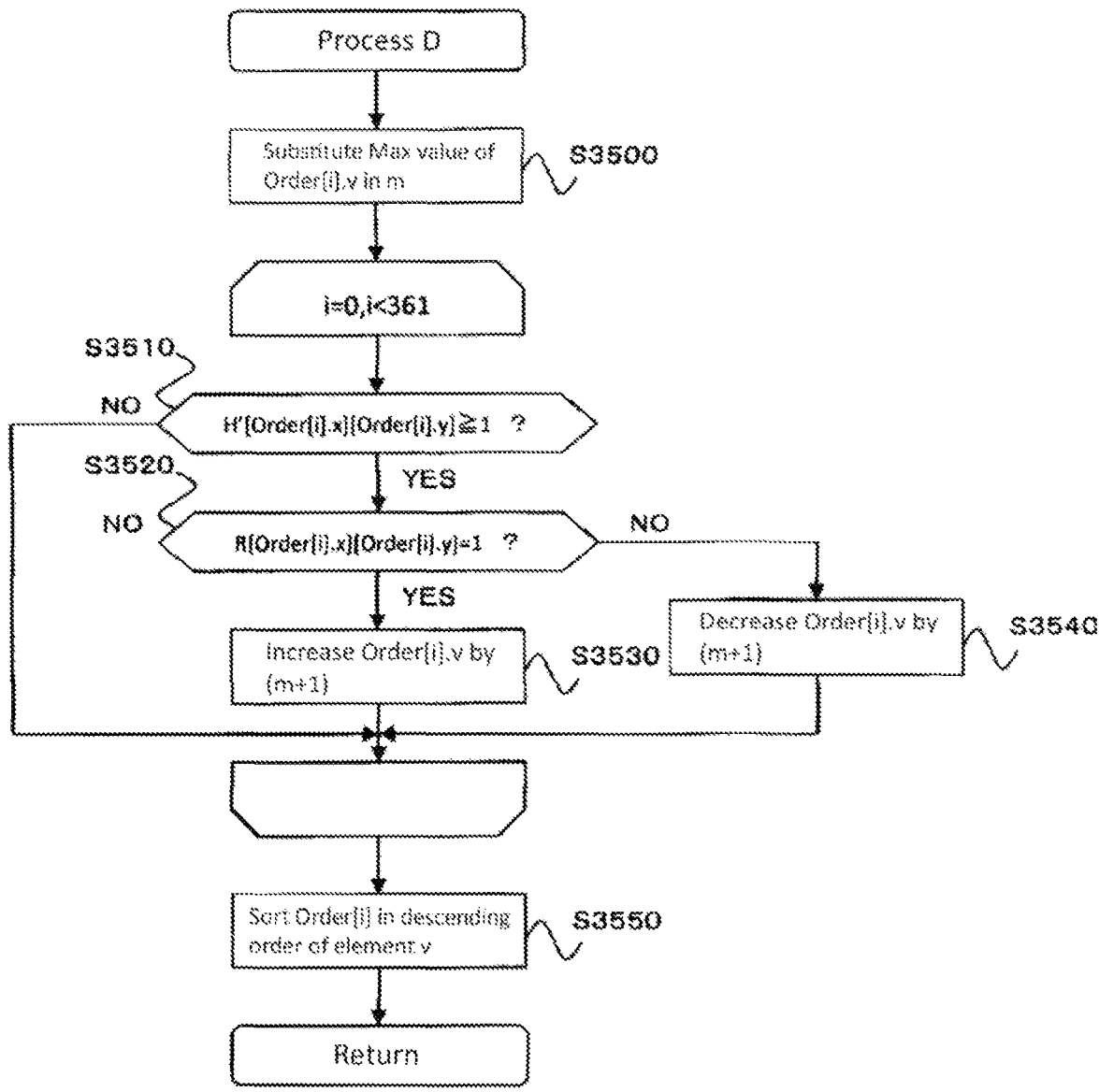

FIG. 17 This is a flowchart in which an example of the processing sequence of Process D in Working Example 1 is schematically described in detail.

Figure 18:
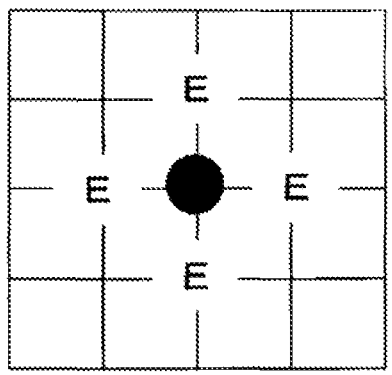

FIG. 18 This is a diagram showing points E.

FIG. 19 This is a diagram showing the processing computing points E in a group of stones.

Figure 20:
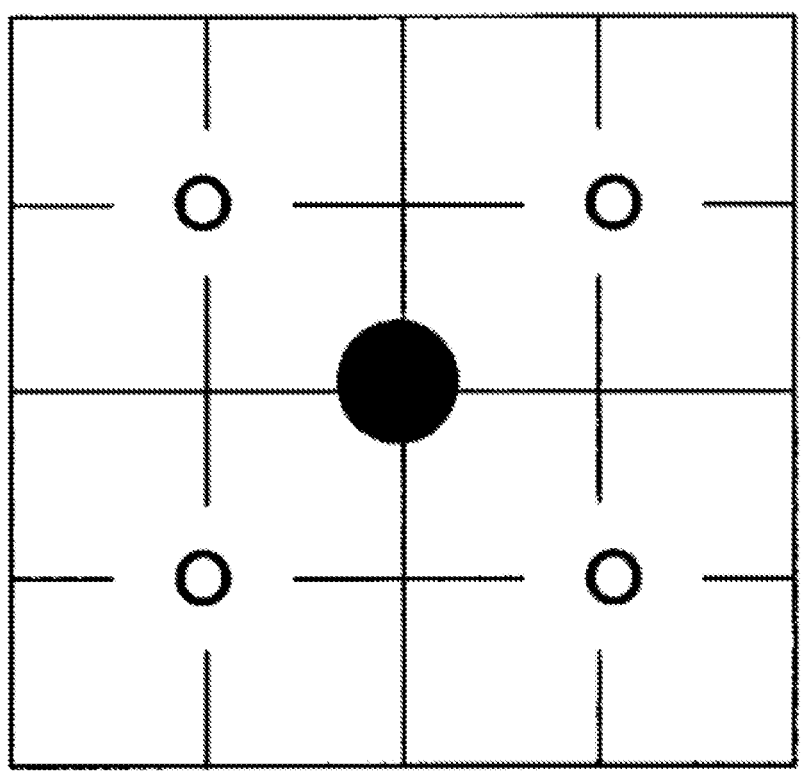

FIG. 20 This is a diagram showing points O.

FIG. 21 This is a diagram showing the processing in which points O in a group of stones are obtained.

Figure 22:
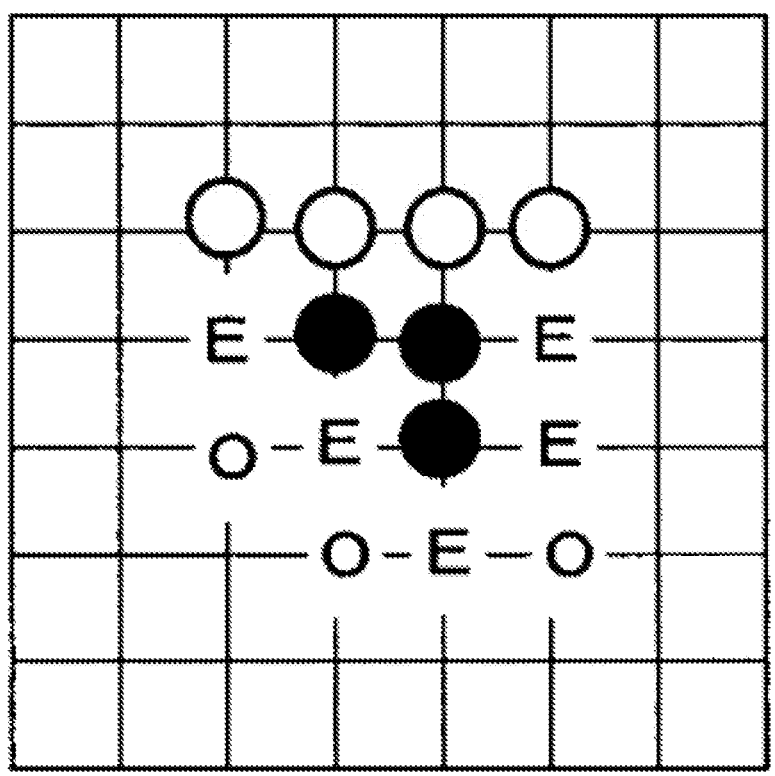

FIG. 22 This is a diagram showing an example of vacant points E and vacant points O.

Figure 23:
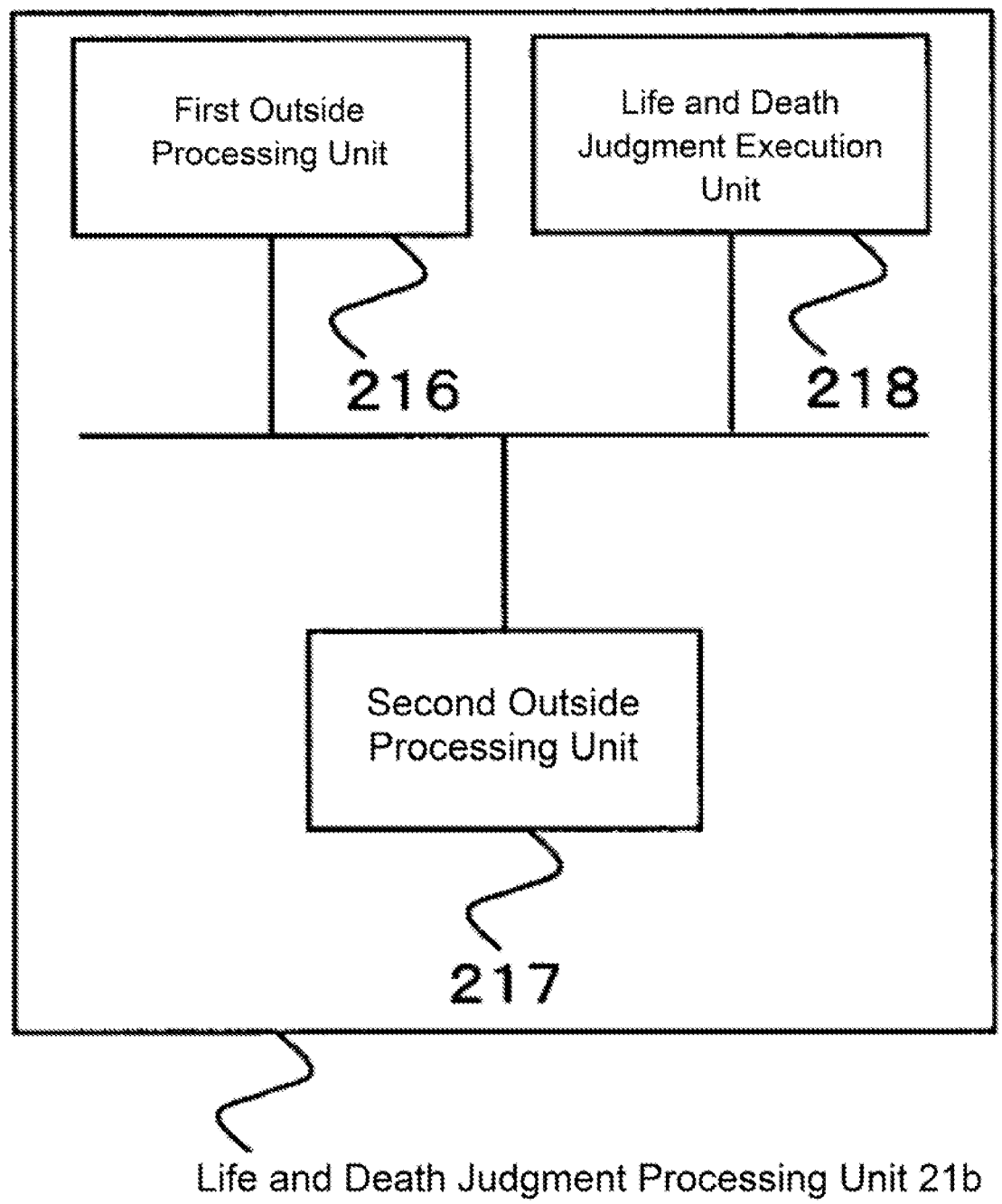

FIG. 23 This is a conceptual diagram schematically showing an example of the processing functions of the life and death judgment in Working Example 2.

Figure 24:
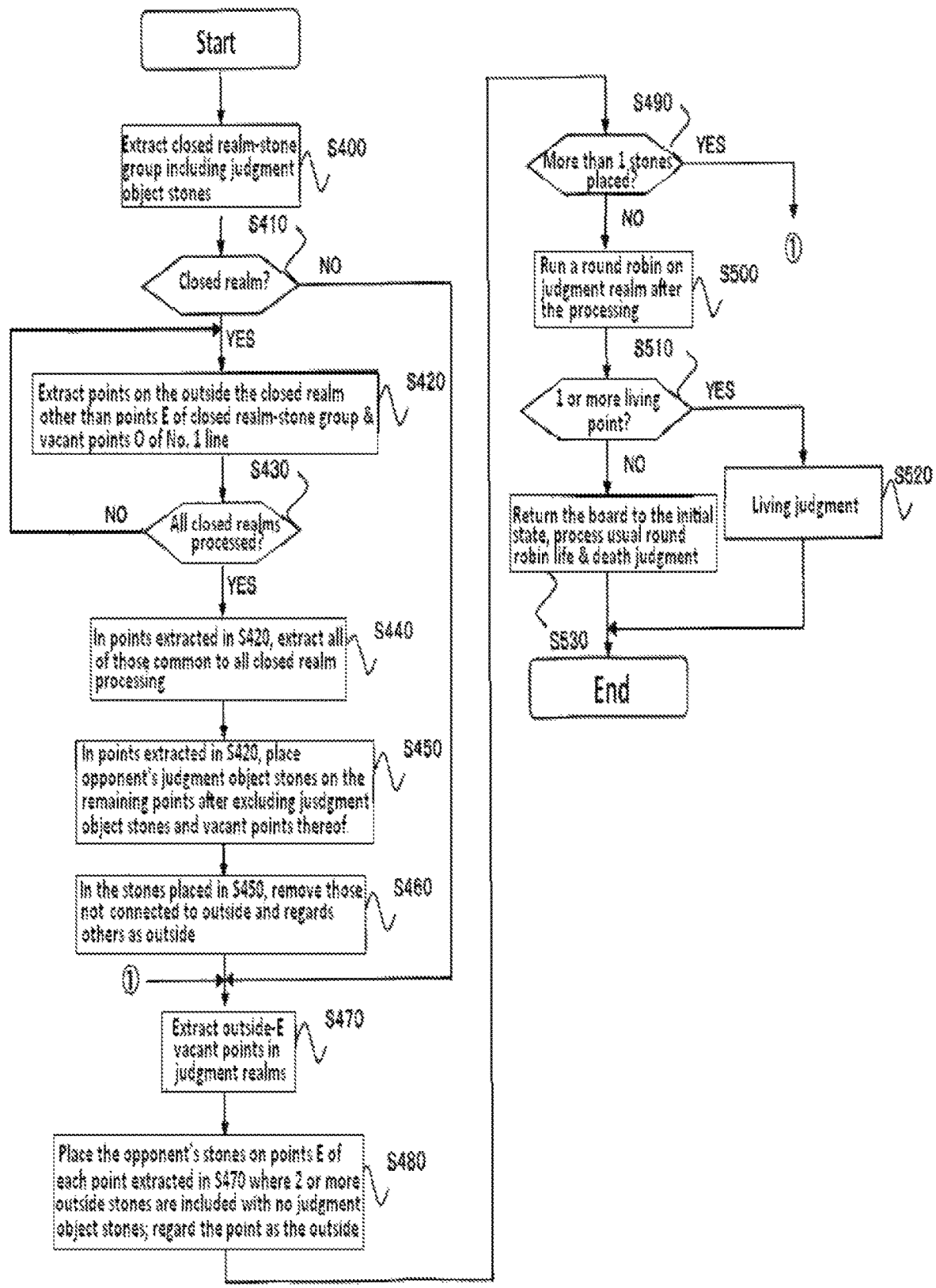

FIG. 24 This is a flowchart schematically showing an example of the processing sequence of the life and death judgment processing in Working Example 2.

Figure 25:
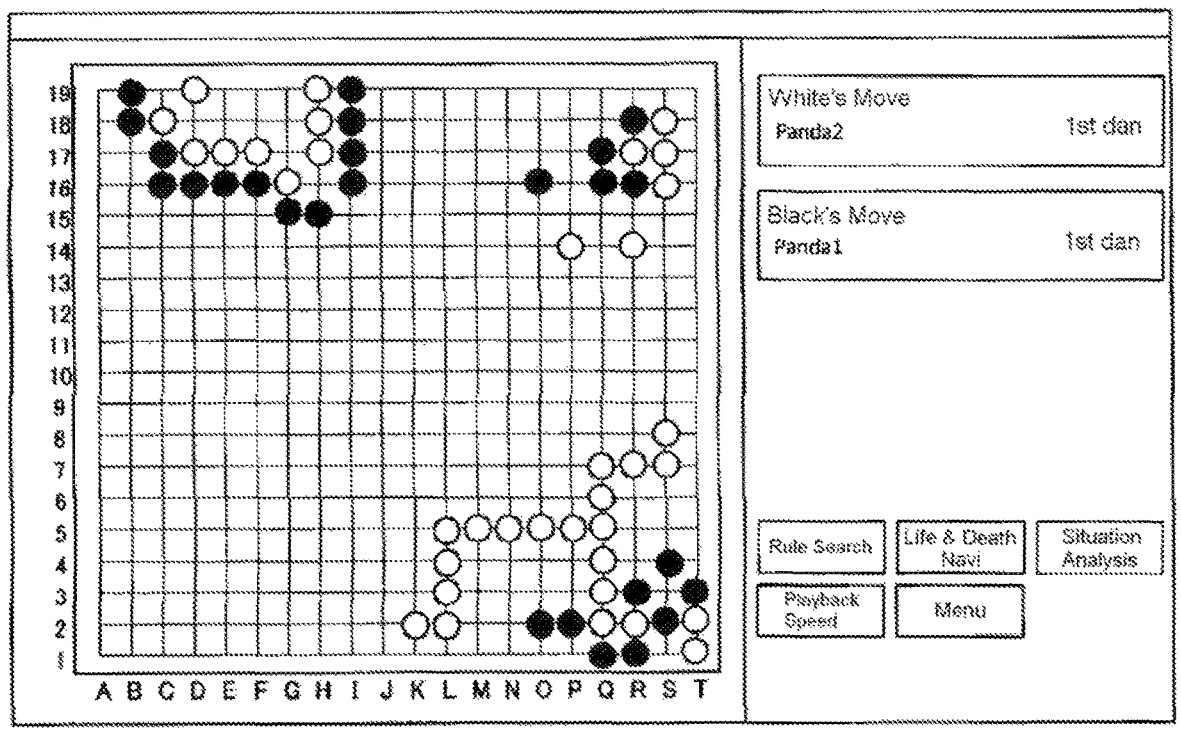

FIG. 25 This is an example of the game screen in Working Example 2.

Figure 26:
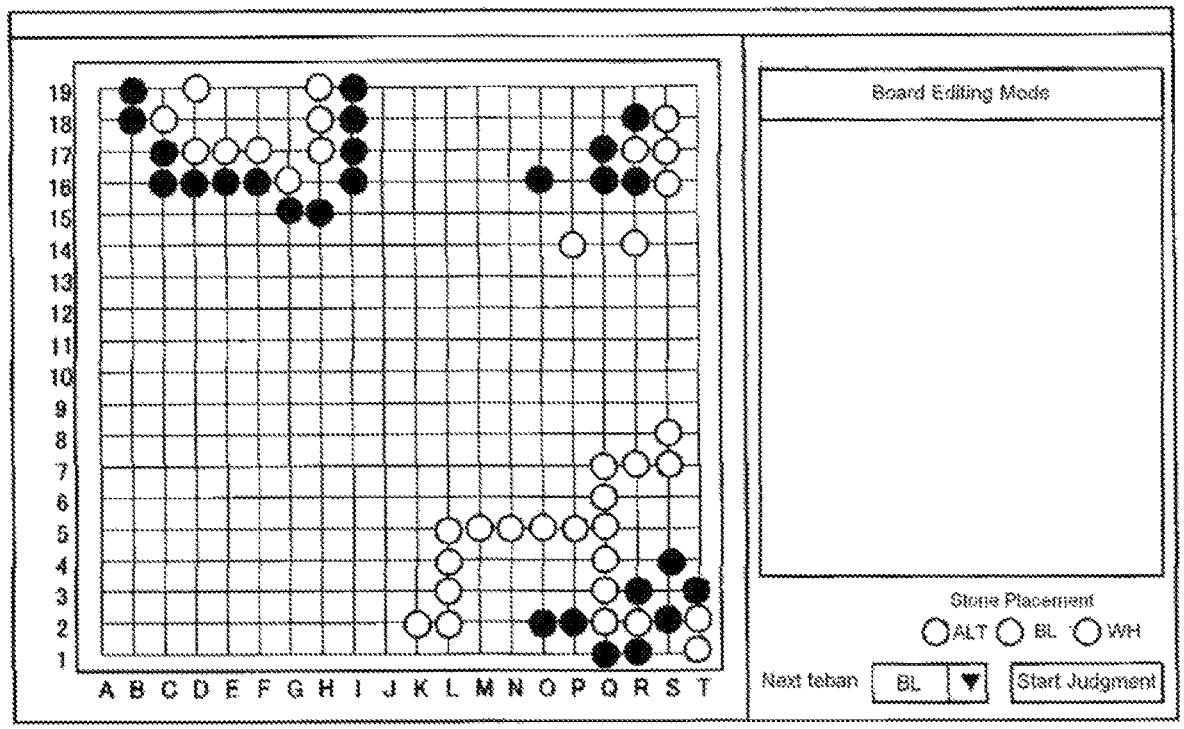

FIG. 26 This is an example of the editing screen in Working Example 2.

Figure 27:
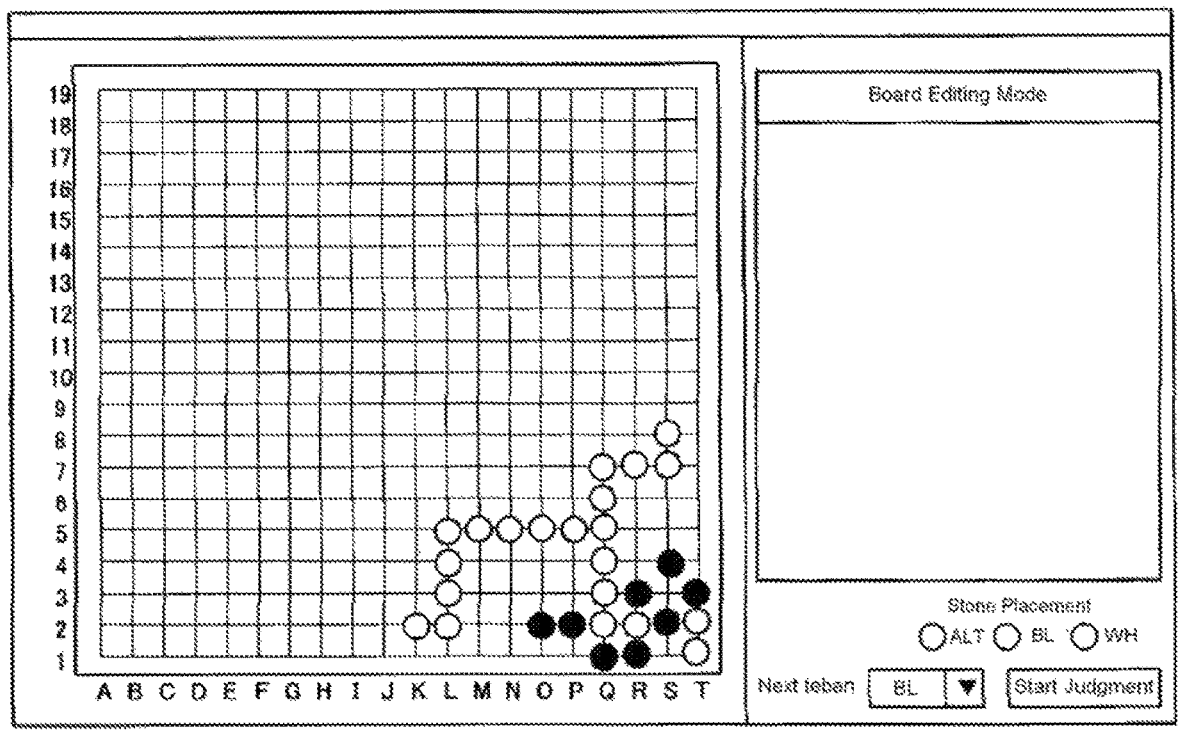

FIG. 27 This is an example of the editing screen in Working Example 2.

FIG. 28 This is an example of the state of the board of Working Example 2.

FIG. 29 This is an example of the state of the board of Working Example 2.

Figure 30:
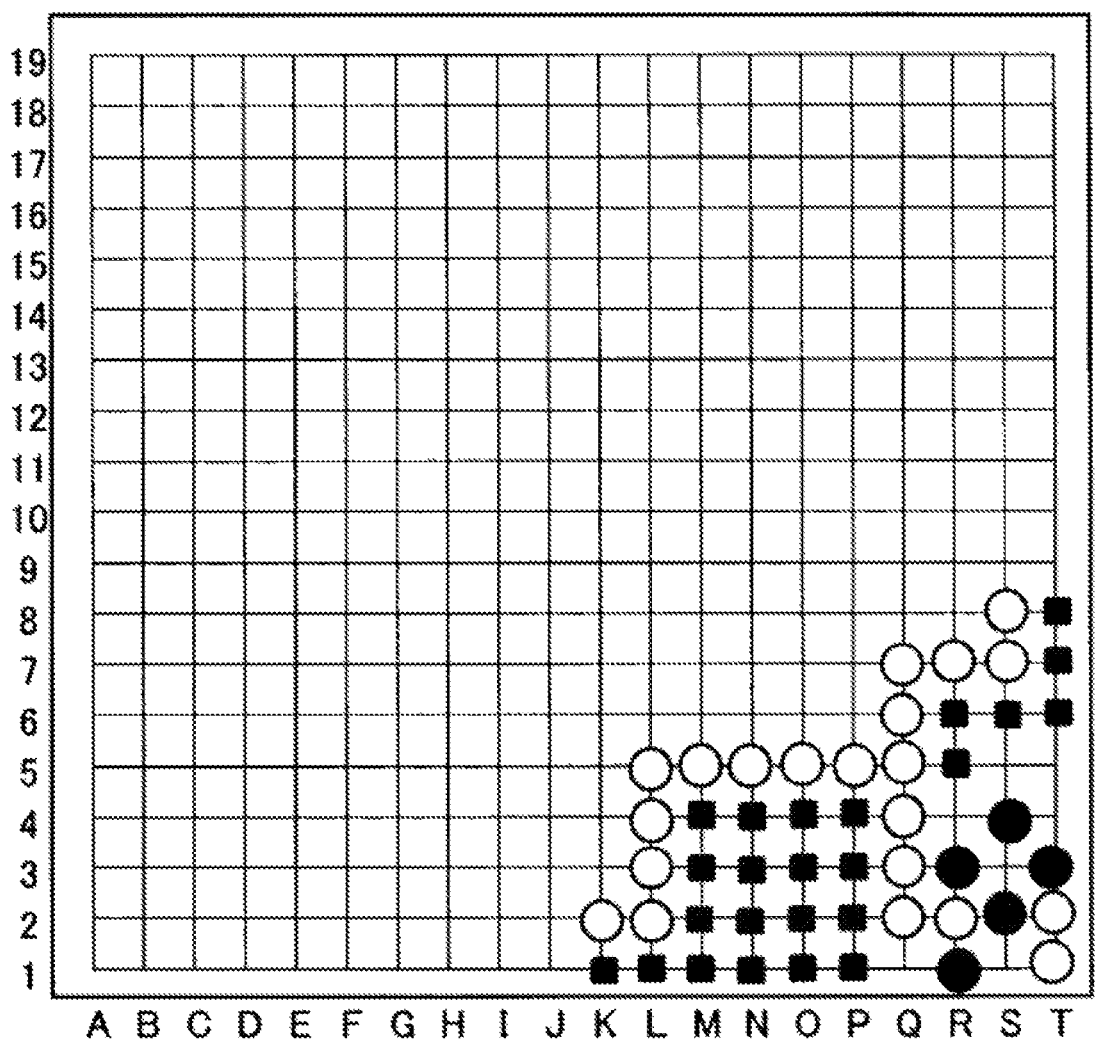

FIG. 30 This is an example of the state of the board of Working Example 2.

FIG. 31 This is an example of the state of the board of Working Example 2.

Figure 32:
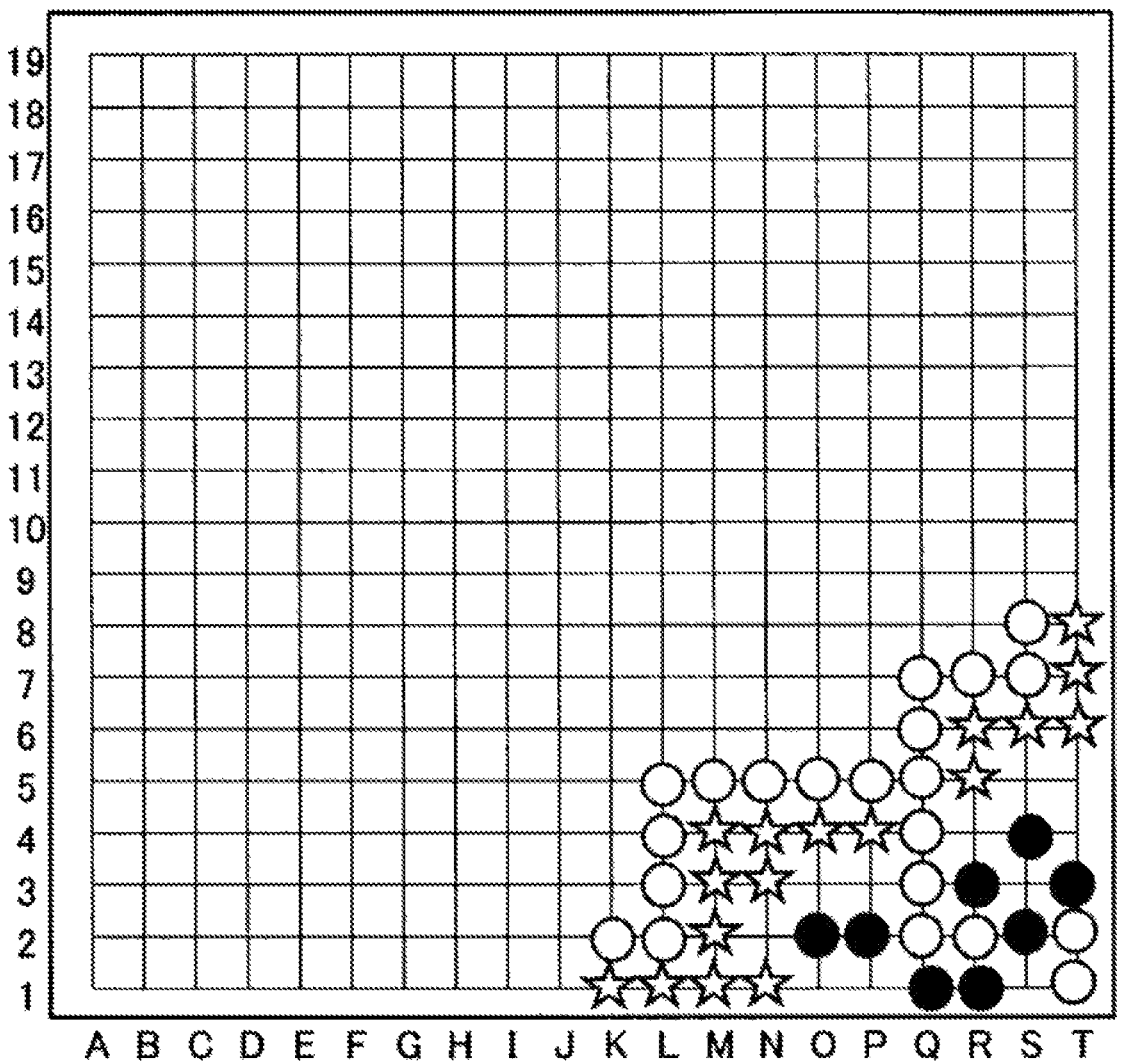

FIG. 32 This is an example of the state of the board of Working Example 2.

Figure 33:
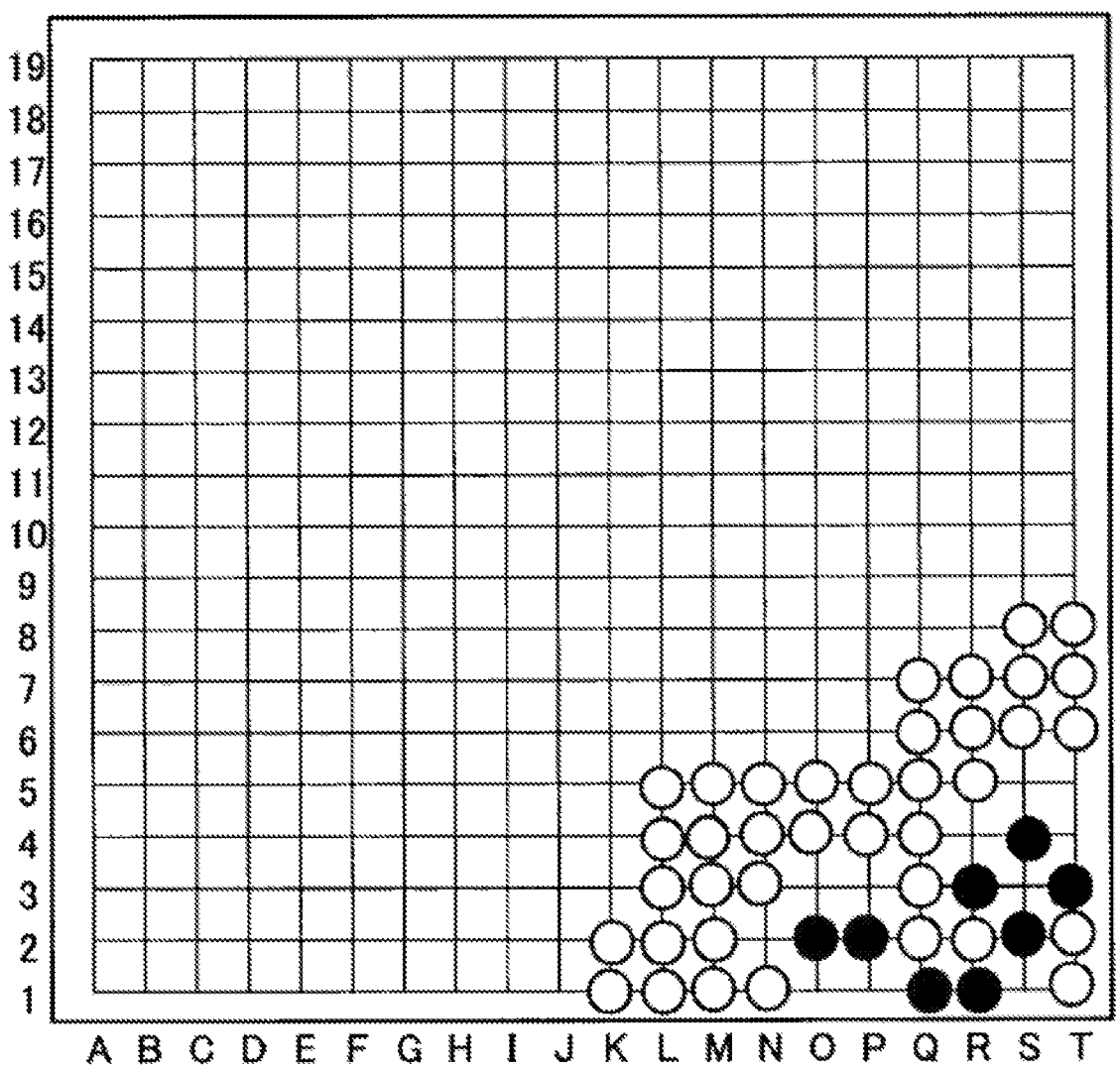

FIG. 33 This is an example of the state of the board of Working Example 2.

Figure 34:
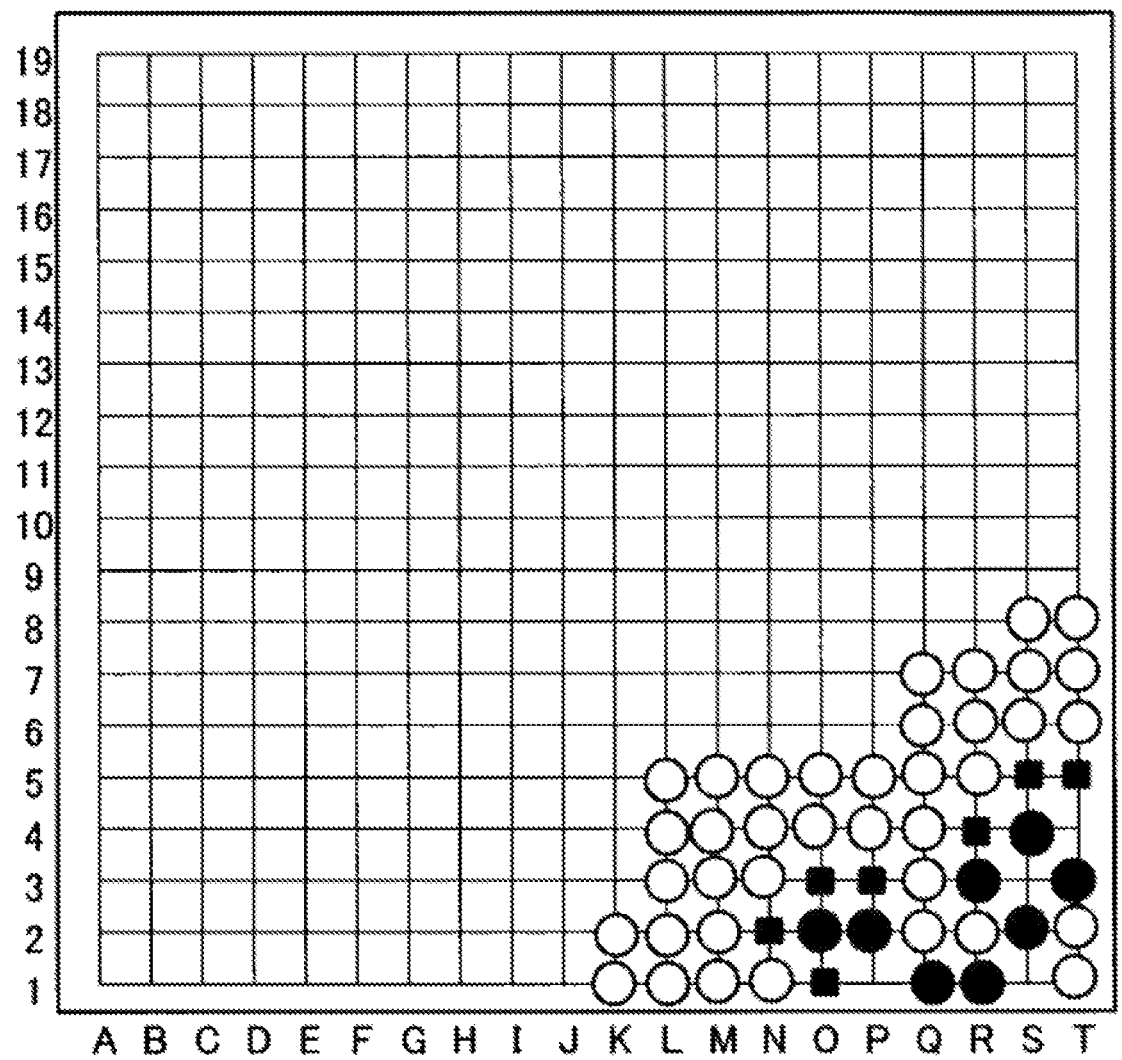

FIG. 34 This is an example of the state of the hoard of Working Example 2.

Figure 35:
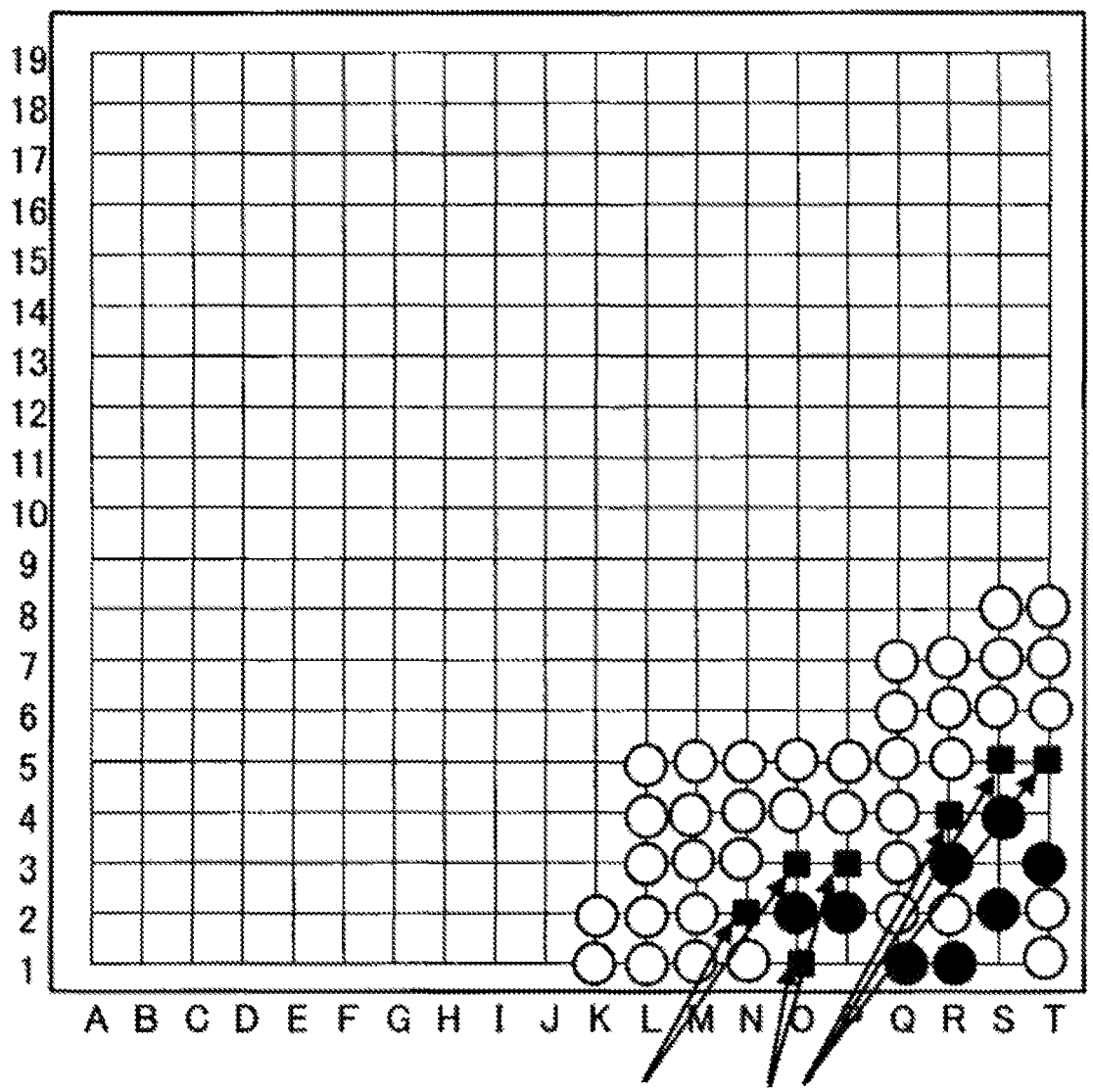

FIG. 35 This is an example of the state of the board of Working Example 2.

Figure 36:
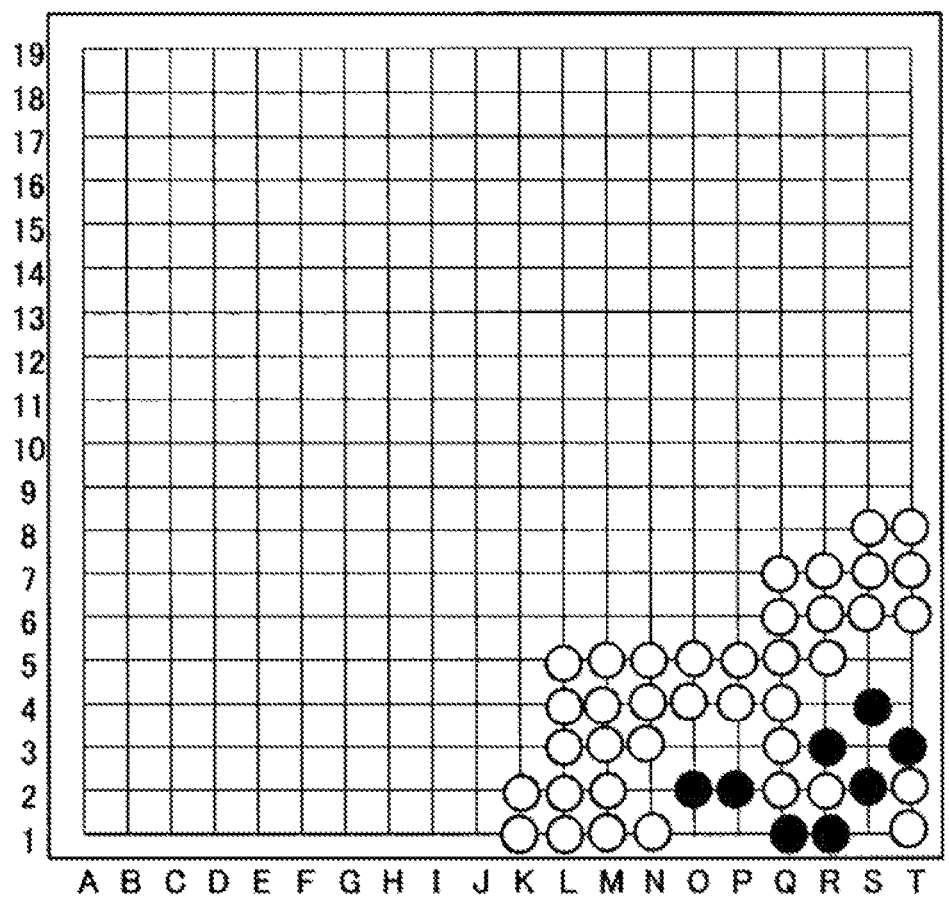

FIG. 36 This is an example of the state of the board of Working Example 2.

Figure 37:
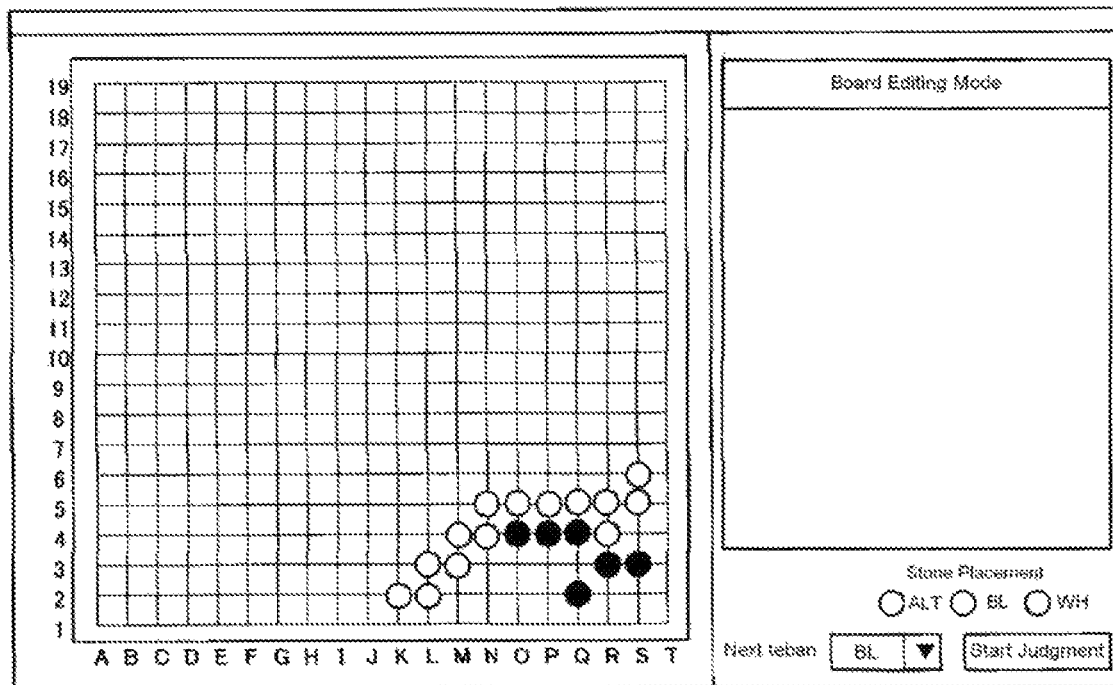

FIG. 37 This is another example of the game screen of Working Example 2.

Figure 38:
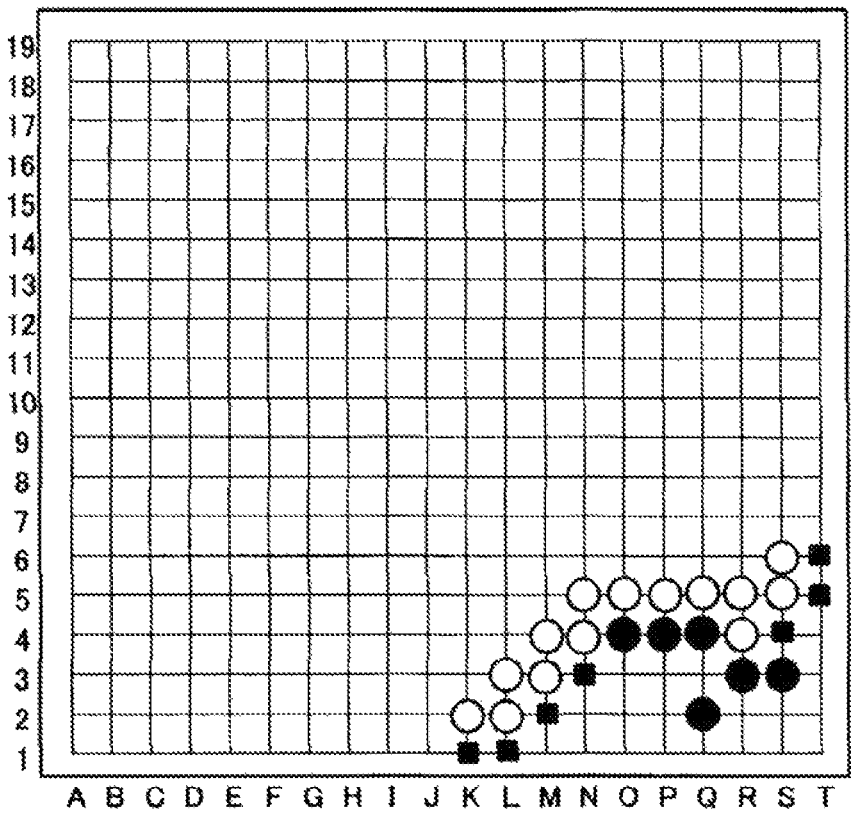

FIG. 38 This is another example of the state of the board of Working Example 2.

Figure 39:
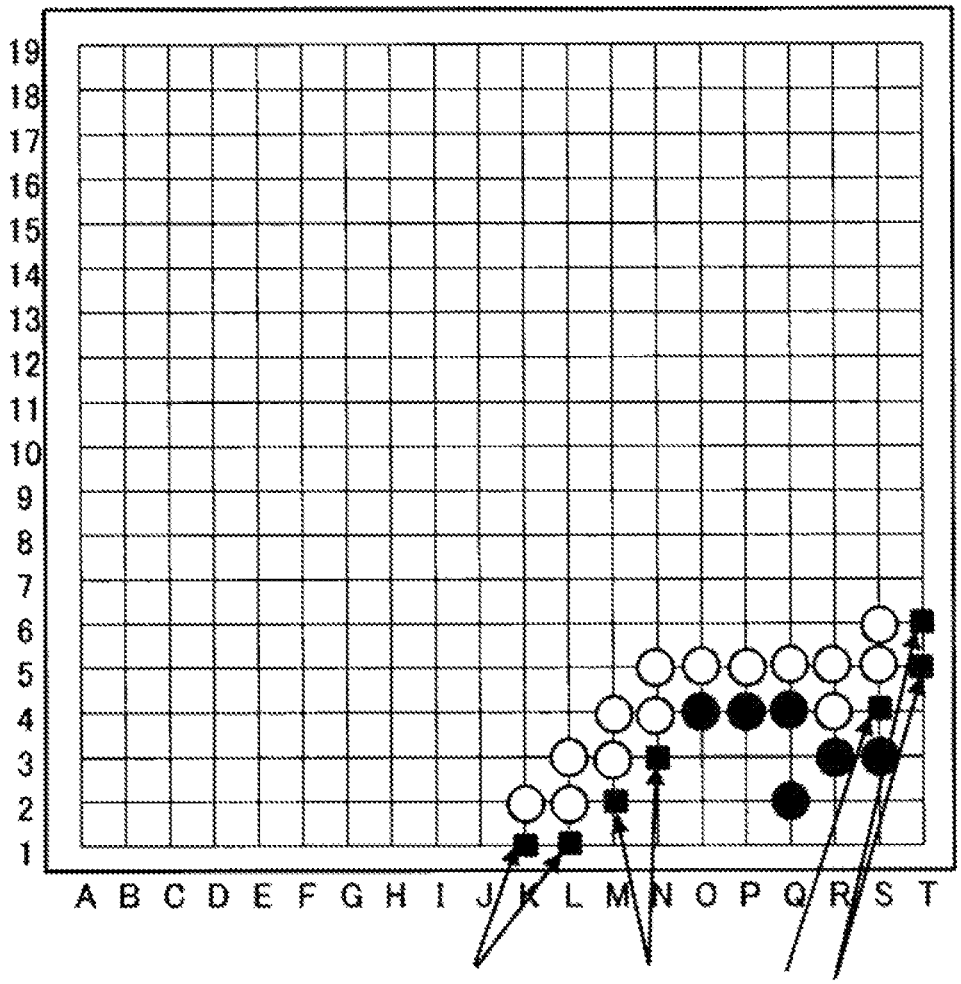

FIG. 39 This is another example of the state of the board of Working Example 2.

Figure 40:
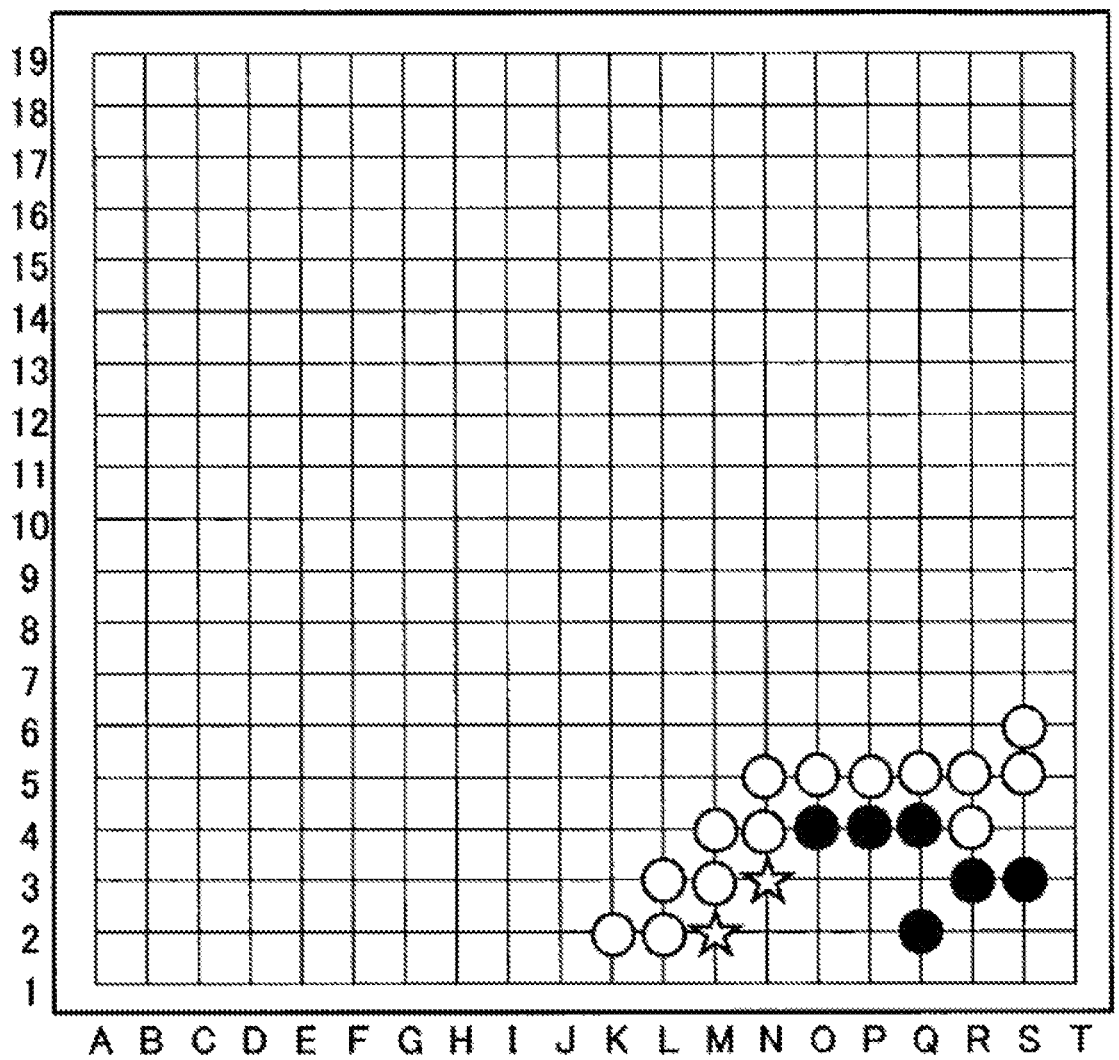

FIG. 40 This is another example of the state of the board of Working Example 2.

Figure 41:
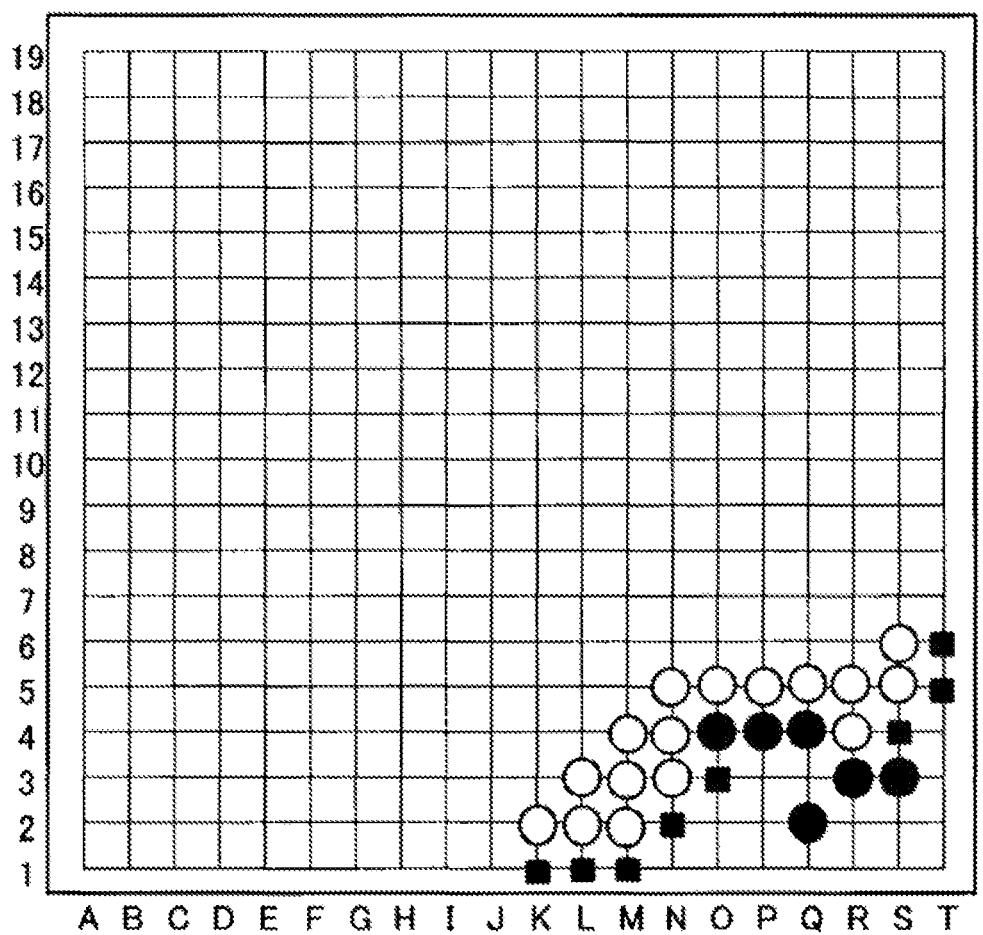

FIG. 41 This is another example of the state of the board of Working Example 2.

Figure 42:
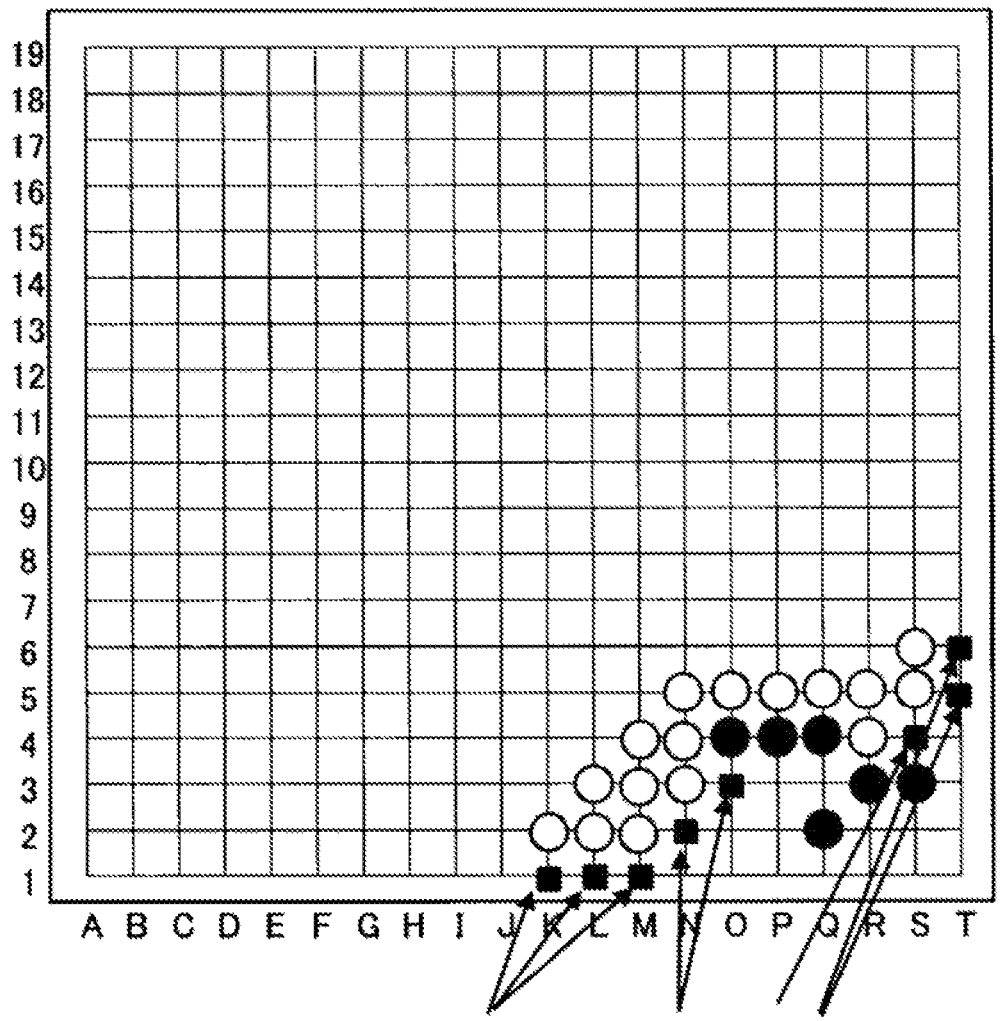

FIG. 42 This is another example of the state of the board of Working Example 2.

Figure 43:
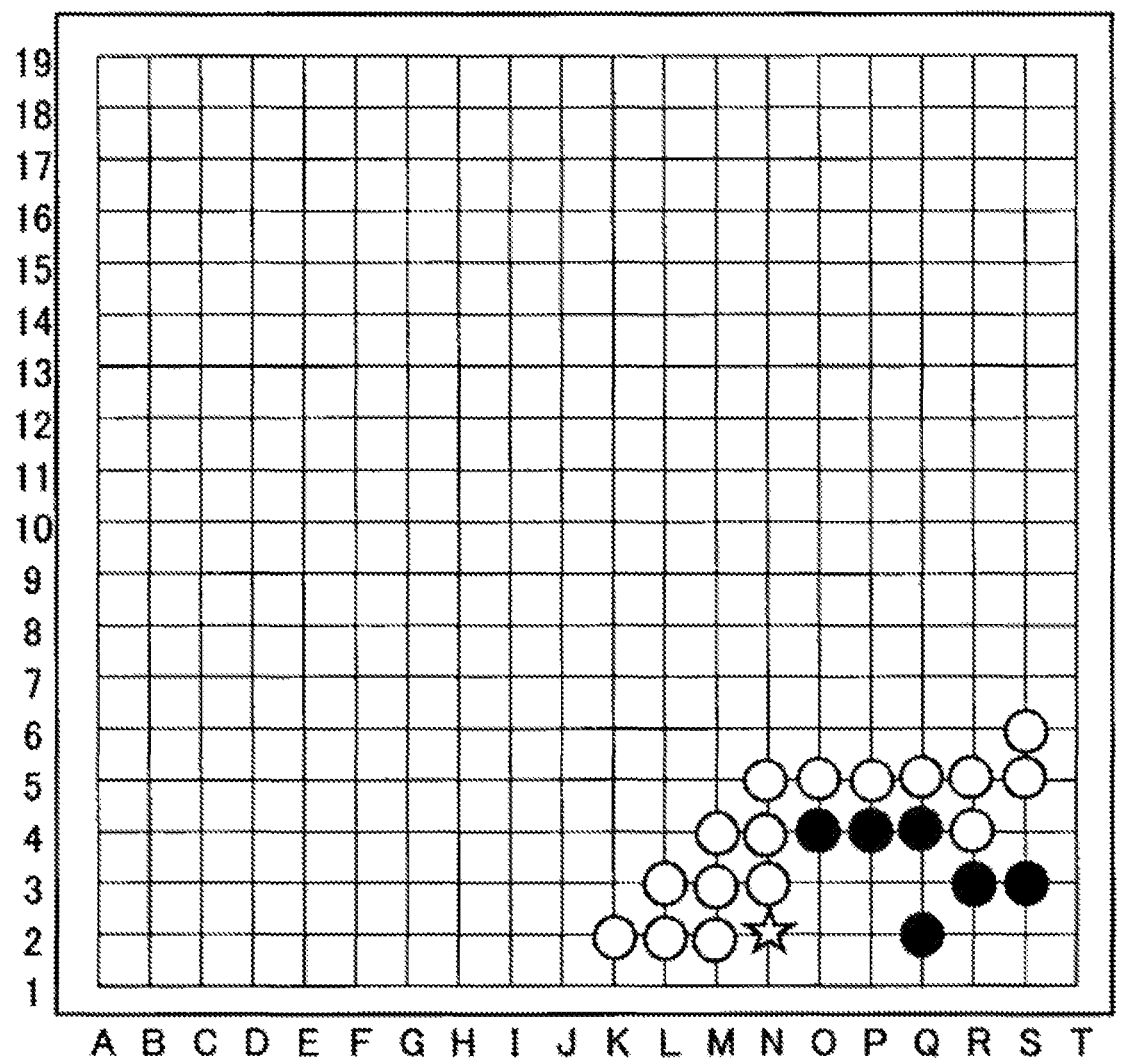

FIG. 43 This is another example of the state of the board of Working Example 2.

Figure 44:
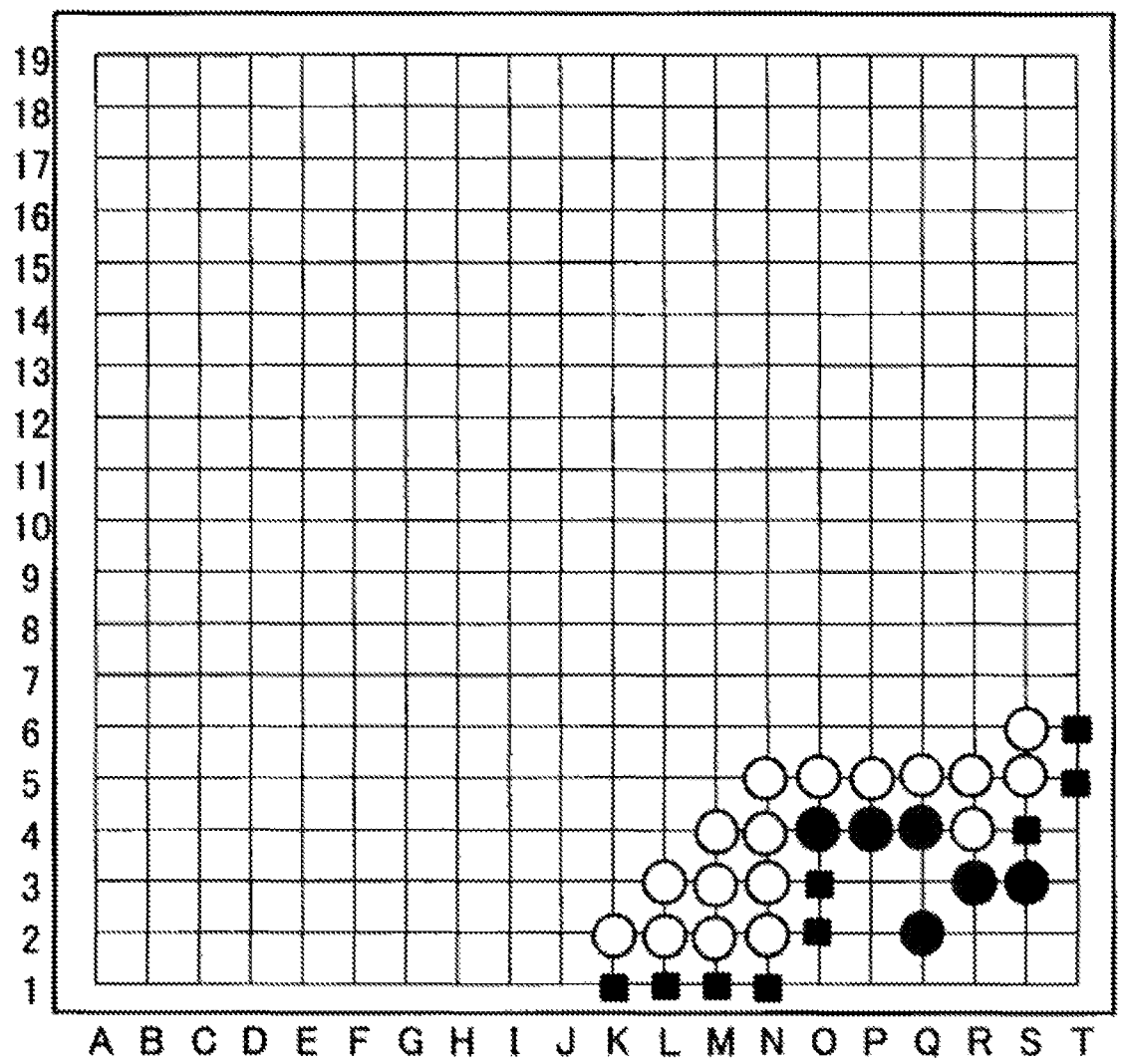

FIG. 44 This is another example of the state of the board of Working Example 2.

Figure 45:
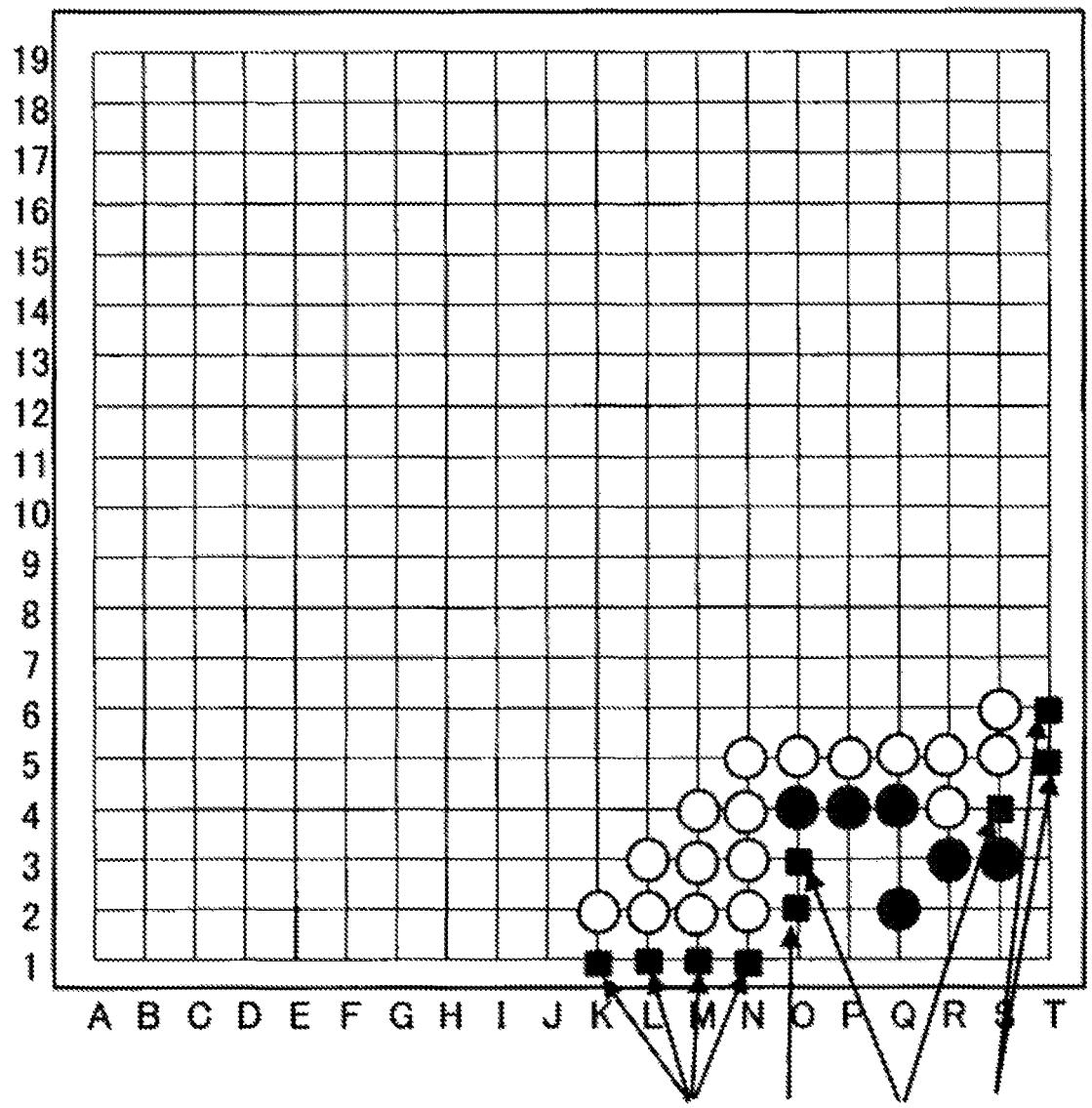

FIG. 45 This is another example of the state of the board of Working Example 2.

Figure 46:
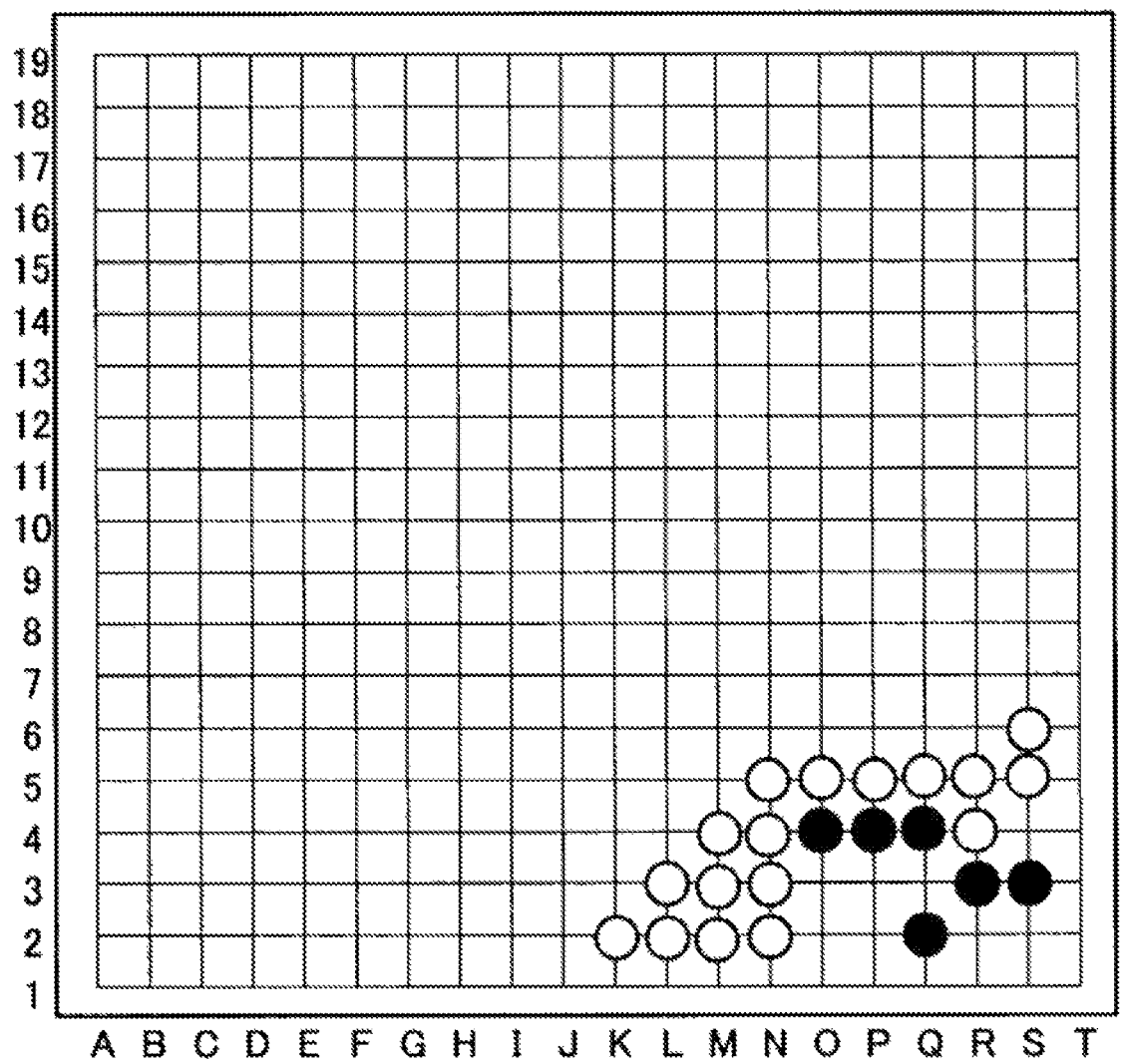

FIG. 46 This is another example of the state of the board of Working Example 2.

Figure 47:
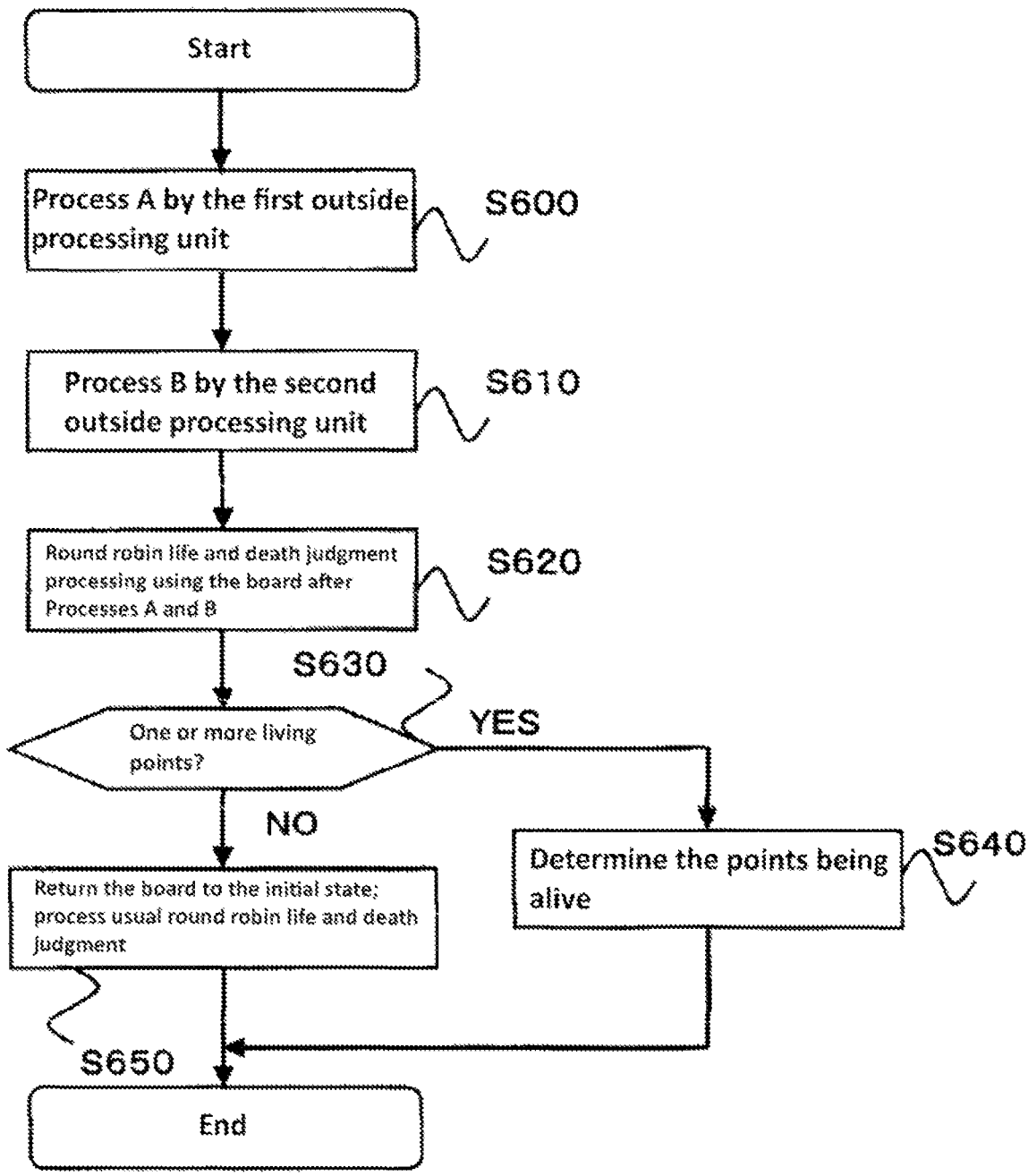

FIG. 47 This is a flowchart in which an example of the entire processing sequence in Working Example 2 is schematically described in detail.

Figure 48:
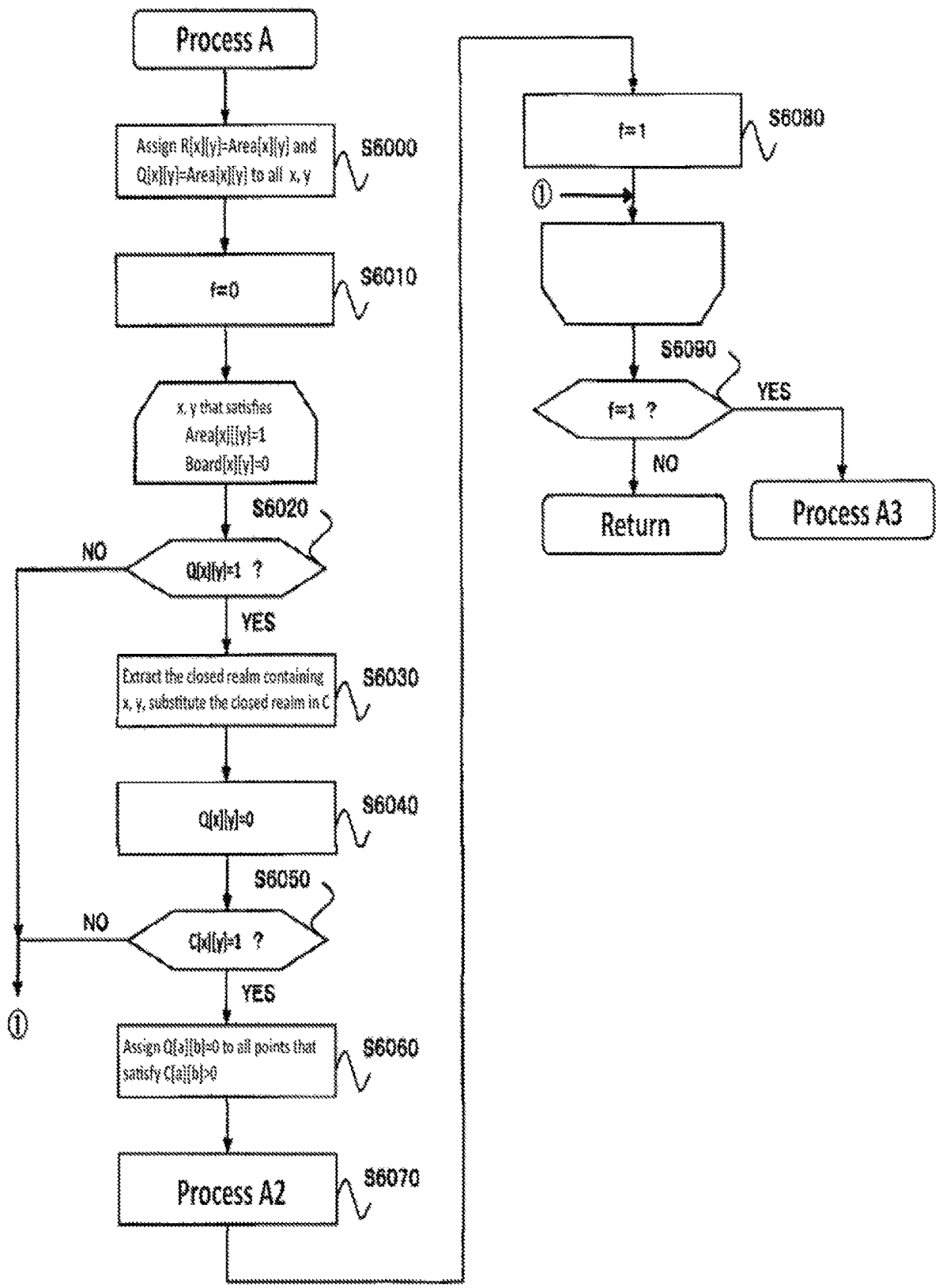

FIG. 48 This is a flowchart in which an example of the processing sequence of Process A in Working Example 2 is schematically described in detail.

Figure 49:
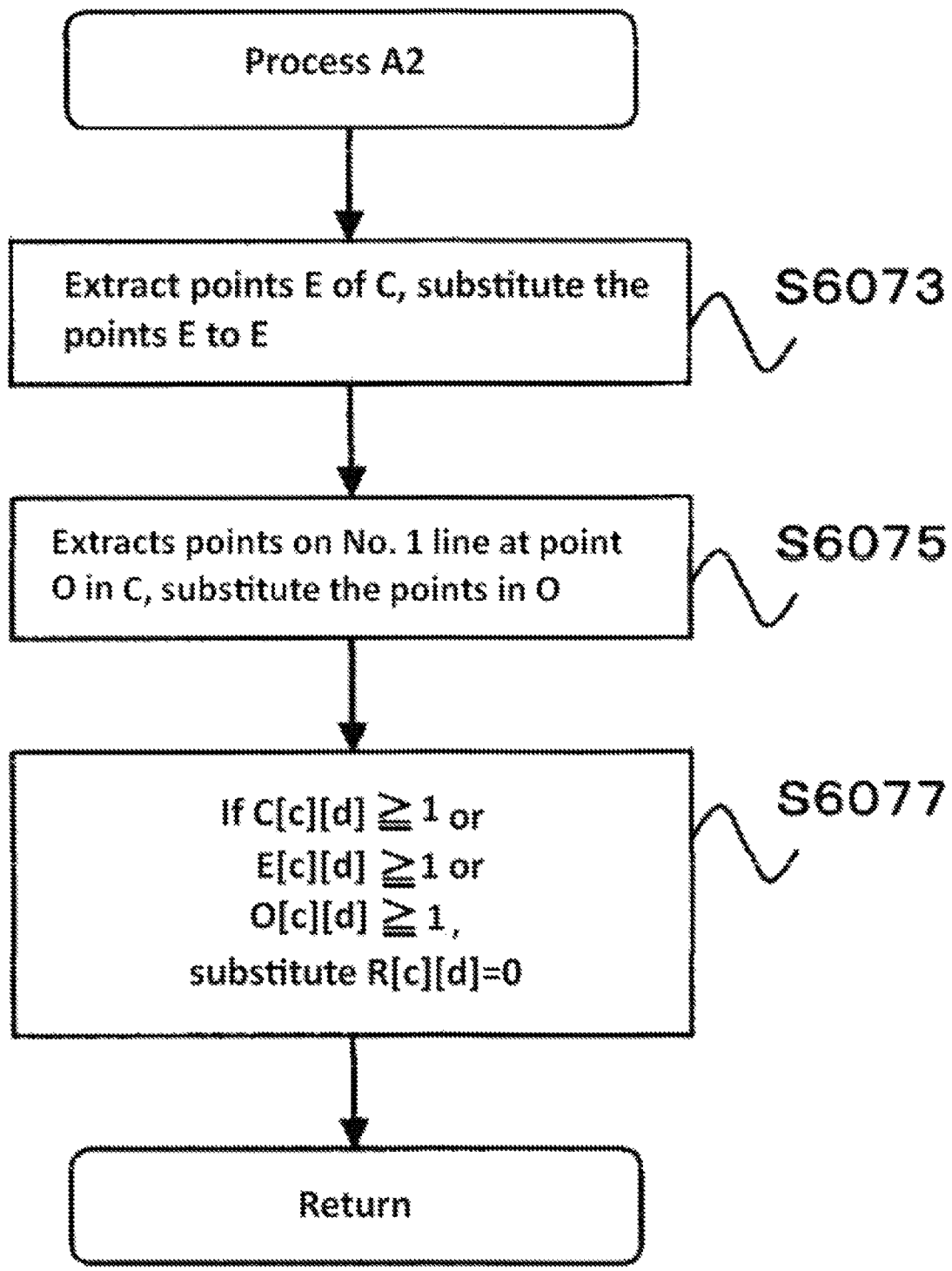

FIG. 49 This is a flowchart in which an example of the processing sequence of Process A2 in Working Example 2 is schematically described in detail.

Figure 50:
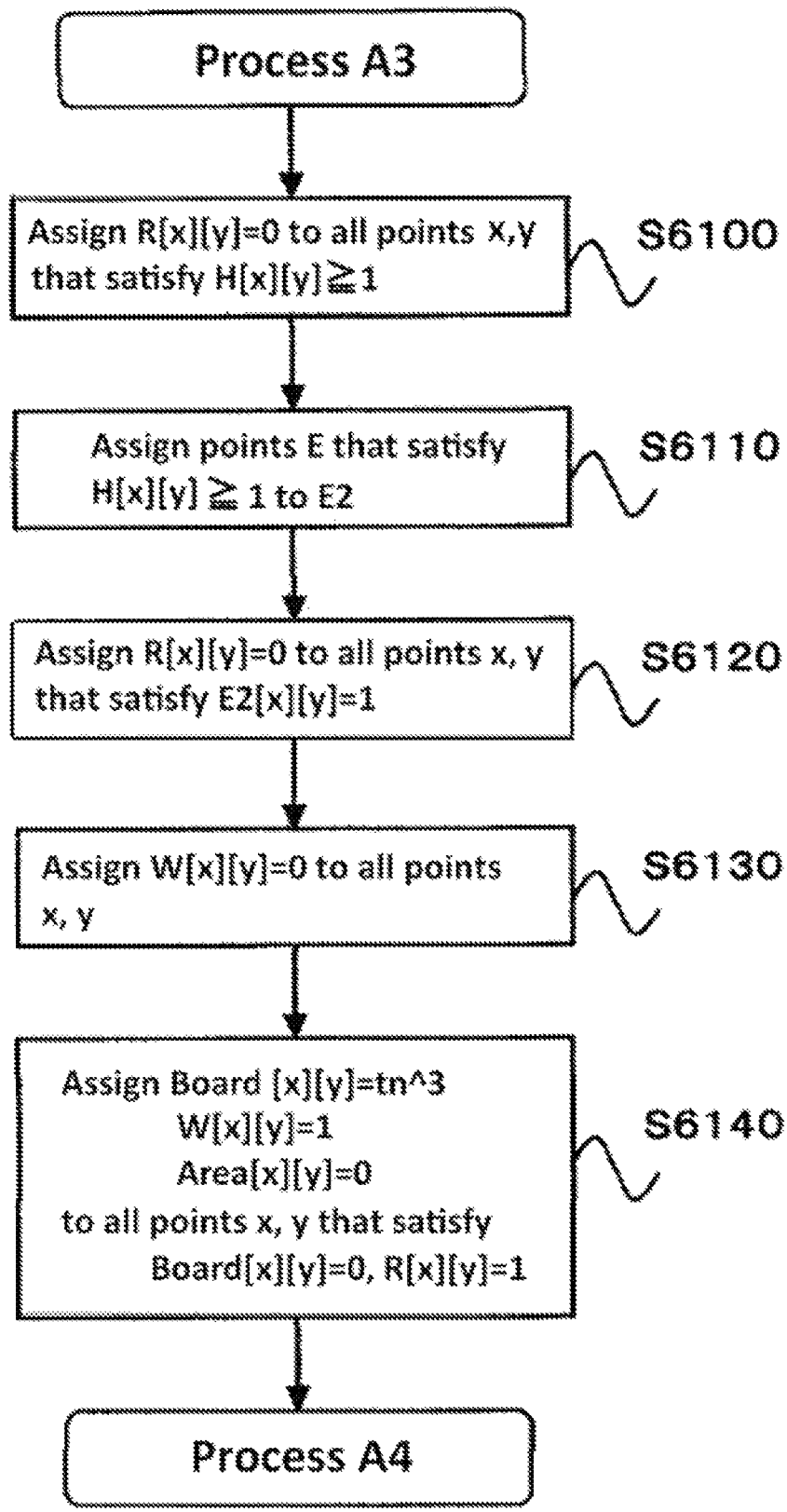

FIG. 50 This is a flowchart in which an example of the processing sequence of Process A3 in Working Example 2 is schematically described in detail.

Figure 51:
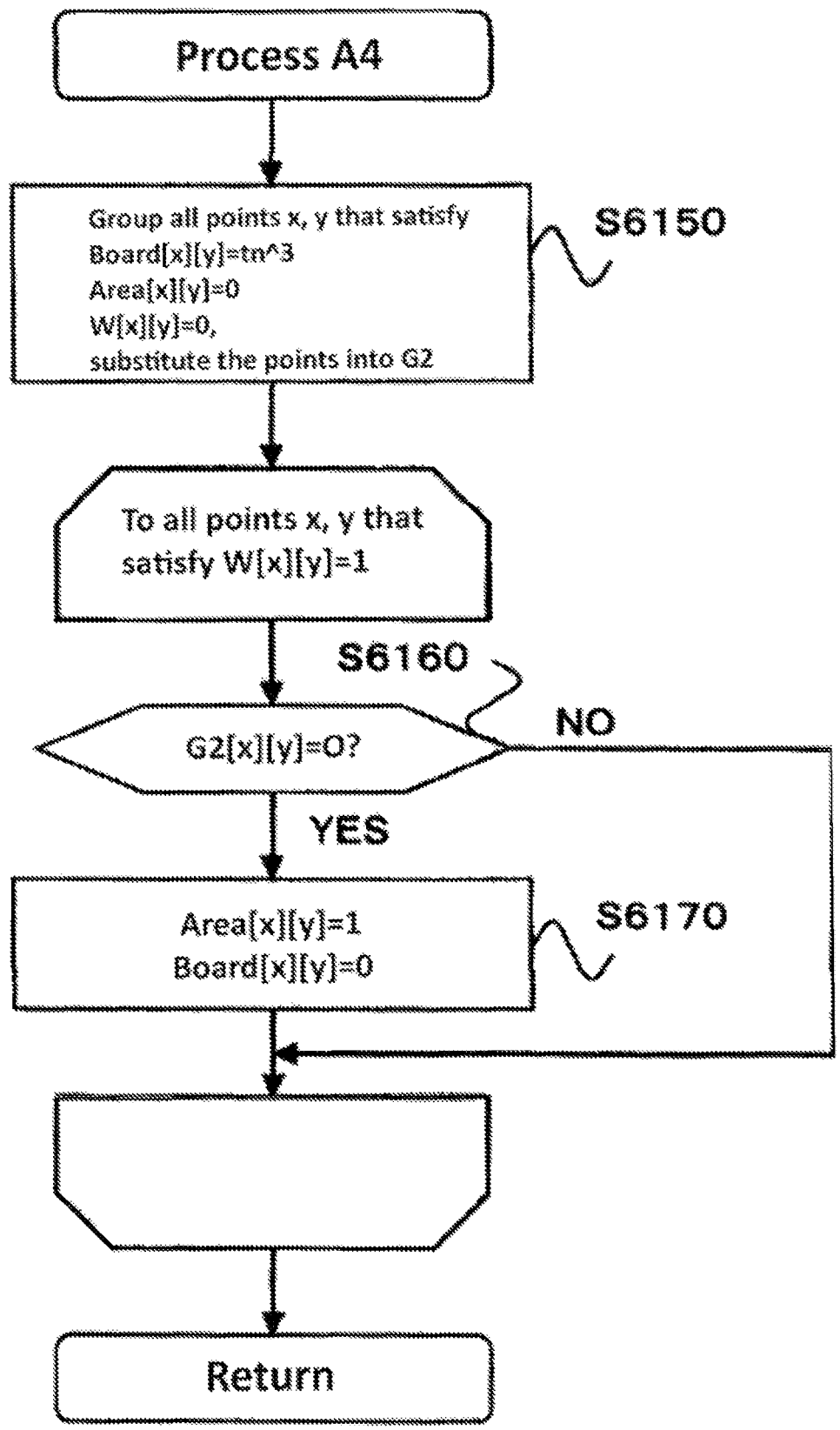

FIG. 51 This is a flowchart in which an example of the processing sequence of Process A4 in Working Example 2 is schematically described in detail.

Figure 52:
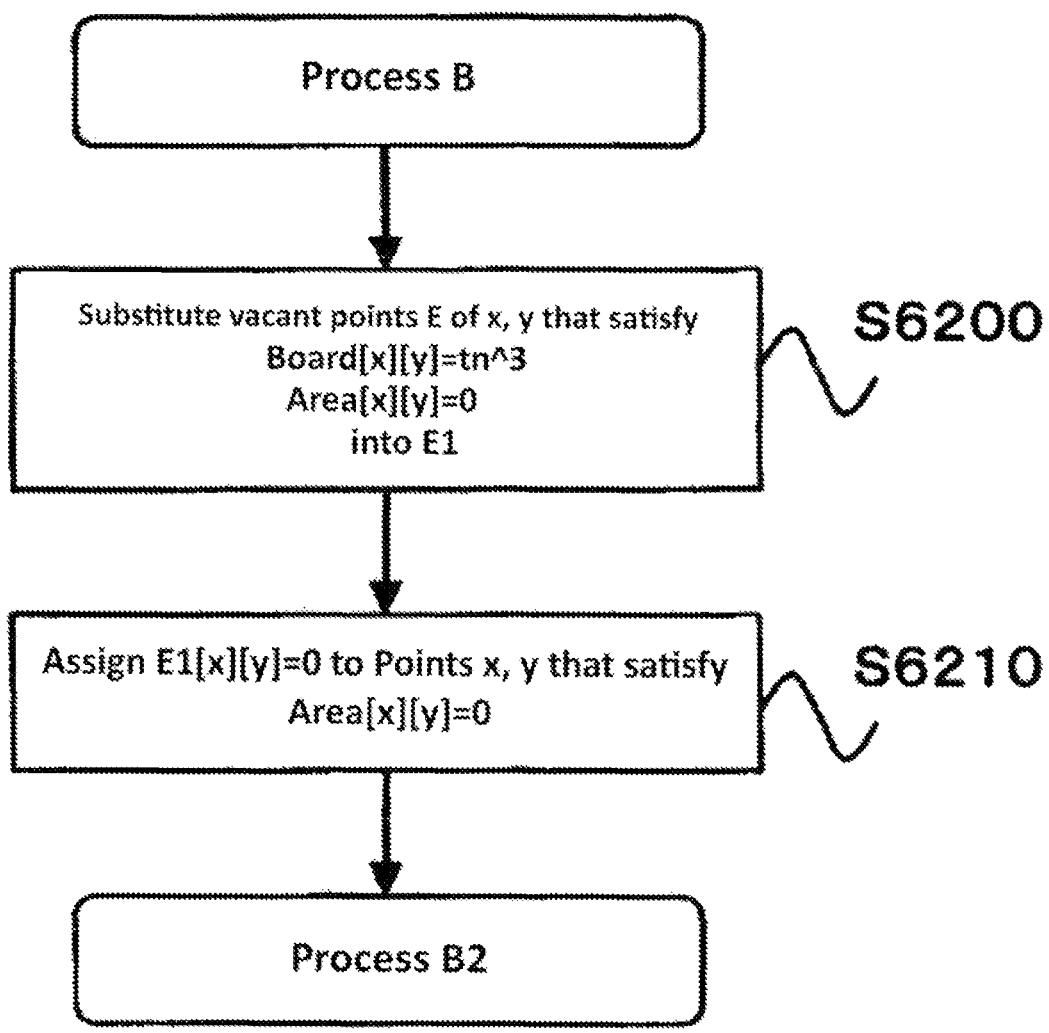

FIG. 52 This is a flowchart in which an example of the processing sequence of Process B in Working Example 2 is schematically described in detail.

Figure 53:
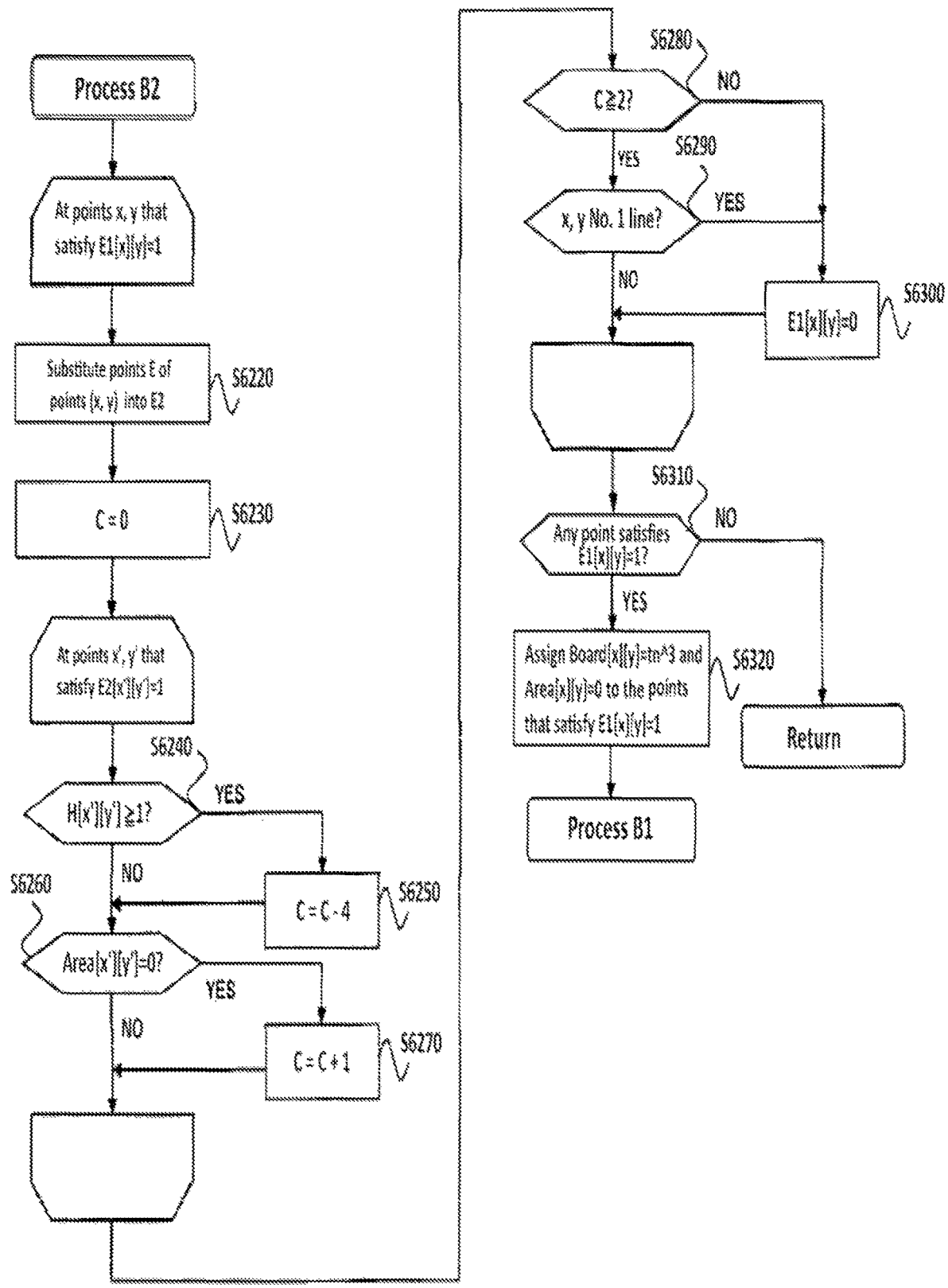

FIG. 53 This is a flowchart in which an example of the processing sequence of Process 13B2 in Working Example 2 is schematically described in detail.

Figure 54:
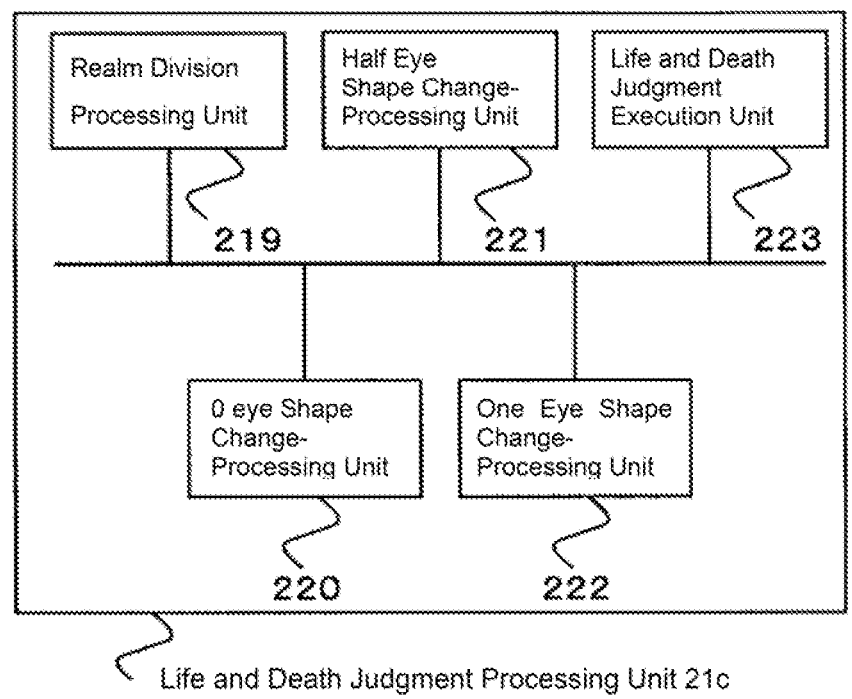

FIG. 54 This is a conceptual diagram schematically showing an example of the processing functions of the life and death judgment in Working Example 3.

Figure 55:
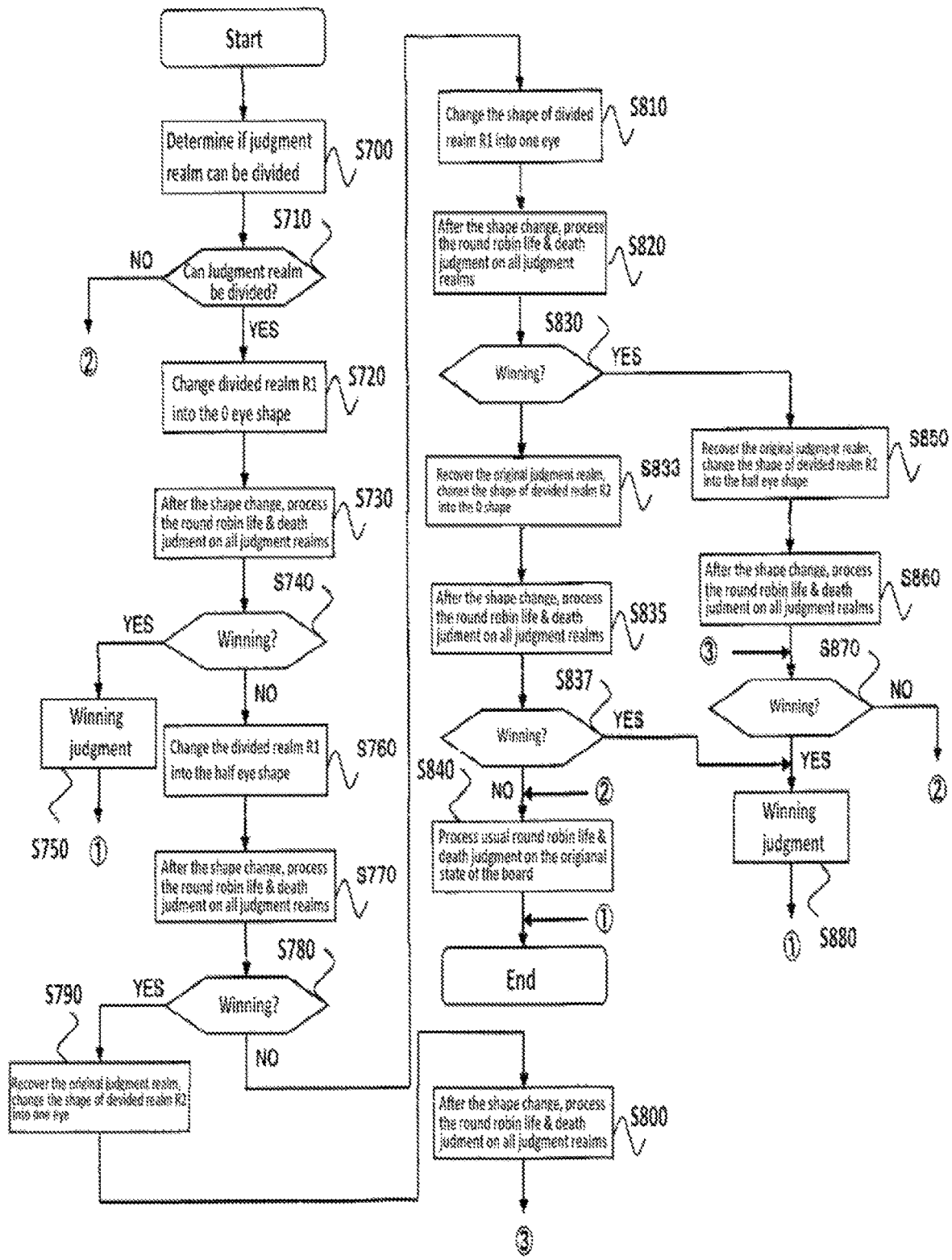

FIG. 55 This is a flowchart showing an example of the processing sequence in Working Example 3.

FIG. 56 This is a diagram showing an example of the shape change-processing into the 0 eye shape.

FIG. 57 This is a diagram showing an example of the shape change-processing into the half eye shape.

FIG. 58 This is a diagram showing an example of the shape change-processing into the one eye shape.

Figure 59:
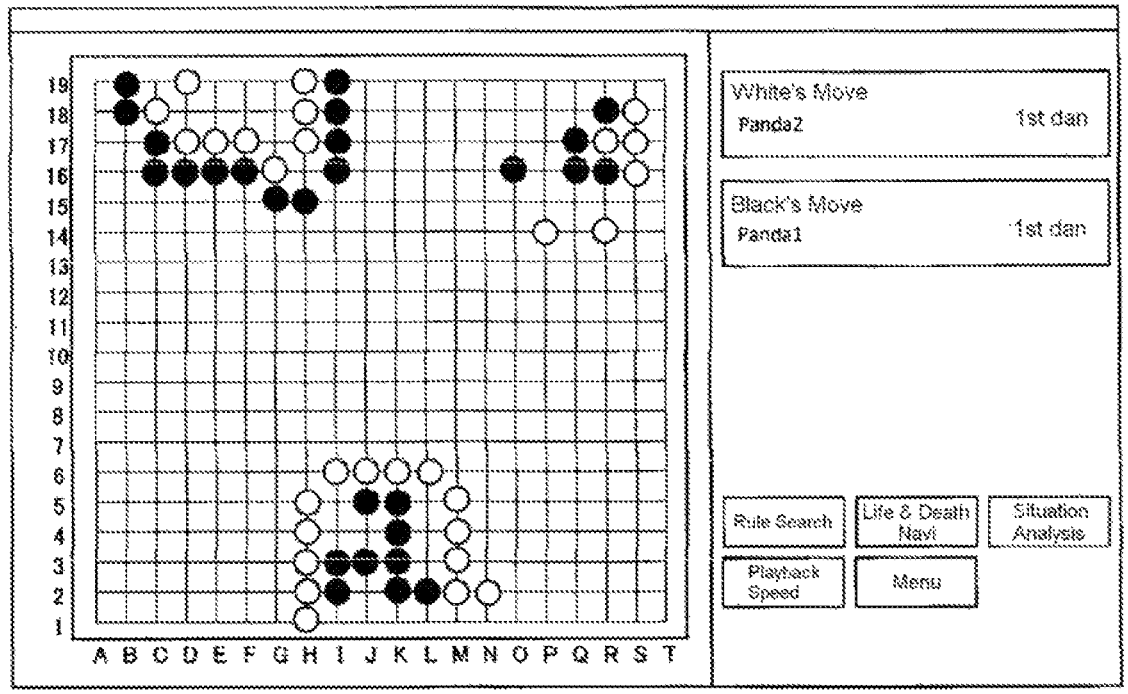

FIG. 59 This is an example of the game screen in Working Example 3.

Figure 60:
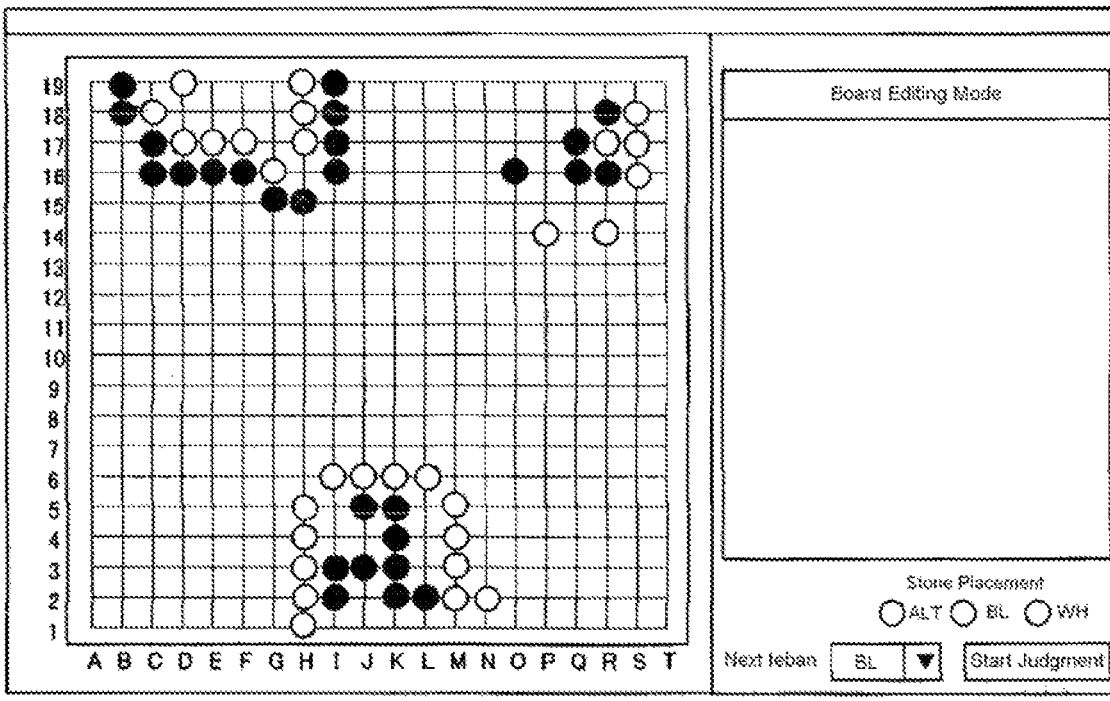

FIG. 60 This is an example of the editing screen in Working Example 3.

Figure 61:
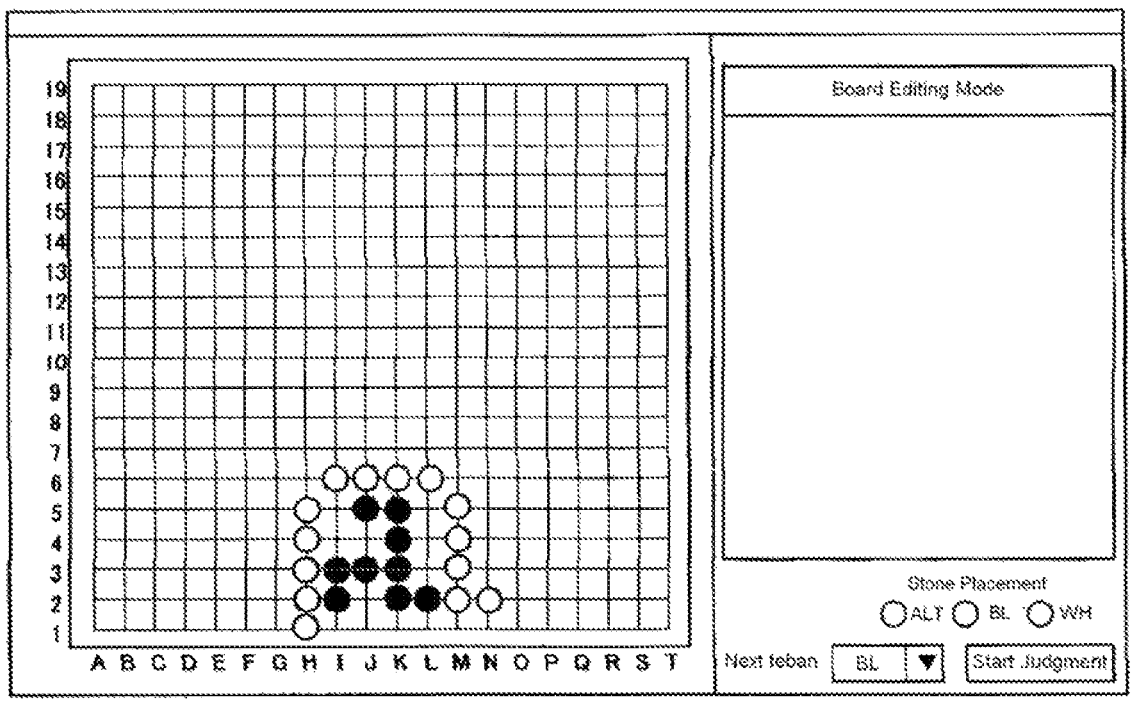

FIG. 61 This is an example of the editing screen in Working Example 3.

Figure 62:
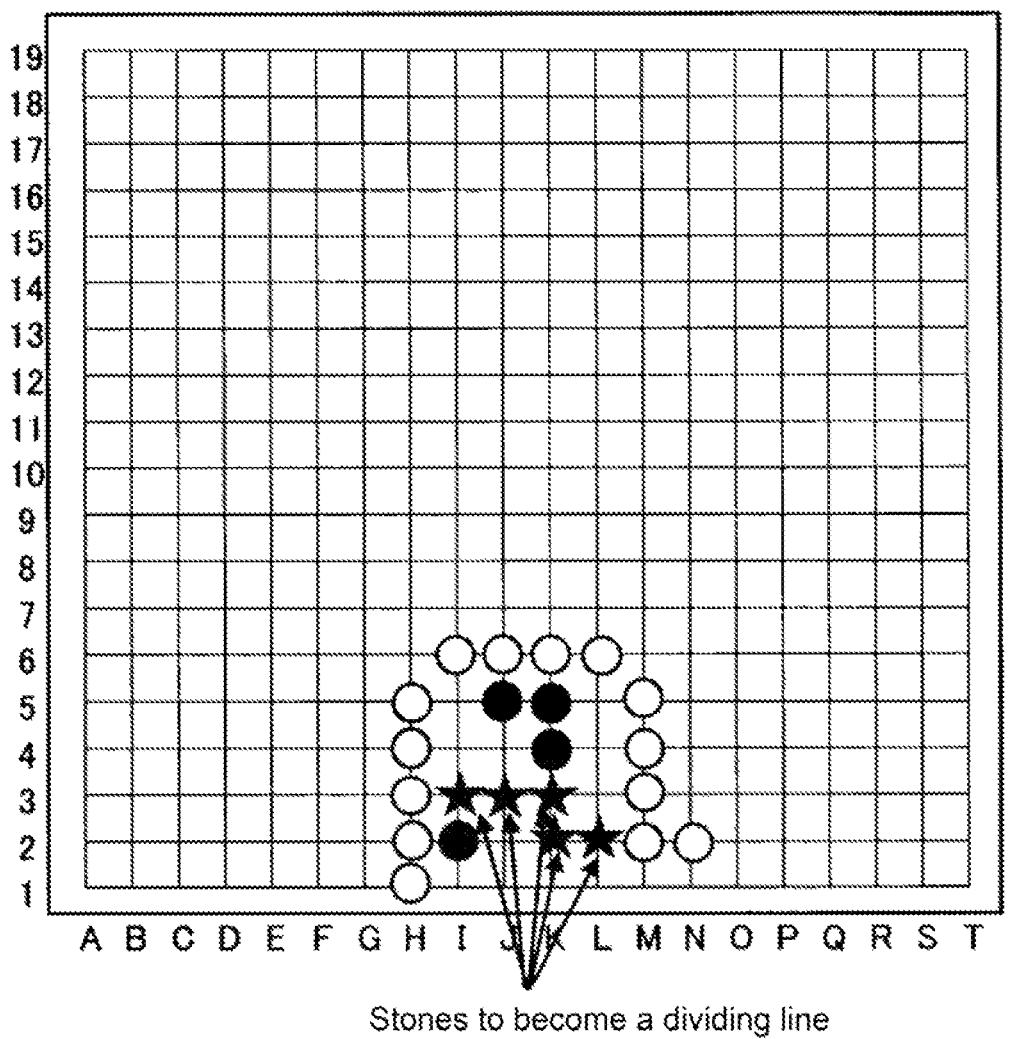

FIG. 62 This is an example of the state of the board in Working Example 3.

Figure 63:
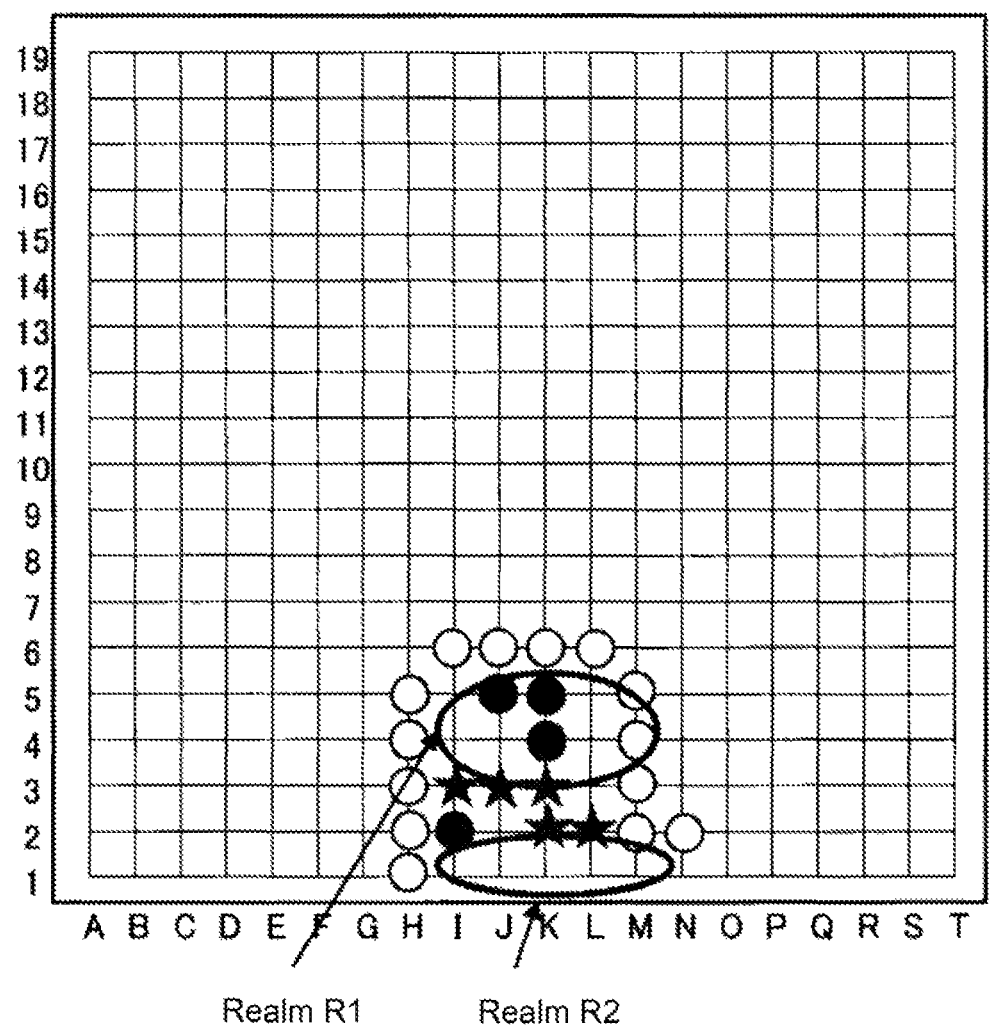

FIG. 63 This is an example of the state of the board in Working Example 3.

Figure 64:
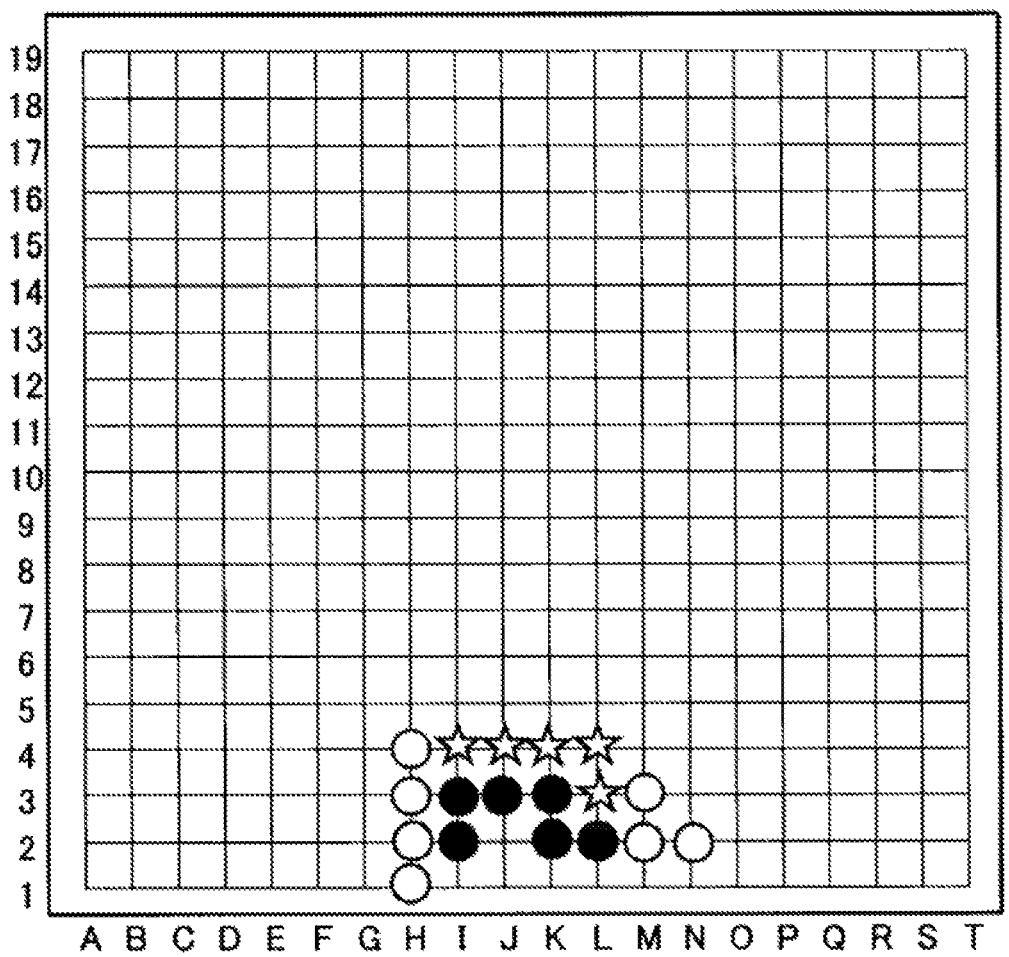

FIG. 64 This is an example of the state of the board in Working Example 3.

Figure 65:
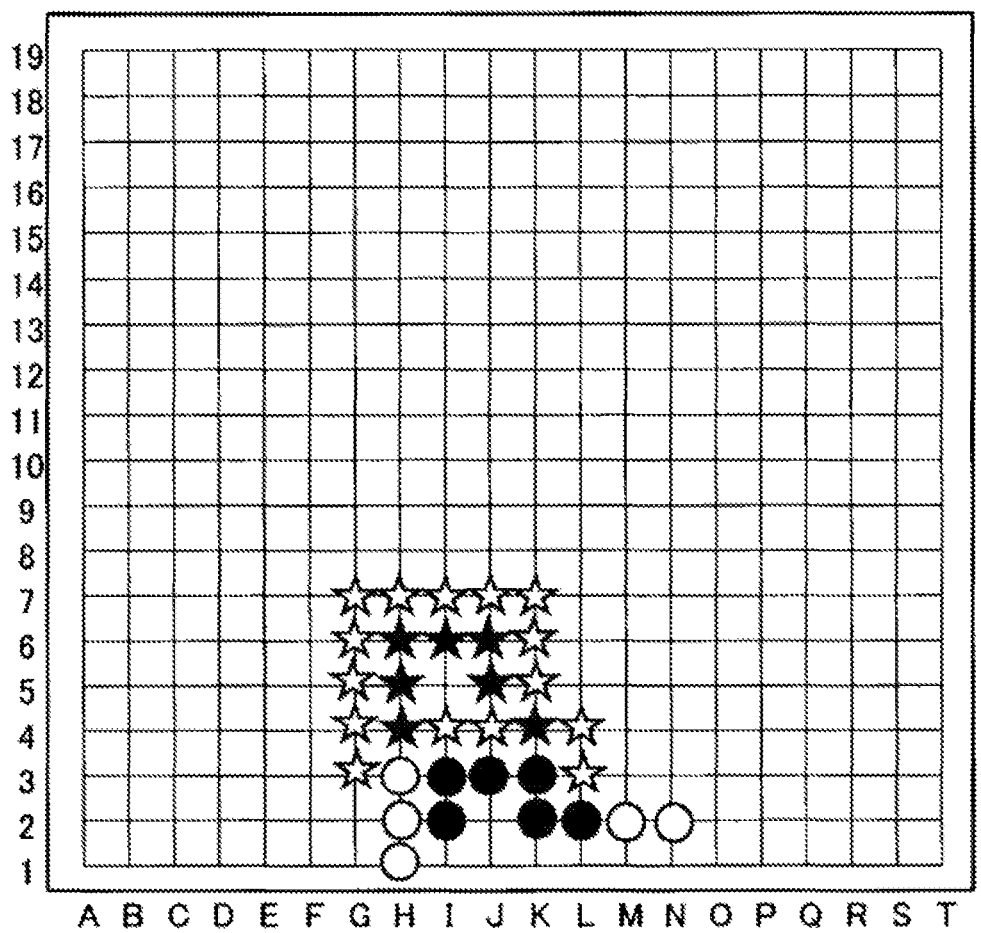

FIG. 65 This is an example of the state of the board in Working Example 3.

Figure 66:
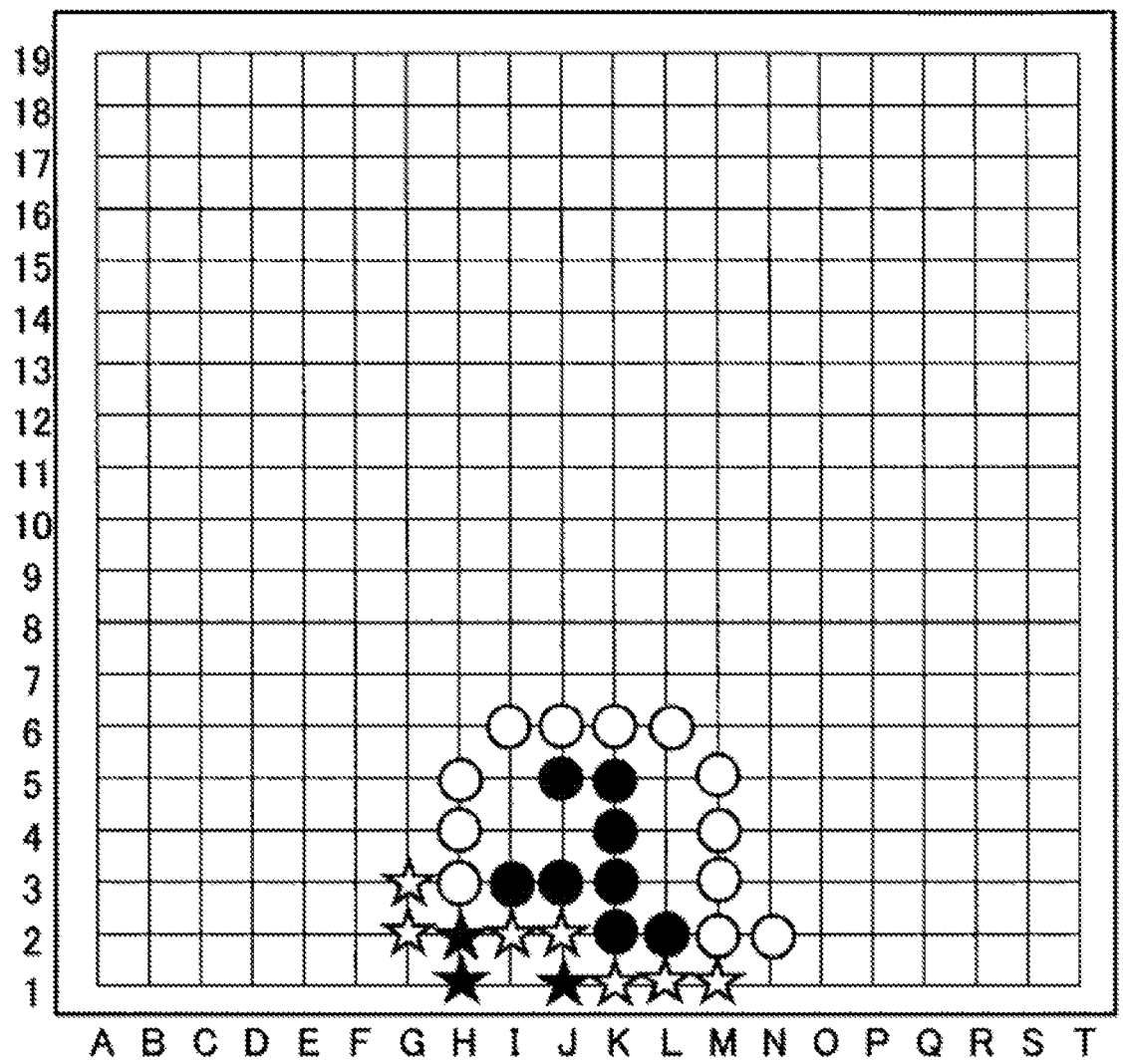

FIG. 66 This is an example of the state of the board in Working Example 3.

Figure 67:
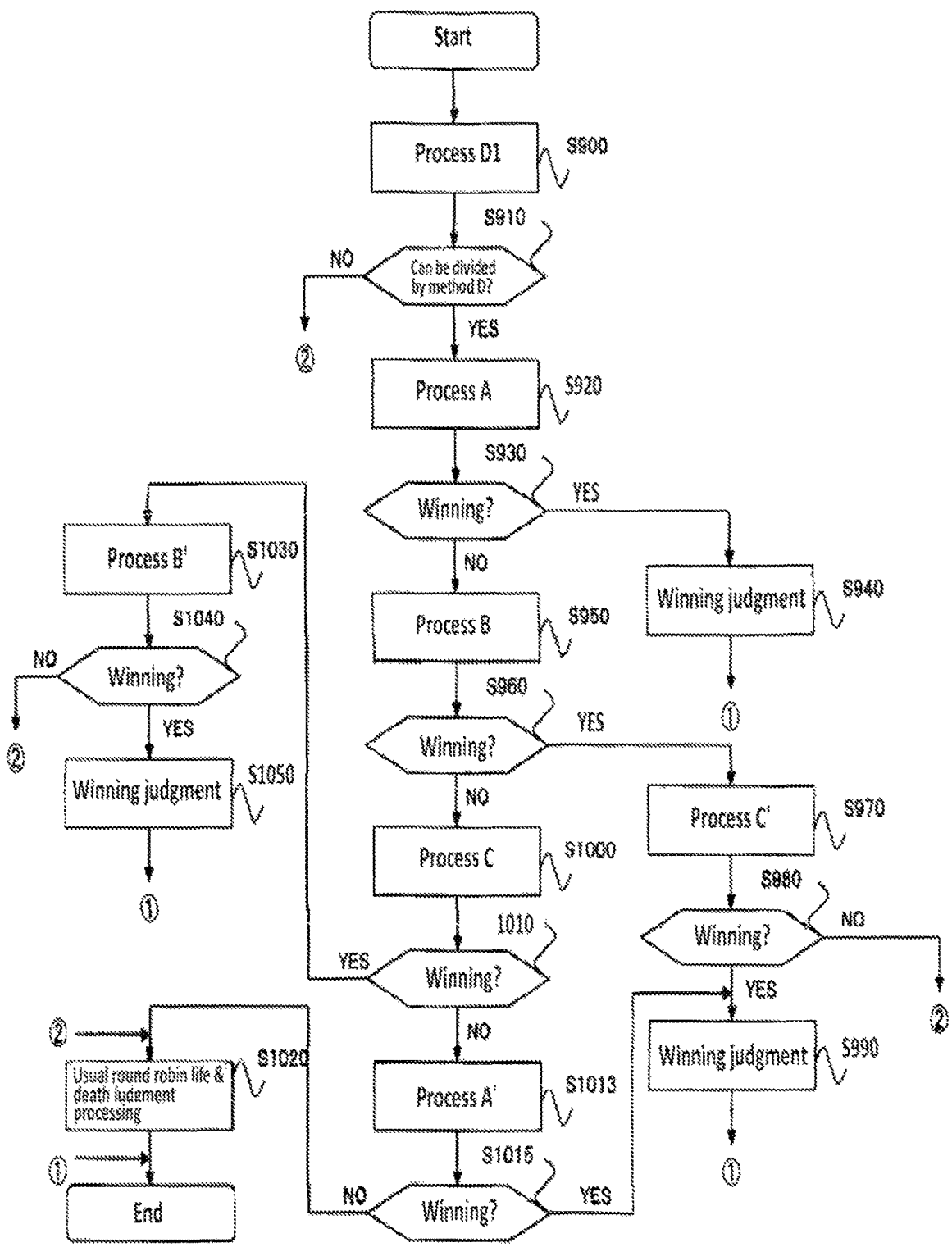

FIG. 67 This is a flowchart in which an example of the entire processing sequence in Working Example 3 is schematically described in detail.

Figure 68:
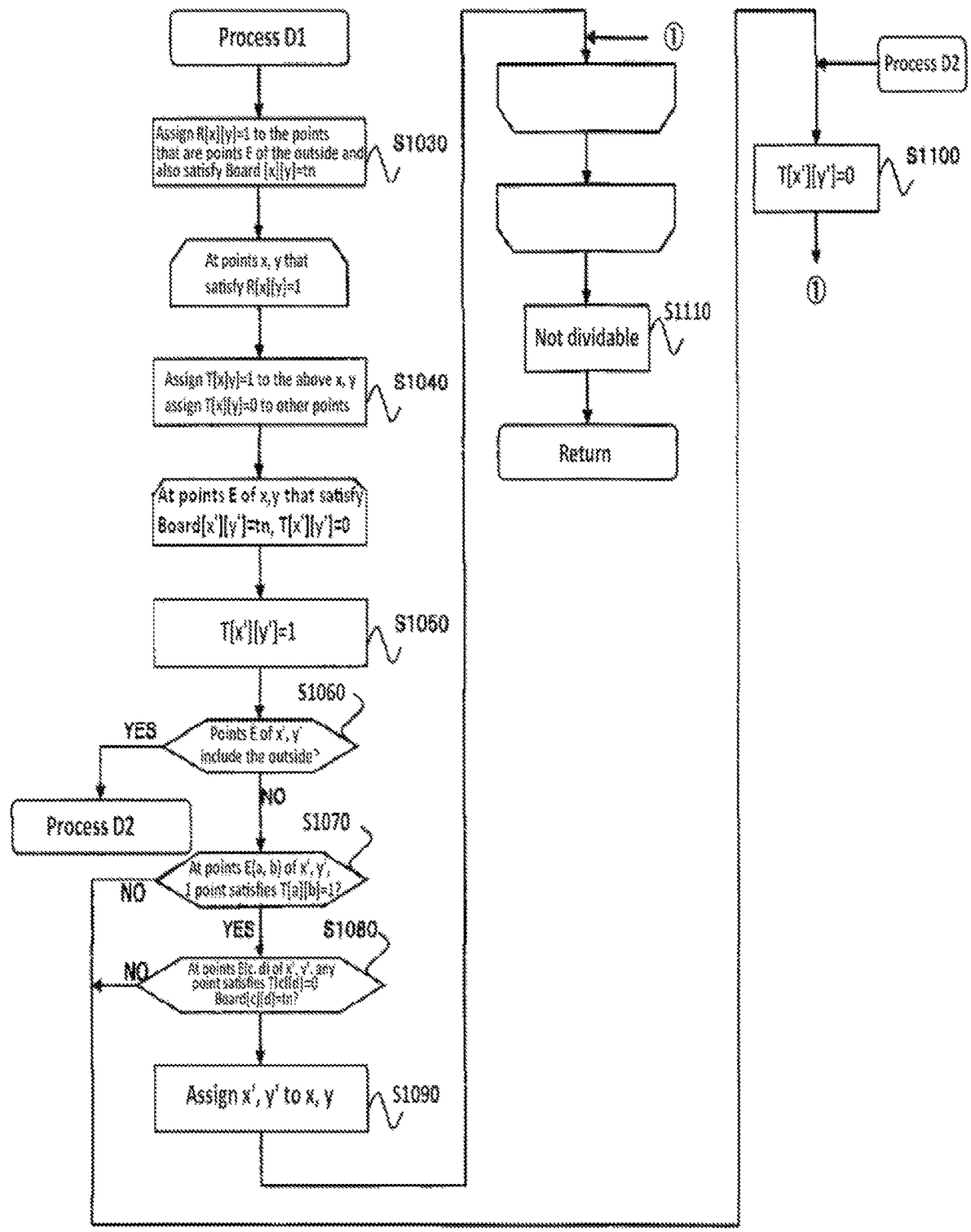

FIG. 68 This is a flowchart in which an example of the processing sequence of Process D1 in Working Example 3 is schematically described in detail.

Figure 69:
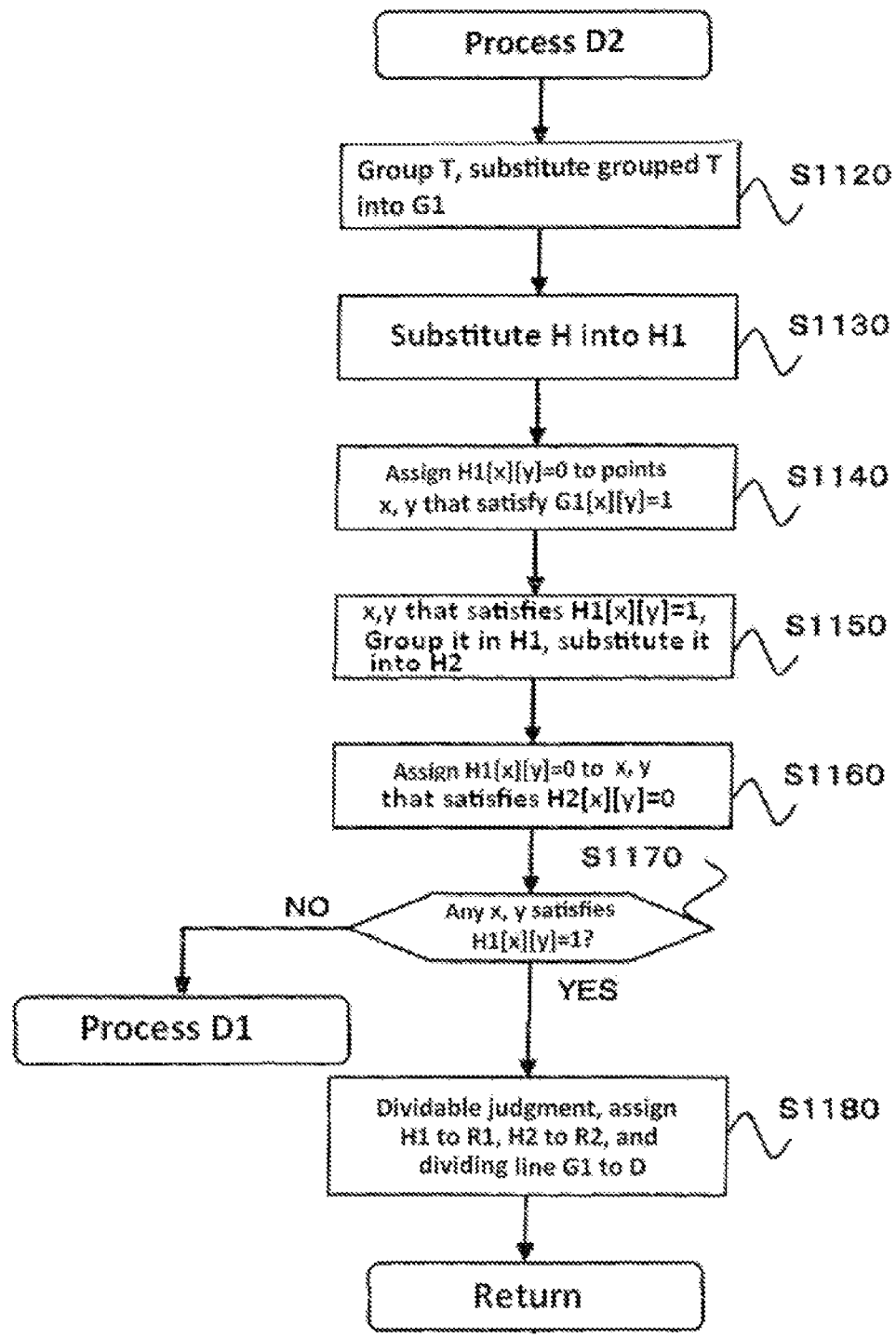

FIG. 69 This is a flowchart in which an example of the processing sequence of Process D2 in Working Example 3 is schematically described in detail.

Figure 70:
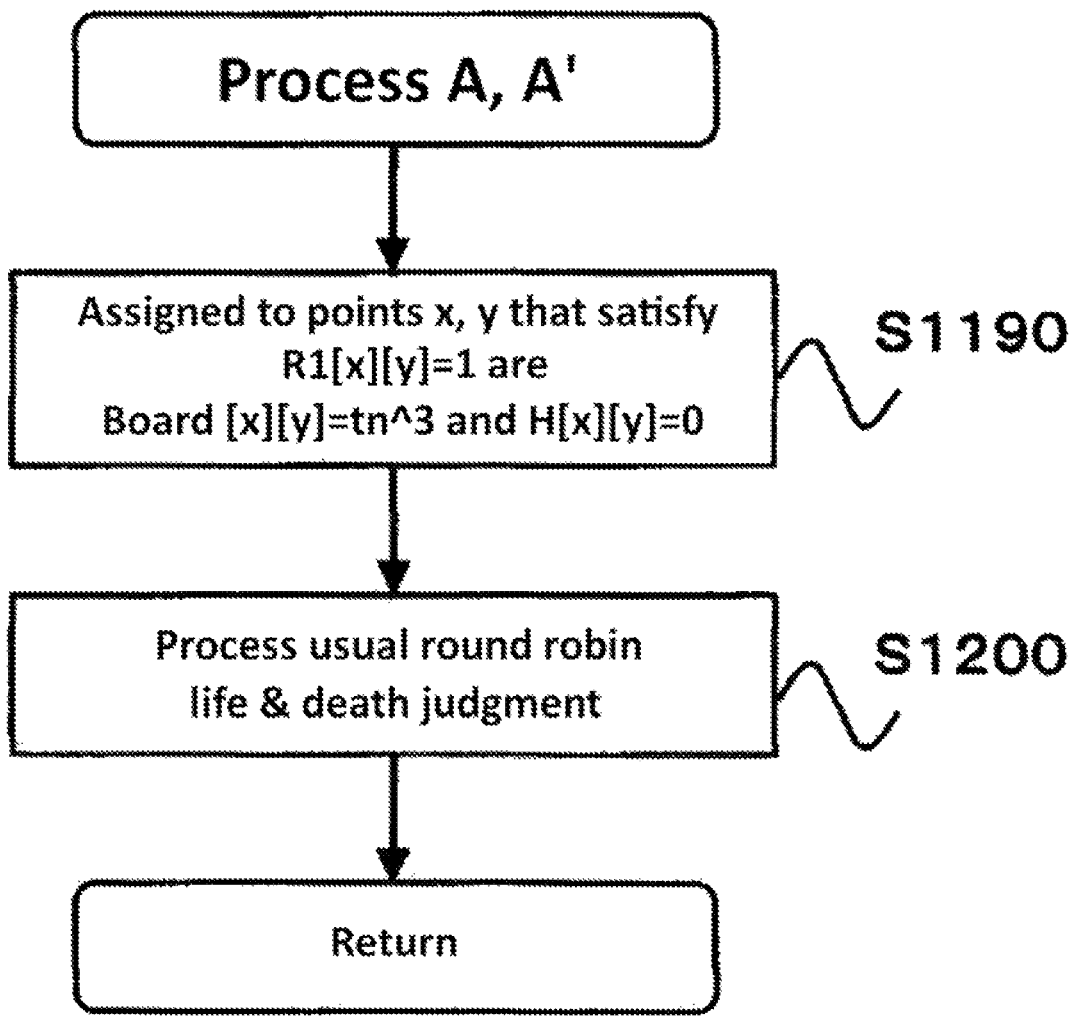

FIG. 70 This is a flowchart in which an example of the processing sequence of Process A in Working Example 3 is schematically described in detail.

Figure 71:
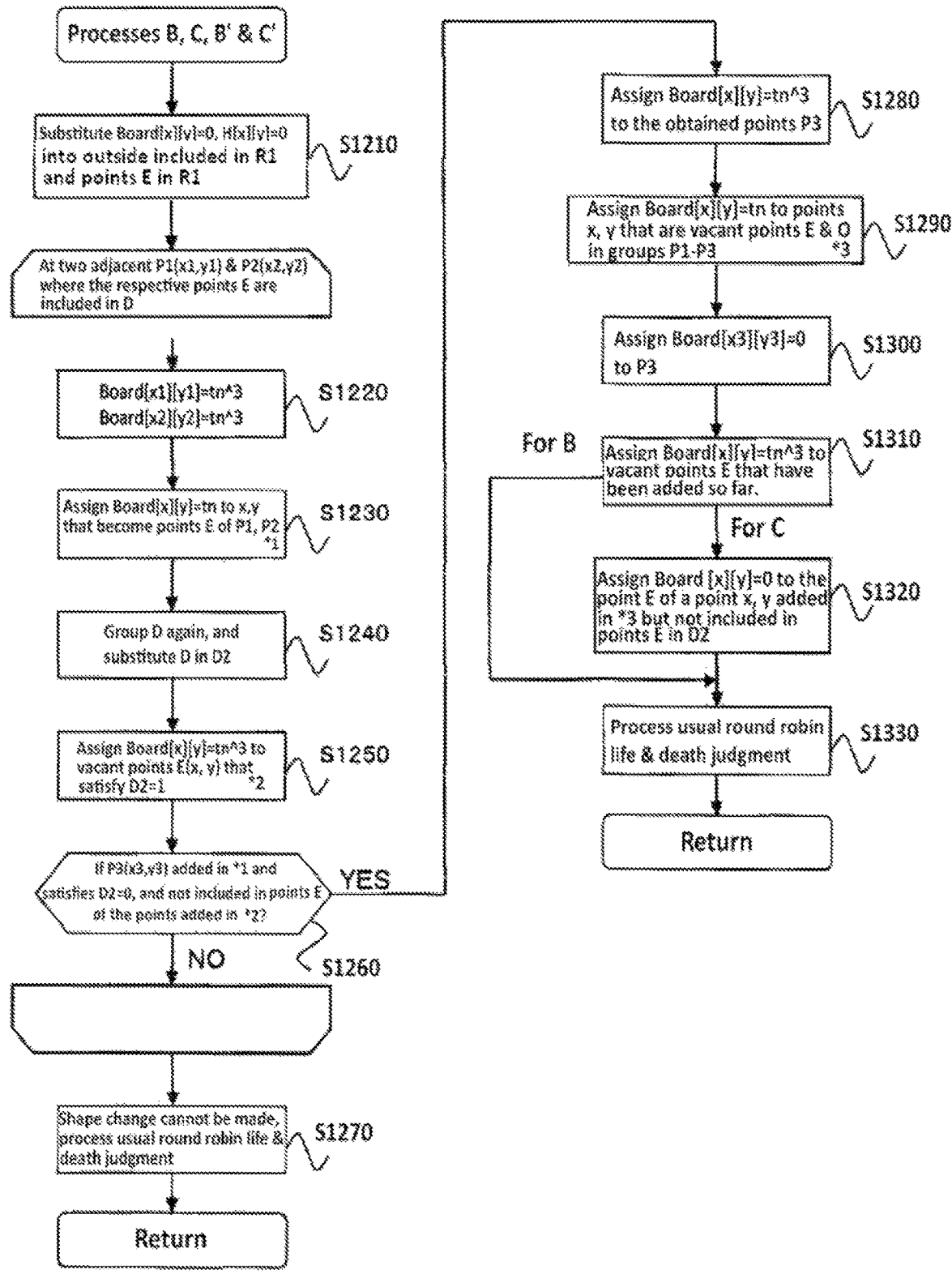

FIG. 71 This is a flowchart in which an example of the processing sequence of Processes B, C. B' and C' in Working Example 3 is schematically described in detail.

Figure 72:
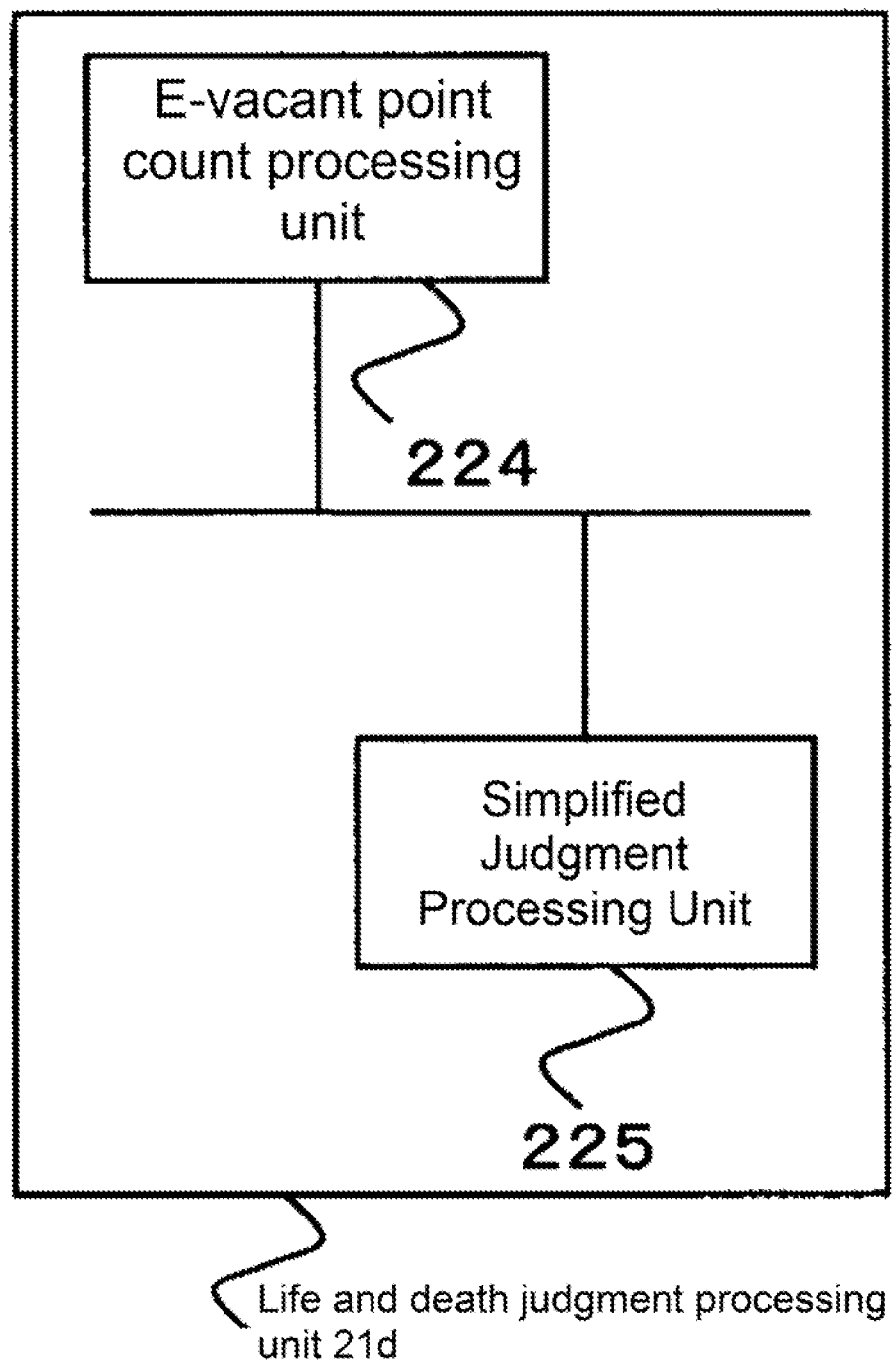

FIG. 72 This is a conceptual diagram schematically showing an example of the processing functions of the life and death judgment in Working Example 4.

Figure 73:
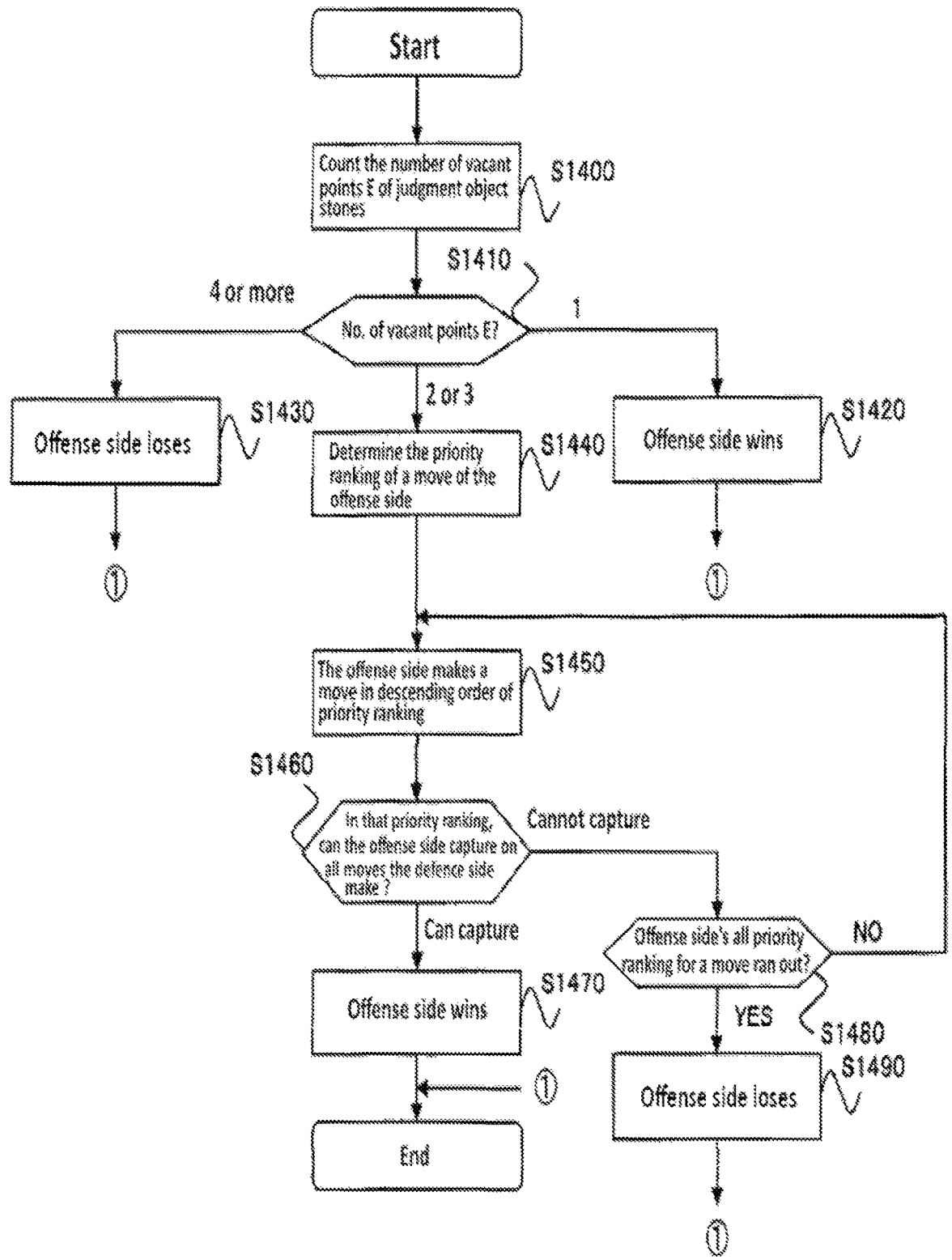

FIG. 73 This is a flowchart showing an example of the processing sequence of the life and death judgment processing in Working Example 4.

Figure 74:
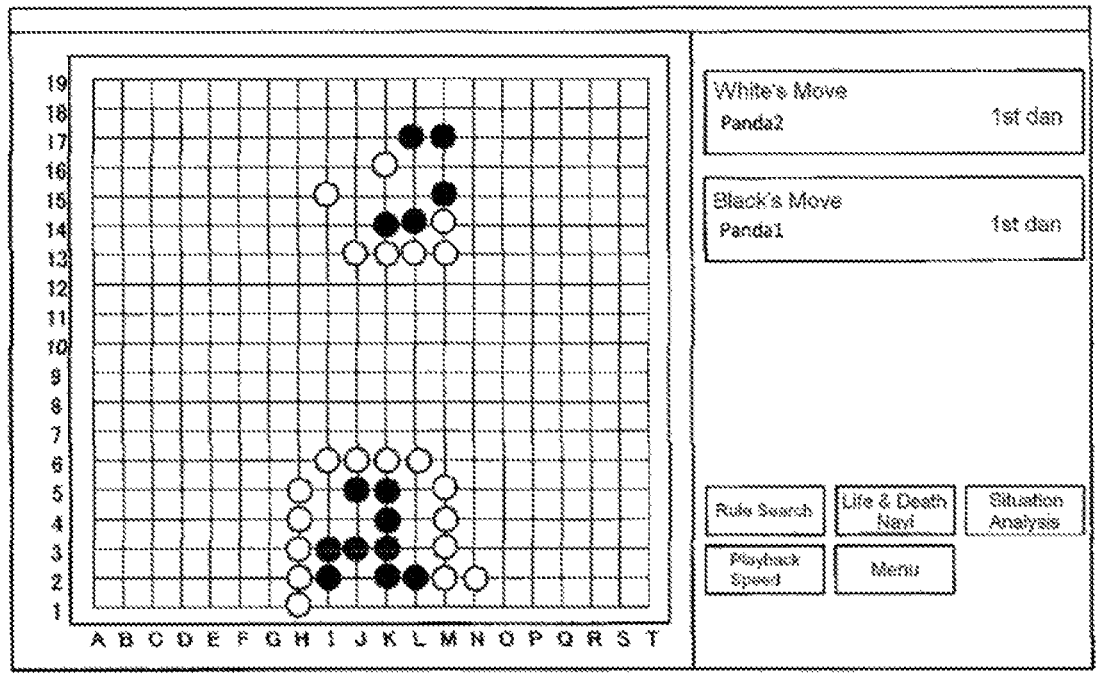

FIG. 74 This is an example of the playing screen in Working Example 4.

Figure 75:
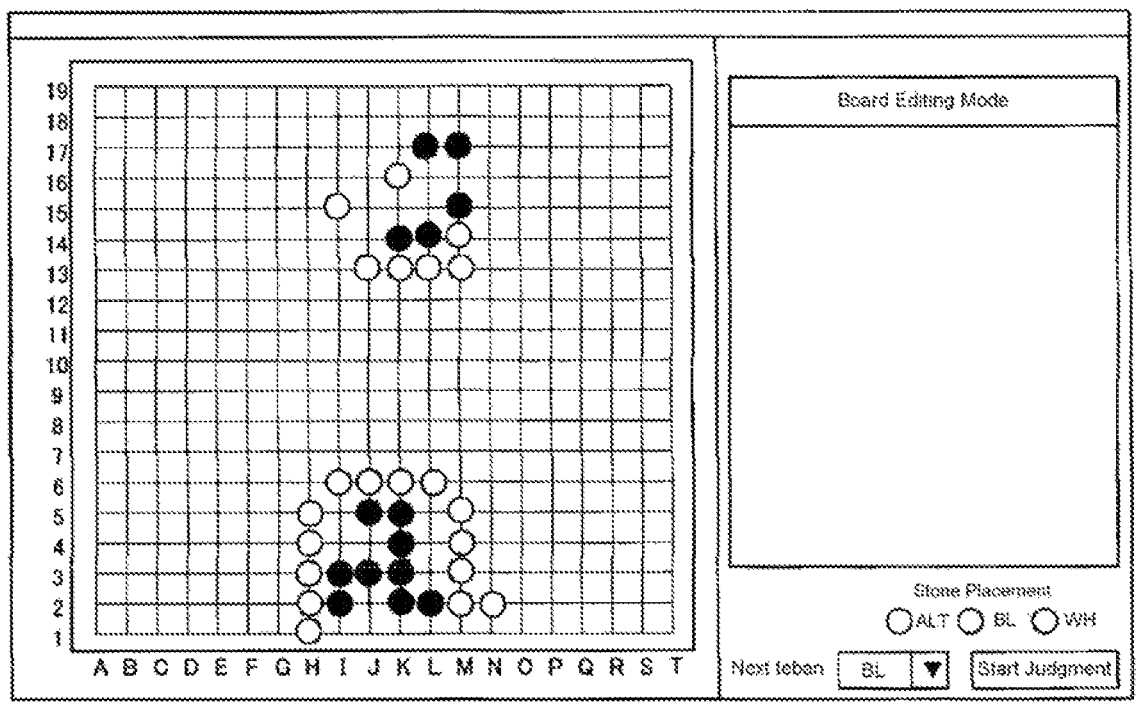

FIG. 75 This is an example of the editing screen in Working Example 4.

Figure 76:
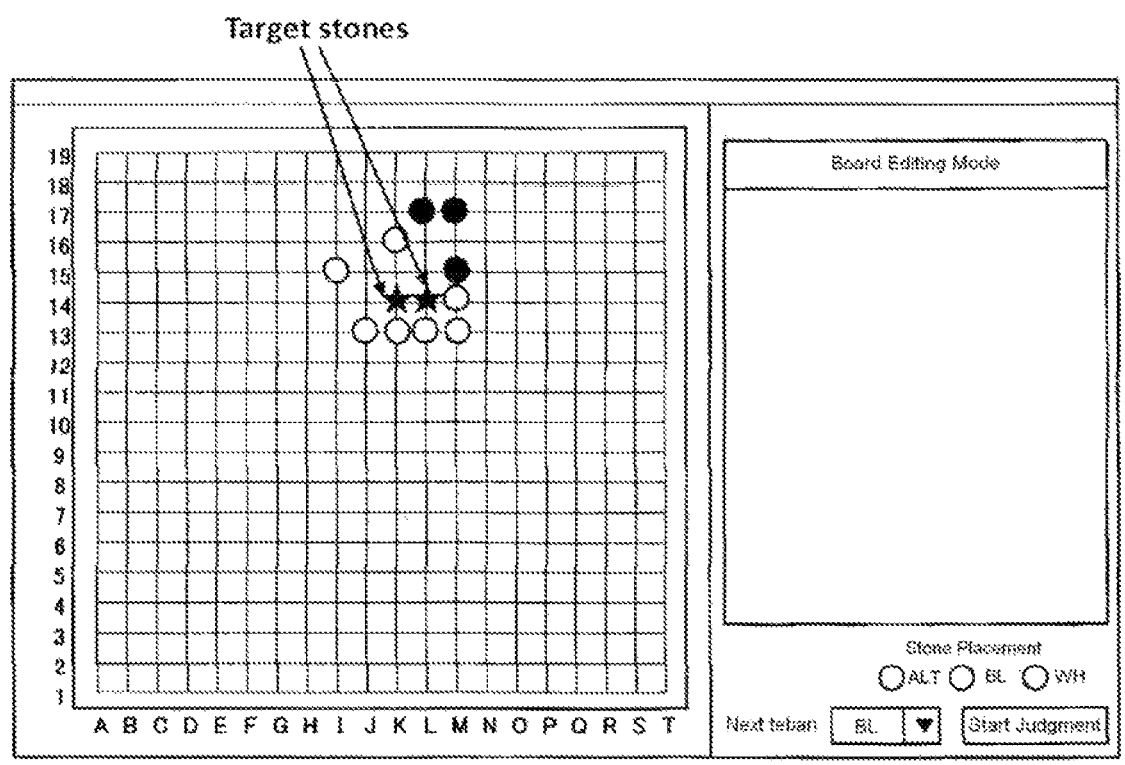

FIG. 76 This is an example of the editing screen in Working Example 4.

Figure 77:
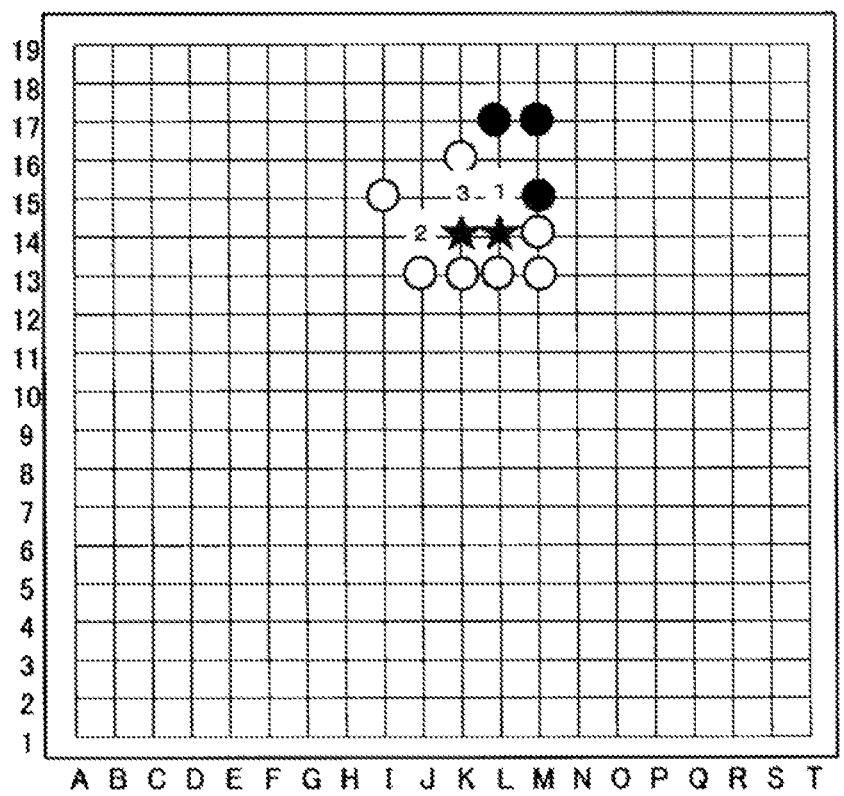

FIG. 77 This is an example of the state of the board of Working Example 4.

Figure 78:
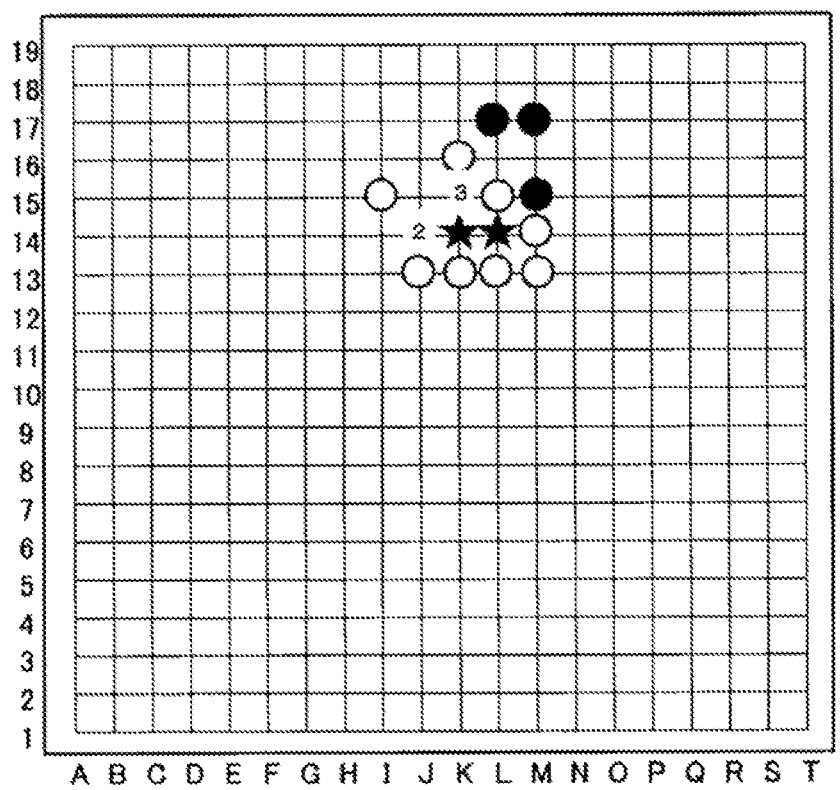

FIG. 78 This is an example of the state of the hoard of Working Example 4.

Figure 79:
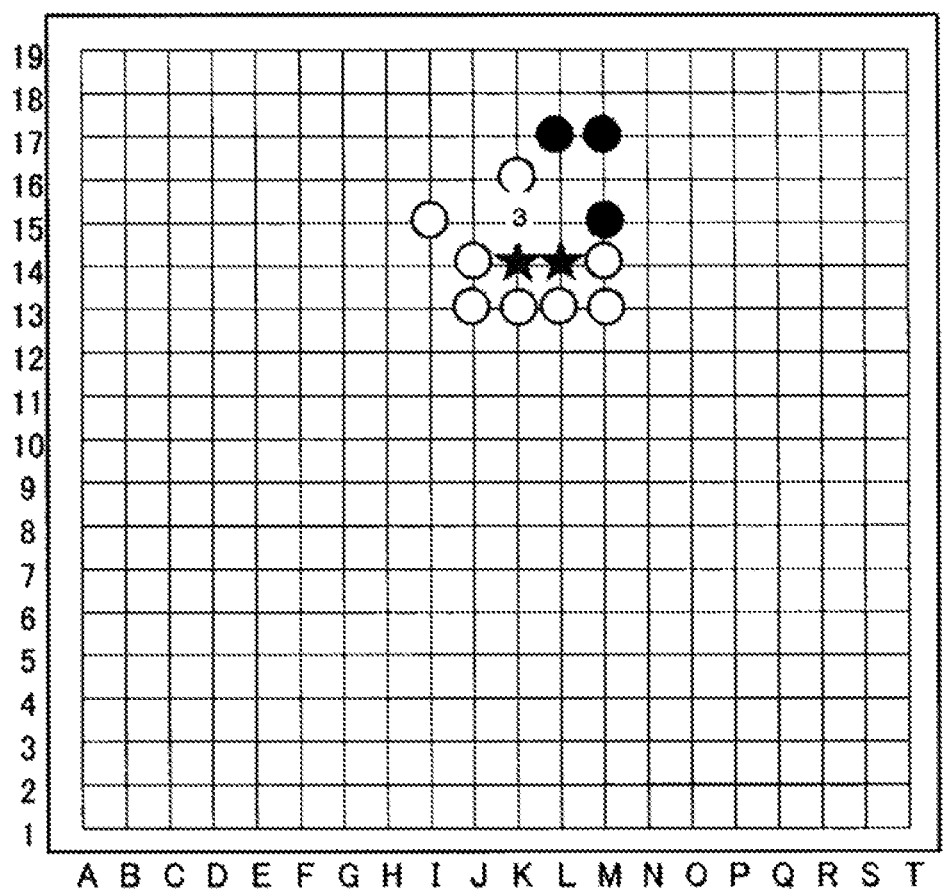

FIG. 79 This is an example of the state of the board of Working Example 4.

Figure 80:
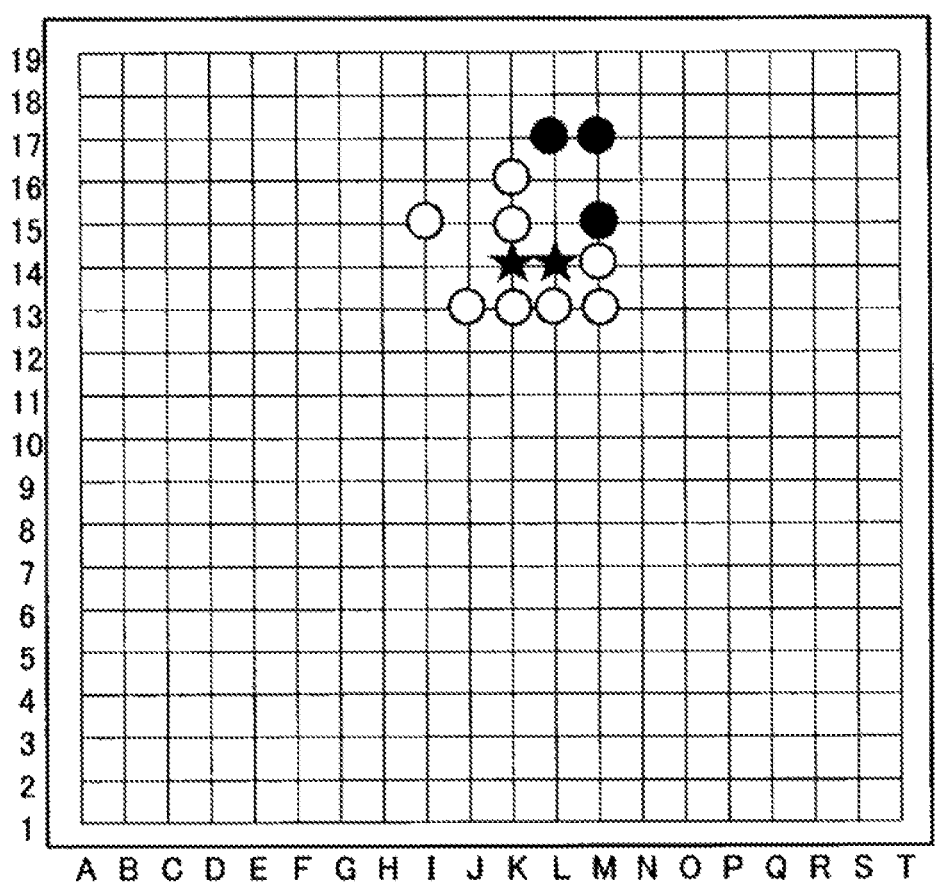

FIG. 80 This is an example of the state of the board of Working Example 4.

Figure 81:
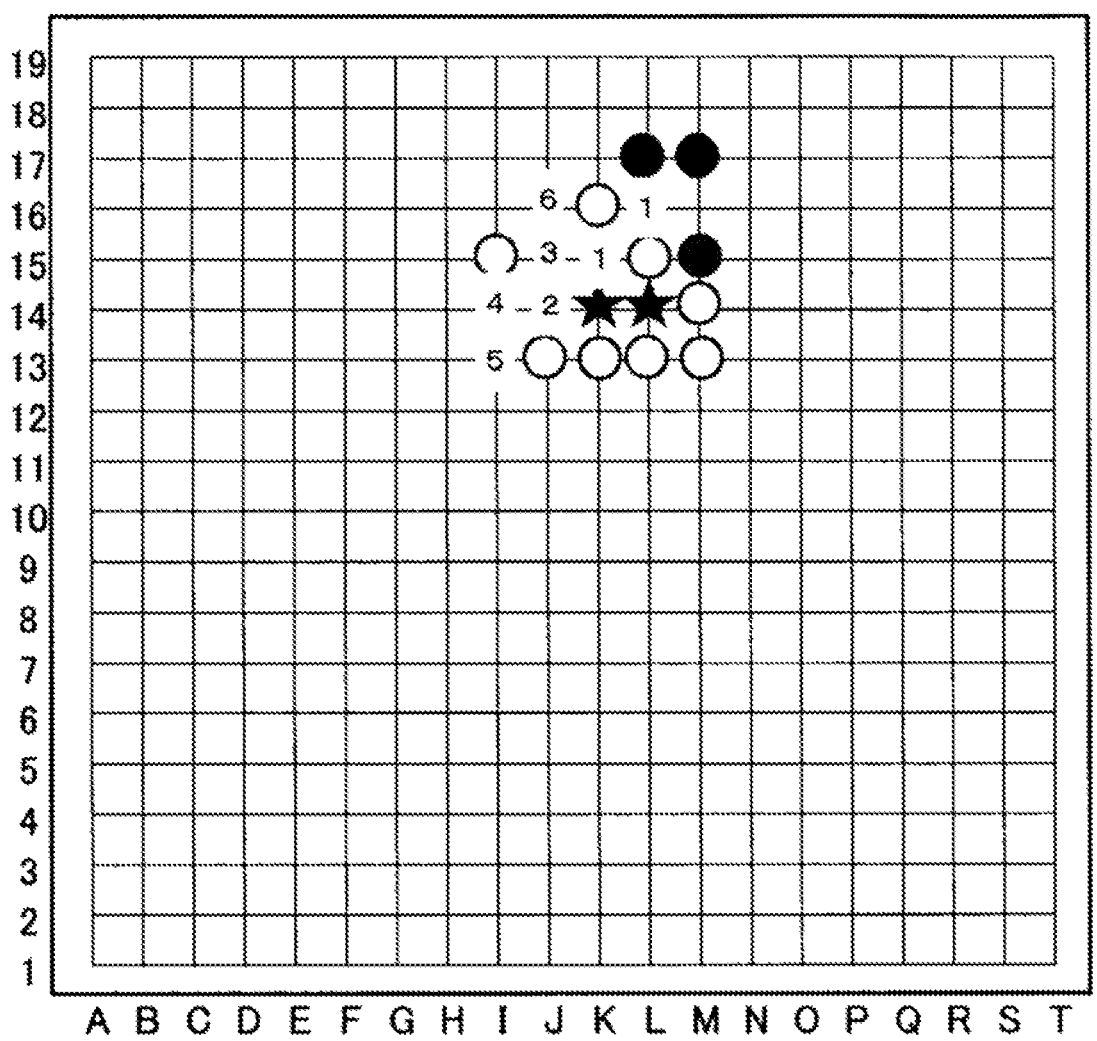

FIG. 81 This is an example of the state of the board of Working Example 4.

Figure 82:
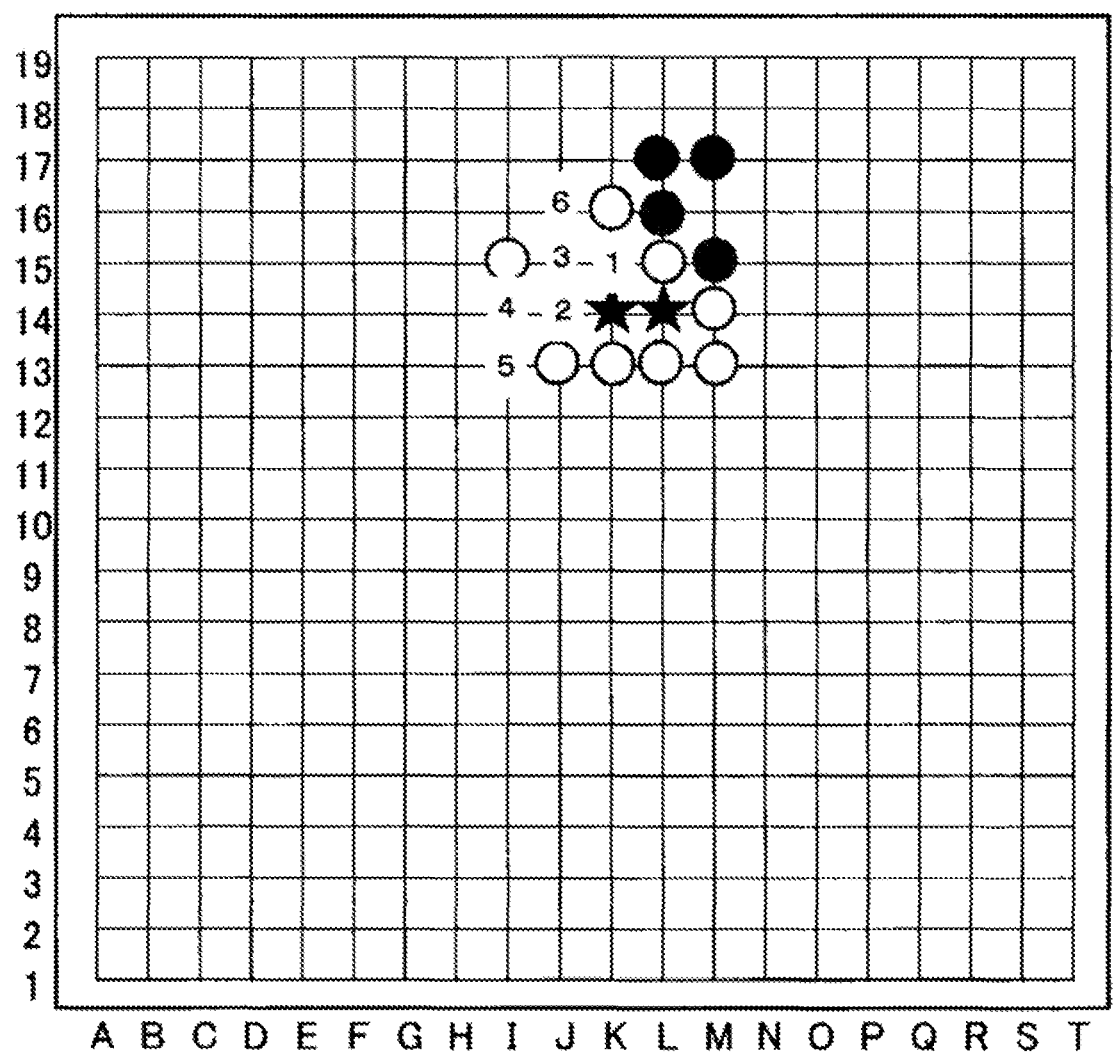

FIG. 82 This is an example of the state of the board of Working Example 4.

Figure 83:
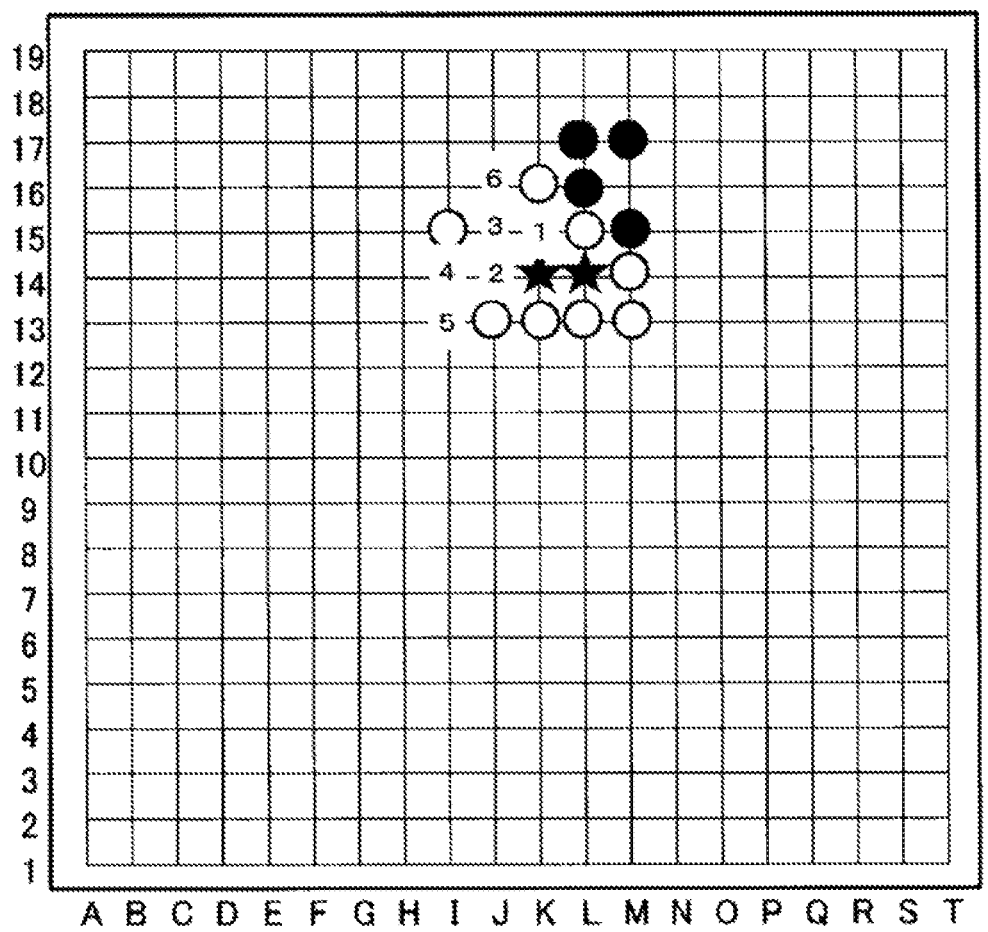

FIG. 83 This is an example of the state of the board of Working Example 4.

Figure 84:
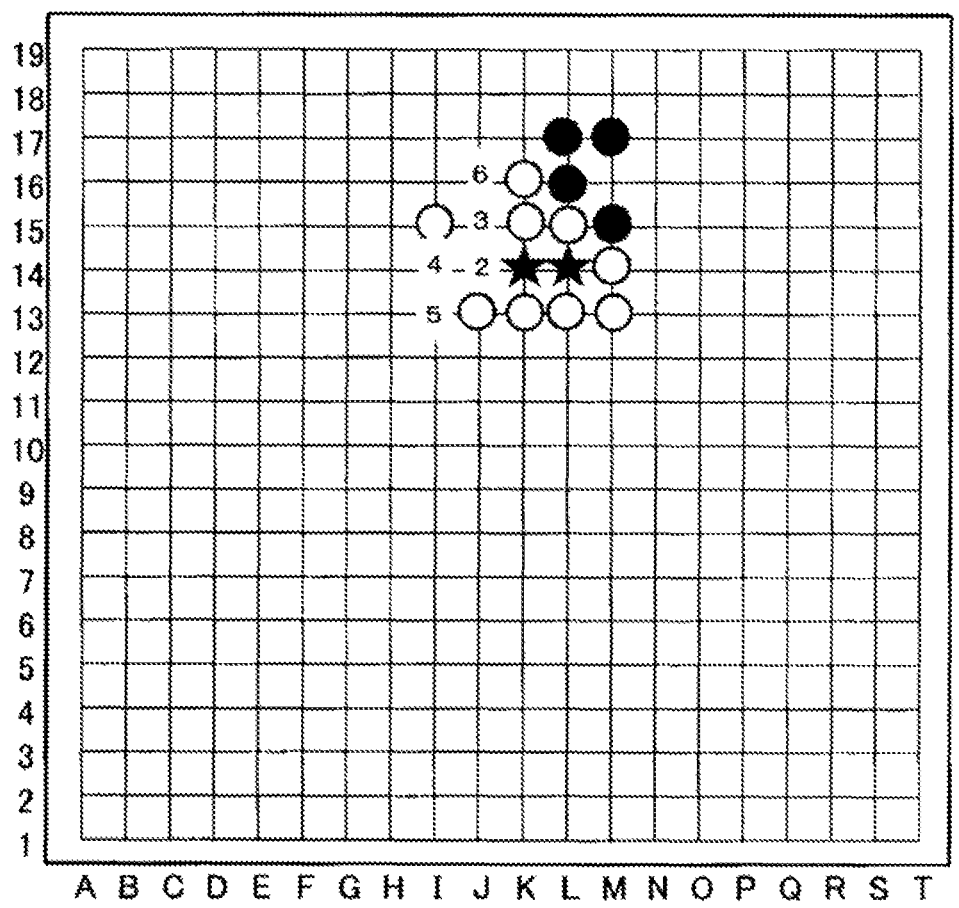

FIG. 84 This is an example of the state of the board of Working Example 4.

Figure 85:
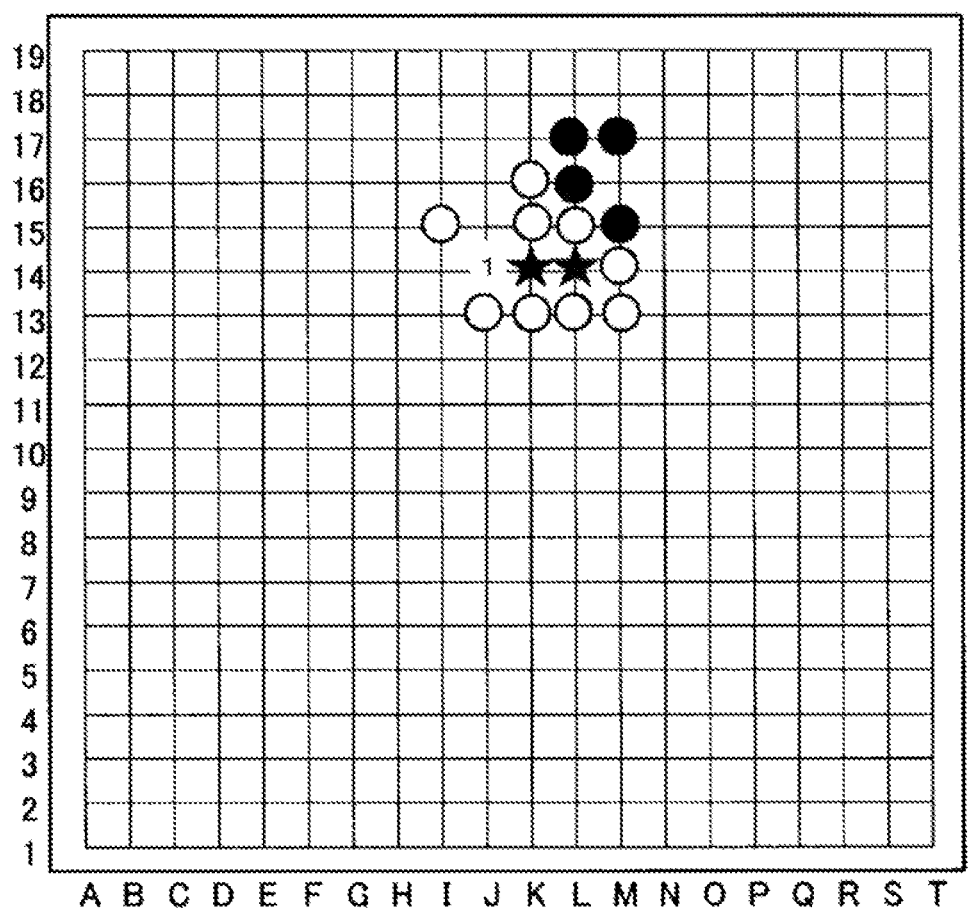

FIG. 85 This is an example of the state of the board of Working Example 4.

Figure 86:
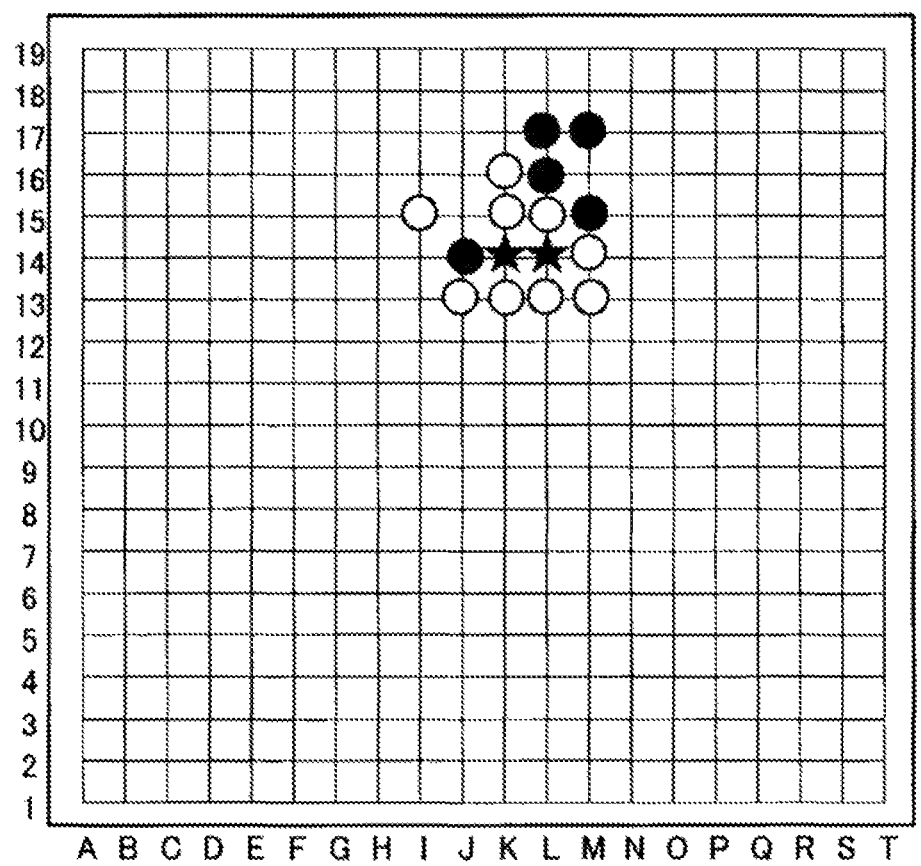

FIG. 86 This is an example of the state of the board of Working Example 4.

Figure 87:
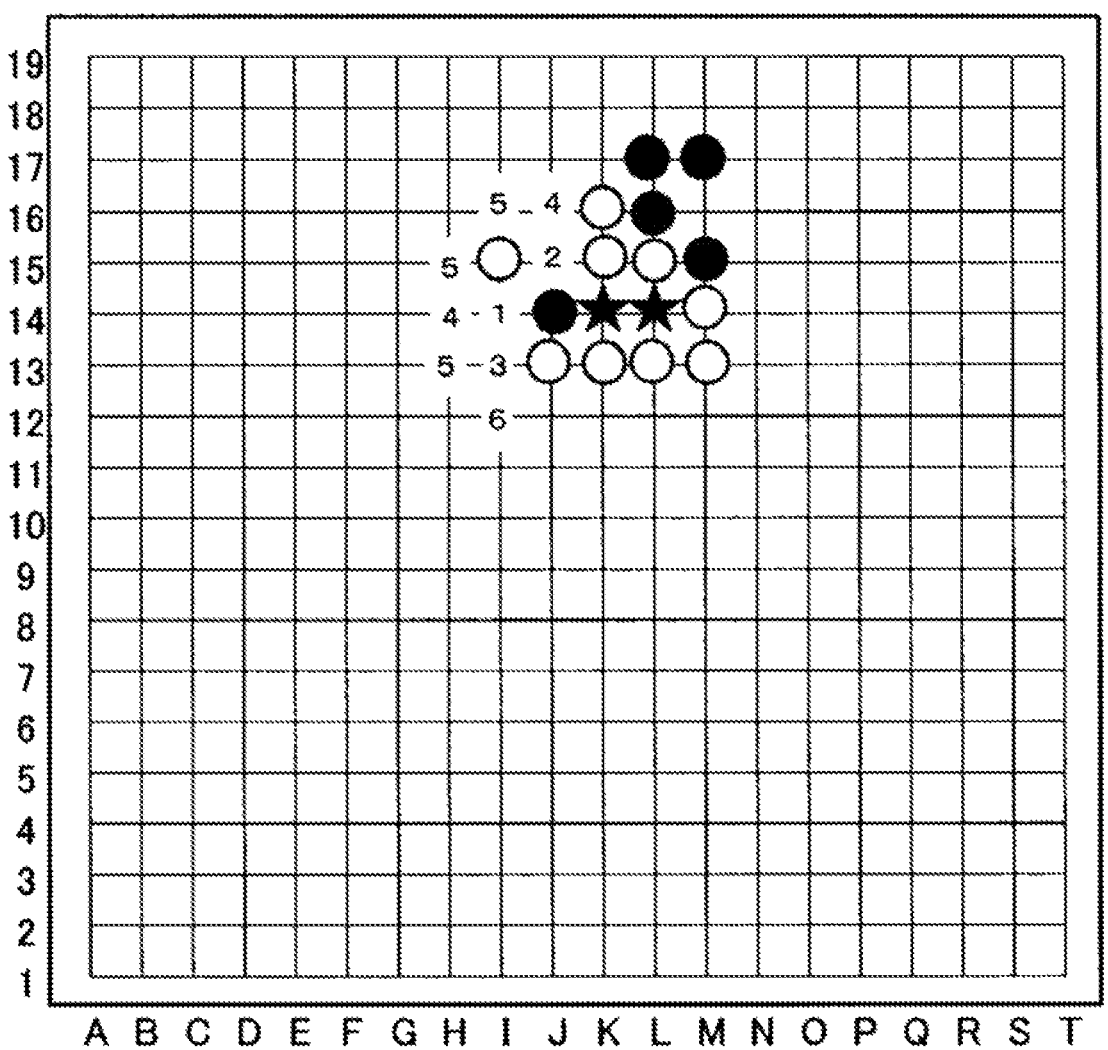

FIG. 87 This is an example of the state of the board of Working Example 4.

Figure 88:
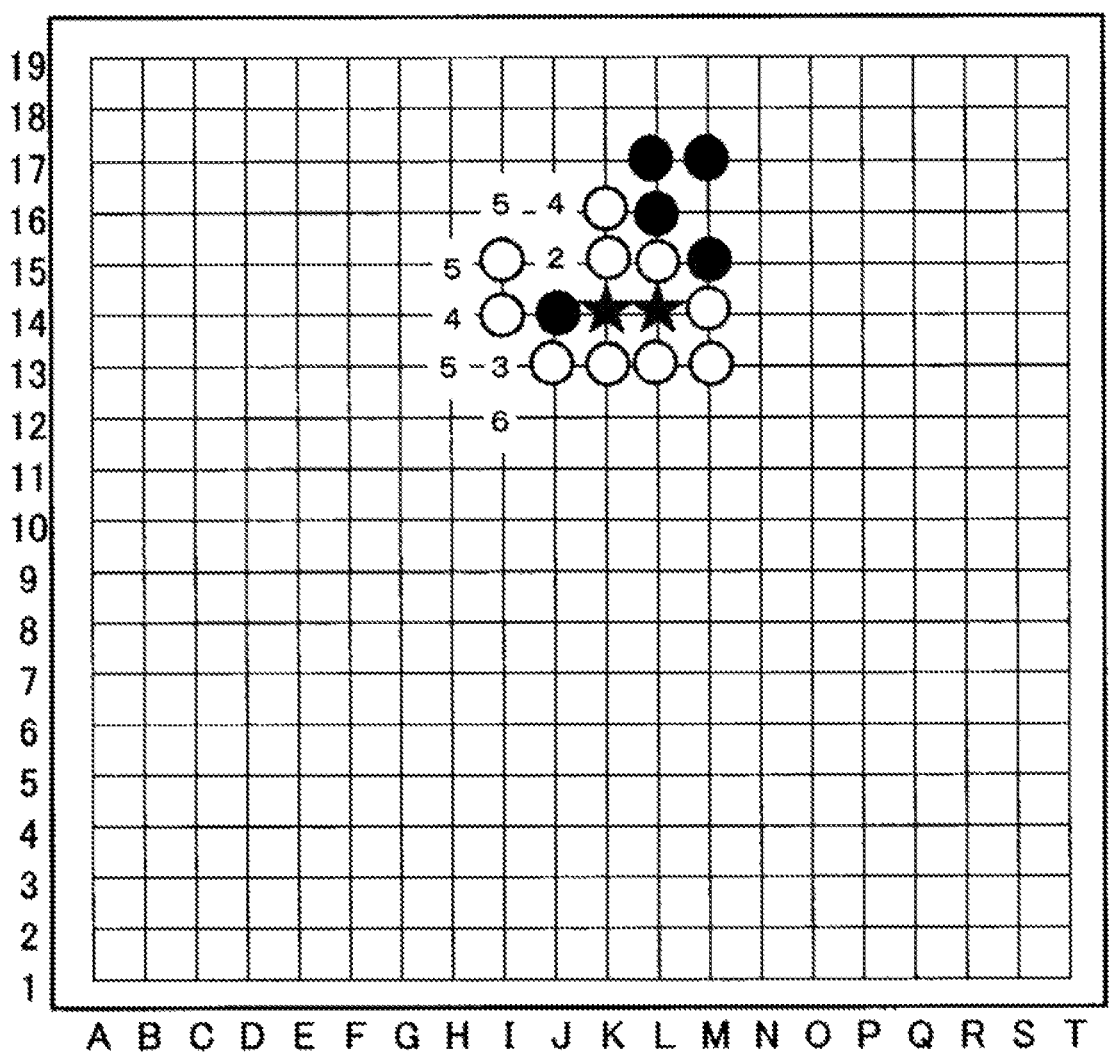

FIG. 88 This is an example of the state of the board of Working Example 4.

Figure 89:
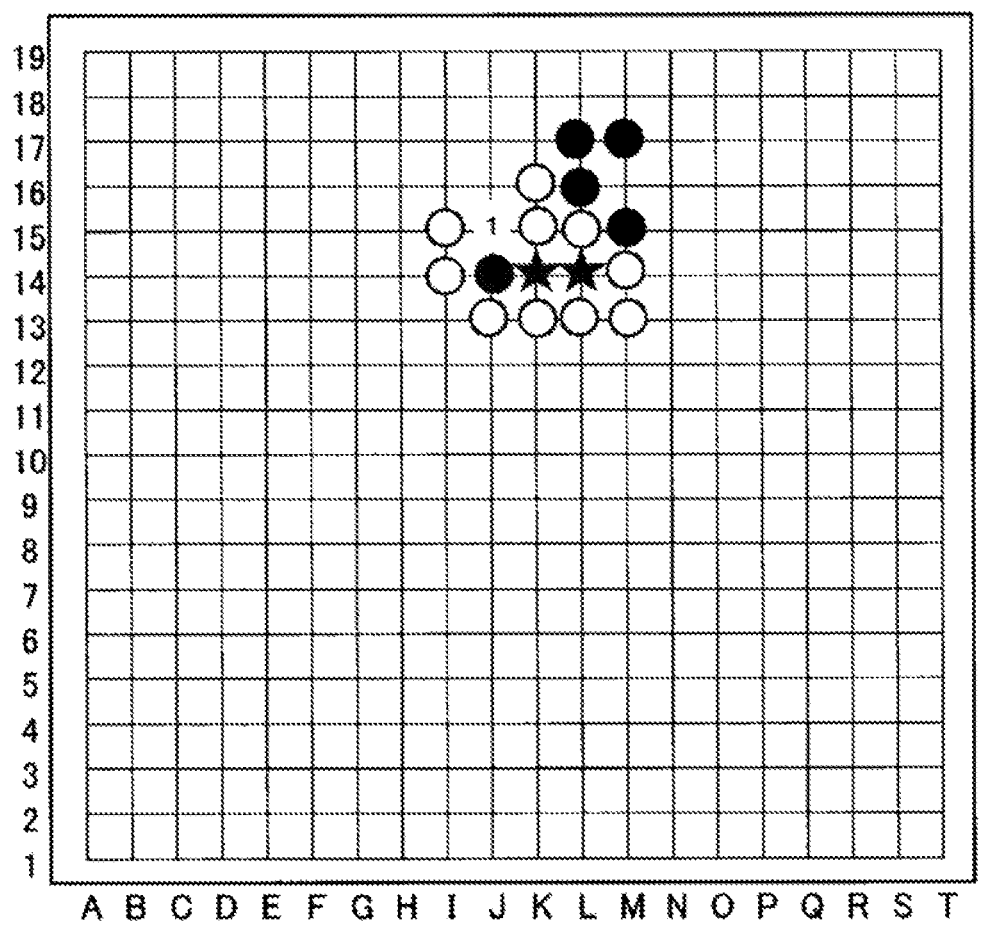

FIG. 89 This is an example of the state of the board of Working Example 4.

Figure 90:
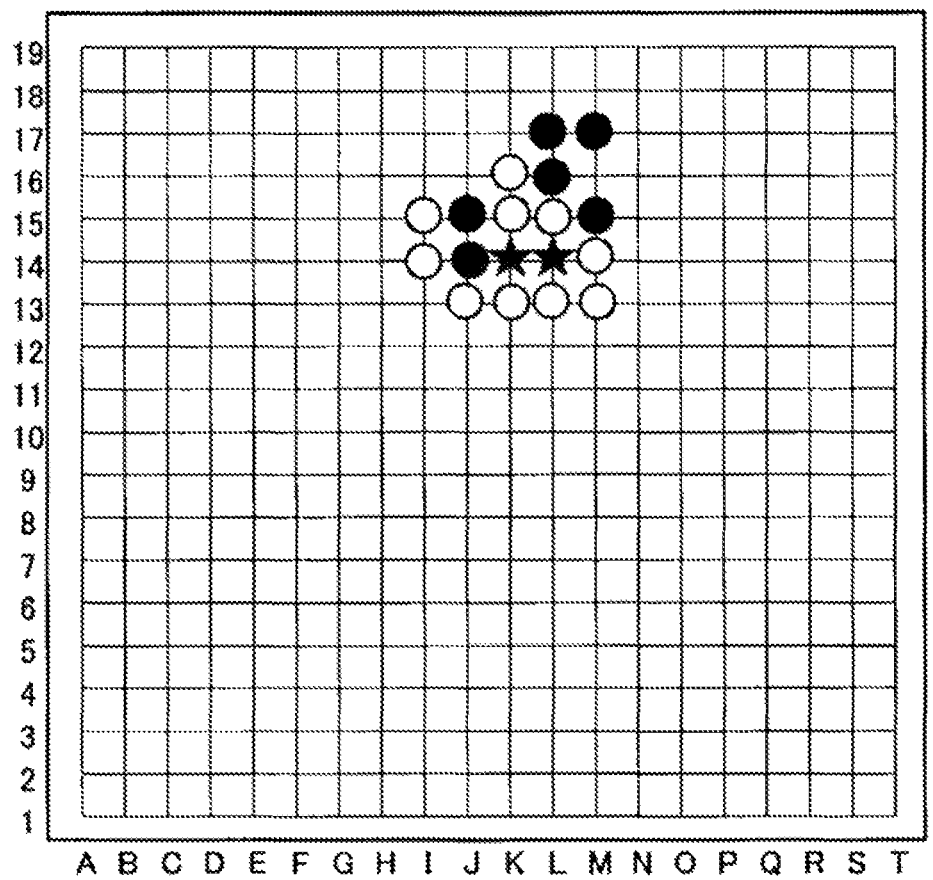

FIG. 90 This is an example of the state of the hoard of Working Example 4.

Figure 91:
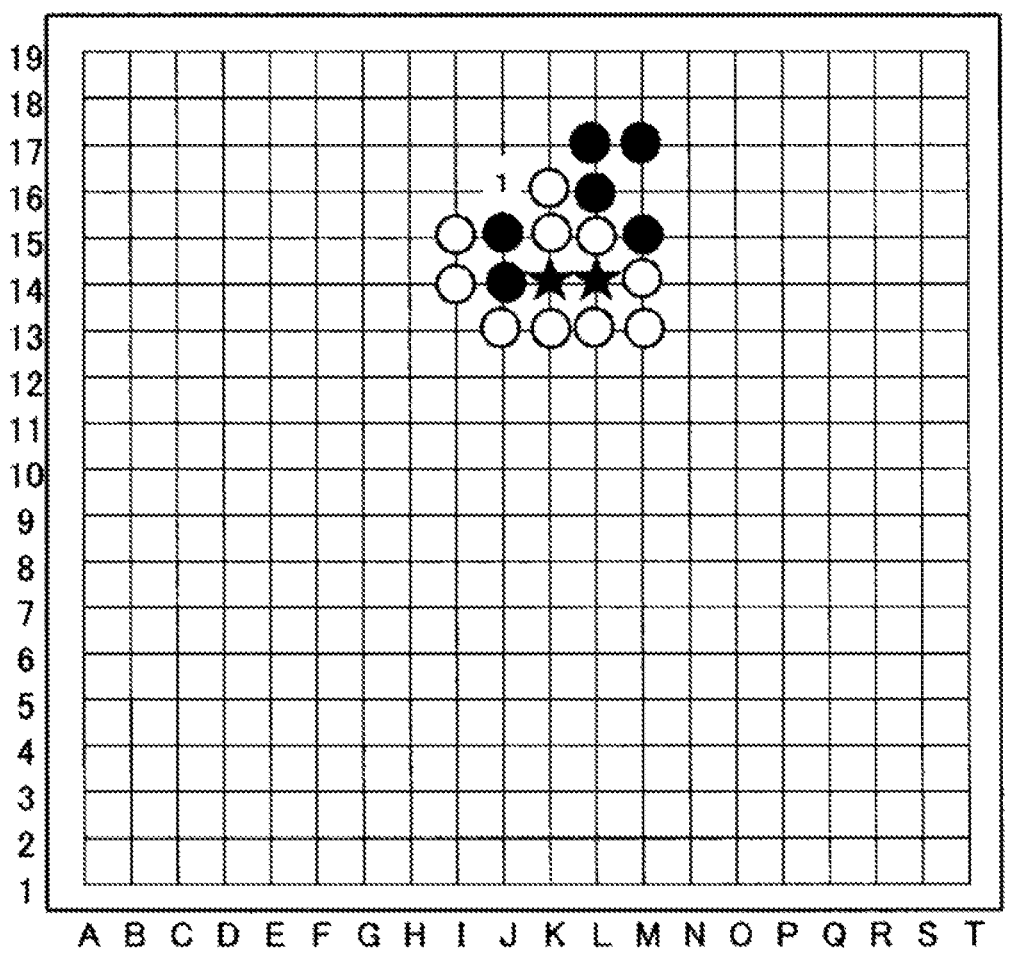

FIG. 91 This is an example of the state of the board of Working Example 4.

Figure 92:
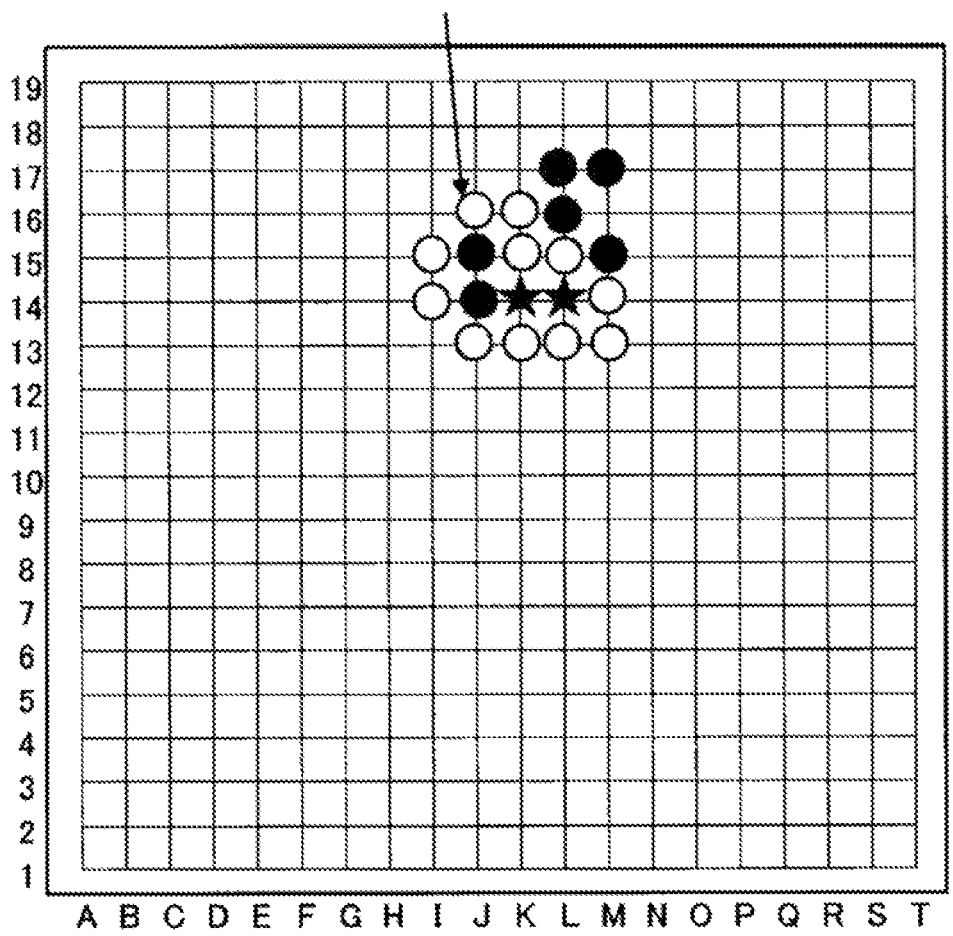

FIG. 92 This is an example of the state of the board of Working Example 4.

Figure 93:
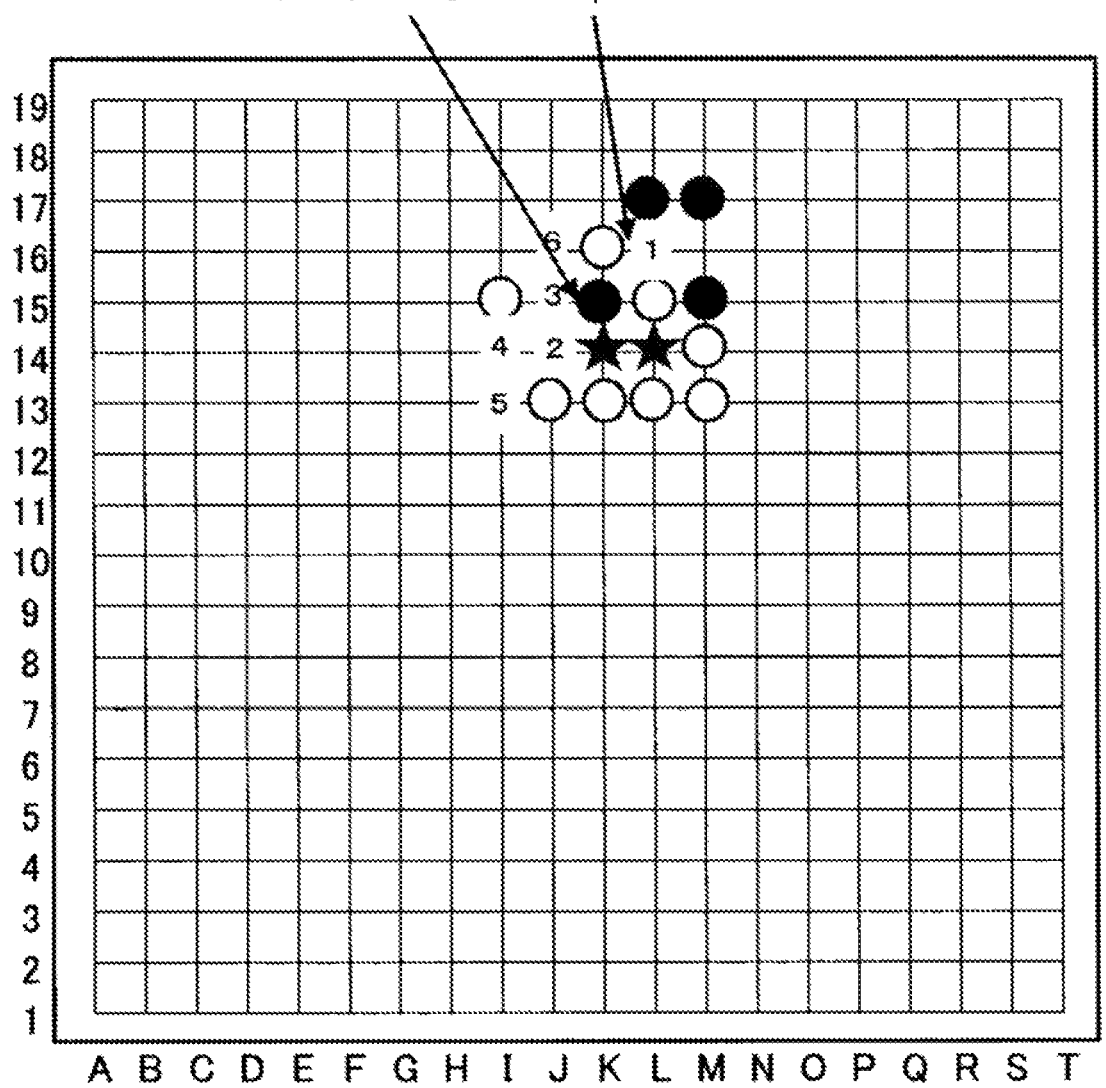

FIG. 93 This is an example of the state of the board of Working Example 4.

Figure 94:
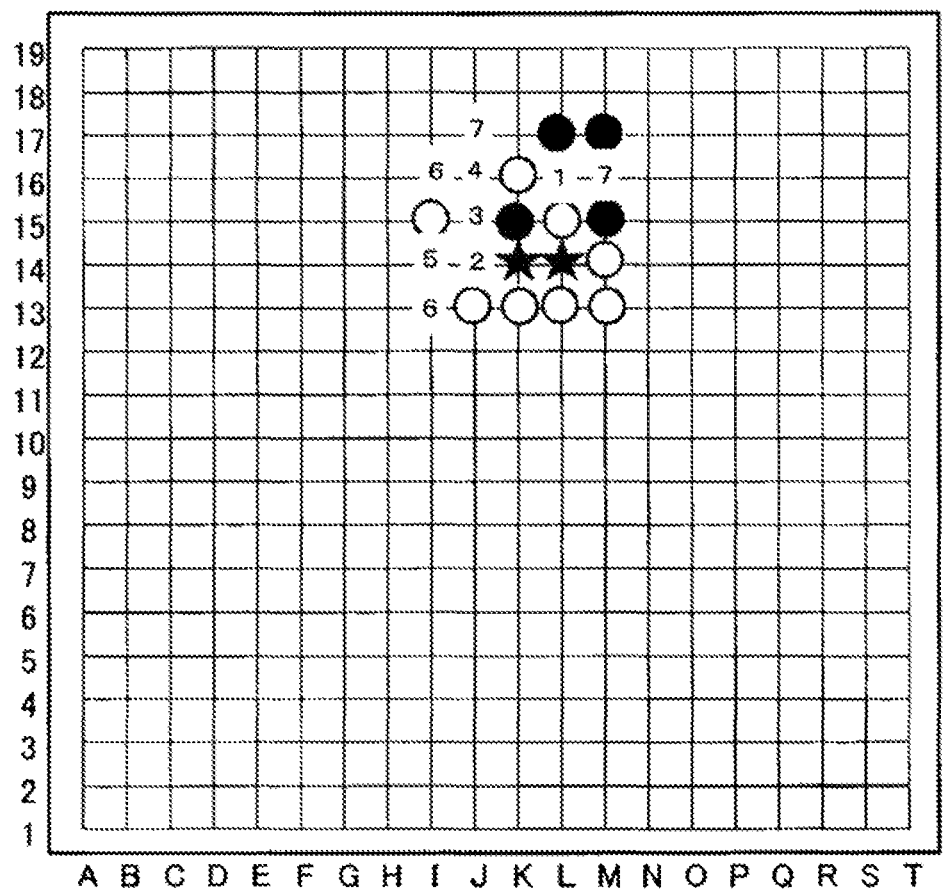

FIG. 94 This is an example of the state of the board of Working Example 4.

Figure 95:
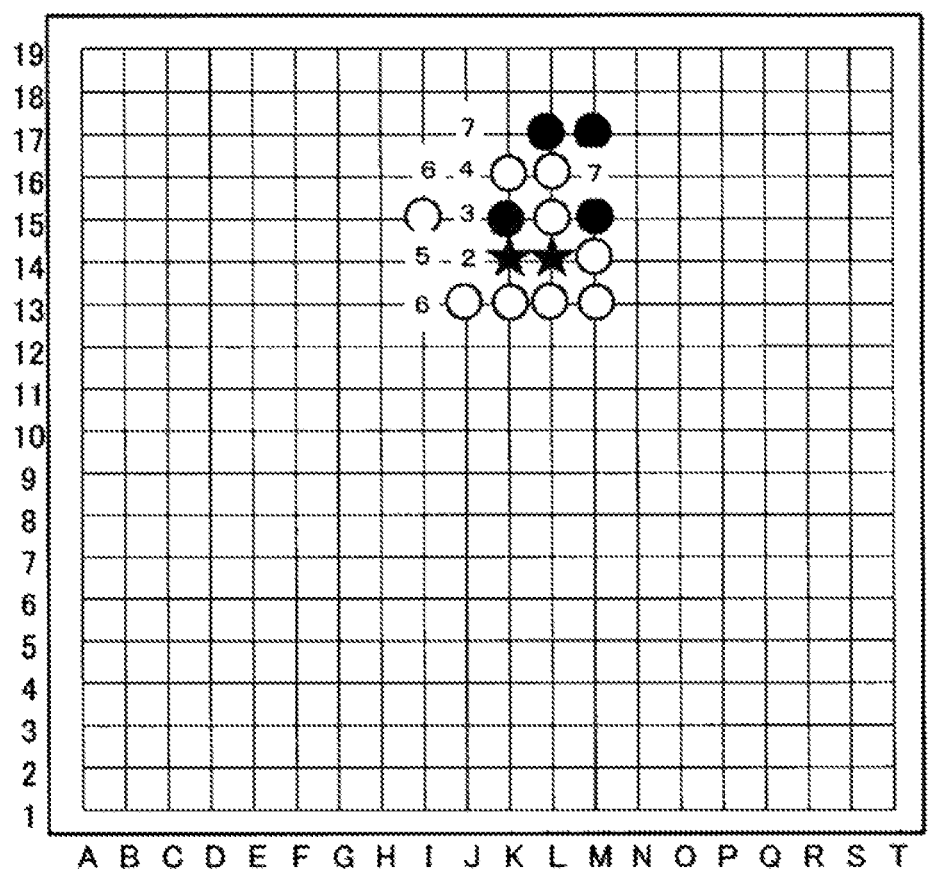

FIG. 95 This is an example of the state of the board of Working Example 4.

Figure 96:
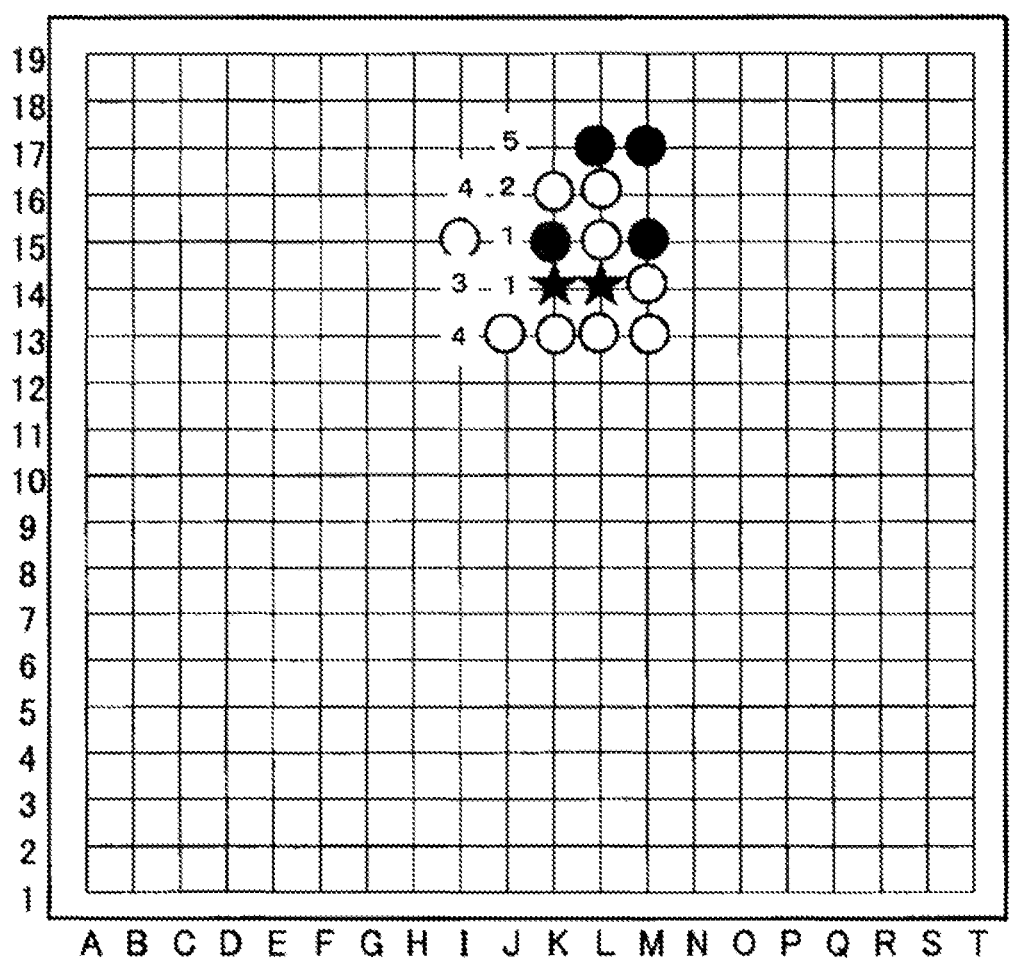

FIG. 96 This is an example of the state of the board of Working Example 4.

Figure 97:
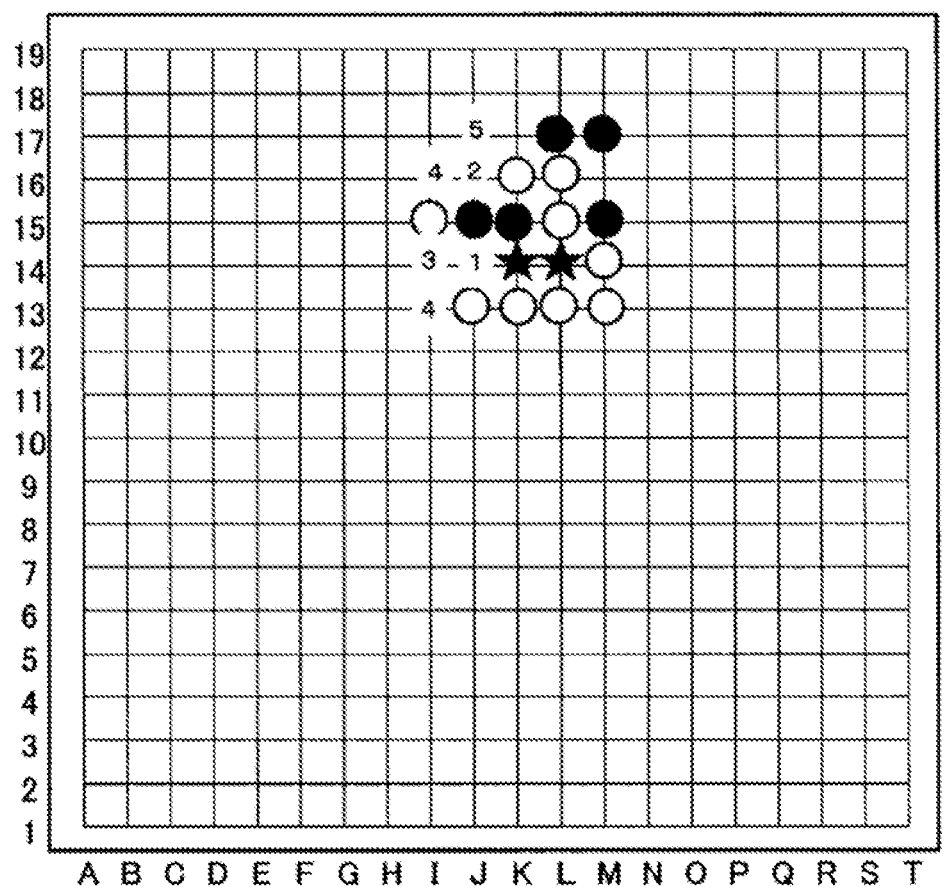

FIG. 97 This is an example of the state of the board of Working Example 4.

Figure 98:
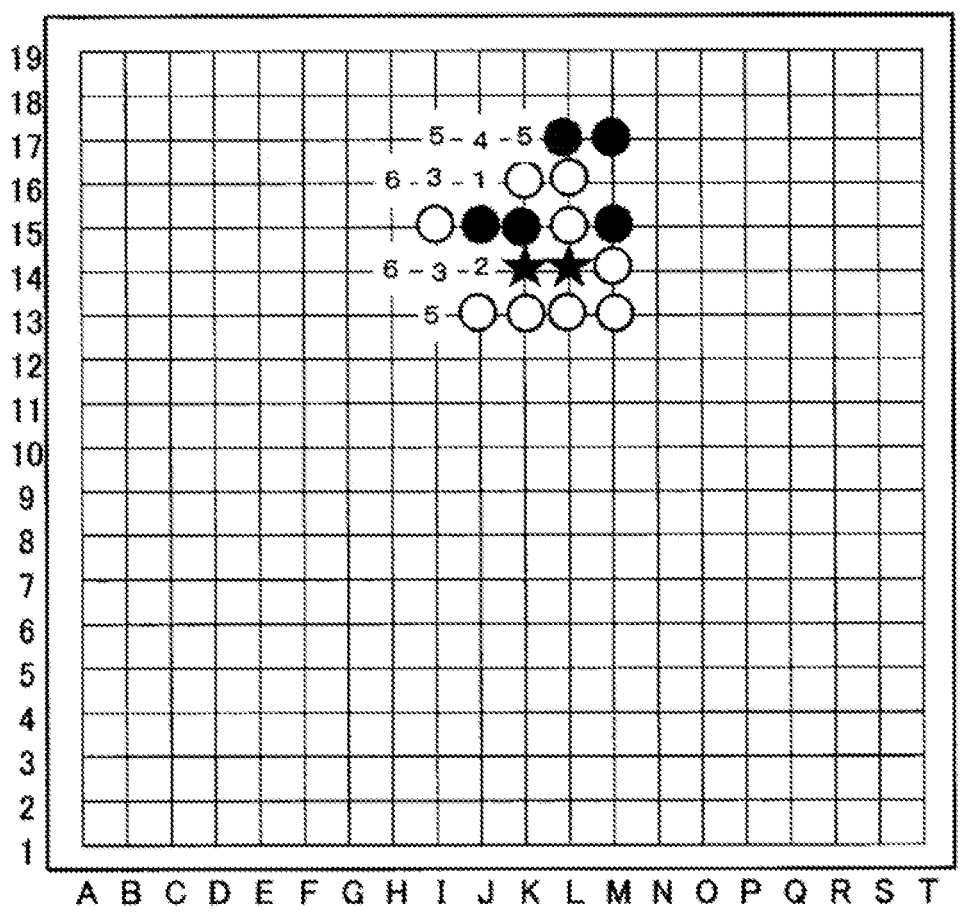

FIG. 98 This is an example of the state of the board of Working Example 4.

Figure 99:
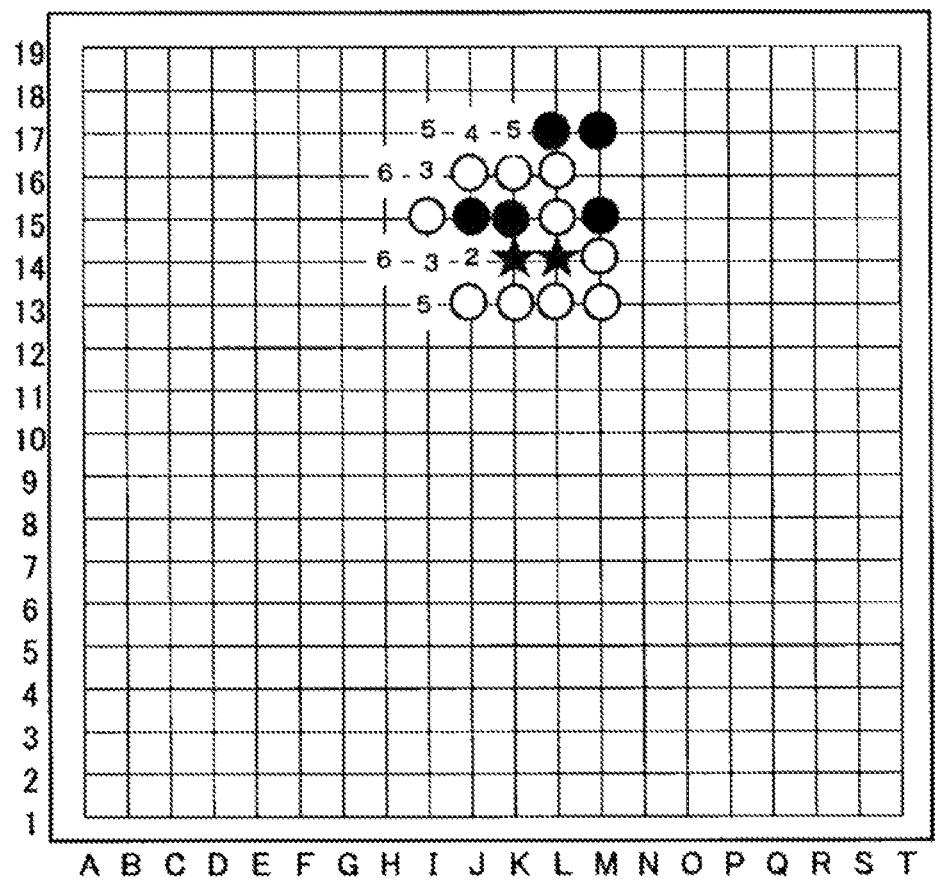

FIG. 99 This is an example of the state of the board of Working Example 4.

Figure 100:
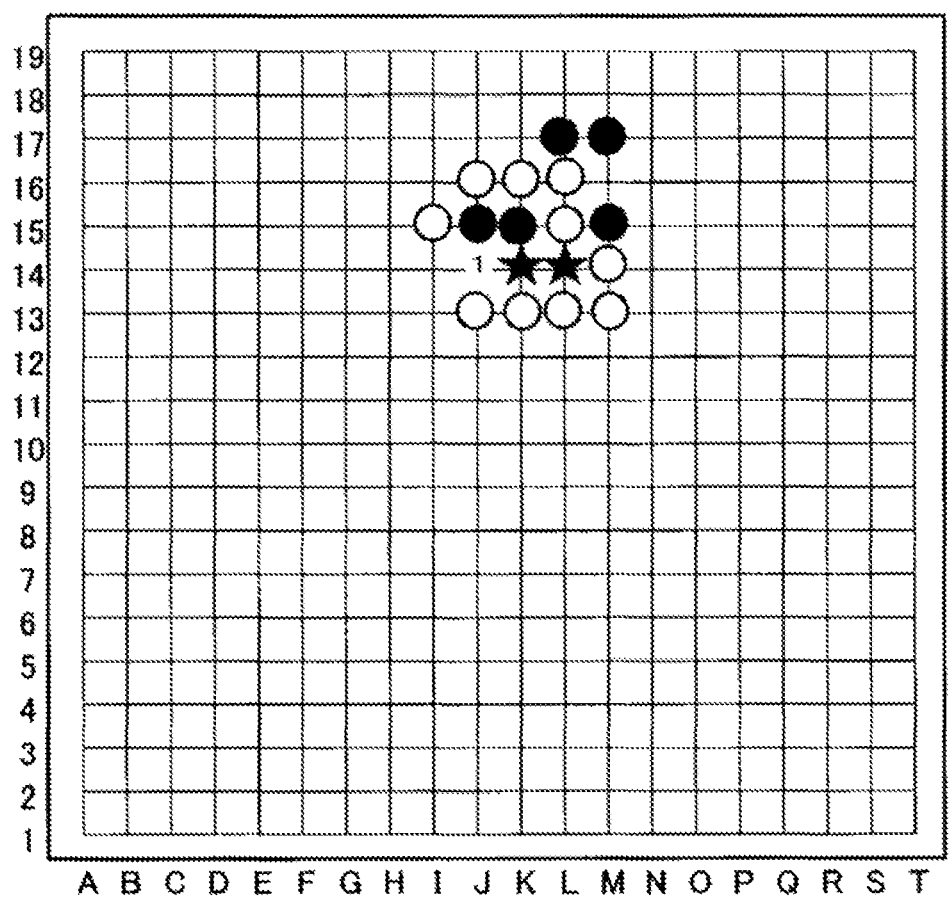

FIG. 100 This is an example of the state of the hoard of Working Example 4.

Figure 101:
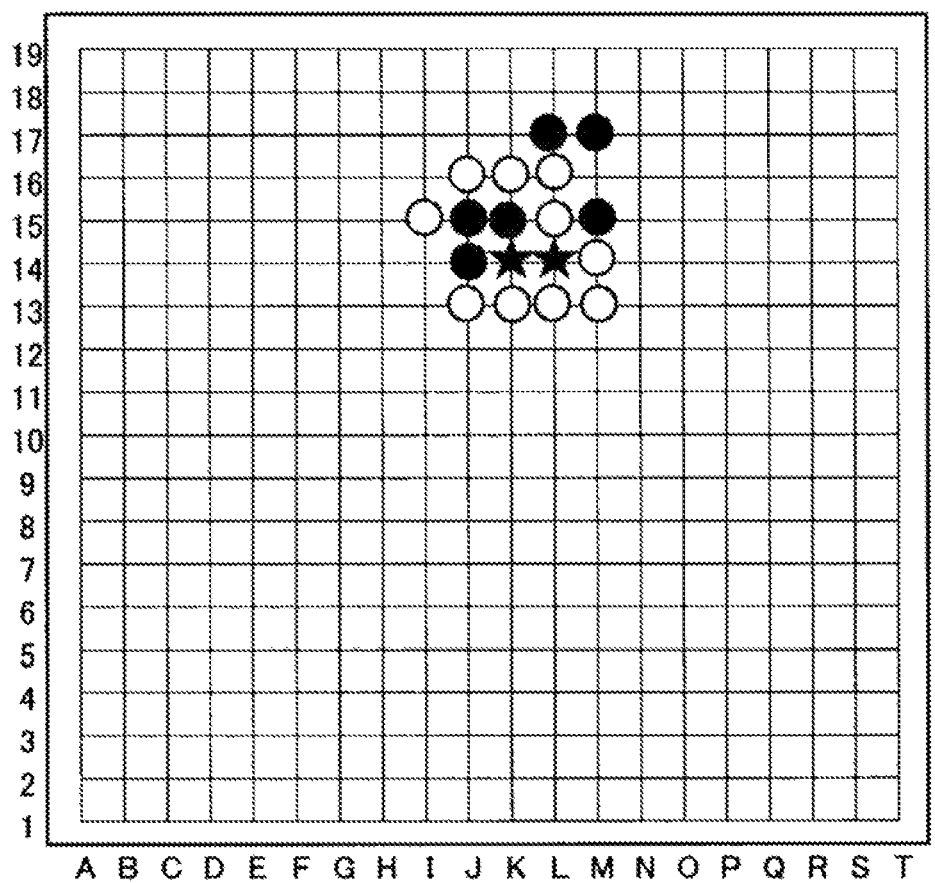

FIG. 101 This is an example of the state of the board of Working Example 4.

Figure 102:
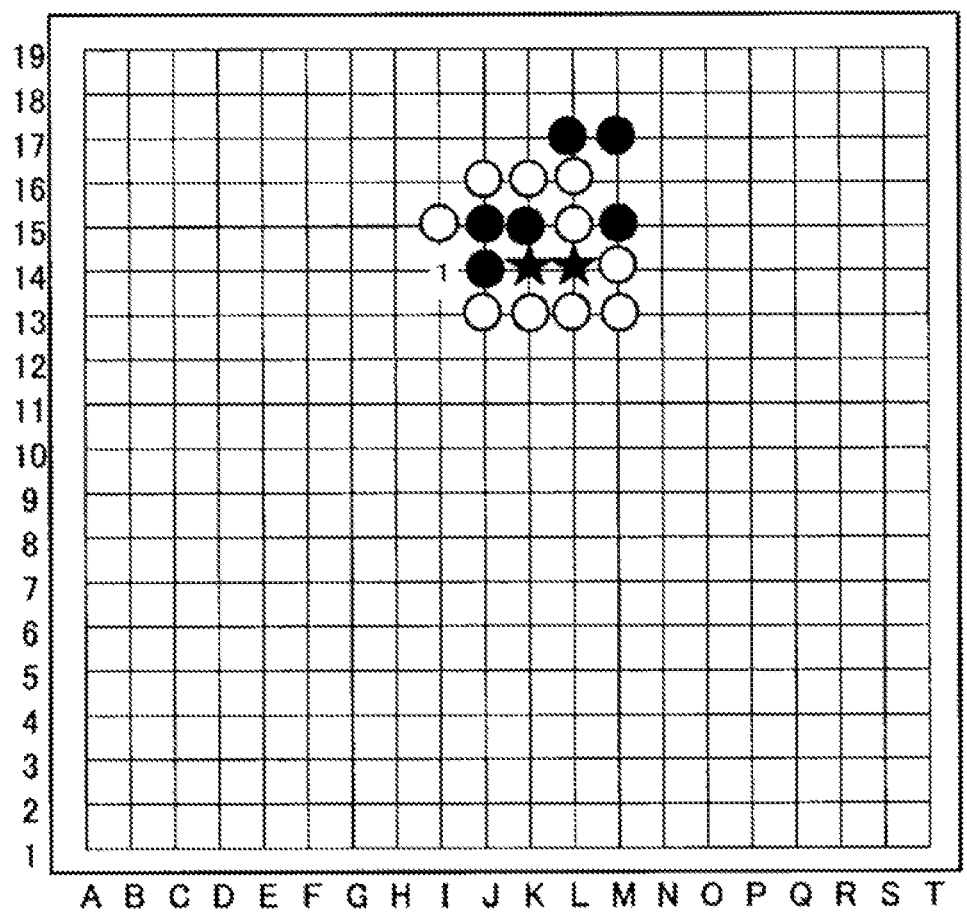

FIG. 102 This is an example of the state of the board of Working Example 4.

Figure 103:
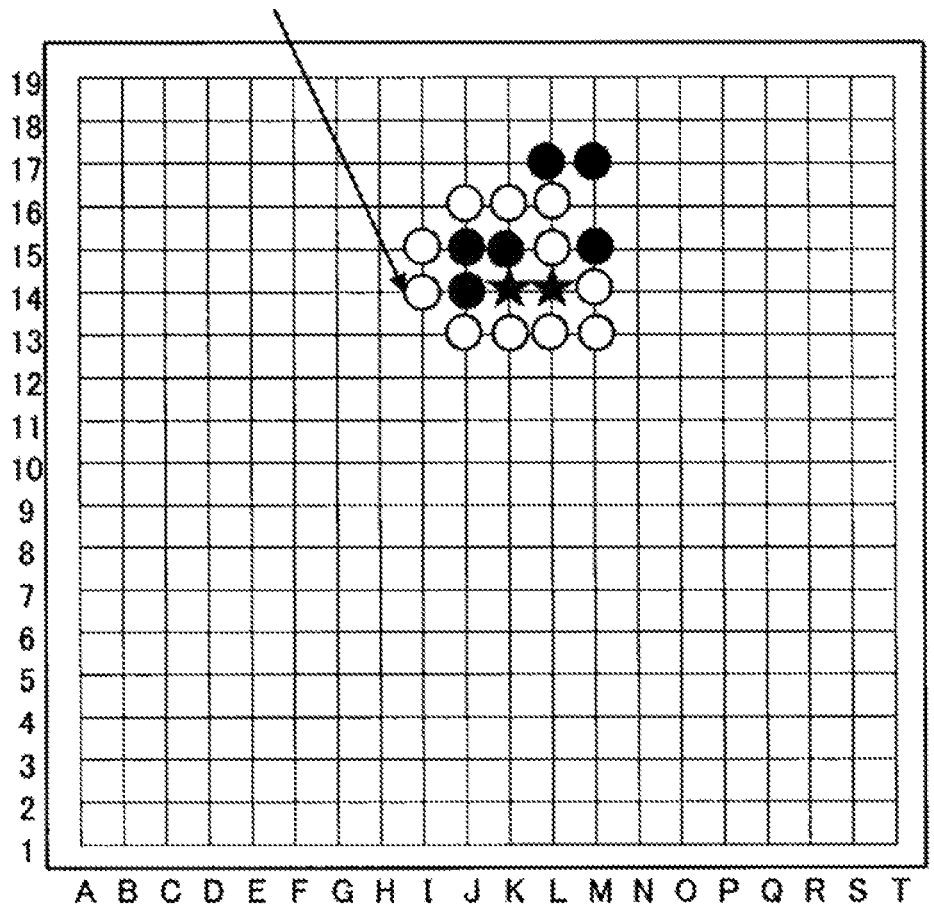

FIG. 103 This is an example of the state of the board of Working Example 4.

Figure 104:
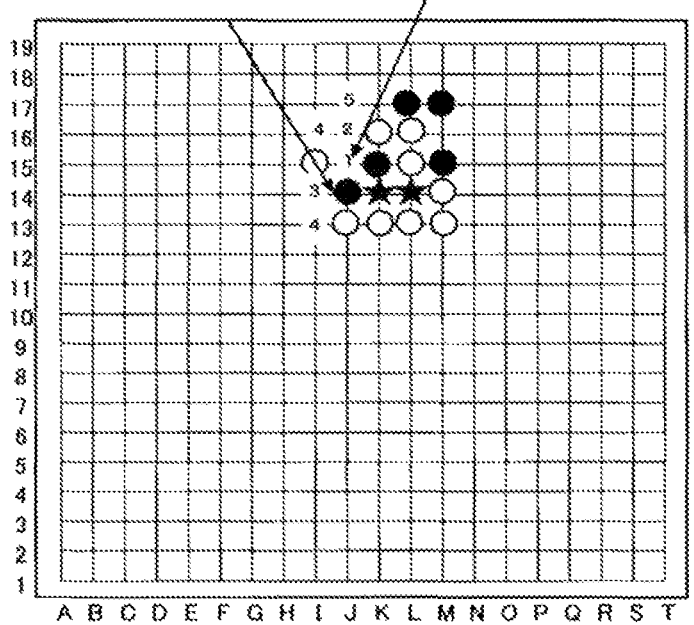

FIG. 104 This is an example of the state of the board of Working Example 4.

Figure 105:
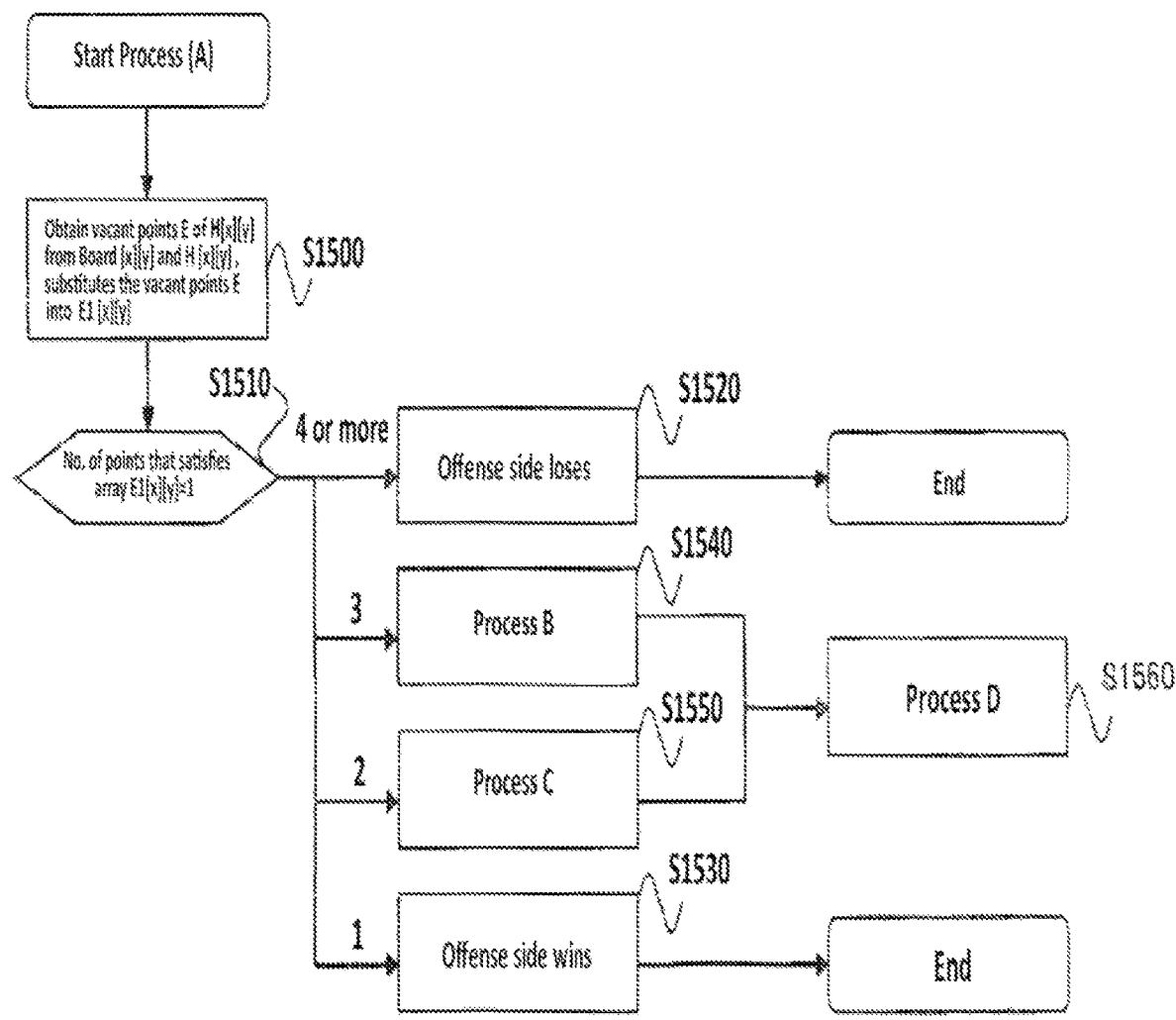

FIG. 105 This is a flowchart in which an example of the entire (Process A) processing sequence in Working Example 4 is schematically described in detail.

Figure 106:
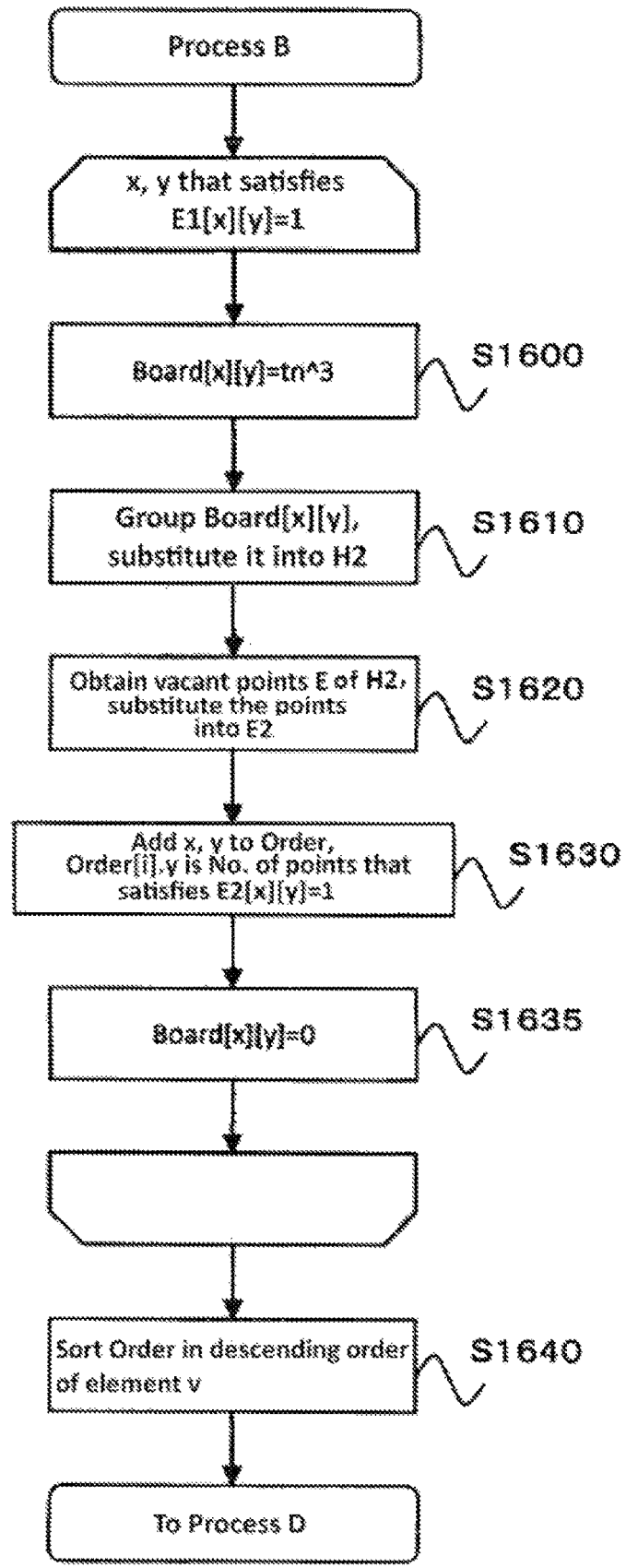

FIG. 106 This is a flowchart in which an example of the processing sequence of Process B in Working Example 4 is schematically described in detail.

Figure 107:
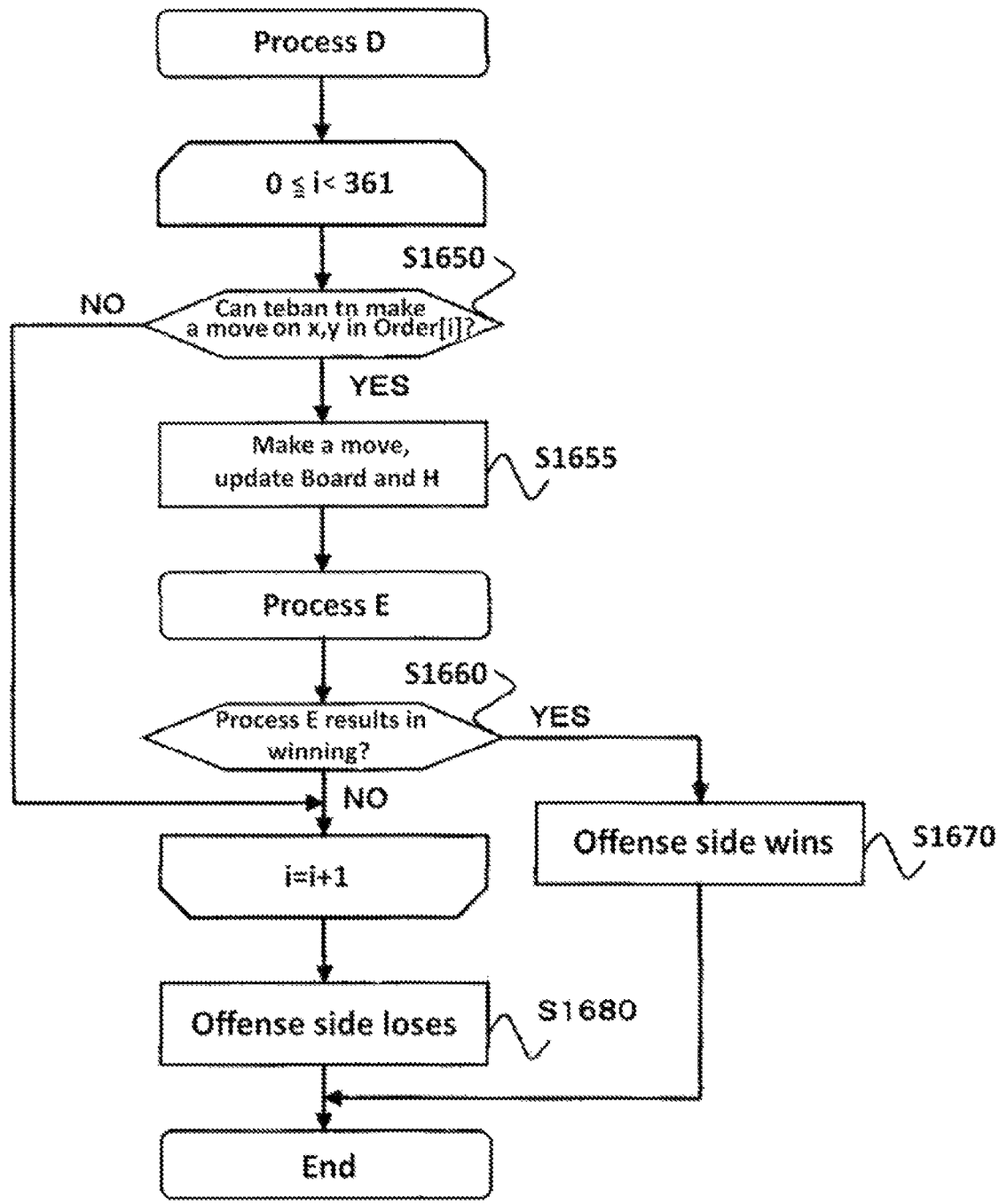

FIG. 107 This is a flowchart in which an example of the processing sequence of Process) in Working Example 4 is schematically described in detail.

Figure 108:
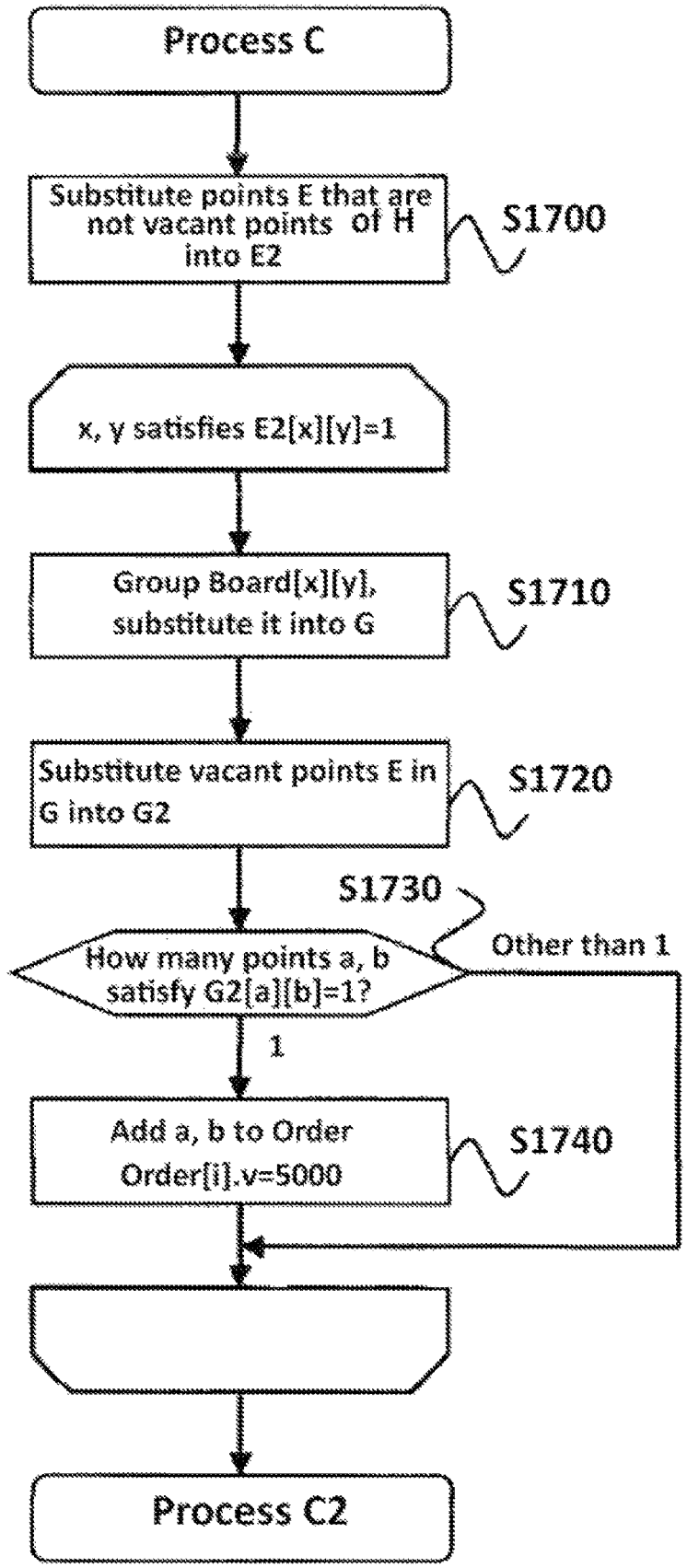

FIG. 108 This is a flowchart in which an example of the processing sequence of Process C in Working Example 4 is schematically described in detail.

Figure 109:
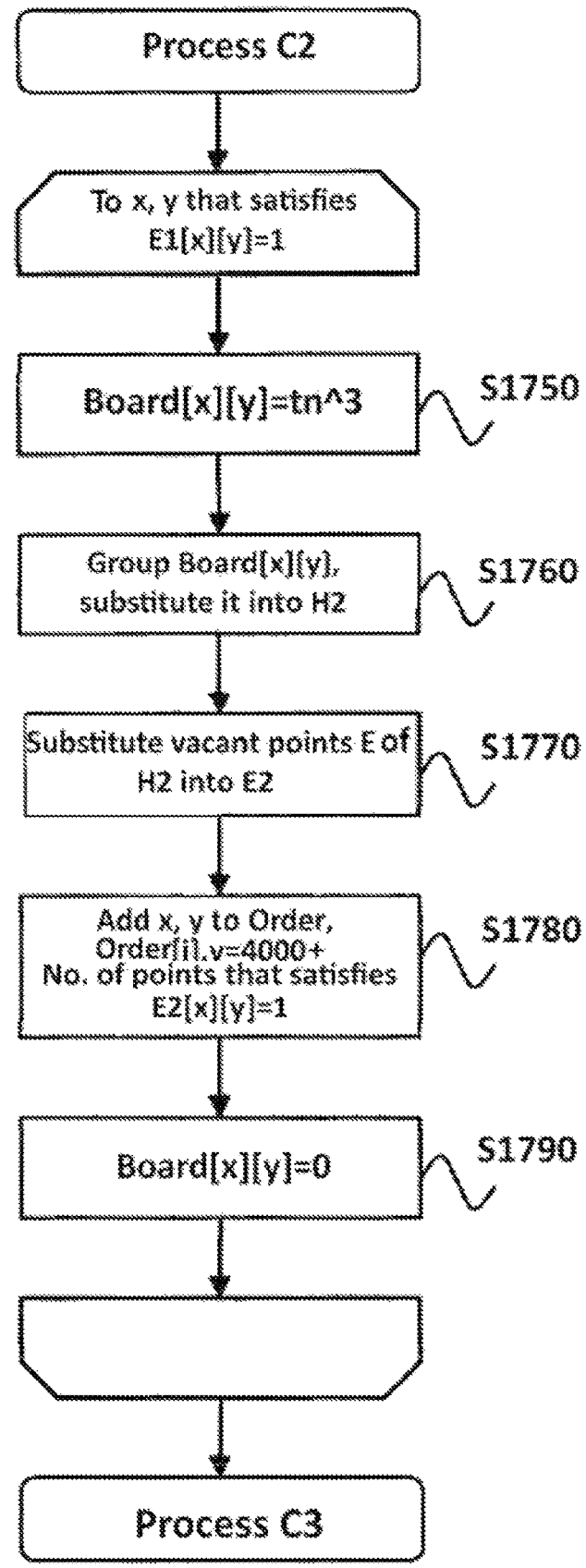

FIG. 109 This is a flowchart in which an example of the processing sequence of Process C2 in Working Example 4 is schematically described in detail.

Figure 110:
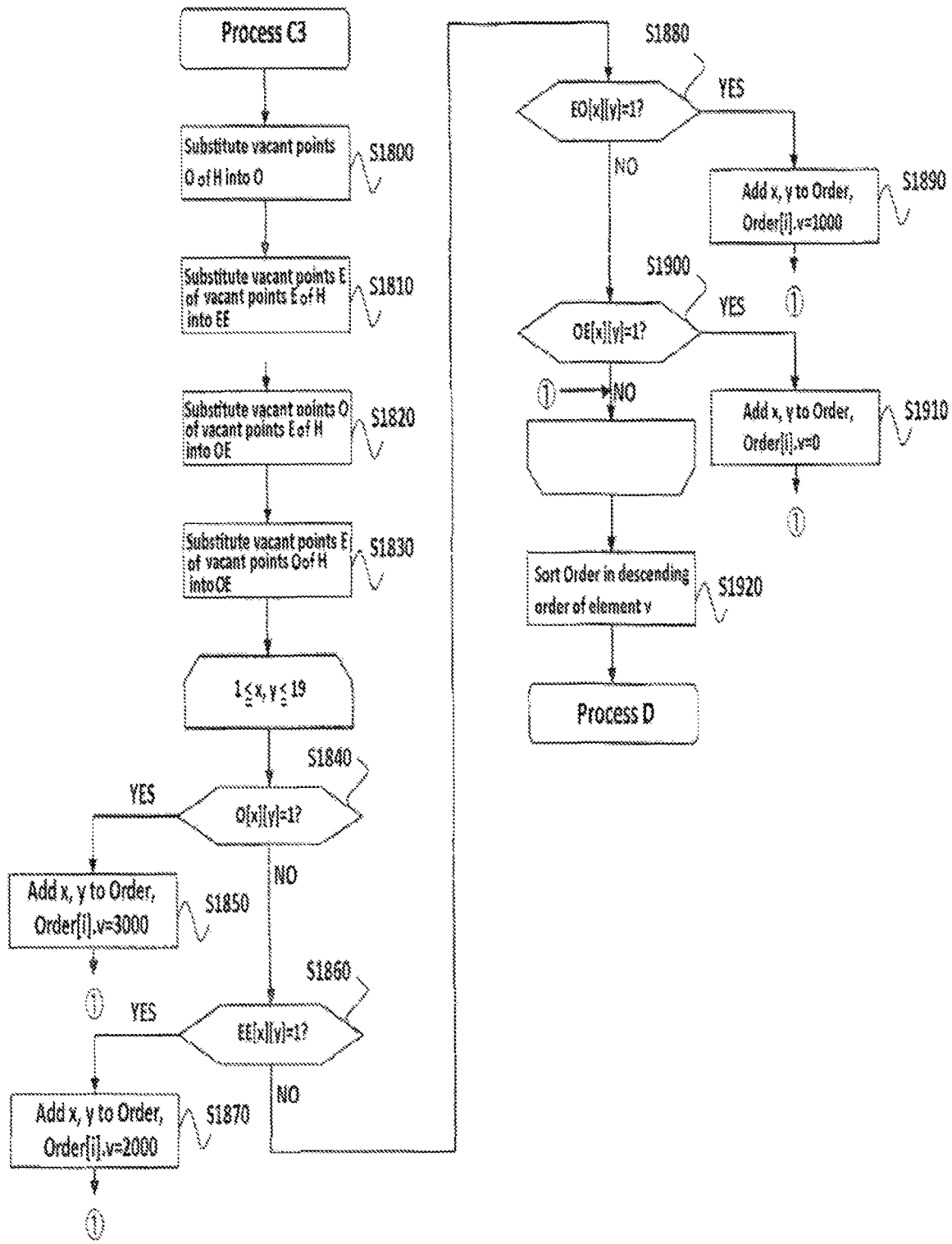

FIG. 110 This is a flowchart in which an example of the processing sequence of Process C3 in Working Example 4 is schematically described in detail.

Figure 111:
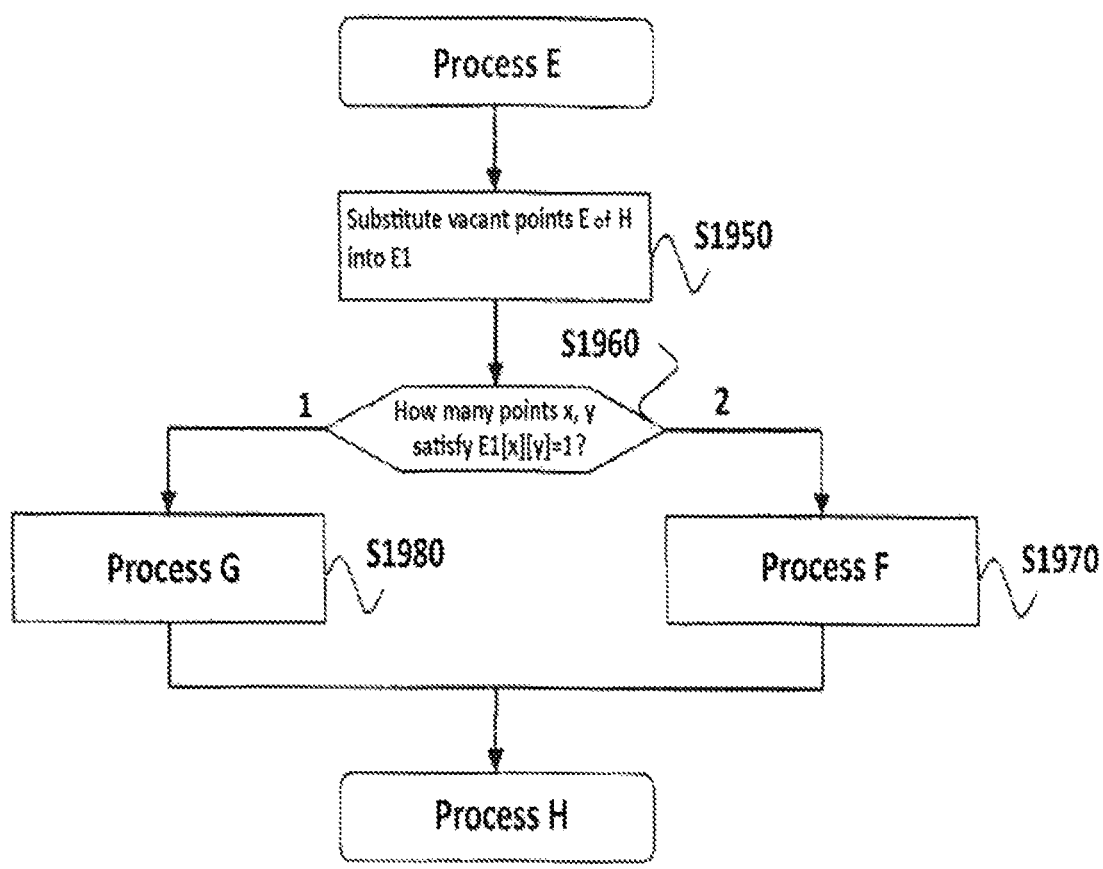

FIG. 111 This is a flowchart in which an example of the processing sequence of Process E in Working Example 4 is schematically described in detail.

Figure 112:
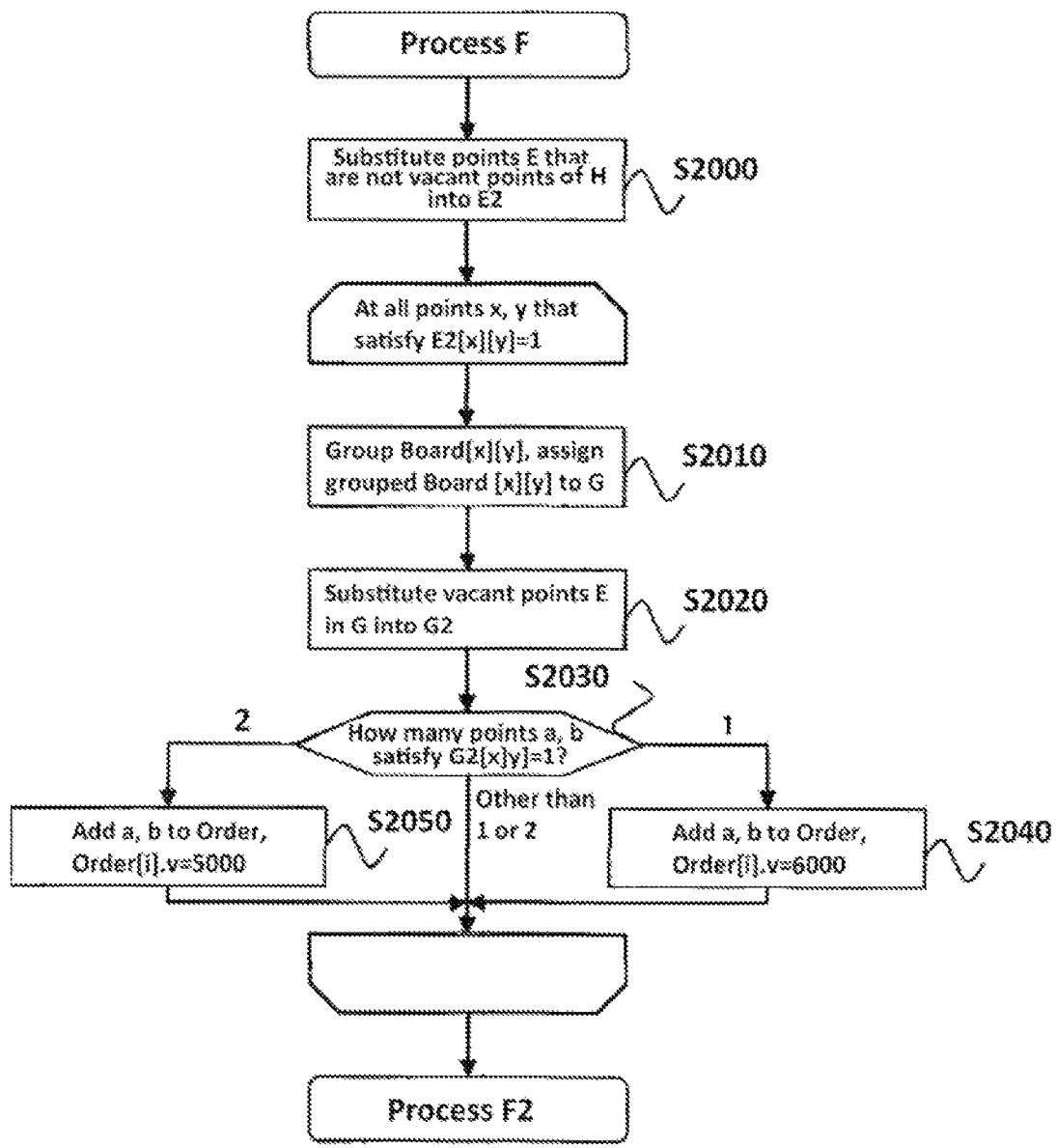

FIG. 112 This is a flowchart in which an example of the processing sequence of Process F in Working Example 4 is schematically described in detail.

Figure 113:
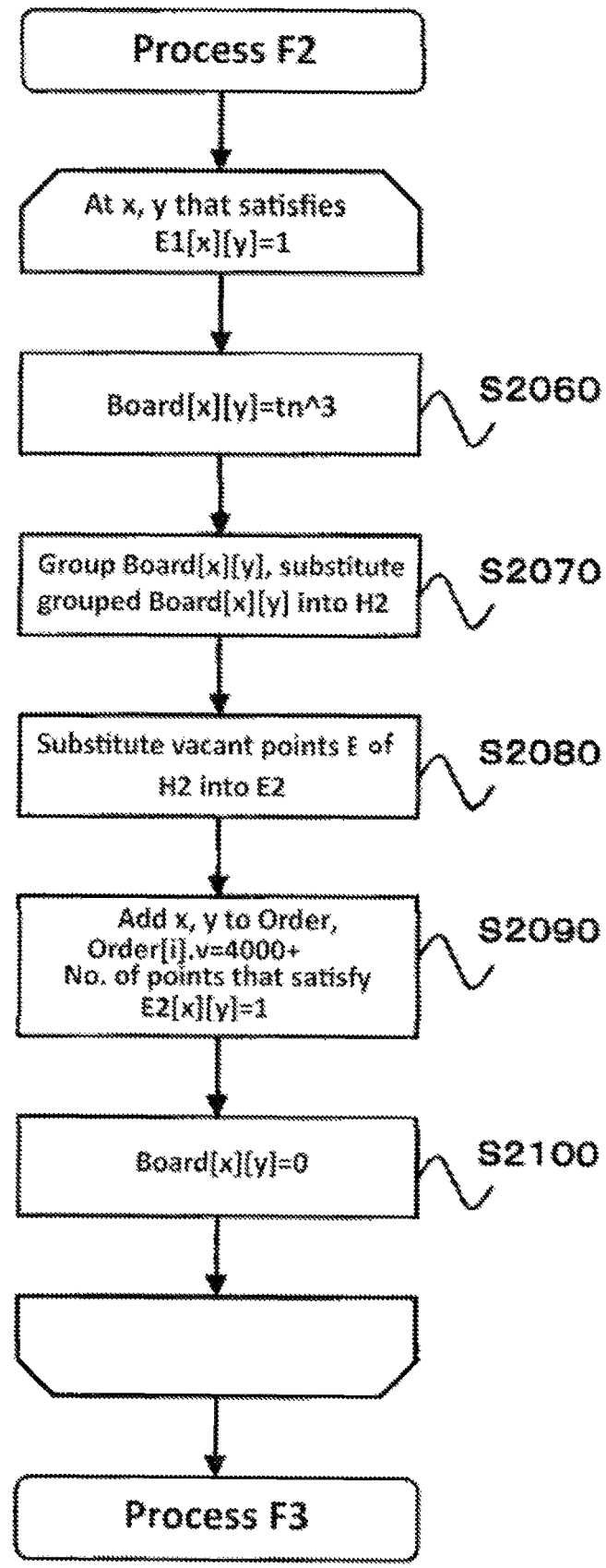

FIG. 113 This is a flowchart in which an example of the processing sequence of Process F2 in Working Example 4 is schematically described in detail.

Figure 114:
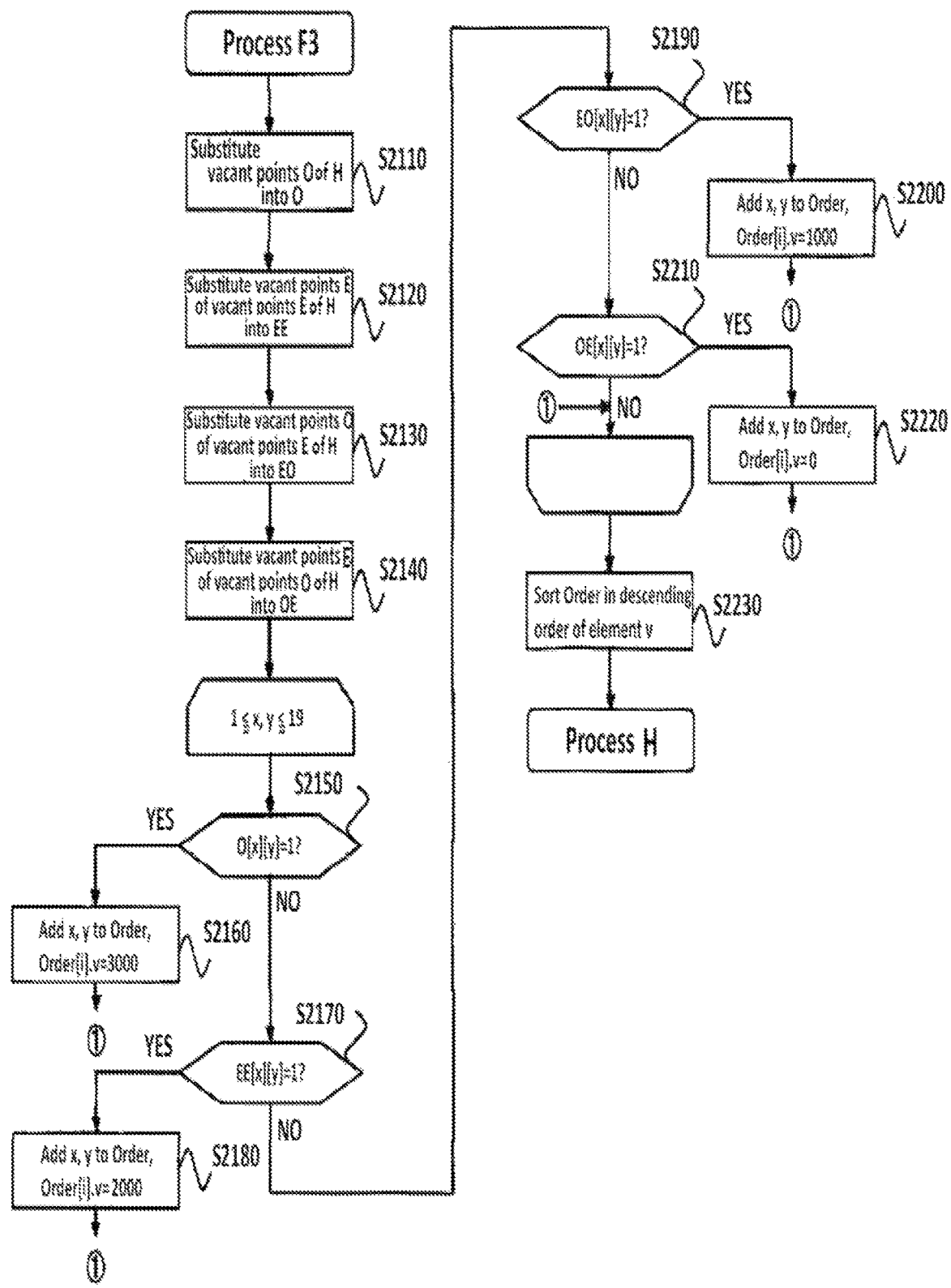

FIG. 114 This is a flowchart in which an example of the processing sequence of Process F3 in Working Example 4 is schematically described in detail.

Figure 115:
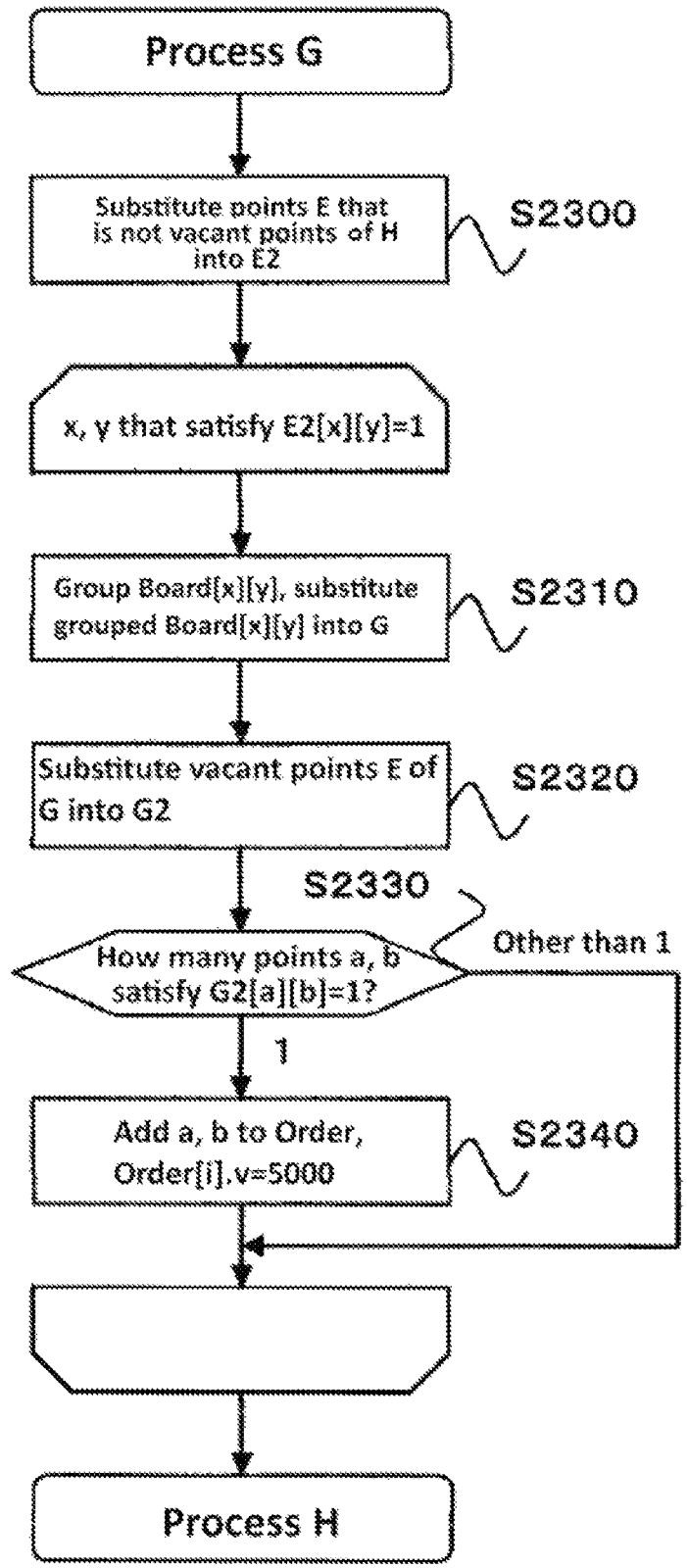

FIG. 115 This is a flowchart in which an example of the processing sequence of Process G in Working Example 4 is schematically described in detail.

Figure 116:
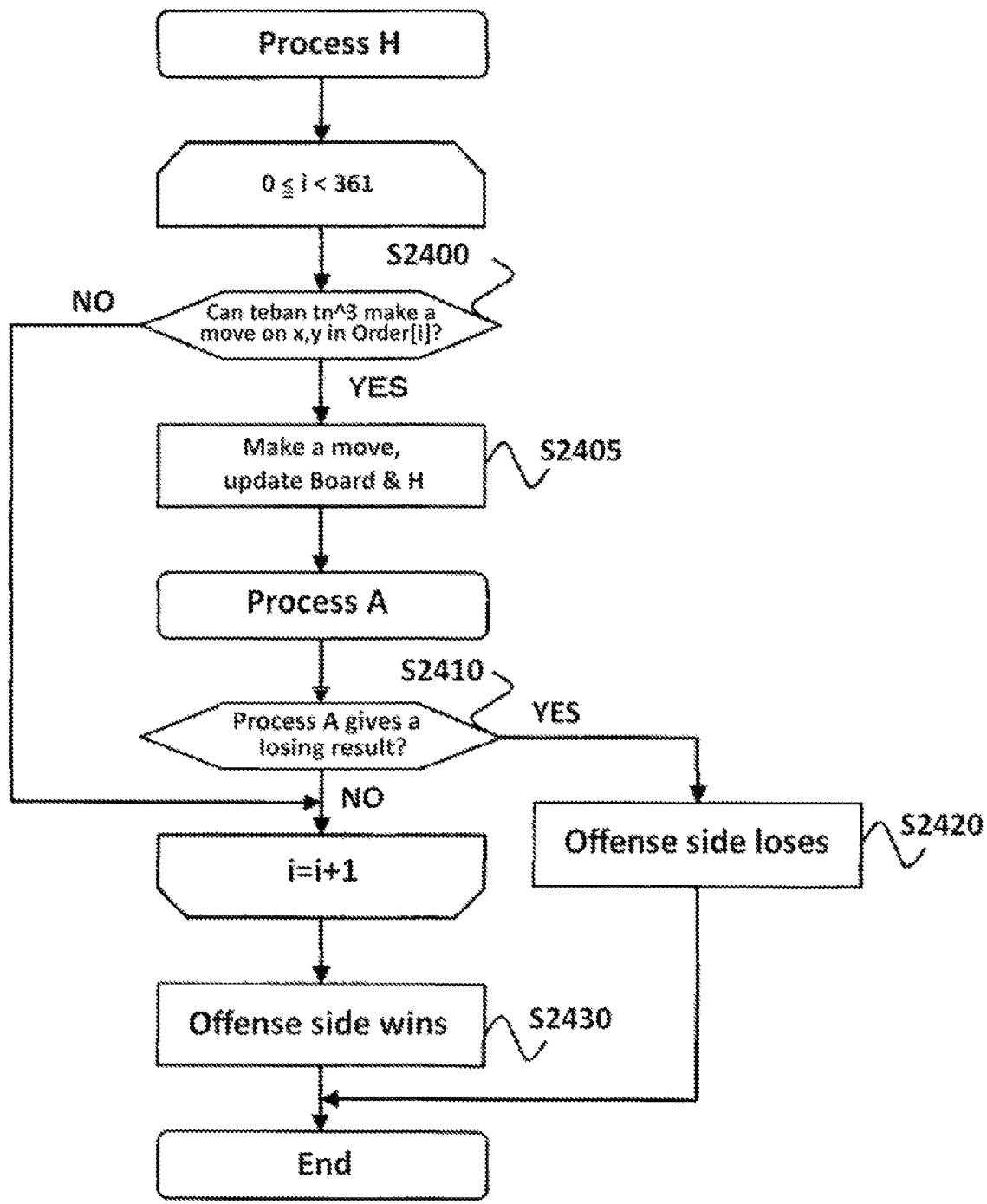

FIG. 116 This is a flowchart in which an example of the processing sequence of Process H of Working Example 4 is schematically described in detail.

MODE FOR CARRYING OUT TH E INVENTION

Life and death judgment system for a Go game 1 of the present invention (hereinafter simply referred to as the "life and death judgment system 1") can be used for a Go playing system via a network such as the Internet or a Go playing system not via a network. Note that this specification describes the cases in which a playing system is used together with life and death judgment system 1; however, life and death judgment system 1 alone may function as well. The same processing can be performed also in that case.

An example of the system configuration for a Go playing system via a network having life and death judgment system 1 of the present invention is shown schematically in FIG. 1. In this case, data can be transmitted or received between computer terminals (player terminals 3) used by each player and server 2 which realizes the playing system via a network. This specification demonstrates the case in which the data processing of the playing system and life and death judgment system 1 takes place in the same server 2; however, the processing may also take place in separate servers 2. Moreover, as described above, in addition to the fact that the playing system is realized by server 2, the playing system having life and death judgment system 1 can also be installed in player terminals 3, and by doing so, the processing associated with the present invention may also be carried out without going through a network. Furthermore, life and death judgment system 1 of the present invention may also be incorporated into the playing system as a function thereof to be configured integrally.

The conceptual diagram of an example of the processing function of life and death judgment system 1 for a Go game of the present invention is schematically shown in FIG. 2. As described above, this specification demonstrates the case in which the playing system for a Go game is configured via a network; the processing is realized by installing each processing function in servers 2, and transmitting and receiving the data via a network between player terminals 3 used by players.

Moreover, an example of hardware configuration of computer terminals that are server 2 and player terminals 3 is shown schematically in FIG. 3. Server 2 and computer terminals comprise computational device 10 such as CPU which runs the program's computational processing; storage device 11 such as RAM, a hard disk, etc. that store data; display device 12 such as a display (screen); input device 13 such as a keyboard, a pointing device (mouse, ten keys, etc.), etc.; and communication devise 14 which transmits and receives the processing result of computational device 10, and the data to be stored in storage device 11 via a network such as the Internet or LAN, etc. Each function (each means) to be realized by server 2 and computer terminals is performed by computational devise 10 as it reads out the means for executing the processing (programs, modules, etc.). When the data stored in storage device 11 is used in the processing, each function reads out said data from said storage device 1.1, and the data read out is utilized as required for the processing in computational device 10. Moreover, functions of computer terminals and server 2 may be allocated dispersedly over multiple computer terminals or servers 2.

The function of each means of the present invention is only differentiated logically, and may have a physically or actually identical realm.

Server 2 comprises input reception unit 20, life and death judgment processing unit 21, and output processing unit 22. Although not being illustrated in this specification, identical or different servers 2 have the processing function to realize the Go playing system, where the board data (i.e. the data required for actually playing a Go game by the use of a computer such as what stone is placed on which intersection, a move, etc.) is stored and controlled. When the life and death judgment processing system carries out the processing of life and death judgment, it obtains appropriately the board data, etc. from the playing system to use it in the processing of life and death judgment.

Input reception unit 20 receives the data required for making the life and death judgment such as a request for the execution of the life and death judgment, data on a move, the data on one's turn to move, the data on judgment object stones and target stones, etc. from player terminals 3. Moreover, output processing unit 22 transmits the processing result obtained by life and death judgment processing unit 21, the data to be displayed on player terminals 3, etc. to player terminals 3.

When input reception unit 20 receives a request for executing the processing of life and death judgment from layer terminal 3, life and death judgment processing unit 21 acquires the board data from the playing system, and carries out the processing of the life and death judgment in accordance with the data of the board or the board after being edited by the players. At this time, by receiving from player terminals 3 the data to designate a realm in which the life and death judgment processing is performed rather than the data on the entire board, it may acquire the data of the board on said realm to carry out the processing of life and death judgment. Additionally, input reception unit 20 receives other data such as one's turn, the data required for processing the life and death judgment on judgment object stones, target stones, etc. from player terminals 3 and uses them to execute the processing.

Basically, as in the past, the life and death judgment processing on stones is carried out by placing round robin-stones at points where no stone is placed, and making judgment one after another on them in all patterns; in this way, the processing becomes time consuming. Therefore, life and death judgment processing unit 21 optionally executes one or more processes described later before said round robin processing to achieve the acceleration of the round robin processing. Note that the processing of life and death judgment by life and death judgment processing unit 21 can use the life and death judgment processing program similar to that of the conventional one. Also note that each working example below demonstrates the case in which the life and death judgment is made in a round robin manner; however, the method used in other conventional life and death judgment processing programs can also be used. Furthermore, the round robin based life and death judgment processing may be the one used in the conventional life and death judgment processing program, and it is not always necessary for all vacant points in the judgment realm to undergo the round robin processing. For instance, a method in which, in vacant points in the judgment realm, the processing on part of vacant points is omitted may also be used. For example, there is a method of omitting the processing in which, when multiple moves of the equal value exist, only one move is made. In other words, life and death judgment execution unit 214 may optionally adopt any method, as long as it can execute the processing of the life and death judgment on the judgment object stones or target stones in the judgment realm. Moreover, the processing of life and death judgment in this specification is the one that utilizes a round robin (or a round robin with the efficiency enhanced processing in which a part of vacant points remain unprocessed); however, the life and death judgment processing can adopt not only a round robin based life and death judgment processing but also any method of processing, as long as the life and death can be determined.

Note that the computer program described in each of the above-mentioned non-patent documents is an example of conventional life and death judgment processing program, and can be used as needed; however, the present invention is not limited to this.

Also note that the terms used for describing each working examples described later is described herein. The judgment object stones are the stones that should give a conclusion of life or death and include all stones of one color in the judgment realm. If at least one stone is alive, the life and death judgment results in life; when all stones are captured, the life and death judgment results in death. Additionally, the target stones are part or all of the judgment object stones, and the stones that should give a conclusion of life or death. However, if the target stones are designated and all target stones are alive, the life and death judgment results in life;

if at least one target stone is captured, the life and death judgment results in death. Note that players may or may not designate target stones.

The judgment realm is the area in which a move of a stone can be made upon judgment. A group means a group of adjacent stones (stones positioned vertically and horizontally) of the same color that are connected. The outside means the area in which a move cannot be made upon judgment. A group of stones in this realm is considered to be alive, and one group can never be included in both the judgment realm and the outside.

Working Example 1

Working example 1 of the high speed processing by the above-mentioned life and death judgment processing unit 21a is described herein. An example of the processing function of life and death judgment processing unit 21a of this working example is shown in a conceptual diagram in FIG. 4. When life and death judgment processing unit 21a of this working example performs the round robin life and death judgment processing, it changes the priority of processing at each point so that a round robin is run from the points with a high possibility of giving the life and death judgment result, and then, the round robin life and death judgment processing is carried out according to the priority.

The life and death judgment processing unit 21a of this working example comprises initial judgment processing unit 210, first judgment processing unit 211, second judgment processing unit 21.2, priority change-processing unit 213, life and death judgment execution unit 214, and priority memory unit 215.

Initial judgment processing unit 210 determines whether the high speed judgment of this working example is possible. In other words, it determines whether the judgment can be made by using part or all of the original judgment object stones in the judgment realm as the outside, and the stone having a color different from that of the original judgment object stone, which is on the inner side from the outside, as the inside. If it is determined that such judgment can be made, stones of a different color which are adjacent to the original judgment object stones are set as target stones.

If initial judgment processing unit 210 determines that the high speed judgment can be made, first judgment processing unit 211 carries out the processing of life and death judgment by using the stone having a color different from that of the judgment object stone in the judgment realm as the inside, the original judgment object stone as the outside, and the opponent's stone which is adjacent to the original judgment object stones as the target stone. Note that, regarding target stones, the life and death judgment can be made by using part of the opponent's stones which are adjacent to the original judgment object stones, or part or all of the opponent's stones that are in the judgment realm as target stones.

If no point of a move is determined to be alive (winning) at first judgment processing unit 211, second judgment processing unit 21.2 carries out the life and death judgment by using the judgment object stone of a color different from that of the judgment object stone in the judgment realm as the inside, and the original judgment object stone as the outside.

Furthermore, if first judgment processing unit 211 carries out the life and death judgment by using all of the opponent's stones adjacent to the original judgment object stone as target stones and gives no point of a move being alive (winning), another round of the life and death judgment may be carried out by using part of the opponent's stones adjacent to the original judgment object stone as target stones, or part or all of the opponent's stones in the judgment realm as target stones. If no point of a move is determined to be alive (winning) in this life and death judgment processing as well, there can be another configuration in which the processing of the life and death judgment is performed by second judgment processing unit 212.

If there is a living point of a move at first judgment processing unit 211 and second judgment processing unit 212, priority change-processing unit 213 promotes on that point of a move the priority of each point of a move stored in the priority memory unit 215 described later. Moreover, the priority stored in priority memory unit 215 is demoted for the points other than the point of a move if there is a living point of a move at first judgment processing unit 211, the points other than the point of a move if there is a living point of move at second judgment processing unit 212, or the points in the judgment realm if there is no living point of move at second processing unit 21.2.

Life and death judgment execution unit 214 executes the processing of the life and death judgment on the vacant points in each of the judgment realms according to the condition set in first judgment processing unit 211 and second judgment processing unit 212. The processing of life and death judgment can use the life and death judgment processing program similar to that of the conventional one. Note that each working example below demonstrates the case in which the life and death judgment is made in a round robin manner; however, the method used in other conventional life and death judgment processing programs can also be used. Furthermore, the round robin based life and death judgment processing may be the one used in the conventional life and death judgment processing program, and it is not always necessary for all vacant points in the judgment realm to undergo the round robin processing. For instance, a method in which, in vacant points in the judgment realm, the processing on part of vacant points is omitted may also be used. For example, there is a method of omitting the processing in which, when multiple moves of the equal value exist, only one move is made. In other words, life and death judgment execution unit 214 may optionally adopt any method, as long as it can execute the processing of the life and death judgment on the judgment object stones or target stones in the judgment realm.

Priority memory unit 215 stores the priority of processing each point of a move.

An example of the processing of the life and death judgment processing of this working example is described herein with reference to the flow chart shown in FIG. 5.

Players are playing a Go game using player terminals 3 via a network. In this situation, the processing of the Go game takes place at server 2 which actualizes the playing system. In the middle of the game, or after the game is over, if any player presses a given button, etc. displayed on the screen, an execution request for the life and death judgment processing is transmitted from player terminal 3 to server 2 which carries out the life and death judgment processing. An example of the game screen is shown in FIG. 6.

In the case of the game screen shown in FIG. 6, by pressing a request button on the screen such as the "Life and Death Navi" button, etc. for the processing of the life and death judgment, a request for carrying out the life and death judgment processing is transmitted from player terminal 3 to server 2.

As the request is received by input reception unit 20 of server 2, said board data (e.g. game history data) is acquired by life and death processing unit 21a from storage device 11 of the play system. Then, the life and death judgment processing screen containing the board data to player terminals 3 is transmitted by output processing unit 22 to player terminals 3. An example of the play screen depicting this situation is shown in FIG. 7. Note that, in addition to the board data of the live game, the history data of the past game stored in a given storage device 11, or the history data of the game being watched may be acquired by life and death judgment processing unit 21a from storage device 11 of the play system, and the game history data may be included in the screen of FIG. 7 and transmitted to player terminals 3.

Players who carries out the life and death judgment processing edits the board on the screen showing the life and death judgment processing of FIG. 7. For instance, players remove or place a stone by designating the stone being displayed. Moreover, players designate the judgment realm by dragging input device 13 such as a mouse. In this way, players who want to carry out the life and death judgment processing edit the board data properly. In this mode, the data on the stones to be edited, teban, etc. are properly transmitted from player terminals 3 to server 2.

Upon designation of the judgment realm by the players described above, the stones in the judgment realm that should give a conclusion are designated as the judgment object stones. Note that, in the judgment object stones, if players want to further designate specific stones as the stones that should give a conclusion (target stones), the specific stones can be designated as target stones. If at least one stone is alive, the life and death judgment gives the living result; when all stones are captured, the life and death judgment gives the dying result. Note that in case target stones are designated, when all of the target stones survive (remain alive), the result of life and death judgment is survival of target stones (alive), and when even one stone of the target stones is captured, the result of life and death judgment is non-survival of target stones (dead). Note that the designation of target stones is not essential, and whether target stones are designated does not make any difference in processing but changes the baseline of the life or death judgment. Therefore, the working example below describes the case in which players do not designate the target stone unless noted otherwise.

An example of the screen showing the life and death judgment processing after the edition is shown in FIG. 8. Note that, in FIG. 8, it is assumed that 13 black stones are the judgment object stones, and white has the teban. In Go, the "teban" shows not only the color of the stone that makes the next move but also the fact that the winning or losing (alive or dead) judgment viewed from the teban is made. Therefore, in this case, it means that a white stone will make a move next, and the life or death of 13 black stones will be determined from the white stone's view.

For instance, by pressing the "judgment processing" on the screen of FIG. 8, the board data after the editing (game history data, judgment object stone data, etc.), the teban data, and a request to start the life and death judgment processing are transmitted from player terminals 3 to server 2. If the board data after the editing, the teban data, and a request to start the life and death judgment processing are received by input reception unit 20 of server 2, life and death processing unit 21a begins to process the life and death judgment upon reception of the input, namely the board data after the editing.

The processing of the life and death judgment begins with the tentative optional setting of the priority of processing each point (vacant intersection, i.e., vacant point) by life and death judgment processing unit 21a (S100). The priority of each tentatively set point here is stored in priority memory unit 215. The priority of processing each point may be set by using any method. This priority is the one which designates the first point to be processed; the priority may be set by ranking or it may be set in such a way that a point is added to each vacant point, and the point is processed in descending order (or ascending order). Note that the priority of each point is set in the same manner as the past Next, initial judgment processing unit 210 of life and death judgment processing unit 21a determines whether the high speed judgment of this working example is possible based on the board data (after the board data is edited) (S110). In other words, it determines whether the judgment can be made by using the original judgment object stones in the judgment realm as the outside, and the stone having a color different from that of the original judgment object stone, which is on the inner side from the outside, as the inside. If it is determined that such judgment can be made, initial judgment processing unit 210 sets stones which are adjacent to the original judgment object stones as target stones.

In other words, the board data is in the state of FIG. 8, in which 13 black stones are the original judgment object stones; therefore, initial judgment processing unit 210 designates the white stones in the judgment realm as the inside, the black judgment object stones as the outside, and the star marked white stones as the target stones (the board in this state is schematically shown in FIG. 9). In the case of FIG. 8, the black judgment object stones include white stones on the inside; therefore, it is determined that the high speed judgment of this working example is possible (S120).

Note that, in the judgment processing of S110, if the high speed judgment cannot be made due to the absence of the opponent's stone in the area of the original judgment object stones, etc., the processing of this working example is terminated, and the processing of the round robin based life and death judgment begins as in the past (S130).

Moreover, in the judgment processing of S110, if initial judgment processing unit 210 determines that the high speed judgment is possible as described above, first judgment processing unit 211 performs the processing of life and death judgment on the present teban (i.e. white is the teban here) using the inside of judgment object stones as the judgment realm. This life and death judgment processing applies a round robin only to the judgment realm set in S110 (S140). In other words, as shown in FIG. 10, the judgment on white's teban begins by regarding the 8 white stones as judgment object stones and target stones. Accordingly, since the points marked with white squares in FIG. 10 are vacant points in the judgment realm, life and death judgment execution unit 21.4 begins the processing of the round robin based life and death judgment. Note that the round robin life and death judgment processing itself is the same as the conventional one.

By doing so, the situation shown in FIG. 10 can be determined that the white is alive (the white wins) as shown in FIG. 11, and first judgment processing unit 211 determines that the points of a move are the two points marked as A.

As first judgment processing unit 211 determines that the teban stones are alive (winning) (there are points that become alive) (S150), for these points of a move, priority change-processing unit 213 promotes the priority of said points from the tentative priority set in S100 and stored in priority memory unit 215, and demotes the priority of other points (points other than those marked as A in the judgment realm of first judgment processing unit 211) (S160). For instance, it changes the priority ranking of points A determined as the points of a move to the highest (i.e. 1 and 2), moves down the order sequentially, and demotes the priority ranking of the points other than points A in the judgment realm of first judgment processing unit 211. Alternatively it promotes the priority of points A only by a given ranking (i.e. 10), and demotes the priority of the points other than A in the judgment realm of first judgment processing unit 211 by a given ranking. Furthermore, when priorities are controlled by means of points, given points are added to points A while given points are subtracted from the points other than A in the judgment realm in first judgment processing unit 211. Note that the processing of changing priority is not limited to the above; any processing may be adopted as long as at least the priority of the point of move is promoted. By promoting the priority of the point determined to be a point of a move at first judgment processing unit 211 by priority change-processing unit 213, the processing of said point (point A determined to be a point of a move) can be accelerated.

Additionally in S140, if first judgment processing unit 211 cannot determine that the teban stone is alive (winning) (no point is alive), at second judgment processing unit 212, life and death judgment execution unit 214 begins the round robin based life and death judgment processing in the same manner as S140 without designating, as target stones, those stones which were designated as target stones in S140 (S170).

In other words, in S140, first judgment processing unit 211 makes a judgment by designating all stones that are adjacent to the original judgment object stone as target stones; however, second judgment processing unit 212 does not designate target stones but carries out the round robin based life and death judgment processing in the same manner as S140. Therefore, in the case of FIG. 10, in S140, the judgment on the teban of white begins by using 8 white stones as the judgment object stones and target stones; however, in S170, the judgment on the teban of white begins by using 8 white stones as the judgment object stones. In this case also, the vacant points that become the object of a round robin remain the same as those of S140.

If second judgment processing unit 212 makes the alive (winning) judgment on the teban stones (there is a point being alive) (S180), for that point of a move, priority change-processing unit 213 promotes the priority of said point from the tentative priority set in S100 and stored in priority memory unit 215, and demotes the priority of other points (S190). Moreover, if second judgment processing unit 212 is unable to determine that a teban stone is alive (winning) (no point is alive), priority change-processing unit 213 demotes the priority of each point in said judgment realm (S200).

By doing the above, a judgment on whether the teban stone is alive is made by regarding the stones of the color which are different from that of the original judgment object stones inside the judgment realm as the inside, and the original judgment object stones as the outside; therefore, in light of the judgment result, if there are living points, the priority of said point of a move set tentatively in S100 can be promoted while the priority of other points can be demoted.

After performing the above processing, life and death judgment processing unit 21a carries out the round robin based life and death judgment processing according to the priority of each point changed by first judgment processing unit 211 or second judgment processing unit 212 to be stored in priority memory unit 215.

The points of move (i.e. point A in FIG. 11) determined to be alive by first judgment processing unit 21.1 or second judgment processing unit 212 are processed sooner than other vacant points even in the round robin-based life and death judgment. These points of move are likely to influence the life and death judgment on the original judgment object stones (the points with a high possibility to give a life or death judgment); therefore, the prioritized processing of these points can increase the possibility of obtaining the result of the judgment on the original judgment object stones quickly.

In other words, in a round robin that is simply introduced, a round robin is carried out according to the priority tentatively set for every point in S100; therefore, players do not know when to expect a result. However, by carrying out the processing at life and death processing unit 21a of this working example, points with a high possibility to give a life or death result are processed sooner, hence the possibility of accelerating the turnaround time of the life or death result is high.

In contrast, priority change-processing unit 213 has already demoted the priority of the points other than the point of a move if first judgment processing unit 211 determines the presence of a living point, the points other than the point of move if second judgment processing unit 212 determines the presence of a living point, or each point in the judgment realm if second judgment processing unit 212 determines the absence of an alive point; therefore, these points are processed after the points with the tentatively set priority are processed. These points are unlikely to influence the life and death judgment on the original judgment object stones (points with the low possibility to give an alive or death judgment); therefore, the demotion of priority can increase the possibility of accelerating the turnaround time of the life or death result of the original judgment object stones.

As life and death judgment processing unit 21a determines the result of the processing the life or death judgment in the manner described above, the processing result is transmitted by output processing unit 22 to player terminals 3. An example of the screen showing the result of the life and death judgment displayed on player terminals 3 is shown in FIG. 12. Players can know the life or death result by looking at the screen like this.

Next, details of each processing described above is described herein with reference to FIGS. 13 to 17. Note that the data formats and terms used in the description of each working example below are described herein.

Board data is expressed as Board [x][y] (when $1 \le x \le 19$, $1 \le y \le 19$). If each point on the board is a vacant point, 0 is assigned; if there is a black stone, 1, and if there is a white stone, 2 are assigned.

The teban is expressed as "tn". Note that tn3 becomes the color of the opponent's stone; however, " " expresses the bit computation.

The judgment object stone is expressed as H [x][y]. Assigned to the judgment object stone is 1, and assigned to the stone that is also a target stone is 2.

The priority ranking of a point of a move is expressed as Order [i] (when $0 \le i \le 361$), and Order [i]. x (the x-coordinate of point i) and Order [i].y (the y-coordinate of point i) represent the coordinates. Additionally, Order [i].v is a variable (the priority ranking of point i of a move.

The judgment realm is expressed as Area [x][y] (when $1 \le x \le 19$, $1 \le y \le 19$). Assigned to the point which is the judgment realm is 1, and to the point not in the judgment realm is 0.

Grouping is the process in which a group of points that are in the same color from a certain point and vertically or horizontally adjacent are substituted in an array.

Point E means a group of points on the vertical or horizontal axis that are adjacent to that stone (with a distance of 1). As shown in FIG. 18, Points E are the points marked as E facing one black stone. Points E in multiple groups of stones are obtained by subtracting the points at which the groups of stones exist from the union of points E of all stones constituting the groups. An example of this is shown in FIG. 19.

Point O means a group of points adjacent to that stone diagonally (distanced by 1). As shown in FIG. 20, points O are the points marked as O facing one black stone. Points O in a group of stones are obtained by subtracting the points at which the groups of stones exist and the points included in the points E of the groups of stones from the union of points O of all stones constituting the groups. An example of this is shown in FIG. 21.

Vacant point E means, in points E of the groups of stones, a group of points where no stone is placed. An example of this is shown in FIG. 22.

First, life and death judgment processing unit 21*a* reads out the board data and stores in Board [x][y] whether the point is a vacant point, a black stone is placed, or a white stone is placed. Additionally, it stores in the judgment realm Area [x][y] whether the point is the judgment realm. Besides the above, the judgment object stone H[x][y], the judgment realm Area [x][y], and the teban tn, etc. are also set appropriately. Moreover, a round robin begins with the tentative and optional setting of the priority of the processing the vacant point (Board Ix][y]=0) (S300). In other words, it tentatively sets the priority in each Order[i]. The priority set for each point here is stored in priority memory unit 215. Note that any method similar to the one mentioned above may be used to process the priority.

Next, initial judgment processing unit 210 of life and death judgment processing unit 21*a* executes the processing of the initial judgment (process A) (S310).

Specifically, first, the process sequence of S3100 to S3120 is repeated for x, y of each point which satisfies the following condition: Area [x][y]=1, Board [x][y]=tn3. In other words, a judgment realm is created by using Board [x][y] as the judgment object stones (S3100), and whether all stones constituting the outside in the judgment realm set in S3100 are included in the judgment object stones of the original judgment realm is determined (S3110). If not included, the processing shifts to the next point (x, y). If included, whether a judgment can be given using the realm set in S3100 is determined (S3120), and if it is determined otherwise, the processing shifts to the next point (x, y). If a judgment can be given, the loop is interrupted at that point, and the processing shifts to the one by first judgment processing unit 211. In the case in which Process B is never reached but the loop is terminated, the high speed judgment processing of Working Example 1 cannot be adopted; therefore, the round robin life and death judgment processing based on the tentative priority (the priority set by the use of Order[i]) set in S300 begins.

As described above, after the initial judgment processing (Process A) is carried out by initial judgment processing unit 21.0, the first judgment processing (Process B) is processed by first judgment processing unit 211 (S320). Note that the original judgment realm is expressed as the array Area [x][y], the judgment object stone as the array H [x][y], the judgment realm of the inside as the array Area' [x][y], and the judgment object stones as the array H' [x][y]. Thus, each value is substituted into each of the arrays Area' [x][y] and H' [x][y] respectively.

Specifically, first, in the judgment object realm, the processing of S3200 and S3230 are iterated on each point (each of the judgment object point) (x, y) which satisfies the condition expressed by array H' [x][y]=1. Initially, the above points (x, y) (the points that satisfy the condition expressed as H' [x][y]=1) are grouped (a group of points in the same color that are connected on the vertical or horizontal path are substituted in the array from each point (x, y)) and substituted in array G [x][y] (S3200). Then, points E of array ([x][y] are obtained and substituted in array E [x][y] (S3210).

Then, whether the point (a, b) satisfies array E [a][b]=1 and Area' [a][b]=0 (1≤a, b≤19) is determined (S3220). In other words, whether it is point E, and there is a point outside the judgment realm is determined. If not, process B is terminated at that point.

If the above point exists in S3220, at the point (c, d) that satisfies G [c][d]=1. H' [c][d]=2 (1≤c, d≤19) is set (S3230). In other words, the stones at the points are set as the target stones.

After the above processing is carried out at each of the points which satisfy H' [x][y]=1, life and death judgment executing unit 214 carries out the round robin life and death judgment processing at each of the points in the judgment realm Area' [x] [y], and living (winning) points of a move are substituted in array R [x][y] (S3240). If there is no living (winning) point of a move, no substitution occurs in array R [x][y]. Note that, assigned to points of a move is 1 in array R[x][y], and assigned to the points other than points of a move is 0.

As described above, after the first judgment processing (Process B) is carried out by first judgment processing unit 21.1, whether a point of a move being alive is found in Process B is determined (S330). If there is a point of move being alive in Process B (if there is a point of a move substituted into array R [x][y]), Process D is carried out by priority change-processing unit 213 described later (S350).

By carrying out the above processing, the processes corresponding to S110 through S150 shown in FIG. 5 can be executed.

Moreover, if there is no point of a move being alive in Process 13 (if there is no point of a move substituted into Array Rx[x][y]) in S330, the second judgment processing (Process C) is carried out by second judgment processing unit 212 (S340).

Specifically, first, in the judgment object realm, H'[x][y]=1 is set on each point (target point) (x, y) that satisfies the condition expressed by H' [x][y]=2 (S3400). That is, the stones to become target points are set as the judgment object stones.

Then, the processing of the round robin life and death judgment is carried out by life and death judgment execution unit 214 on each point in the judgment realm Area'[x][y], and a living (winning) point of a move is substituted into array R [x][y] (S3410). If no point of a move is alive (winning), no substitution occurs in array R [x][y].

As described above, by carrying out the second judgment processing (Process C) at second judgment processing unit 21.2, the corresponding processing sequence of S170 through S180 as shown in FIG. 5 can be executed. Additionally, after the second judgment processing is carried out at second judgment processing unit 212, or if the presence of a living point is determined in Process B in S330, the priority change-processing (Process D) is executed by priority change-processing unit 213 (S350).

First, in array Order [i] (0≤i<361) showing the priority of a point of a move, the maximum value of Order [i].v (parameter) is substituted in m (S3500).

Then, the processes from 83510 through S3540 are repeated from i=0, to i≤361.

First, if H' (Order [i]. x [Order [i].y] is 1 or greater (S3510), whether the point x, y is a point of a move, namely R [Order [i].x][Order [i].y]=1, is determined (S3520). If it is a point of a move (R [Order [i].x][Order (i).y]=1). Order [i] is increased only by m+1 (S3530). If it is not a point of a move (R [Order [i].x] (Order [i][y]≠1), Order [i].v is decreased only by m+1 (S3540). In other words, for a point of a move, the priority is increased only by a predetermined amount (m+1); for points other than a point of a move, the priority is decreased only by a predetermined amount (m+1).

After all i undergoes the above processing, Order [i] is sorted in descending order of the element v (S3550). By doing so, the priority of a point of a move is promoted and the priority of other points is demoted.

As the processing is carried out by priority change-processing unit 213 in this way, array Order [i] is stored in priority memory unit 21.5. By executing the above process, the processes according to S160 and S190 through S200 of FIG. 5 can be executed. Then, at this stage, life and death judgment processing unit 214 carries out the round robin based life and death judgment processing based on the stored priority, thereby processes the point with a high priority, namely, a point of a move sooner. Since a point of a move tends to give a result of the life and death judgment easily, the result of the life and death judgment can be outputted quickly.

If the result of the life and death judgment is outputted during the processing of the round robin judgment by life and death judgment execution unit 214, output processing unit 22 transmits the process result to player terminals 3. Players can know the life or death result by looking at the screen like this.

As in this working example, by determining whether the opponent's stones that are in the inside of the judgment realm are alive and setting the priority of a point of a move in a round robin before the round robin based life and death judgment is simply carried out, the fife and death judgment processing of the judgment object stones can be achieved at a high speed.

Working Example 2

Next, Working example 2 in which the high speed processing is carried out by the above-mentioned life and death judgment processing unit 21b is described herein. An example of the processing function of life and death judgment processing unit 21b of this working example is shown in a conceptual diagram in FIG. 23. When life and death judgment processing unit 21b of this working example performs the round robin life and death judgment processing, it changes the priority of processing at each point so that a round robin is run after the number of process object points is reduced, and then, the round robin life and death judgment processing is carried out.

The life and death judgment processing unit 21b of this working example comprises first outside processing unit 216 and second outside processing unit 217, and life and death judgment execution unit 218.

First outside processing unit 216 extracts, in the original judgment realm, the closed realm including the judgment object stones, and places a stone having a color different from that of said judgment object stone at a point which satisfies a given condition outside the closed realm, and regards said newly placed stone as the outside. Hence, the number of the object points processed in a round robin is reduced.

Second outside processing unit 217 reduces the number of points that become the objects of a round robin processing by extracting vacant points E of the outside in the judgment realm, placing a stone of a color which is different from that of the judgment object stone at a point E where two or more stones of the outside are included without including any judgment object stone, and regarding the newly placed stone as the outside.

Note that, in this specification, the outside is a point at part or the entire area of the non-judgment realm. Preferably, it is a point not in the judgment realm while the judgment realm includes point E or O.

Life and death judgment execution unit 218 carries out the processing of life and death judgment on the vacant point in the original judgment realm after the board is processed by first outside processing unit 216 and second outside processing unit 217. The processing of life and death judgment can use the life and death judgment processing program similar to that of the conventional one. Note that each working example below demonstrates the case in which the life and death judgment is made in a round robin manner; however, the method used in other conventional life and death judgment processing programs can also be used. Furthermore, the round robin based life and death judgment processing may be the one used in the conventional life and death judgment processing program, and it is not always necessary for all vacant points in the judgment realm to undergo the round robin processing. For instance, a method in which, in vacant points in the judgment realm, the processing on part of vacant points is omitted may also be used. For example, there is a method of omitting the processing in which, when multiple moves of the equal value exist, only one move is made. In other words, life and death judgment execution unit 218 may optionally adopt any method, as long as it can execute the processing of the life and death judgment on the judgment object stones or target stones in the judgment realm.

Note that first outside processing unit 216 and second outside processing unit 217 may carry out two processes or one of the two processes. Moreover, the processing by first outside processing unit 216 and second outside processing unit 217 is one of the examples, and for instance, another method in which a stone having a color different from that of the judgment object stone is newly placed by using the outside as a baseline, may also be used, as long as the number of object points processed in a round robin can be reduced.

An example of the processing of the life and death judgment processing of this working example is described herein with reference to the flow chart shown in FIG. 24.

Players are playing a Go game using player terminals 3 via a network. In this situation, the processing of the (Go game takes place at server 2 which actualizes the playing system. In the middle of the game or after the game is over, if any player presses a given button, etc. displayed on the screen, an execution request for the life and death judgment processing is transmitted from player terminal 3 to server 2 which carries out the life and death judgment processing. An example of the play screen is shown in FIG. 25.

In the case of the game screen shown in FIG. 25, by pressing a request button in the screen such as the "Life and Death Navi" button, etc. for the processing of the life and death judgment, a request for carrying out the life and death judgment processing is transmitted from player terminal 3 to server 2.

As the request is received by input reception unit 20 of server 2, said board data (e.g. game history data) is acquired by life and death processing unit 21b from storage device 11 of the play system. Then, the life and death judgment processing screen containing the board data to player terminals 3 is transmitted by output processing unit 22 to player terminals 3. An example of the play screen depicting this situation is shown in FIG. 26. Note that, in addition to the board data of the live game, the history data of the past game stored in a given storage device 11, or the history data of the game being watched may be acquired by life and death judgment processing unit 21b from storage device 11 of the play system, and the game history data may be included in the screen of FIG. 26 and transmitted to player terminals 3.

Players who carries out the life and death judgment processing edits the board on the screen showing the life and death judgment processing of FIG. 26. For instance, players remove or place a stone by designating the stone being displayed. Moreover, players designate the judgment realm by dragging input device 13 such as a mouse. In this way, players who want to carry out the life and death judgment processing edit the board data properly. In this mode, the data on the stones to be edited, teban, etc. are properly transmitted from player terminals 3 to server 2.

Upon designation of the judgment realm by the players described above, the stones in the judgment realm that should give a conclusion are designated as the judgment object stones. Note that, in the judgment object stones, if players want to further designate specific stones as the stones that should give a conclusion (target stones), the specific stones can be designated as the target stones. If at least one stone is alive, the life and death judgment results in life; when all stones are captured, the life and death judgment results in death. Note that the designation of target stones is not essential, and whether the target stones are designated does not make any difference in processing but changes the baseline of the life or death judgment. Therefore, the working example below describes the case in which players do not designate the target stone unless noted otherwise; however, if target stones are designated, the process can be achieved by appropriately interpreting the description "judgment object stone" as the "target stones".

An example of the screen showing the life and death judgment processing after the edition is shown in FIG. 27. Note that, in FIG. 27, it is assumed that 8 black stones are the judgment object stones, and black has the teban. Therefore, in this case, it means that a black stone will make a move next, and the life or death of 8 black stones will be determined from the black stone's view.

For instance, by pressing the "judgment processing" on the screen of FIG. 27, the board data (game history data, judgment object stone data, etc.) after the editing, the teban data, and a request to start the life and death judgment processing are transmitted from player terminals 3 to server 2. If the board data after the editing, the teban data, and a request to start the life and death judgment processing are received by input reception unit 20 of server 2, life and death processing unit 21b begins to process the life and death judgment based on the received board data inputted after the editing.

First of all, when first outside processing unit 216 of life and death judgment processing unit 21b begins the round robin processing, it extracts the game history of the board data and a group of stones constituting the closed realm including the judgment object stone (S400). Note that the closed realm means the area closed by one's stones alone or by one's stones and the outside regardless of the opponent's stones.

By doing so, in the case of FIG. 27, two groups of the stones constituting the closed realm can be extracted as shown in FIG. 28. In FIG. 28 (a), the closed realm is defined only by the black judgment object stones; in FIG. 28 (b), the closed realm is defined by the black judgment object stones and the edge of the board.

If no closed realm is found in S400 (S410), the processing by first outside processing unit 216 is terminated, and the processing at second outside processing unit 217 is carried out. In other words, the processing goes to S470. On the other hand, if there are closed realms (S410), in each of the closed realms, points outside the closed realm, which is neither the vacant point E of the group of the stones constituting the closed realm nor the 0 vacant point of No. 1 line, are extracted (S420). The processing of S420 is carried out on FIG. 28 to result in FIG. 29. The black squares in FIG. 29 represent the points extracted in S420.

If S420 is carried out for each of the closed realm extracted in S400 (S430), and if points defined in S420 are extracted from all of the closed realms, the points common to all of the closed realms are extracted (S440). In other words, extracted are the points being the product of the points extracted from each of the closed realm in S420. This is schematically depicted in FIG. 30.

Then, among the points extracted in S440, a stone of a color which is different from that of the judgment object stone (a white stone in this situation) is placed at the points left after the judgment object stones and vacant points E are excluded (S450). This is schematically depicted in FIG. 31. Note that the stars in FIG. 31 represent the newly placed opponent's stones. Also note that the opponent's stones are placed at all of the remaining points; however, they may be placed on part of points, not all of the points.

In the opponent's stones that are newly placed in S450, the stones that are not connected to the outside are removed. Then, the opponent's stones placed newly other than the removed stones are regarded as the outside (S460). This is schematically shown in FIGS. 32 and 33.

First outside processing unit 216 carries out the processing in the manner described above. After the processing by first outside processing unit 216 is terminated, or first outside processing unit 216 determines that there is no closed realm in S400, the processing by second outside processing unit 217 is carried out.

In other words, second outside processing unit 217 extracts the outside-E-vacant points in the judgment realm (S470). This is schematically shown in FIG. 34. The black squares in FIG. 34 represent the points extracted in S470.

Then, in each of the E points extracted in S470, whether there is a point where two or more stones of the outside are included without including any judgment object stone is determined. Additionally, if there is such a point, the opponent's judgment object stone (white stone) is placed at the point, and the point is regarded as the outside (S480). This is schematically shown in FIG. 35.

If one or more stones are placed in S480, the process sequence of S470 to S480 is carried out again (S490). If no stone is placed, the processing of second outside processing unit 217 is terminated at that point (S490). In the case of FIG. 35, the condition of S480 is not satisfied; therefore, no new stone is placed.

After the processing by second outside processing unit 217 is terminated in the manner described above, life and death judgment execution unit 218 carries out the round robin processing on the data after the processing of S490 is provided to the board. In the example described above, the processing of the round robin life and death judgment on each point of FIG. 36 is carried out by life and death judgment execution unit 218 (S500).

Then, the result of the life and death judgment processing determines that one or more points are alive (winning) (S510), the final result as being alive (winning) is determined by the life and death judgment processing (S520).

On the other hand, as a result of the life and death judgment processing in S500, if no point is determined to be alive (winning) (S510), the board data is returned to the initial state (the state of FIG. 27), and life and death judgment execution unit 218 carries out the normal life and death judgment processing and determines the result as the final result.

As life and death judgment processing unit 21b determines the result of the life and dearth processing in a manner as described above, output processing unit 22 transmits the processing result to player terminals 3.

By carrying out the processing of a round robin in the life and death judgment processing by life and death judgment execution unit 218 after the processing of the type described in this working example is carried out, the number of object points in the judgment realm subjected to a round robin can be reduced. Accordingly, the total time required for a round robin is reduced, which renders a quick computation of the process result.

The processing on the state of the board after the editing as shown in FIG. 27 is described above; however, now, the board data after the editing is shown in FIG. 37 is assumed next. The processing of Working Example 2 in this case is described herein.

For instance, by pressing the "judgment processing" on the screen of FIG. 37, the board data (game history data, judgment object stone data, etc.) after the editing, the teban data, and a request to start the life and death judgment processing are transmitted from player terminals 3 to server 2. If the board data after the editing, the teban data, and a request to start the life and death judgment processing are received by input reception unit 20 of server 2, life and death processing unit 21b begins to process the life and death judgment based on the received board data inputted after the editing.

First of all, first outside processing unit 216 of life and death processing unit 21b begins the round robin processing by extracting the board history data and a group of stones constituting the closed realm including the judgment object stones (S400).

However, in the case of FIG. 37, a group of stones constituting the closed realm cannot be extracted. Therefore, first outside processing unit 216 terminates the processing and second outside processing unit 217 carries out the processing (S410).

Then, second outside processing unit 21.7 extracts the outside-E-vacant points to become the judgment realm (S470). This is schematically shown in FIG. 38. The black squares in FIG. 38 represent the points extracted in S470.

Then, in each of the points E extracted in S470, whether there is a point where two or more stones of the outside are included without including any judgment object stones is determined. Additionally, if there is such a point, the opponent's judgment object stone (white stone) is placed at the point, and the point is regarded as the outside (S480). This is schematically shown in FIG. 39. Furthermore, when the processing of S480 is carried out, the opponent's stones are newly placed in the manner as shown in FIG. 40. Note that, in FIG. 40, the stars represent the opponent's newly placed stones. Also note that, in this case, the opponent's stones are placed at all of the determined points; however, they may be placed only at some points, not all of the points.

As the opponent's stones are newly placed in S480 (S490), second outside processing unit 217 extracts outside-E-vacant points which are to become the judgment realm (S470). (Note that, in this working example, the iteration processing is carried out when the opponent's stone is newly placed: however, the iteration processing may not be carried out.) This is schematically shown in FIG. 41. The black squares in FIG. 41 represent the points extracted in S470.

Then, in each of the points E extracted in S470, whether there is a point where two or more stones of the outside are included without including any judgment object stones is determined. Additionally, if there is such a point, the opponent's judgment object stone (white stone) is placed at the point, and the point is regarded as the outside (S480). This is schematically shown in FIG. 42. Furthermore, the execution of the processing of S480 causes the opponent's stones to be newly placed as shown in FIG. 43. Note that, in FIG. 43, the stars represent the newly placed stones of the opponent.

Since the opponent's stones are newly placed in S480 (S490), second outside processing unit 217 extracts the outside-E-vacant points in the judgment realm (S470). This is schematically shown in FIG. 44. The black squares in FIG. 44 represent the points extracted in S470.

Then, in each of the E points extracted in S470, whether there is a point where two or more stones of the outside are included without including any judgment object stone is determined. Additionally, if there is such a point, the opponent's judgment object stone (white stone) is placed at the point, and the point is regarded as the outside (S480). This is schematically shown in FIG. 45.

In the state of FIG. 45, no stone is newly placed. Therefore, the processing by second outside processing unit 217 is terminated (S490).

After the processing by second outside processing unit 2.17 is terminated in the manner described above, life and death judgment execution unit 218 carries out the round robin processing on the data after the processing of S490 is provided to the board. In the example described above, the processing of the round robin life and death judgment on each point of FIG. 46 is carried out by life and death judgment execution unit 218 (S500).

Then, if the life and death judgment processing determines that one or more points are alive (winning) (S510), the final judgment as being alive (winning) is given as a result of the life and death judgment processing (S520).

On the other hand, as a result of the life and death judgment processing in S500, if no point is determined to be alive (winning) (S510), the board data is returned to the initial state (the state of FIG. 37), and life and death judgment execution unit 218 carries out the usual life and death judgment processing (S530) and gives the result as the final judgment.

If life and death judgment processing unit 21b determines the result of the life and death processing in a manner as described above, output processing unit 22 transmits the processing result to player terminals 3.

Next, each of the above processing sequence is described in further detail with reference to FIGS. 47 to 53.

First, life and death judgment processing unit 21b loads the board data and stores in Board [x][y] whether the point is a vacant point, a black stone is placed, or a white stone is placed. Additionally, it stores in the judgment realm Area [x][y] whether the point is the judgment realm. Besides the above, the judgment object stone H[x][y], the judgment realm Area [x][y]), and the teban tn, etc are also set appropriately. Then, first outside processing unit 216 at life and death judgment processing unit 21b carries out the processing (Process A) (S600).

In other words, first, R [x][y]=Area [x][y] and Q [x][y]=Area [x][y] are assigned at all of the points expressed by (x, y) (S6000). Then, f=0 as the initial value is assigned to the variable f (S601.0).

Next, first outside processing unit 216 reiterates the processing of S6020 to S6080 at point (x, y) which satisfies the conditions expressed as Area [x][y]=1 and Board [x][y]=0.

First, whether Q [x][y]=1 is determined (whether it is the judgment realm is determined) (S6020); if not, the processing shifts to the next variable expressed by x, y. On the other hand, if Q [x][y]=1 (if it is the closed realm), the closed realm in which said point (x, y) is included is extracted and substituted into array C [x][y] (S6030). Then, Q [x][y]=0 is substituted (S6040).

If C [x][y] #1. (S6050), the processing shifts to the next variable x, y. On the other hand, if C [x][y]=1, Q [a][b]=0 is assigned to all points that satisfy the condition expressed as C [a][b]>0 (0.1≤a, b≤1.9) (S6060). Then, Process A2 is carried out (S6070). Note that this processing is the one according to S420 shown in FIG. 24.

Then, Process A2 is carried out by first outside processing unit 216. In other words, points E of array C [x][y] are extracted and substituted into array E [x][y] (S6073). Additionally, the points of No. 1 line at points O in array C [x][y] are extracted and substituted into array O [x][y] (S6075). Then, if array C [c][d], array E [c][d]≥1, or array O [c][d]≥1, R [c][d]=0 is substituted. (1≤c, d≤19) (S6077).

As first outside processing unit 216 carries out Process A2 in the manner described above, f=1 is assigned to the variable f (S6080), First outside processing unit 21.6 carries out the above iteration processing at all of the points (x, y) that satisfy the conditions expressed as Area [x][y]=1 and Board [x][y]=0.

By carrying out the above processing, the corresponding process sequence of S400 to S440 shown in FIG. 24 can be executed.

After the above iteration processing is terminated, whether f=1 is determined for the variable f (S6090), and if f=1, Process A3 is carried out. If f≠1, Process A is terminated, and the next processing, namely Process B is carried out by second outside processing unit 217 (S610).

In the above-mentioned S6090, if f=1, first outside processing unit 216 subsequently carries out Process A3.

In other words, R [x][y]=0 is assigned to all of the points expressed by (x, y) that satisfy the condition expressed as array H [x][y]1 (S6100). Next, the points E that satisfy the condition expressed as array H [x][y] 1 are assigned to array E2 (S6110).

Array R [x][y=0 is assigned to all of the points (x, y) that satisfy the condition expressed as array E2 [x][y]=1 (S6120). And array W [x][y]=0 is assigned to all of the points (x, y) (S6130). Then, Board [x][y]=tn3, W [x][y]=1, and Area [x][y]=0 are assigned to all of the points (x, y) that satisfy the conditions expressed as Board (x)[y]=0 and R [x][y]=1 (S6140).

By carrying out the above processing, the corresponding process sequence of S450 shown in FIG. 24 can be executed. Additionally, after the processing of S6140 is terminated, first outside processing unit 216 carries out Process A4.

First, first outside processing unit 216 groups all of the points (x, y) that satisfy the conditions expressed as Board [x][y]=tn3, Area [x][y]=0, and W [x][y]=0, and substitutes the points into array G2 [x][y] (S6150). Then, the process sequence of S6160 to S6170 are iterated at all of the points (x, y) that satisfy the condition expressed as W [x][y]=1.

First, whether array G2 [x][y]=0 is determined (S6160), and if array G2 is not 0, the processing shifts to the next point (x, y). If array G2 is 0, Area [x][y]=1 and Board [x][y]=0 are substituted (S6170). Then, the process shifts to the next point (x, y).

As the above iteration processing is carried out on all points (x, y) that satisfies the condition W [x][y]=1, Process A4 ends. By carrying out the above processing, the corresponding process sequence of S460 shown in FIG. 24 can be executed.

If the above processing ends, or f≠1 in S600, Process B is carried out by second outside processing unit 217 (S610).

First, second outside processing unit 217 substitutes the vacant points E of the points expressed by (x, y) that satisfy the conditions expressed as Board [x][y]=tn3 and Area [x][y]=0 into array E1 [x][y](S6200). Then, next, array E1 [x][y]=0 is assigned to the points (x, y) that satisfy the condition expressed as Area [x][y]=0 (S6210). By doing the above, the corresponding process sequence of S470 shown in FIG. 24 can be executed.

Then, next, the iteration process sequence of S6220 to S6300 is carried out on all of the points (x, y) that satisfy the condition expressed as array E1 [x][y] 1.

First, points E of the points (x, y) are substituted into array E2 [x][y](S6220), and variable C=0 is substituted (S6230). Then, the iteration process sequence of S6240 to S6270 is carried out on point (x', y') that satisfy the condition expressed as array E2 [x'][y']=1.

First, whether array H [x'][y']≥1 is determined (S6240), and if the condition is satisfied, C is updated by subtracting 4 from the variable C (S6250). That is, C=C−4 is executed. Then, if the condition as expressed as H [x'][y']≥1 is not satisfied, or S6250 is carried out, whether Area [x'][y']=0 is determined (S6260). If Area [x'][y']=0, C is updated by adding 1 to the variable C (S6270). That is, C=C+1 is executed. If Area [x'][y']≠0 or S6270 is carried out, the same processing is carried out on the next point (x', y') which satisfies the condition expressed as array E2 [x][y]=1.

After all of the points (x', y') that satisfy the condition expressed as array E2 [x'][y']=1 are processed, whether C≥2 is determined (S6280). If C≥2, whether points expressed by (x, y) is No. 1 line is determined (S6290). On the other hand, if the condition C≥2 is not satisfied, array E1 [x][y]=0 is substituted (S6300). Furthermore, in S6290, if the points expressed by (x, y) constitute No. 1 line, array E1. [x][y]=0 is substituted (S6300).

If the points expressed by (x, y) do not constitute No. 1 line in S6290, or array E1 [x][y]=0 is substituted in S6300, the same processing as described above is carried out on the next point that satisfies the condition expressed as array E1 [x][y]=1.

After all of the points (x, y) that satisfy the condition expressed as array E1 [x][y]=1 undergo the processing sequence of S6220 to S6300, whether any points satisfy the condition expressed as array E1 [x][y]=1 is determined (S6310). If no point satisfies array E1. [x][y]=1, the processing by second outside processing unit 217 is terminated, and the round robin life and death judgment processing is carried out on the current state of the board by life and death judgment execution unit 218 (S620).

On the other hand, if any points satisfy the condition expressed as array E1 [x][y]=1. Board [x][y]=tn3 and Area [x][y]=0 are assigned to the points that satisfy E1 [x][y]=1 (S6320). And the processing sequence returns to Process B, and second outside processing unit 217 carries out the above processing again. In other words, the processing sequence after S6200 is carried out.

By carrying out the above processing, the processing sequence of S480 to S490 of FIG. 24 can be executed.

Moreover, by executing Process A and Process B in the manner as described above, the initial state of the board is changed to narrow the points in the judgment realm. Life and death judgment execution unit 218 uses the narrowed points in a round robin to execute the life and death judgment processing as in the past (S620).

Then, if the life and judgment processing results gives one or more living (winning) points (S630), the life and death judgment processing determines the final result as being alive (wining) (S640).

On the other hand, if the result of the live and death judgment in S620 gives no living (wining) point (S630), the hoard data is returned to the initial state, and life and death judgment execution unit 218 (S650) carries out the life and death judgment processing as usual and determines the result as the final result.

As life and death judgment processing unit 21b determines the processing result of the life and death judgment, output processing unit 22 transmits the processing result to player terminals 3.

As in this working example, the number of the judgment object stones processed in a round robin can be reduced by newly placing stones of the same color as that of the outside in the judgment realm using the outside as the baseline before the round robin life and death judgment processing is simply carried out. Furthermore, if the life and death judgment on the narrowed outside gives the living judgment, the life and death judgment on the judgment object stones can be achieved at a high speed.

Working Example 3

Next, Working Example 3 in which the high speed processing is carried out by life and death judgment processing unit 21c is described herein. An example of the process function of life and death judgment processing unit 21c is conceptually shown in FIG. 54. Life and death judgment processing unit 21c of this example presents the case in which, in the processing of the round robin based life and death judgment, the board in the judgment realm is divided by a given method and changed into each of the eye shapes before the life and death judgment processing is carried out. In other words, the board in the judgment realm is divided by a given method, and one area in the divided realms is changed into the most disadvantageous shape before the processing of the life and death judgment on the entire judgment realm is carried.

Life and death judgment processing unit 21c of this working example comprises realm division processing unit 219, 0 eye shape change-processing unit 220, half eye shape change-processing unit 221, and one eye shape change-processing unit 223.

Realm division processing unit 219 recursively determines in the judgment realm the connection of the adjacent stones of the same color by using the judgment object stones which are adjacent to the outside, and determines whether the other end is adjacent to the other outside. The board in the judgment realm is divided by determining such connections of the stones.

0 eye shape change-processing unit 220 changes the shape of one of the realms determined by realm division processing unit 219 into the 0 eye shape. Specifically, said realm is changed into the 0 shape which is the most disadvantageous shape to said judgment object side. For instance, the shape is changed by placing the opponent's stones at all of the points. For instance, as shown in FIG. 56, the same stones as those of the outside are placed at the points adjacent to the dividing line. In FIG. 56, the stars represent the newly placed stones.

Half eye shape change-processing unit 221 changes the shape of one of the realms determined by realm division processing unit 219 into the half eye shape. Specifically, said realm is changed into the half eye shape which is the most disadvantageous shape to said judgment object side. For instance, in the realm, the shape is changed into the half eye shape so that the two stones of the opponent adjacent to the dividing line can be captured. As shown in FIG. 57, stones are placed so that, for instance, the one eye shape is formed on black's move while the 0 eye shape is formed on white's move. The stars in FIG. 57 represent the stones to be newly placed.

One eye shape change-processing unit 222 changes one of the areas determined by realm division processing unit 219 into one eye. Specifically, said realm is changed into the one eye shape which is the most disadvantageous shape to the judgment object side. For instance, in the realm, the shape is changed into the one eye shape in which two stones of the opponent that are adjacent to the dividing line can be captured. As shown in FIG. 58, for example, stones are placed to form the black one eye shape regardless of black's move or white's move. The stars in FIG. 58 represent the stones to be newly placed.

Note that, in changing the shape into the 0 eye, half eye, or one eye, any change may be made, and any method for processing may be adopted.

Life and death judgment execution unit 223 carries out the life and death judgment processing on the entire judgment realm after the shapes of the divided realms are changed at 0 eye shape change-processing unit 220, half eye shape change-processing unit 221, or one eye shape change-processing unit 222. Additionally, it carries out the life and death judgment processing on the original judgment realm. This life and death judgment processing can use the life and death judgment processing program similar to that of the conventional one. Also note that each working example below demonstrates the case in which the life and death judgment is made in a round robin manner; however, the method used in other conventional life and death judgment processing programs can also be used. Furthermore, the round robin based life and death judgment processing may be the one used in the conventional life and death judgment processing program, and it is not always necessary for all vacant points in the judgment realm to undergo the round robin processing. For instance, a method in which, in vacant points in the judgment realm, the processing on part of vacant points is omitted may also be used. For example, there is a method of omitting the processing in which, when multiple moves of the equal value exist, only one move is made. In other words, life and death judgment execution unit 223 may optionally adopt any method, as long as it can execute the processing of the life and death judgment on the judgment object stones or target stones in the judgment realm.

Next, an example of the processing of the life and death judgment of this working example is described herein with reference to the flowchart as shown in FIG. 55.

Players are playing a Go game using player terminals 3 via a network. In this situation, the processing of the Go game takes place at server 2 which actualizes the playing system. During the game, or after the game is over, if any player presses a given button, etc. displayed on the screen, an execution request for the life and death judgment processing is transmitted from player terminal 3 to server 2 which carries out the life and death judgment processing. An example of the play screen is shown in FIG. 59.

In the case of the play screen shown in FIG. 59, by pressing a request button in the screen such as the "Life and Death Navi" button, etc. for the processing of the life and death judgment, a request for carrying out the life and death judgment processing is transmitted from player terminal 3 to server 2.

As the request is received by input reception unit 20 of server 2, said board data (e.g. game history data) is acquired by life and death processing unit 21c from storage device 11 of the play system. Then, the life and death judgment processing screen containing the board data is transmitted by output processing unit 22 to player terminals 3. An example of the play screen depicting this situation is shown in FIG. 60. Note that, in addition to the board data of the live game, the history data of the past game stored in a given storage device 11, or the history data of the game being watched may be acquired by life and death judgment processing unit 21c from storage device 11 of the play system, and the game history data may be included in the screen of FIG. 60 and transmitted to player terminals 3.

Players who carries out the life and death judgment processing edits the board on the screen showing the life and death judgment processing of FIG. 60. For instance, players remove or place a stone by designating the stone being displayed. Moreover, players designate the judgment realm by dragging input device 13 such as a mouse. In this way, players who want to carry out the life and death judgment processing edit the board data properly. In this mode, the data on the stones to be edited, teban, etc. are properly transmitted from player terminals 3 to server 2.

Upon designation of the judgment realm by the players described above, the stones in the judgment realm that should give a conclusion are designated as the judgment object stones.

An example of the screen showing the life and death judgment processing after the edition is shown in FIG. 61. Note that, in FIG. 61, it is assumed that 9 black stones are the judgment object stones, and black has the teban. Therefore, in this case, black stone has the next turn, and the life or death of the 9 black stones will be determined from the black stone's view.

For instance, by pressing the "judgment processing" on the screen of FIG. 61, the board data after the editing, the teban data (game history data, judgment object stone data, etc.), and a request to start the life and death judgment processing are transmitted from player terminals 3 to server 2. If the board data after the editing, the teban data, and a request to start the life and death judgment processing are received by input reception unit 20 of server 2, life and death processing unit 21c begins to process the life and death judgment upon reception of the input, namely board data after the editing.

First, realm division processing unit 219 of life and death judgment processing unit 21.c determine whether it can be divided (S700) by extracting the game history of the board before the round robin processing begins, and dividing the judgment realm. In other words, it recursively determines the connection of the adjacent stones of the same color by using the judgment object stones which are adjacent to the outside, and determines whether the other end is adjacent to the other outside. Furthermore, if the search results in the presence of connected stones, it determines that the judgment realm can be divided. The working example below describes the case in which the original judgment realm is divided into two areas; however, if it can be divided into 3 or more realms, the judgment is made on one of the realms and all of the remaining areas. Moreover, when the judgment is made on the remaining areas, by recursively determining whether the realm can be divided, the same processing as described below can be used in the case in which the realm is divided into 3 or more areas.

If realm division processing unit 219 determines that the original judgment realm cannot be divided in S700 as described above (S710), it terminates the processing as it is, and life and death judgment execution unit 223 carries out the processing of the usual round robin life and death judgment on the state of the original board (S840).

On the other hand, if realm division processing unit 219 determines that the original judgment realm can be divided in S700, (S710), the determined realm is divided into two. This state is schematically shown in FIG. 62. The black stars in FIG. 62 represent the stones that become the dividing line.

Then, the judgment realm is divided into two areas defined by the dividing line as the border. Now, the area above the dividing line is referred to as realm R1, the area below the dividing line is referred to as realm R2. This state is shown in FIG. 63. In addition to the division into the upper and lower sections, any type of division including the division into the right and left sections can be adopted.

As such, after the realm is divided into two areas by realm division processing unit 219, any one of the realm (herein the realm is referred to as R1) can be changed into the 0 eye shape by 0 eye shape change-processing unit 220 (S720). For instance, the stones included in realm R1 are removed, and the same stones as those of the outside (white stones here) are placed at all points that are adjacent to the dividing line. This state is schematically shown in FIG. 64. The white starts represent the newly placed stones.

Then, after the shape change is processed in S720, life and death judgment execution unit 223 carries out the round robin life and death judgment on the state of the board after the shape change (S730). If the life and death judgment processing by life and death judgment execution unit 223 gives the "winning" result (S740), the winning judgment can be made (S750), and the processing is terminated as it is. In the case of FIG. 64, the stones do not live, and the processing shifts to S740.

In other words, if the life and death judgment processing by life and death judgment execution unit 223 in S730 results in the "losing" judgment (S740), then, realm R1 is changed into the half eye shape by half eye shape change-processing unit 221 (S760). For instance, stones included in realm R1 are removed and, at the points created by the removal of the stones, stones are placed to form the half eye shape so that, for instance, the one eye shape is formed on black's move while the 0 eye shape is formed on white's move. This state is schematically shown in FIG. 65. Here, the white stars and black starts represent the newly placed stones.

Then, after the shape change-processing is terminated in S760, life and death judgment execution unit 223 carries out the round robin life and death judgment processing on the state of the board after the shape change (S770). If the processing of the life and death judgment by life and death execution processing unit 223 gives the "winning" result (S780), then, the board is returned to the original state, and in the divided realms, the realm which is different from the one processed in S760, namely realm R2 is changed into the one eye shape by one eye shape change-processing unit 222 (S790). For instance, the stones included in realm R2 are removed, and at the points created by the removal of the stones, stones are placed to form the one eye shape, for instance, the black one eye shape, regardless of black's move or white's move. This state is schematically shown in FIG. 66. Here, the white stars and black starts represent the newly placed stones.

Then, after the shape change is processed in S790, life and death judgment execution unit 223 carries out the round robin life and death judgment on the state of the board after the shape change (S800). If the life and death judgment processing by life and death judgment execution unit 223 gives the "winning" result (S870), the winning judgment can be made (S880), and the processing is terminated as it is. In the case of FIG. 67, the stones are alive, and the processing is terminated.

On the other hand, in S870, if life and death judgment execution unit 223 gives the "losing" judgment (S870), the processing is terminated as it is, and life and death judgment execution unit 223 carries out the usual processing of the round robin life and death judgment on the original state of the board (S840).

Additionally, in S780, if life and death judgment execution unit 223 determines that realm R1 will not live (S780), then, realm R1 is changed into the one eye shape by one eye shape change-processing unit 222 (S810). For instance, the stones included in realm R1 are removed, and at the points created by the removal of the stones, stones are placed to form the one eye shape, for instance, the black one eye shape, regardless of black's move or white's move.

Then, after the shape change-processing is terminated in S810, life and death judgment execution unit 223 carries out the round robin life and death judgment processing on the state of the board after the shape change (S820). The processing of the life and death judgment by life and death execution processing unit 223 gives the "losing" result (S830), then, the board is returned to the original state, and in the divided realms, the realm which is different from the one processed in S810, namely realm R2 is changed into the 0 eye shape by 0 eye shape change-processing unit 220 (S833). Then, after the shape change is processed in S833, life and death judgment execution unit 223 carries out the round robin life and death judgment on the state of the board after the shape change (S835). If the life and death judgment processing by life and death judgment execution unit 223 gives the "winning" result (S837), the winning judgment can be made (S880), and the processing is terminated as it is. On the other hand, if life and death judgment execution unit 223 gives the "losing" judgment in S835 (S837), the processing is terminated as it is, and life and death judgment execution unit 223 carries out the usual processing of the round robin life and death judgment on the original state of the board (S840).

On the other hand, if life and death judgment execution unit 223 gives the "winning" result in S820 (S830), then, the board is returned to the original state, and in the divided realms, the realm which is different from the one that was processed in S810, namely realm R2 is changed into the half eye shape by half eye shape change-processing unit 221 (S850). For instance, the stones included in realm R2 are removed and, at the points created by the removal of the stones, stones are placed to form the half eye shape so that, for instance, the one eye shape is formed on black's move while the 0 eye shape is formed on white's move.

Then, after the shape change is processed in S850, life and death judgment execution unit 223 carries out the round robin life and death judgment on the state of the board after the shape change (S860). If the life and death judgment processing by life and death judgment execution unit 223 gives the "winning" result (S870), the winning judgment can be made (S880), and the processing is terminated as it is.

On the other hand, in S860, if life and death judgment execution unit 223 gives the "losing" judgment (S870), the processing is terminated as it is, and life and death judgment execution unit 223 carries out the usual processing of the round robin life and death judgment on the original state of the hoard (S840).

As described above, in the processing of the round robin life and death judgment, the board in the judgment realm is divided by a given method and changed into each eye shape before the life and death judgment processing is carried out on the entire judgment realm so that the players can know the result of the life and death judgment processing faster than the processing in which a round robin is simply introduced to the processing of life and death judgment on the judgment realm. This recognizes the fact that the presence of two eyes in the judgment realm dictates living. In other words, in the case in which the judgment realm is divided into two, and one of the divided realms is considered a 0 eye, the other realm, if it is alive, has two eyes; therefore, it can be determined that the judgment object stones are alive as a whole. Additionally, in the case in which one of the realms is considered to have the half eye shape, the other realm, if it is alive, should have the one eye shape: therefore, it can be determined that the judgment object stones are alive as a whole. Furthermore, in the case in which one of the realms is considered to have the one eye shape, and the other realm, if it is alive, should have the half eye shape; therefore, it can be determined that the judgment object stones are alive as a whole.

As described above, in recognition that living stones often have two eyes, by dividing the board in the judgment realm, changing the divided areas into any of the shapes selected from 0 eye, half eye, or one eye, and carrying out round robin death judgment processing on the state of the board after the shape change, and determining whether the divided realms are alive, the result of the life and death judgment processing can be obtained faster than the processing of life and death judgment on the original board.

As life and death judgment processing unit 21c determines the result of the life and death judgment processing in the manner described above, output processing unit 22 transmits the process result to player terminals 3.

Next, each of the processing described above is described in detail with reference to FIGS. 67 to 71.

First, life and death judgment processing unit 21c loads the board data and stores in Board [x][y] whether the point is a vacant point, a black stone is placed, or a white stone is placed. Additionally, it stores in the judgment realm Area [x][y] whether the point is the judgment realm. Besides the above, the judgment object stone [x][y], the judgment realm Area [x][y], the teban tn, etc. are also set appropriately. Then, realm division processing unit 219 at life and death judgment processing unit 21c divides the judgment realm and determines whether the judgment realm can be divided. In other words, Processes D1 and D2 are executed (S900).

Realm division processing unit 219 assigns array R [x][y]=1 to the points that are points E of the outside and that also satisfy the condition expressed as Board [x][y]=tn (S1030). Then, the process sequence of S1040 to S1090 is iterated at points (x, y) that satisfy the condition expressed as R [x][y]=1.

First, array T [x][y]=1 is assigned to the points (x, y) that satisfy the condition expressed as R [x][y]=1, and array T [x][y]=0 is assigned to other points (S1040). Then, the processing of S1050 to S1090 is iterated at points (x', y') that satisfy the conditions expressed as Board [x'][y']=tn and T [x'][y']=0 at points E of the points (x, y).

First, [x'][y']=1 is substituted (S1050). Then, whether the outside is included in points E of the points (x', y') is determined (S1060); if the outside is included in points E of the points (x', y'). Process D2 described later is carried out. On the other hand, if the outside is not included, whether one point satisfies the condition expressed as T [x][y]=1 at points E (a, b) of the points (x', y') is determined (S1070). Note that, here. (a=x'+1, x'−1, b=0), or (b=y'+1, y'−1, a=0). If it is not one point that satisfies T [a][b]=1, T [x'][y']=0 is set (S1100). In addition, if only one point satisfies T [a][b]=1, whether there is a point that satisfies the conditions expressed as T [c][d]=0 and Board [c][d]=tn at points E (c, d) of the points (x', y') is determined (S1080). Note that, here, (c=x'+1, x'−1, d=0), or (d=y'+1, y'−1, c=−0). Furthermore, if no point satisfies the condition of S1080, T [x'][y']=0 is set (S1100).

On the other hand, if there is a point that satisfies the conditions expressed as T [c][d]=0 and Board [c][d]=tn at point E (c, d) of the points (x', y') (S1080), the points (x', y') are assigned to points (x, y) (S1090). The above processing is carried out at all points (x', y') that satisfy the conditions expressed as Board [x', y']=tn and T [x'][y']=0 at points E of points (x, y). After the processing is carried out at all of the points (x', y'), the next point of the points (x, y) undergoes the processing.

The above processing is carried out at all of the points (x, y) that satisfy the condition expressed as R [x][y]=1. If the process is terminated, it can be determined that the realm cannot be divided (S1110), realm division processing unit 219 terminates the subsequent processes and the usual round robin life and death judgment processing is carried out by life and death judgment execution unit 223 (S910, S1020).

If the outside is included in points E of the points (x', y') in the above processing in S1060, Process D2 is carried out; therefore, Process D2 is described herein. First, array T [x][y] is grouped and substituted into array G1. [x][y] (S1120). Then, array H [x][y] is substituted into array H1 [x][y] (S1130).

Next, array H1 [x][y]=0 is assigned to the points (x, y) which satisfy the condition expressed as array G1 [x][y]=1 (S1140). Then, the points (x, y) that satisfy the condition expressed as array H1 [x][y]=1 are taken and grouped in array H1 [x][y], and further substituted into array H2 [x][y] (S1150). Then, H1 [x][y]=0 is assigned to the points (x, y) that satisfy the condition expressed as array H2 [x][y]=1 (S1160).

Next, whether a point (x, y) that satisfies the condition expressed as H1 [x][y]=1 exists is determined (S1170), and if such point does not exist, the processing returns to Process D1, and T [x'][y']=0 is set (S1100). On the other hand, if there are some points (x, y) that satisfy H1 [x][y]=1, it is determined that the judgment realm can be divided, and the dividing line G1 is assigned to array D [x][y] while regarding each of the realms as R1 and R2 (S1180). Additionally, array H1 [x][y] is assigned to array R1 [x][y] at each point in realm R1, and array H2 [x][y] is assigned to array R2 [x][y] at each point in realm R2 (S1180) respectively.

By carrying out the processing described above, the corresponding process sequence of S700 to S710 in FIG. 55 can be achieved.

Furthermore, as S1180 ends, realm division processing unit 219 can determine that the judgment realm can be divided (S910); therefore, Process A is carried out by 0 eye shape change-processing unit 220 and life and death judgment execution unit 223 (S920).

First, Board [x][y]=tn3 and H[x][y]=0 are assigned by 0 eye shape change-processing unit 220 to the points (x, y) that satisfy the condition expressed as R1 [x][y]=1 (S1190). (Note that, here, realm R1 undergoes the 0 eye shape change-processing.) Then, the usual round robin life and death judgment processing is carried out by life and death judgment execution unit 223 (S1200).

The above described processing can execute the corresponding process sequence of S720 to S730 in FIG. 55.

After the shape change to the 0 eye shape is processed by 0 eye shape change-processing unit 220 in the manner described above, if the processing of the life and death judgment carried out by life and death judgment execution unit 223 gives the winning result (S930), the winning judgment can be made as it is (S940); therefore, the processing is terminated.

On the other hand, if the life and death judgment processing carried out by life and death judgment execution unit 223 gives the losing result (S930), Process B is carried out next by half eye shape change-processing unit 221 and life and death judgment execution unit 223 (S950).

First, half eye shape change-processing unit 221 assigns Board [x][y]=0 and H [x][y]=0 to the outside points (x, y) included in realm R1 and points E in realm R1 (S1210). Then, the processing sequences of S1220 to S1260 and S1280 to S1330 are iterated at the points in which points E of each of the two adjacent points P1 (x1, y1) and P2 (x2, y2) are included in array D [x][y] of the dividing line D.

First, Board [x1][y1]=tn3 and Board [x2][y2]=tn3 are assigned to each of the points P1 and P2 (S1220). Then, Board [x][y]=tn is assigned to the points (x, y) which become points E of points P1 and P2 (S1230). Then, array D [x][y] is grouped again (the dividing line D is grouped again), and substituted in array D2 [x][y] (S1240). Then, Board [x][y]=tn3 is assigned to vacant points E (x, y) of the points that satisfy the condition expressed as D2 [x][y]=1 (S1250).

Next, whether points P3 (x3, y3), that are added in S12:30 and satisfies the condition expressed as array D2 [x][y]=0 and, at the same time, not included in points E of the points (x, y) added in S1250, exist is determined (S1260). If such points P3 (x3, y3) do not exist, the processing shifts to the next point. Then, after the processing is carried out on all of the points in which the points E of each of the two points P1 and P2 are included in array D [x][y] of the dividing line D, if the condition of S1260 is not satisfied, which is the case in which the shape change cannot be made, the processing is terminated as it is, and the life and death judgment processing is carried out by life and death judgment execution unit 223 (S1270).

In the judgment of S1260, if some points satisfy the condition, Board [x3][y3]=tn3 is assigned to the obtained points P3 (S1280). Then, assigned to the points (x, y) which become the vacant points E and the vacant points O in groups P1 to P3 is Board [x][y]=tn (S1290). Then, Board [x3][y3]=0 is set at Points P3 (S1300).

Now. Board [x][y]=tn3 is assigned to the vacant points E (x, y) of the points that have been added so far (S1310). Here, since Process 13 is carried out by half eye shape change-processing unit 221, the usual round robin life and death judgment processing is carried out. (S1330).

By carrying out the processing in the manner as described above, the corresponding processing sequence of S760 to S770 shown in FIG. 55 can be executed.

After half eye shape change-processing unit 221 changes the shape into the half eye shape in the manner described above, if life and death judgment execution unit 223 carries out the processing of the life and death judgment and gives the winning result (S960), Process C' is executed next by one eye shape change-processing unit 222 and life and death judgment execution unit 223 (S970). On the other hand, if the processing of the life and death judgment gives the losing result (S960), Process C is executed next by one eye shape change-processing unit 222 and life and death judgment execution unit 223 (S1000).

First, the case in which Process C' is executed is described. Note that the flowcharts of Processes B, C, B', and C' are basically the same as the one shown in FIG. 71; however, depending on the processing object realm, namely R1 or R2, flowcharts of Processes B and B' have some differences. Similarly, depending on the processing object realm, namely R1 or R2, flowcharts of Processes C and C' have some differences.

First, one eye shape change-processing unit 222 assigns the conditions expressed as Board [x][y]=0 and H [x][y]=0 to the outside points (x, y) included in realm R2 and points E in realm R2 (S1210). Then, the processing sequences of B1220 to B1260 and S1280 to S1330 are iterated at the points in which the points E of each of the two adjacent points P1 (x1, y1) and P2 (x2, y2) are included in array D [x][y] of the dividing line D.

First, Board [x][y]=tn3 and Board [x2][y2]=tn3 are assigned to each of the points P1 and P2 (S1220). Then, Board [x][y]=tn is assigned to the points (x, y) which become the points E of points P1 and P2 (S1230). Then, array D [x][y] is grouped again (the dividing line D is grouped again), and substituted in array D2 [x][y] (S1240). Then, Board [x][y]=tn3 is assigned to the points E (x, y) of the points that satisfy the condition expressed as D2 [x][y]=1 (S1250).

Next, whether points P3 (x3, y3), that are added in S1230 and satisfies the condition expressed as array D2 [x][y]=0 and, at the same time, not included in the points E at the points (x, y) added in S1250, exist is determined (S1260). If P3 (x3, y3) does not exist, the processing shifts to the next point. Then, after the processing is carried out at all points in which, at the two points, namely P1 and P2, points E of each P1 and P2 are included in array D [x][y] of the dividing line D, and if the condition is not satisfied in S1260, which is the case in which the shape change cannot be made, the processing is terminated as it is, and the life and death judgment processing is carried out by life and death judgment execution unit 223 (S1270).

In the judgment of S1260, if some points satisfy the condition, Board [x3][y3]=tn3 is assigned to the obtained points P3 (S1280). Then, assigned to the points (x, y), which become the vacant points E and the vacant points O of a group of P1 to P3, is Board [x][y] to (S1290). Then, at points P3, Board [x3][y3]=0 is set (S1300).

Now, to vacant points E (x, y) of the points that have been added so far is assigned Board [x][y]=tn3 (S1310). Here, Process C' is carried out by one eye shape change-processing unit 222; therefore, next, one point (x, y), which is the point E of the points added in S1.290 but not included in the points E in array D2 [x][y], is obtained, and Board [x][y]=0 is substituted (S1320). And the usual round robin life and death judgment processing is carried out by life and death judgment execution unit 223 (S1330).

By carrying out the processing in the manner as described above, the corresponding processing sequence of S790 to S800 shown in FIG. 55 can be executed.

After one eye shape change-processing unit 222 changes the shape into the one eye shape in the manner described above, if life and death judgment execution unit 223 carries out the processing of the life and death judgment and gives the winning result (S980), a win as a whole can be determined (S990), and the processing is terminated as it is. On the other hand, if life and death judgment execution unit 223 carries out the processing of the life and death judgment and gives the losing result (S980), the usual round robin life and death judgment processing is carried out by life and death judgment execution unit 223 (S1020).

By executing Processes B, C, B', and C' based on the flowchart shown in FIG. 71 in the manner as described above, the result of processing the life and death judgment can be obtained.

Note that, if Process B in S960 described above gives the losing result, Process C is carried out next by one eye shape change-processing unit 222 and life and death judgment execution unit 223 in the same manner described above (S1000). In other words, based on the flowchart shown in FIG. 71 in which R1 is the processing object realm, the processing similar to Process C' described above is carried out.

If Process C in S1000 results in, that is, if, after the shape change into one eye is processed by one eye shape change-processing unit 222, the processing of the life and death judgment by life and death judgment execution unit 223 gives a winning result (S1010), a win as a whole can be determined (S990); therefore, the process is terminated as it is. On the other hand, if the execution of the life and death judgment processing gives the losing result (S1.010), Process A' is executed by 0 eye shape change-processing unit 220 and life and death judgment execution unit 223 in the manner as described above (S1013).

Note that Process A' as in the flowchart shown in FIG. 70 is a processing sequence similar to that of Process A; however, the processing object realm of Process A' is R2, not realm R1.

If Process A' in S1013 results in, that is, if, after the shape change into 0 eye is processed by 0 eye shape change-processing unit 220, and the processing of the life and death judgment by life and death judgment execution unit 223 gives a winning result (S1015), a win as a whole can be determined (S990); therefore, the process is terminated as it is. On the other hand, if the execution of the life and death judgment processing gives the losing result (S1015), the usual round robin life and death judgment processing is carried out by life and death judgment execution unit 223 (S1020).

As life and death judgment processing unit 21c determines the result of the processing the life or death judgment in the manner described above, the processing result is transmitted by output processing unit 22 to player terminals 3.

According to this working example in which the board in the judgment realm is divided by a given method, and each eye shape is determined, a simplified judgment can be made by using the characteristic that the living stones often have two eyes.

Working Example 4

Next, Working Example 4 in which the high speed processing is carried out by life and death judgment processing unit 21d is described herein. An example of the process function of life and death judgment processing unit 21d is conceptually shown in FIG. 72. Life and death judgment processing unit 21d of this example uses a method in which whether a stone is dead is determined easily by limiting the moves and by determining that the stone is alive if there are many vacant points adjacent to the judgment object stones in addition to the normal condition to be alive. Note that, in this specification, this judgment method is referred to as the loose ladder move based judgment method.

Life and death judgment processing unit 21d of this working example comprises E-vacant point count processing unit 224 and simplified judgment processing unit 225.

E-vacant point count processing unit 224 counts the number of vacant points E of the judgment object stones.

Simplified judgment processing unit 225 determines the priority of a point of a move of the offense side or the defense side by the use of the loose ladder move based on the number of vacant points E counted by E-vacant point count processing unit 224, and executes the move of the offense side or the defense side based on the priority, and gives the losing result of the offense side if the number of vacant points E of the judgment object stones of the offense side is 4 or more while giving the winning result of the offense side, if the number of vacant points E of the judgment object stones of the offense side is 1. Note that the priority judgment on a point of a move based on the number of vacant points E of the offense side or the defense side is processed in the following manner.

First, for the offense side, if the number of the vacant points E of the judgment object stones counted by E-vacant point count processing unit 224 is 4 or more, the loose ladder move cannot be utilized; therefore, the losing judgment of the offence side is made.

For the offense side, if the number of the vacant points E of the judgment object stones counted by E-vacant point count processing unit 224 is 3, in the vacant points E, the number of the vacant points E that are present when the defense side moves on that point is counted, and the priority is determined in descending order of number to make a move.

For the offense side, if the number of vacant points E of the judgment object stones counted by E-vacant point count processing unit 224 is 2, a move is made as follows: First, if the number of the vacant points E of the stones of the offense side that become point E are counted by E-vacant point count processing unit 224 is 1, a move is made on the vacant point E. Second, in the vacant points E, the number of the vacant points E that are present when the defense side makes a move on that point is counted by E-vacant point count processing unit 224, and a move is made in descending order of number to make a move. Third, a move is made on the vacant points O. Fourth, a move is made at the vacant point E of the vacant points E. Fifth, a move is made on the vacant point (of the vacant points E. Sixth, a move is made on the vacant point E of the vacant points O.

For the offense side, if the number of the vacant points E of the judgment object stones of the offense side counted by E-vacant point count processing unit 224 is 1, a move is made on that point. At this point, it is determined that the offense side wins the game.

Next, for the defense side, if the number of the vacant points E of the judgment object stones counted by E-vacant point count processing unit 224 is 2, a move is made in the following manner. First, if the number of the vacant points E of the stones of the offense side that become point E counted by E-vacant point count processing unit 224 is 1, a move is made on that vacant point E. Second, if the number of the vacant points E of the stones of the offense side that become point E counted by E-vacant point count processing unit 224 is 2, a move is made on any one of the vacant points E. Third, in the vacant points E, the number of vacant points E that are present when a move is made on that point is counted by E-vacant point count processing unit 224, and a move is made in descending order of the number to make a move. Fourth, a move is made on the vacant points O. Fifth, a move is made on the vacant points E of the vacant points E. Sixth, a move is made on the vacant points O of the vacant points E. Seventh, a move is made on the vacant point E of the vacant points O.

For the defense side, if the number of the vacant points E of the judgment object stones counted by E-vacant point count processing unit 224 is I, a move is made in the following manner. First, if one point is given when the number of the vacant points E of the stones of the offense side that become point E is counted by E-vacant point count processing unit 224, a move is made on that vacant point E. Second, a move is made on the vacant points E.

Simplified judgment processing unit 225 iterates the above processing sequence of the offense side and the defense side alternately until the number of the vacant points E of the offense side reaches 1, or 4 or more.

Next, an example of the life and death judgment processing of this working example is described herein with reference to the flowchart shown in FIG. 73.

Players are playing a Go game using player terminals 3 via a network. In this situation, the processing of the Go game takes place at server 2 which actualizes the playing system. During the game, or after the game is over, if any player presses a given button displayed on the screen, an execution request for the life and death judgment processing is transmitted from player terminal 3 to server 2 which carries out the life and death judgment processing. An example of the game screen is shown in FIG. 74.

In the case of the game screen shown in FIG. 74, by pressing a request button on the screen such as the "Life and Death Navi" button, etc. that requests the processing of the life and death judgment causes a request for carrying out the life and death judgment processing to be transmitted from player terminal 3 to server 2.

As the request is received by input reception unit 20 of server 2, said board data (e.g. game history data) is acquired by life and death processing unit 21d from storage device 11 of the play system. Then, the life and death judgment processing screen containing the board data to player terminals 3 is transmitted from output processing unit 22 to player terminals 3. An example of the game screen depicting this situation is shown in FIG. 75. Note that, in addition to the board data of the live game, the history data of the past game stored in a given storage device 11, or the history data of the game being watched may be acquired by life and death judgment processing unit 21d from storage device 11 of the play system, and the game history data may be included in the screen of FIG. 75 and transmitted to player terminals 3.

Players who carries out the life and death judgment processing edits the board on the screen showing the execution of the life and death judgment processing of FIG. 75. For instance, players remove or place a stone by designating the stone being displayed. Moreover, players designate the judgment realm by dragging input device 13 such as a mouse. In this way, players who intend to carry out the life and death judgment processing properly edit the board data. At this time, the editing data on the stones and teban are properly transmitted from player terminals 3 to server 2.

Upon designation of the judgment realm by the players described above, the stones in the judgment realm that should give a conclusion are designated as the judgment object stones. Additionally, in the judgment object stones, if players want to further designate specific stones as the stones that should give a conclusion (target stones), the specific stones can be designated as the target stones. In the judgment object stones, if at least one stone is alive, the life and death judgment gives the living result; when all stones are captured, the life and death judgment gives the dying result. Note that, in the case in which target stones are designated, if all of the target stones are alive, the life and death judgment gives the living conclusion; if at least one of the target stones are captured, the life and death judgment gives the dying conclusion. Also note that the designation of target stones is not essential, and whether the target stones are designated does not make any difference in processing but changes the baseline of the life or death judgment. Therefore, when target stones are designated, the processing can be provided in such a way that the statement "judgment object stones" is appropriately interpreted as "target stones" to process each of the grouped target stones.

An example of the screen showing the life and death judgment processing after the edition is shown in FIG. 76. Note that, in FIG. 76, it is assumed that 2 black stones (black stars) are target stones, and white has the teban. Therefore, in this case, it means that a white stone has the next turn, and the life or death of the 2 black stones will be determined from the white stone's view.

For instance, by pressing the "judgment processing" on the screen of FIG. 76, the board data after the editing (game history data, judgment object stone data, etc.), the teban data, and a request to start the life and death judgment processing are transmitted from player terminals 3 to server 2. If the board data after the editing, the teban data, and a request to start the life and death judgment processing are received by input reception unit 20 of server 2, life and death processing unit 21*d* begins to process the life and death judgment upon receipt of the input, namely the board data after the editing.

First, E-vacant point count processing unit 224 of life and death judgment processing unit 21*d* counts the number of the vacant points E of the judgment object stones that are target stones (S1400). Now, if the number of the vacant point E is 1 (S1410), simplified judgment processing unit 225 gives a winning judgment of the offense side (S1420), and terminates the processing as it is. Moreover, if the number of the vacant points E is 4 or more (S1.410), simplified judgment processing unit 225 gives a losing judgment of the offense side (S1430) and terminates the processing as it is.

In the case of FIG. 76, three vacant points E are given as shown in FIG. 77. Therefore, simplified judgment processing unit 225 determines the priority ranking of a move of each of the vacant points E based on the above order (S1440). Here, there are five vacant points E when the defense side makes a move on the vacant point E1, four vacant points E when the defense side makes a move on the vacant point E2, and three vacant points E when the defense side makes a move on the vacant point E3; therefore, the priority ranking of a move is determined in accordance with this priority ranking.

Thus, simplified judgment processing unit 225 makes a move on the vacant point E1 having the highest priority ranking first (S1450). This is schematically shown in FIG. 78.

Next, in response to the offense side's move on the vacant point E1, simplified judgment processing unit 225 determines whether all of the moves the defense side makes allow the offense side to capture the target stones (S1460). If all of the moves the defense side makes allow the offense side to capture the target stones, simplified judgment processing unit 225 terminates the processing at that point, and determines that the offense side wins the game (S1470). On the other hand, if any of the moves the defense side makes prevents the target stones from being captured (S1460), a move is made based on the subsequent priority ranking set in S1450 (S1.480, 1450). In other words, a move is made on the vacant point E2 shown in FIG. 77. This is schematically shown in FIG. 79.

Moreover, in the same manner as described above, in response to the offense side's move on this vacant point E2, simplified judgment processing unit 225 determines whether all of the moves the defense side makes allow the offense side to capture the target stones (S1460). If all of the moves the defense side makes allow to capture the target stones, simplified judgment processing unit 225 terminates the processing at that point, and determines that the offense side wins the game (S1470). On the other hand, if any of the moves the defense side makes prevents the target stones from being captured (S1460), a move is made based on the subsequent priority ranking set in S1450 (S1480, S1450). In other words, a move is made on the vacant point E3 shown in FIG. 78. This is schematically shown in FIG. 80.

Furthermore, in the same manner as described above, in response to the offense side's move on this vacant point E3, simplified judgment processing unit 225 determines whether the offense side can capture the target stones on all of the moves the defense side make allow the offense side to capture the target stones (S1460). If all of the moves the defense side makes allow to capture the target stones, simplified judgment processing unit 225 terminates the processing at that point and determines that the offense side wins the game (S1470). On the other hand, if any one of the moves the defense side makes prevents the target stones from being captured (S1460), a move is made based on the subsequent priority ranking set in S1450 (S1.480); however, since a move has exhausted all of the moves having the priority ranking, simplified judgment processing unit 225 determines that the offense side lost the game and terminates the processing (S1490).

As life and death judgment processing unit 21*d* determines the processing result of the life or death judgment in the manner described above, the processing result is transmitted by output processing unit 22 to player terminals 3.

Note that, determining whether all of the moves the defense side makes allow the offense side to capture the target stones requires a method in which the processing is carried out based on the priority ranking in such a way that, when the defense side makes a move on a point based on the number of the vacant points E counted by E-vacant point count processing unit 224, then, the offense side further makes a move on that point based on the number of the vacant points E counted by E-vacant point count processing unit 224. Hence, the processing for the defense side is described herein with reference to the state shown in FIG. 78.

In the case in which the offense side makes a move in the state shown in FIG. 78, the number of the vacant points E counted by E-vacant point count processing unit 224 is 2. Therefore, the following priority ranking of each point of a move can be determined: First, the point having two vacant points E of the stones of the offense side that become points E; second, the vacant point E; third, the vacant point O; fourth, the vacant point E of the vacant point E; fifth, the vacant point O of the vacant point E; and sixth, the vacant point E of the vacant point O. This is schematically shown in FIG. 81.

In this case, two vacant points E1 have the highest priority ranking; therefore, for instance, a move is made on the upper vacant point E1. This is schematically shown in FIG. 82.

Next, if the defense side makes a move in the state shown in FIG. 82, the number of vacant points E counted by E-vacant point count processing unit 224 is 2; therefore, a move is made based on the priority ranking described above. In other words, the following priority ranking of each point can be determined: First, the point having one vacant point E of the stones of the offense side that becomes the point E; second, the vacant point E; third, the vacant point O; fourth, the vacant point E of the vacant point E; fifth, the vacant point O of the vacant point E; and sixth, the vacant point E of the vacant point O. This is schematically shown in FIG. 83.

Based on the above, the vacant point E1 has the highest priority ranking; therefore, the offense side makes a move on that vacant point E1. This is schematically shown in FIG. 84.

Next, if the offense side makes a move in the state shown in FIG. 84, the number of vacant points E counted by E-vacant point count processing unit 224 is 1; therefore, a move is made based on the priority ranking of the defense side described above. In other words, the number of the vacant point E is 1, and there is no point having one vacant point E of the stones of the offense side that becomes point E; therefore a move is made by using the remaining vacant points E. This is schematically shown in FIG. 85.

Accordingly, the defense side makes moves at the points. This is schematically shown in FIG. 86.

Next, if the offense side makes a move in the state shown in FIG. 86, the number of the vacant points E counted by E-vacant point count processing unit 224 is 2; therefore, a move is made based on the priority ranking described above. Furthermore, the stones of the same color connected to the target stones also undergo the processing as the target stones. In other words, the following priority ranking of each point can be determined: First, the point having three vacant points E when the defense side makes a move that become points E; second, the point having two vacant points E when the defense side makes a move that become points E; third, the vacant point O: fourth, the vacant points E of the vacant points E; fifth, the vacant points O of the vacant points E; and sixth, the vacant point E of the vacant points O. This is schematically shown in FIG. 87.

Based on the above, the vacant point E1 has the highest priority ranking; therefore, the offense side makes a move on the vacant point E1. The state in which a move is made by the offense side is schematically shown in FIG. 88.

Next, when the offense side makes a move in the state shown in FIG. 88, the number of vacant point E counted by E-vacant point count processing unit 224 is 1; therefore, a move is made based on the priority ranking of the defense side described above. In other words, the number of the vacant point E is I and, at the same time, there is no point having one vacant point E of the stones of the offense side that becomes point E; therefore, a move is made by using the remaining vacant points E. This is schematically shown in FIG. 89.

Accordingly, the defense side makes a move at the points. This is schematically shown in FIG. 90.

Next, when the offense side makes a move in the state shown in FIG. 90, one vacant point E is given by E-vacant point count processing unit 224; therefore, a move is made based on the priority ranking described above. In other words, a move is made on the vacant point E1, and it is determined that the offense side wine. This is schematically shown in FIG. 92.

By carrying out the above, the defense side's winning judgment can be made in the manner described above; however, this is the situation shown in FIG. 81 in which two points have the priority ranking of "1", and a move is made on the upper vacant point E1 (This is shown in FIG. 82). Accordingly, simplified judgment processing unit 225 has not given the offense side's winning judgment on the other point also having the priority ranking of "1"; therefore, simplified judgment processing unit 225 makes judgment on the ease in which a move is made on the other point. In other words, the state of the board is once returned to the state shown in FIG. 81 before a move is made on the other point having the priority ranking of "1". This is schematically shown in FIG. 93.

Next, when the defense side makes a move in the state shown in FIG. 93, the number of vacant points E counted by E-vacant point count processing unit 224 is 2; therefore, a move is made based on the priority ranking described above. In other words, the following priority ranking of each point can be determined: First, the point having one vacant point E of the stones of the offense side that becomes the point E; second, the point having two vacant points E when the defense side makes a move that become the points E; third, the point having one vacant point E when the defense side makes a move that becomes the point E, fourth, the vacant point O; fifth, the vacant point E of the vacant point E; sixth, the vacant points O of the vacant point E; and seventh, the vacant points E of the vacant points O. This is schematically shown in FIG. 94.

By doing so, the vacant point E1 has the priority having the highest ranking; therefore, the offense side makes a move on the vacant point E1. The state in which the offense side made a move is schematically shown in FIG. 95.

Next, when the offense side makes a move in the state shown in FIG. 95, two vacant points E are given by E-vacant point count processing unit 224; therefore, a move is made based on the priority ranking described above. In other words, the following priority ranking of each point can be determined: First, in points E, the point having two vacant points E when the defense side makes a move; second, the vacant point O; third, the vacant point E of the vacant points E; fourth, the vacant points O of the vacant points E; and fifth, the vacant point E of the vacant points O. This is schematically shown in FIG. 96.

In the state shown in FIG. 96, there are two points having the priority ranking of "1" (vacant points E1). Now, in the vacant points E1, the defense side makes a move on the upper vacant point E1 first. This is schematically shown in FIG. 97. After the case in which a move is made on the upper vacant point E1 is processed, another move is made on the lower vacant point E1 to undergo a similar judgment.

Next, when the defense side makes a move on the state shown in FIG. 97, the number of vacant points E counted by E-vacant point count processing unit 224 is 2; therefore, moves are made based on the priority ranking described above. In other words, the following priority ranking of each point can be determined: First, the point having three vacant points E when the defense side makes a move that become the points E; second, the point having two vacant points E when the defense side makes a move that become the points E; third, the vacant points O; fourth, the vacant point E of the vacant points E; fifth, the vacant points O of the vacant points E; and sixth, the vacant points E of the vacant points O. This is schematically shown in FIG. 98

By doing so, the vacant point E1 has the highest priority ranking; therefore, the offense side makes a move on the vacant point E1. The state in which the offense side makes a move is schematically shown in FIG. 99.

Next, when the offense side makes a move in the state shown in FIG. 99, the number of vacant points E counted by E-vacant point count processing unit 224 is 1; therefore, moves are made based on the priority ranking described above. In other words, the number of vacant points E is 1, and there is no point having one vacant point E of the stones of the offense side that becomes point E; therefore, a move is made by using the remaining vacant points E. This is schematically shown in FIG. 100.

Thus, the defense side makes moves at the points. This is schematically shown in FIG. 101.

Next, when the offense side makes a move in the state shown in FIG. 101, the number of vacant points E counted by E-vacant point count processing unit 224 is 1; therefore, a move is made based on the priority ranking described above. This is schematically shown in FIG. 102. In other words, a move is made on the vacant point E1 and, at the same time, a win of the offense side is determined. This is schematically shown in FIG. 103.

By carrying out the above, the defense side's winning judgment can be made in the manner described above; however, this is the situation shown in FIG. 96 in which, in two points having the priority ranking of "1", a move is made on the upper vacant point E1 (This is shown in FIG. 97). Accordingly, simplified judgment processing unit 225 has not given the offense side's wining judgment on the other point also having the priority ranking of "1": therefore, simplified judgment processing unit 225 makes judgment on the case in which a move is made on the other point. In other words, the state of the board is once returned to the state shown in FIG. 96 before a move is made on the other point having the priority ranking of "1". This is schematically shown in FIG. 104.

Simplified judgment processing unit 225 iterates the above processing for each of the offense side and the defense side in accordance with the number of vacant points E. Additionally, simplified judgment processing unit 225 allows both the offense side and the defense side to make a move based on the priority ranking in descending order. Accordingly, if the offence side can capture a specific point of a move of the offense side, it is determined that the offense side wins; if there is a move the defense side makes that cannot be captured by all moves the offense side makes, it is determined that the offense side loses.

By using such processing, particularly, whether a specific stone, namely the target stones on the board can be captured in the endgame situation can be determined at a high speed.

Next, each process described above is described further in detail herein with reference to FIGS. 105 to 116.

First, life and death judgment processing unit 21.d reads out the board data and stores in Board [x][y] whether the point is a vacant point, a black stone is placed, or a white stone is placed. Additionally, it stores in the judgment realm Area [x][y] whether the point is the judgment realm. Besides the above, the judgment object stones H [x][y], the judgment realms Area [x][y], and the teban tn, etc are also set appropriately. Moreover, E-vacant point count processing unit 224 at life and death judgment processing unit 21d obtains the vacant points E of H[x][y] from. Board [x][y] and H [x][y] and substitutes the vacant points E into array E1 [x][y] (S1500).

Then, simplified judgment processing unit 225 carries out the corresponding processes from S1520 to S1550 according to the number of points that satisfies the condition expressed as array E1 [x][y]=1 (S1.510).

First, if the number of points that satisfies the condition expressed as array E1 [x][y]=1 is 4 or more, simplified judgment processing unit 225 determines a loss of the offense side (S1520) and terminates the processing as it is. Additionally if the number of points that satisfies the condition expressed as E1. [x][y]=1 is 1, simplified judgment processing unit 225 determines a win of the offense side (S1530) and terminates the processing as it is.

Furthermore, if the number of points that satisfies the condition expressed as E1 [x][y]=1 is 3, simplified judgment processing unit 225 carries out Process B (S1540), and after Process B is terminated, it further carries out Process D (S1560).

On the other hand, if the number of points that satisfies the condition expressed as E1 [x][y]=1 is 2, simplified judgment processing unit 225 carries out Process C (S1550), and after Process C is terminated, it further carries out Process D (S1560).

Simplified judgment processing unit 225 carries out the processing as described above.

Next, Process B is described herein. Simplified judgment processing unit 225 iterates the processing sequence of S1600 to S1635 at the points (x, y) that satisfy the condition expressed as E1 [x][y]=1.

In other words, first, Board [x][y]=tb3 is assigned to the points (x, y) that satisfy the condition expressed as E1 [x][y]=1 (S1600). Then, array Board [x][y] is grouped and substituted into array H2 [x][y] (S1610). Next, the vacant points E in array H2 [x][y] are obtained and substituted into array E2 [x][y] (S1620). Moreover, the points (x, y) are added to array Order [i] (assigned to array Order [i].x is x, to array Order [i].y is y), and the number of points that satisfies the condition expressed as E2 [x][y]=1 is assigned to Order [i]. v (S1630). Furthermore, array Board [x][y]=0 is substituted (S1635).

The above processes are carried out on all of the points (x, y) that satisfy the condition expressed as E1 [x][y]=1, and after the process is terminated, array Order is sorted in descending order of the element v (S1640).

Simplified judgment processing unit 225 carries out Process B in the manner described above, and then, carries out Process D.

First, the processing sequence of S1650 to S1660 is iterated from i=0 to i<361.

In other words, whether the teban to can make a move on points (x, y) in array Order [i] is determined (S1650), and if a move cannot be made, the processing shifts to the next i. On the other hand, if a move can be made, a move is made, and array Board [x][y] and array H [x][y] are updated (S1655). In other words, Board [x][y]=tn is set, and if the opponent's stone can be captured when a move is made, values of the points of capturing the stone in array Board are also updated appropriately. Additionally, the values of the stones adjacent to the judgment object stones are also updated appropriately by using the condition expressed as array H [x][y]=1. Furthermore, if the points can be grouped, array H [x][y] is grouped again. Then, Process E described later is executed, and if Process E gives the winning result (S1660), simplified judgment processing unit 225 determines a win of the offense side (S1670) and terminates the processing. On the other hand, if Process E determines the losing result, the processing shifts to the next i.

The above processing is iterated until i<361, and if the processing is terminated, simplified judgment processing unit 225 determines a loss of the offense side (S1680) and terminates the processing.

Next, Process C in S1550 shown in FIG. 105 is described herein.

Points E that are not the vacant points in H [x][y] are substituted into array E2 [x][y] by simplified judgment processing unit 225 (S1700). Then, the processing sequence of S1710 to S1740 is iterated at all of the points (x, y) that satisfy the condition expressed as E2 [x][y]=1.

In other words, first, array Board [x][y] is grouped and substituted into array G [x][y] (S1710). Next, the vacant points E in array G [x][y] are substituted into array G2 [x][y] (S1720). Then, the number of points (a, b) that satisfy the condition expressed as array G2 [a][b]=1 (1≤a, b≤19) is determined (S1730), and if the number is not one, the processing shifts to the next point (x, y). On the other hand, if the number of points that satisfies the condition expressed as array G2 [x][y]=1 is 1, the point (a, b) is added to array Order [i] (assigned to array Order [i].x is a, to array Order [i].y is b), and Order [i].v=5000 is set (S1740).

The above processes are carried out at all of the points (x, y) that satisfy the condition expressed as E2 [x][y]=1, and after the process is terminated, Process C2 is carried out.

First, the processing sequence of S1750 to S1790 is iterated at all of the points (x, y) that satisfy the condition expressed as E1 [x][y]=1.

In other words, first, Board [x][y]=tb3 is assigned to the points (x, y) that satisfy the condition expressed as E1 [x][y]=1 (S1750). Then, Board [x][y] is grouped and substituted into array H2 [x][y] (S1760). Next, the vacant points E in array H2 are substituted into array E2 [x][y] (S1770). Moreover, the points (x, y) are added to array Order [i] (assigned to array Order [i].x is x, to array Order [i].y is y), and assigned to Order [i]. v is the value representing the sum of 4000 and the number of points that satisfies the condition expressed as E2 [x][y]=1 (S1780). Furthermore, Board [x][y]=0 is substituted (S1790).

The above processing is carried out for all of the points (x, y) that satisfy the condition expressed as E1. [x][y]=1, and as the processing is terminated, Process C3 is carried out.

First, the vacant points O in array H [x][y] are substituted into array O [x][y] (S1800). Then, vacant points E of the vacant points E in array H [x][y] are substituted into array EE [x][y] (S181.0). Next, the vacant points O of the vacant points E in array H [x][y] are substituted into array EO [x][y] (S1820), and the vacant points E of the vacant point O in array H [x][y] are substituted into array OE [x][y] (S1830).

Then, the process sequence of S1840 to S1910 is iterated at the points (x, y) until each point x, y reaches from 1 to 19.

First, whether array O [x][y] 1 is determined (S1840), and if array O [x][y]=1, the points (x, y) are added to array Order [i] (assigned to array Order [i].x is x, to array Order [i].y is y), and Order [i]. v=3000 is substituted (S1850). Then, the processing shifts to the next point (x, y). Additionally, if array O [x][y]≠1, whether array EE [x][y]=1 is determined (S1860).

If array EE [x][y]=1, the points (x, y) are added to array Order [i] (assigned to array Order [i].x is x, to array Order [i].y is y), and Order [i]. v=2000 is substituted (S1870). Then, the processing shifts to the next point (x, y). Additionally, array EE [x][y]≠1, whether array EO [x][y]=1 is determined (S1880).

If array EO [x][y]=11, the points (x, y) are added to array Order [i] (assigned to array Order [i].x is x, to array Order [i].y is y), and Order [i]. v=1000 is substituted (S1890). Then, the processing shifts to the next point (x, y). If array EO [x][y] 1, whether array OE [x][y]=1 is determined (S1900).

If array OE [x][y]=1, the points (x, y) are added to array Order [i] (assigned to array Order [i].x is x, to array Order [i].y is y), and Order [i]. v=0 is substituted (S1910). The processing shifts to the next point (x, y). If array OE [x][y] 1, the processing also shifts to the next point (x, y).

The above process sequence is executed until each point x, y reaches from 1 to 19, and array Order [i] is sorted in descending order of the element v after the processing is terminated (S1920). Then, Process D described above is carried out by simplified judgment processing unit 225.

Next, Process E is described.

First, in Process E, the vacant points E in array H [x][y] are substituted into array E1 [x][y] (S1950). Then, the number of points that satisfies the condition expressed as E1 [x][y]=1 is determined (S1960), and if the number of points that satisfies the condition expressed as E1 [x][y]=1 is 2, Process F described later is carried out by simplified judgment processing unit 225 (S1970). Additionally, if the number of points that satisfies the condition expressed as E1 [x][y]=1 is 1, Process G described later is carried out by simplified judgment processing unit 225 (S1980). Then, after Process F or Process G is terminated. Process H described later is carried out by simplified judgment processing unit 225 (S1990).

First, Process F, which is executed if the number of points that satisfies the condition expressed as E1 [x][y]=1 is 2, is described.

In Process F, points E that are not the vacant points in array H [x][y] are substituted into array E2 [x][y] (S2000). Then, the process sequence of S2010 to S2050 is iterated at all of the points (x, y) that satisfy the condition expressed as E2 [x][y]=1.

First, array Board [x][y] is grouped and substituted into array G [x][y] (S2010). Then, the vacant points E in array G [x][y] are substituted into array G2 [x][y] (S2020).

Then, the number of the points (a, b) that satisfies the condition expressed as array G2 [a][b]=1 (1≤a, b≤19) is determined (S2030): If the number of points that satisfies the condition expressed as array G2 [a][b]=1 is 1, the point (a, b) is added to array Order [i] (assigned to array Order [i].x is a, to array Order [i].y is b) and Order [i].v=6000 is substituted (S2040). On the other hand, if the number of points that satisfies the condition expressed as array G2 [a][b]=1 is 2, the points (a, b) are added to array Order [i] (assigned to array Order [i].x is a, to array Order [i].y is b) and Order [i].v=5000 is substituted (S2050). If array G2 [a][b] is neither one nor two, or the points (a, b) are added to array Order [i] in S2040 or S2050, the processing shifts to the next point (x, y).

The above processing is carried out at all of the points that satisfy the condition expressed as E2 [x][y]=1, and after the processing is terminated, Process F2 is carried out.

First of all, the process sequence of S2060 to S2100 is iterated at all of the points (x, y) that satisfy the condition expressed as array E1 [x][y]=1.

Now, Board [x][y]=tb3 is substituted (S2060), and Board [x][y] is grouped and substituted into array H2 [x][y] (S2070). Then, the vacant points E in array H2 [x][y] are substituted into array E2 [x][y] (S2080), and the points (x, y) are added to array Order [i] (assigned to array Order [i].x is x, to array Order [i].y is y). Then, the value of the sum of 4000 and the number of points that satisfies the condition expressed as array E2 [x][y]=1 is assigned to Order [i]. v (S2090). In addition, Board [x][y]=0 is substituted (S2100).

The above processing is carried out at all of the points (x, y) that satisfy the condition expressed as E1 [x][y]=1, and after the processing is terminated, Process F3 is carried out.

First, the vacant points O in array H [x][y] are substituted into array O [x][y] (S2110). Then, vacant points E of the vacant points E in array H [x][y] are substituted into array EE [x][y] (S2120). Next, vacant points O of the vacant points E in array H [x][y] are substituted into array EO [x][y] (S 2130), and vacant points E of the vacant points O in array H [x][y] are substituted into array OE [x][y] (S2140).

Then, the process sequence of S2150 to S2220 is iterated at points (x, y) until each point x, y reaches from 1 to 19.

First, whether array O [x][y]=1 is determined (S2150), and if so, the points (x, y) are added to array Order [i] (assigned to array Order [i].x is x, to array Order [i].y is y), and Order [i]. v=3000 is substituted (S2160). Then, the processing shifts to the next point (x, y). Additionally, if array O [x][y]≠1, whether array EE [x][y]=1 is determined (S21.70).

If array EE [x][y]=1, the points (x, y) are added to array Order [i] (assigned to array Order [i].x is x, to array Order [i].y is y), and Order [i], v=2000) is substituted (S2180). Then, the processing shifts to the next point (x, y). Additionally, if array EE [x][y]≠1, whether array EO [x][y]=1 is determined (S2190).

If array EO [x][y]=1, the points (x, y) are added to array Order [i](assigned to array Order [i].x is x, to array Order [i].y is y), and Order [i], v=1000 is substituted (S2200). Then, the processing shifts to the next point (x, y). If array EO [x][y]≠1, whether array OE [x][y]=1 is determined (S2210).

If array OE [x][y]=1, the points (x, y) are added to array Order [i] (assigned to array Order [i].x is x, to array Order [i].y is y), and Order [i]. v=0 is substituted (S2220). The processing shifts to the next point (x, y). Even if array OE [x][y] 1, the processing also shifts to the next point (x, y).

The above processing is executed until each point x, y reaches from 1 to 19, and after the processing is terminated, array Order [i] is sorted in descending order of the element v (S2230). Then, Process H described above is carried out by simplified judgment processing unit 225.

Furthermore, in S1960 shown in FIG. 111, if the number of the points that satisfies the condition array E1 [x][y]=1 is 1, Process G is carried out; therefore, Process G is described herein.

Points E that are not the vacant points in array H [x][y] are substituted into array E2 [x][y] by simplified judgment processing unit 225 (S2300). Then, the process sequence of S2310 to S2340 is iterated at all of the points (x, y) that satisfy the condition expressed as E2 [x][y]=1.

In other words, first, the points (x, y) are grouped (array Board [x][y] is grouped) and substituted into array G [x][y] (S2310). Then, the vacant points E in array G [x][y][x][y] substituted into array G2 [x][y] (S2320). Then, the number of points (a, b) that satisfy the condition expressed as array G2 [a][b]=1 (1≤a, b≤19) is determined (S2330), and if the number of points (a, b) that satisfies G2 [a][b]=1 is other than one, the processing shifts to the next point (x, y). On the other hand, if the number of points that satisfies the condition expressed as array G2 [x][y]=1 is 1, the point (a, b) is added to array Order [i] (assigned to array Order [i].x is a, to array Order [i].y is b) and Order [i].v=5000 is set (S2340).

The above processes are carried out at all of the points (x, y) that satisfy the condition expressed as E2 [x][y]=1, and after the process is terminated. Process H is carried out.

First, simplified judgment processing unit 225 iterates the processing sequence of S2400 to S2430 from i=0 to i<361.

In other words, whether the teban to can make a move on points (x, y) in array Order [i] is determined (S2400), and if a move cannot be made, the processing shifts to the next i. On the other hand, if a move can be made, a move is made, and array Board [x][y] and array H [x][y] are updated (S2405). In other words, Board [x][y]=tn3 is set, and if a move can capture the opponent's stones, the values of the points of capturing stones in array Board are also updated appropriately. Additionally, the stones adjacent to the judgment object stones are also updated appropriately by using the condition expressed as array H [x][y]=1. Furthermore, if the points can be grouped, array H [x][y] is grouped again. Then. Process A (the process shown in FIG. 105) described later is executed: If Process A gives the losing result (S2410), simplified judgment processing unit 225 determines that the offense side lost the game (S2420) and terminates the processing. On the other hand, if Process A does not give the losing result, the processing shifts to the next i.

The above processing is iterated up to i<361, and if the processing is terminated, simplified judgment processing unit 225 determines a win of the offense side (S2430) and terminates the processing.

As described above, by carrying out Processes A through H by simplified judgment processing unit 225, the life and death judgment processing of this working example in which a loose ladder move is introduced can be executed.

Working Example 5

Note that, in Working Examples 1 to 3 above, the processes that utilize the judgment object stones are explained; however, the target stones may also be designated. In this case, life and death judgment processing unit 21d can carry out a round robin life and death judgment processing in such a way that, if all of the target stones are alive, the life and death judgment gives the living result while if at least one of the target stones are captured, the life and death judgment gives the dying result.

Moreover, in each of the working example described above, the processing in which arrays and variables are used; however, the present invention is not limited to this and any method that is required can be carried out appropriately.

The function of each means of the present invention is only differentiated logically and may have a physically or actually identical realm. Needles to say, datafiles may be used in place of a database, and the description of "database" includes datafiles.

INDUSTRIAL APPLICABILITY

By the use of the life and death judgment processing system 1 for a Go game described above, the result of life and death judgment can be outputted at a higher speed than the conventional life and death judgment system 1 without limiting the applicable situation to the middlegame or the endgame.

DESCRIPTION OF THE REFERENCE SYMBOLS

1: Life and death judgment system for a Go game
2: Server

3: Player terminal
10: Computational device
11: Storage device
12: Display device
13: Input device
14: Communication device
20: Input reception unit
21: Life and death judgment processing unit
21a, 21b, 21c, 21d: Life and death judgment processing unit
22: Output processing unit
210: Initial judgment processing unit
211: First judgment processing unit
212: Second judgment processing unit
213: Priority change-processing unit
214: Life and death judgment execution unit
215: Priority memory unit
216: First outside processing unit
217: Second outside processing unit
218: Life and death judgment execution unit
219: Realm division processing unit
220: 0 eye shape-change processing unit
221: Half eye shape-change processing unit
222: One eye shape-change processing unit
223: Life and death judgment execution unit
224: E-vacant point count processing unit
225: Simplified judgment processing unit

The invention claimed is:

1. A computer system connected over a computer network to a server supporting a Go-game by two players, each player having their own respective computer terminal connected to the server and on which a computer screen shows a representation of a first board situation of a Go board on which the two players are playing the Go-game; the computer system being capable of making a reliably accurate, high-speed identification of a winning point(s) of first move in a judgment realm selected by a first player associated with Go stones of a first color, said winning point(s) being by said first player and resulting in group(s) of judgment object stones or target stones of the first color being alive in the judgment realm; said identification taking place on a 19×19 size computer Go game board in the middle of a computer Go game; the computer system comprising:
 (a) an input system configured to receive:
  (i) board data of the Go-game from a storage device of the server supporting the Go-game; and
  (ii) input data, from a player's computer terminal, containing data defining the judgment realm and a command signal for identifying a winning point(s) of first move in the judgment realm;
 (b) a life or death judgment system;
 (c) said life or death judgment system directing a first outside system to reduce the number of vacant points in the judgment realm by performing the following functions:
  (i) identifying, within the judgment realm, at least one group of stones of first color constituting a closed realm, and all other stones of first color not constituting a closed realm;
  (ii) identifying all vacant points in the judgment realm outside of the at least one closed realm, excluding any E-vacant points associated with a stone of first color and any O-vacant points on No. 1 line associated with a stone belonging to the at least one group of stones constituting a closed realm; and
  (iii) placing stones of a second color at all of the identified vacant points, and removing any newly placed stone(s) of second color that is not adjacent any other stones of second color outside the judgment realm;
 (d) when the first outside system is terminated upon reducing the number of vacant points in the judgment realm or upon determining that there is no closed realm in the judgment realm, said life or death judgment system directing a second outside system to reduce the number of vacant points in the judgment realm by performing the following functions:
  (i) identifying all outside-E-vacant points in the judgment realm, each of which is associated with two stones of second color belonging to a line group of mutually linked stones of second color, but which is not an E-vacant point, or an O-vacant point on No. 1 line, associated with a stone belonging to a group of stones of first color;
  (ii) placing stones of second color at all of the identified outside-E-vacant points;
  (iii) when stones of second color are placed at all of the identified outside-E-vacant points, repeating steps (c)(i) and (c)(ii) above until there remains no further outside-E-vacant point in the judgment realm;
 (e) when the second outside system is terminated upon determining that there remains no outside-E-vacant point in the judgment realm, said life or death judgment system directing a life or death judgment execution system to identify a winning point(s) of first move in the judgment realm by simulating future game play by iteratively placing, within the judgment realm, a first stone on a respective vacant point selected according to a priority value of the foregoing vacant point, and making a life or death prediction of the judgment object stone(s) or target stone(s) in the judgment realm according to a plurality of patterns of subsequent simulated placement of stones resulting from said respective stone being placed on said respective vacant point; and
 (f) an output system configured to send to said first player's computer terminal a result of said identification of a winning point(s) of first move made by said life or death judgment execution system.

* * * * *